(12) United States Patent
Narayanaswamy et al.

(10) Patent No.: US 12,736,998 B2
(45) Date of Patent: Sep. 15, 2026

(54) APPLICATION PROGRAMMING INTERFACE TO CONFIGURE A PROCESSOR USING PRIORITY

(71) Applicant: NVIDIA Corporation, Santa Clara, CA (US)

(72) Inventors: Sreedhar Narayanaswamy, Sunnyvale, CA (US); Pratikkumar Dilipkumar Patel, Milpitas, CA (US); Milica Despotovic, San Jose, CA (US); Ian Karlin, Hillsboro, OR (US); Dale Allen Southard, Larkspur, CA (US); Mark Taylor, San Francisco, CA (US); Chad R. Plummer, Fairfax, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/632,270

(22) Filed: Apr. 10, 2024

(65) Prior Publication Data

US 2025/0321610 A1 Oct. 16, 2025

(51) Int. Cl.
*G06F 1/00* (2006.01)
*G06F 1/08* (2006.01)

(52) U.S. Cl.
CPC .................................... *G06F 1/08* (2013.01)

(58) Field of Classification Search
CPC ........................................................ G06F 1/08
See application file for complete search history.

(56) References Cited

U.S. PATENT DOCUMENTS

| | | | | |
|---|---|---|---|---|
| 8,612,984 | B2 | 12/2013 | Bell, Jr. et al. | |
| 9,830,187 | B1 * | 11/2017 | Blaine | G06F 9/4881 |
| 10,620,959 | B2 | 4/2020 | Folco et al. | |
| 12,248,357 | B1 | 3/2025 | Ahmad et al. | |
| 2005/0273636 | A1 | 12/2005 | Grobman | |
| 2007/0168055 | A1 | 7/2007 | Hsu et al. | |
| 2008/0278905 | A1 | 11/2008 | Artman et al. | |
| 2009/0064157 | A1 | 3/2009 | Bar-Or et al. | |
| 2009/0109230 | A1 | 4/2009 | Miller et al. | |
| 2010/0153966 | A1 | 6/2010 | Arimilli et al. | |
| 2014/0059209 | A1 | 2/2014 | Alnoor | |
| 2015/0241942 | A1 | 8/2015 | Venumuddala et al. | |
| 2017/0083364 | A1 | 3/2017 | Zhao et al. | |
| 2017/0132037 | A1 | 5/2017 | Sevigny | |
| 2018/0359629 | A1 | 12/2018 | Manam et al. | |
| 2019/0384348 | A1 | 12/2019 | Srinivasan et al. | |
| 2019/0384370 | A1 | 12/2019 | Kim et al. | |
| 2021/0397476 | A1 | 12/2021 | Liu et al. | |

(Continued)

OTHER PUBLICATIONS

IEEE "IEEE Standard for Floating-Point Arithmetic", Microprocessor Standards Committee of the IEEE Computer Society, IEEE Std 754-2008, dated Jun. 12, 2008, 70 pages.

(Continued)

*Primary Examiner* — Xuxing Chen
(74) *Attorney, Agent, or Firm* — Davis Wright Tremaine LLP

(57) ABSTRACT

Apparatuses, systems, and techniques to perform an application programming interface (API) to identify processor settings to be used when performing one or more software workloads. As an example, one or more processors comprising one or more circuits perform an API to identify processor settings to be used to configure processors assigned to perform a software workload based, at least in part, on one or more priority inputs to the API.

21 Claims, 73 Drawing Sheets

(56) References Cited

U.S. PATENT DOCUMENTS

| | | | | |
|---|---|---|---|---|
| 2022/0150898 | A1 | 5/2022 | Jin et al. | |
| 2022/0318052 | A1 | 10/2022 | Sivathanu et al. | |
| 2023/0315143 | A1 | 10/2023 | Srinivasan et al. | |
| 2024/0004707 | A1 | 1/2024 | Wang et al. | |
| 2024/0220338 | A1* | 7/2024 | Kumar | G06F 9/541 |
| 2025/0123673 | A1 | 4/2025 | Simlai et al. | |
| 2025/0301417 | A1* | 9/2025 | Schipani | H04W 64/006 |
| 2025/0321609 | A1 | 10/2025 | Narayanaswamy et al. | |
| 2025/0322481 | A1 | 10/2025 | Narayanaswamy et al. | |

OTHER PUBLICATIONS

San et al., "Quality Assessment of GPU Power Profiling Mechanisms," 2018 IEEE International Parallel and Distributed Processing Symposium Workshops, May 21, 2018, 10 Pages.

HPC Advisory Council, "Monitoring and Management Interfaces for GPU Devices in a Cluster Environment," Retrieved from, https://www.youtube.com/watch?v=f5v-4LgL1ho, Mar. 31, 2014, 2 Pages.

ADM, "How to Tune GPU Performance Using Radeon Software," Retrieved from, <https://web.archive.org/web/20231213131535/https:/www.amd.com/en/support/kb/faq/dh2-020,> Dec. 13, 2023, 19 Pages.

Anonymous, "CPU Performance Scaling—The Linux Kernel Documentation," Retrieved from, https://web.archive.org/web/2024022220 1542/https://www.kernel.org/doc/html/v4.14 /admin-guide/pm/cpufreq.html, Feb. 22, 2024, 13 Pages.

Extended European Search Report for Application No. 25169722.3-1207, mailed Jul. 28, 2025, 10 pages.

* cited by examiner

| | Bias | Fmax Cap (GHz) | Max TGP (W) | XBAR Ratio | MAX MCLK (MHz) | Vmax (V) | Fan Control Algorithm | Perf Tuning Coefficients | DL Weights |
|---|---|---|---|---|---|---|---|---|---|
| Max Perf | Bias = 0 | 2.6 | 750 | 12 | 1593 | 1.125 | A1*bias+A2*bias^2+B | A=0.67, B=0.35,C=0.46, D=0.88 | Weight->(54, 11.6, 0.9) |
| Energy Efficiency | Bias = 1 | 2.7 | 775 | 14 | 1593 | 1.15 | A1*bias+A2*bias^2+B | A=0.77, B=0.35,C=0.49, D=1.04 | Weight->(23, 2.6, 0.93, 4) |
| Tensor Cores Intensive | Bias = 0 | 3.0 | 800 | 15 | 1667 | 1.18 | A1*bias+A2*bias^2+B | A=0.87, B=0.44,C=0.66, D=1.25 | Weight->(67, 1.0, 9.6, 0.9) |

| | Fmax Cap (GHz) | Max TGP (W) | XBAR Ratio | MAX MCLK (MHz) | Vmax (V) | Fan Control Algorithm | Perf Tuning Coefficients | DL Weights |
|---|---|---|---|---|---|---|---|---|
| Bias = 0 | 2.6 | 750 | 12 | 1593 | 1.125 | A1*bias+A2*bias^2+B | A=0.67, B=0.35,C=0.46, D=0.88 | Weight->(54, 11.6, 0.9) |
| Bias = 1 | 2.7 | 775 | 14 | 1593 | 1.15 | A1*bias+A2*bias^2+B | A=0.77, B=0.35,C=0.49, D=1.04 | Weight->(23, 2.6, 0.93, 4) |
| Bias = 2 | 3.0 | 800 | 15 | 1667 | 1.18 | A1*bias+A2*bias^2+B | A=0.87, B=0.44,C=0.66, D=1.25 | Weight->(67, 1.0, 9.6, 0.9) |
| Bias = 3 | 3.2 | 850 | 15 | 1667 | 1.22 | A1*bias+A2*bias^2+B | A=0.87, B=0.44,C=0.66, D=1.25 | Weight->(54, 11.6, 0.9) |

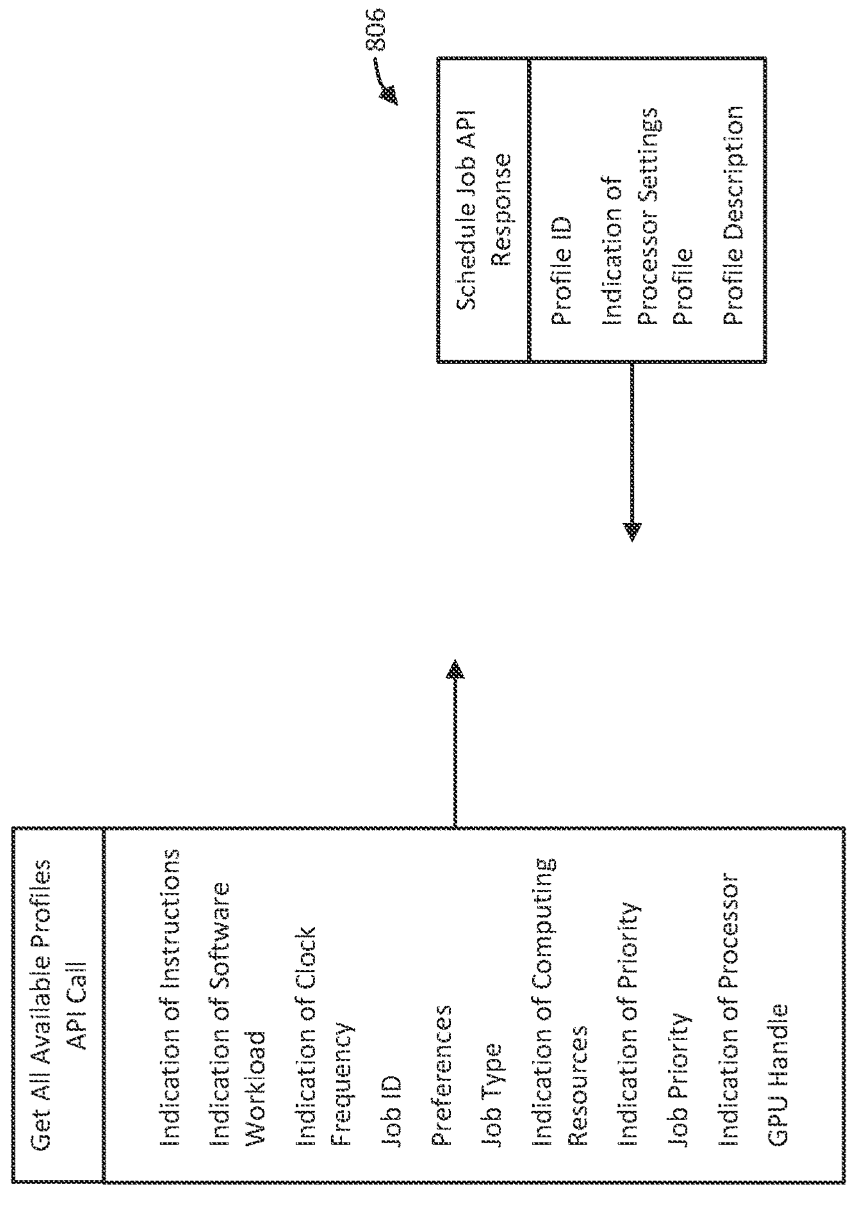
804
Get All Available Profiles API Call
Indication of Instructions
Indication of Software Workload
Indication of Clock Frequency
Job ID
Preferences
Job Type
Indication of Computing Resources
Indication of Priority
Job Priority
Indication of Processor
GPU Handle
806
Schedule Job API Response
Profile ID
Indication of Processor Settings Profile
Profile Description

FIG. 8B

Figure 14:
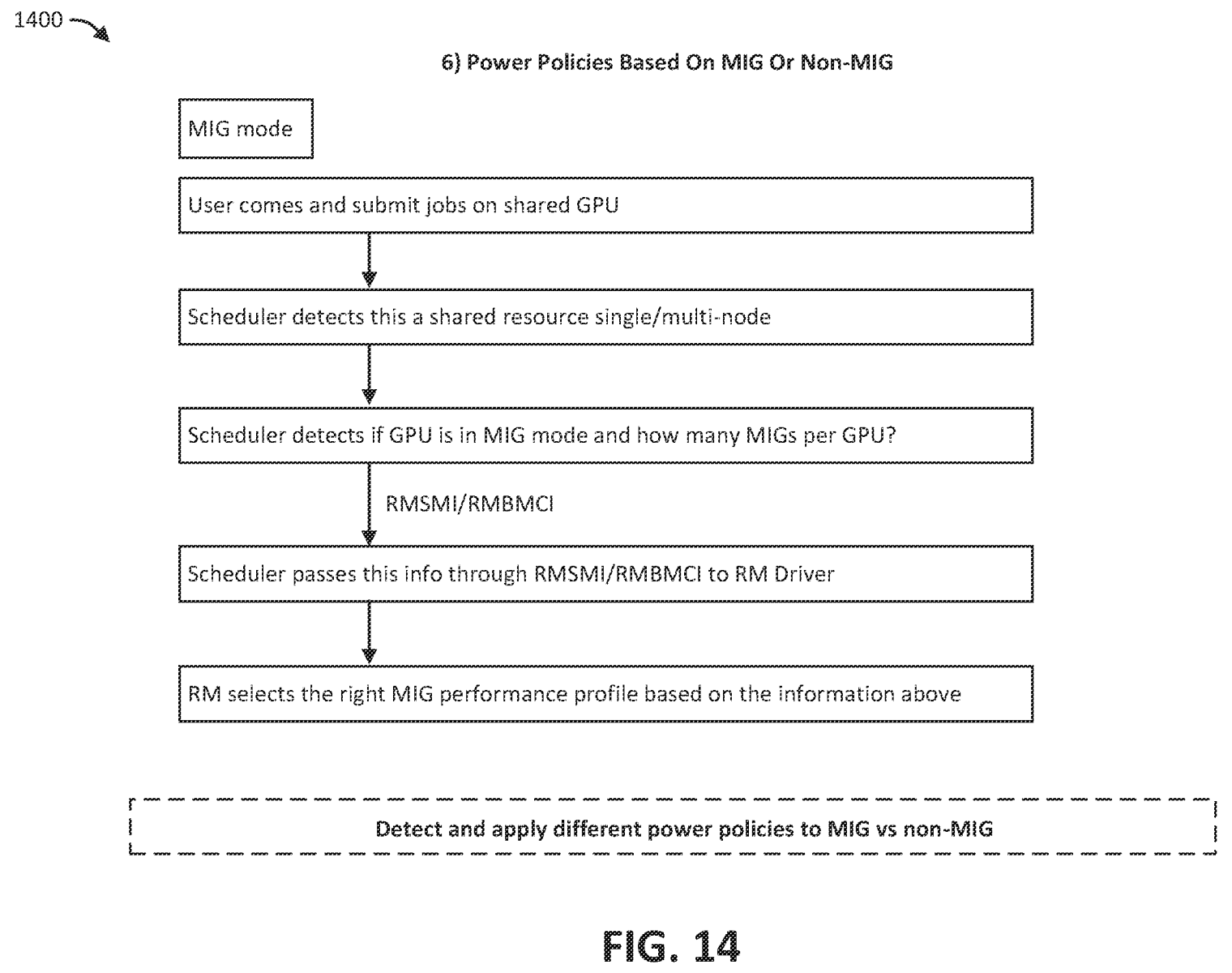

1400

6) Power Policies Based On MIG Or Non-MIG

MIG mode

User comes and submit jobs on shared GPU

Scheduler detects this a shared resource single/multi-node

Scheduler detects if GPU is in MIG mode and how many MIGs per GPU?

RMSMI/RMBMCI

Scheduler passes this info through RMSMI/RMBMCI to RM Driver

RM selects the right MIG performance profile based on the information above

Detect and apply different power policies to MIG vs non-MIG

Workflow -> Single Exclusive Access Scenarios (Multi-Node)

Out of box profiles

1. Out of box profiles

2. Awareness that job is running on multi-GPU is needed to make certain power policies in the driver 3. Awareness of # of GPUs and know it is a multi-GPU job that is running on is needed to make certain power policies in the driver 4. User input as cues (compute bound, my app is like MILC) about the job and user goal (perf, perf/watt) that would change the profiles/power policy 5. Profiling mode 6. Long time/short time power to scheduler for better power aware job allocation 7. Getting average GPU power, temperature, ROS power for the per GPU controller to change power policies.
Shared access scenarios (single node)
Shared access scenarios (multi-node)

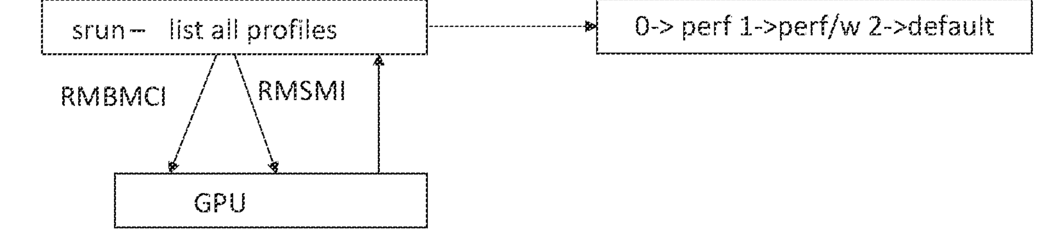

FIG. 15

Usage: A user might have to edit the code to start measuring after setup code is run then run long enough to get a good profile. Job would then restart if possible from a checkpoint in this case leveraging previous slide automatically based on profile.

2000
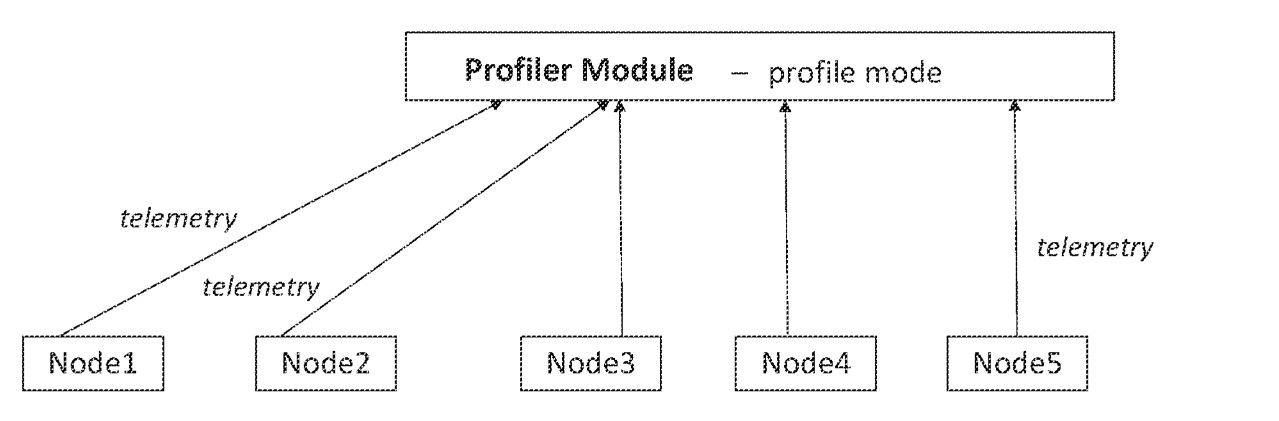
Use mode to collect telemetry from Nvidia GPUs and give a recommendation policy to scheduler on best job scheduling for power/perf
FIG. 20

2100
Letting Datacenter Admins Know Which Jobs Are Worse For di/dt (Short Time Scale Peaks)
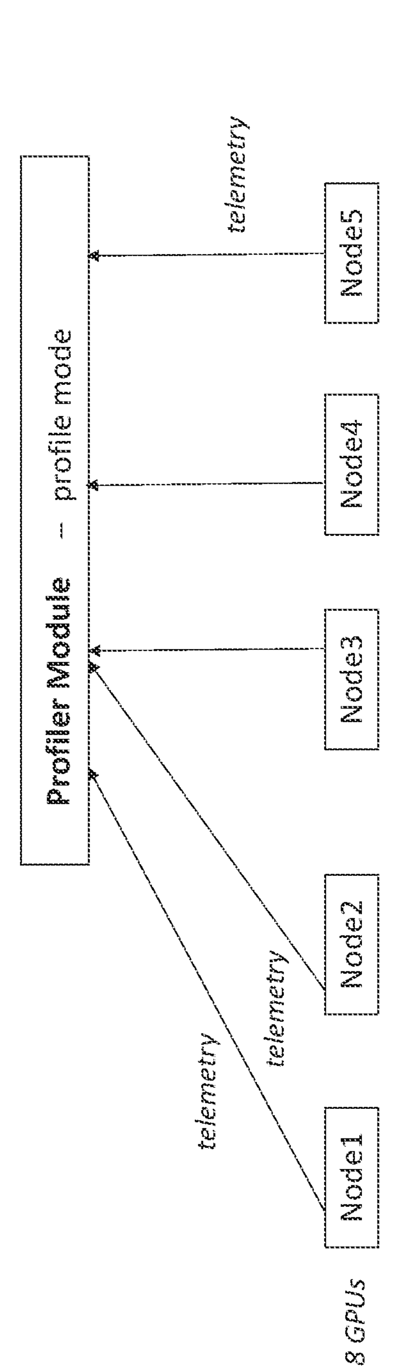
*Use mode to collect telemetry from Nvidia GPUs and give a recommendation policy to scheduler on best job scheduling for power/perf*
FIG. 21

2300

2500

Workflow -> Single Exclusive Access Scenarios (Multi-Node)

Usecase:
This is an added option to 1) where the system optimizes based on what is happening.

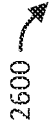
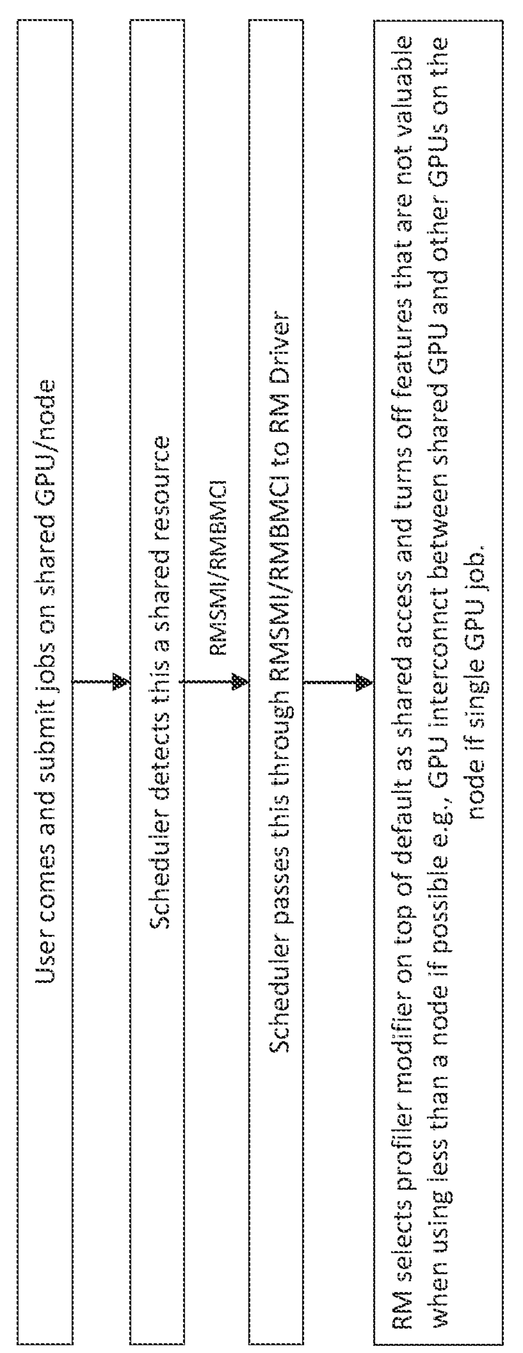
FIG. 26

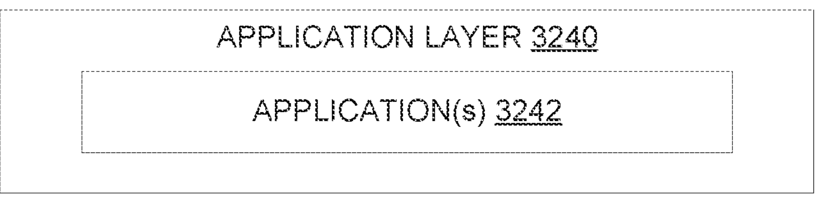
SOFTWARE LAYER 3230
SOFTWARE 3252
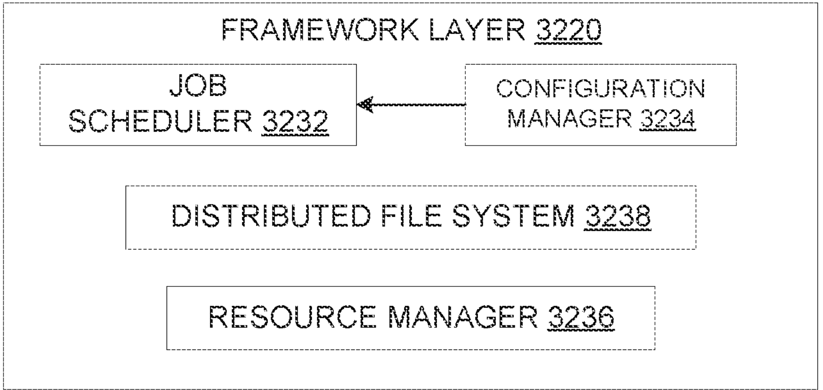
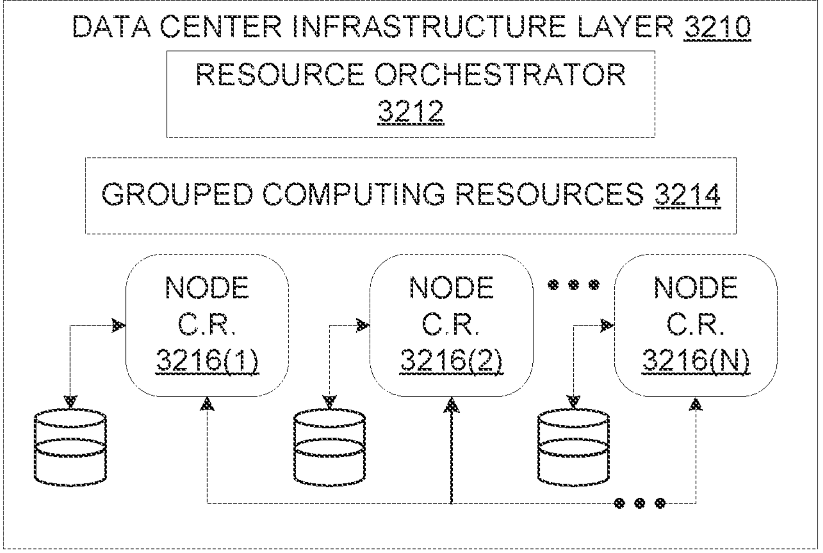
FIG. 32

FIG. 42B
GENERAL-PURPOSE GRAPHICS PROCESSING UNIT 4230
MEMORY CONTROLLER 4242B
MEMOR Y 4244B
HOST INTERFACE 4232
GLOBAL SCHEDULER 4234
COMPUTE CLUSTER 4236A
COMPUTE CLUSTER 4236B
COMPUTE CLUSTER 4236C
COMPUTE CLUSTER 4236D
CACHE MEMORY 4238
COMPUTE CLUSTER 4236E
COMPUTE CLUSTER 4236F
COMPUTE CLUSTER 4236G
COMPUTE CLUSTER 4236H
I/O HUB 4239
GPU LINK 4240
MEMORY CONTROLLER 4242A
MEMORY 4244A

```
// Kernel definition
__global__ void MatAdd(float A[N][N], float B[N][N], float C[N][N])
{
    int i = blockIdx.x * blockDim.x + threadIdx.x;
    int j = blockIdx.y * blockDim.y + threadIdx.y;
    if (i < N && j < N)
        C[i][j] = A[i][j] + B[i][j];
}

int main()
{
    ...
    // Kernel call
    dim3 threadsPerBlock(16, 16);
    dim3 numBlocks(N / threadsPerBlock.x, N / threadsPerBlock.y);
    MatAdd<<<numBlocks, threadsPerBlock>>>(A, B, C);
    ...
}
```

CUDA Source Code 5910

CUDA to HIP Translation Tool 5920

CUDA Kernel Launch Syntax 6010

```
KernelName<<<GridSize, BlockSize, SharedMemorySize, Stream>>>(KernelArguments);
```

HIP Kernel Launch Syntax 6020

```
hipLaunchKernelGGL(KernelName, GridSize, BlockSize, SharedMemorySize, Stream, KernelArguments);
```

```
// Kernel definition
__global__ void MatAdd(float A[N][N], float B[N][N], float C[N][N])
{
    int i = blockIdx.x * blockDim.x + threadIdx.x;
    int j = blockIdx.y * blockDim.y + threadIdx.y;
    if (i < N && j < N)
        C[i][j] = A[i][j] + B[i][j];
}

int main()
{
    ...
    // Kernel invocation
    dim3 threadsPerBlock(16, 16);
    dim3 numBlocks(N / threadsPerBlock.x, N / threadsPerBlock.y);
    hipLaunchKernelGGL(MatAdd, numBlocks, threadsPerBlock, 0, 0, A, B, C);
    ...
}
```

HIP Source Code 5930

FIG. 60

APPLICATION PROGRAMMING INTERFACE TO CONFIGURE A PROCESSOR USING PRIORITY

CROSS-REFERENCE TO RELATED APPLICATIONS

This application incorporates by reference for all purposes the full disclosure of U.S. patent application Ser. No. 18/632,234, filed concurrently herewith, entitled "APPLICATION PROGRAMMING INTERFACE TO CONFIGURE A PROCESSOR", U.S. patent application Ser. No. 18/632,247, filed concurrently herewith, entitled "APPLICATION PROGRAMMING INTERFACE TO INDICATE A COMPUTING RESOURCE", filed concurrently herewith, entitled "APPLICATION PROGRAMMING INTERFACE TO INDICATE A PRIORITY", U.S. patent application Ser. No. 18/632,255, filed concurrently herewith, entitled "APPLICATION PROGRAMMING INTERFACE TO IDENTIFY PROCESSOR SETTINGS", U.S. patent application Ser. No. 18/632,260, filed concurrently herewith, entitled "APPLICATION PROGRAMMING INTERFACE TO CONFIGURE A PROCESSOR USING COMPUTING RESOURCE INPUTS", U.S. patent application Ser. No. 18/632,267, U.S. patent application Ser. No. 18/632,274, filed concurrently herewith, entitled "APPLICATION PROGRAMMING INTERFACE TO IDENTIFY SETTINGS TO CONFIGURE A PROCESSOR", and U.S. patent application Ser. No. 18/632,279, filed concurrently herewith, entitled "APPLICATION PROGRAMMING INTERFACE TO PERFORM INSTRUCTIONS USING PROCESSOR SETTINGS".

TECHNICAL FIELD

At least one embodiment pertains to processing resources used to identify processor settings. At least one embodiment pertains to processors or computing systems used to identify processor settings based, at least in part, on characteristics of a job.

BACKGROUND

Data centers can include software to schedule jobs to be performed by processors in said data center. For example, a job scheduler can schedule jobs to be launched according to each job's priority level, but that does not necessarily always result in an efficient use of computing resources. An amount of computing resources and time used to perform a job can be improved as part of a job scheduling process.

BRIEF DESCRIPTION OF DRAWINGS

FIG. 8B illustrates a diagram of a get all available profiles API call, in accordance with at least one embodiment;

FIG. 14 illustrates a block diagram of a system used to identify power polices to be applied to a node based on whether that node is capable of being partitioned, according to at least on embodiment;

FIG. 15 illustrates a block diagram of system used to identify a power policy to be applied to multiple nodes, according to at least on embodiment;

FIG. 20 illustrates a block diagram of a system used to indicate which jobs to connect to a busbar, in accordance with at least one embodiment;

FIG. 21 illustrates a block diagram of a system used to indicate how jobs perform with respect to a rate of change of current over time, in accordance with at least one embodiment;

FIG. 26 illustrates a block diagram of a system used to identify a processor settings profile based, at least in part, on a GPU shared between jobs, in accordance with at least one embodiment;

FIG. 32 illustrates an exemplary data center, in accordance with at least one embodiment;

FIG. 60 illustrates an exemplary kernel translated by CUDA-to-HIP translation tool of FIG. 59C, in accordance with at least one embodiment;

DETAILED DESCRIPTION

Figure 1:
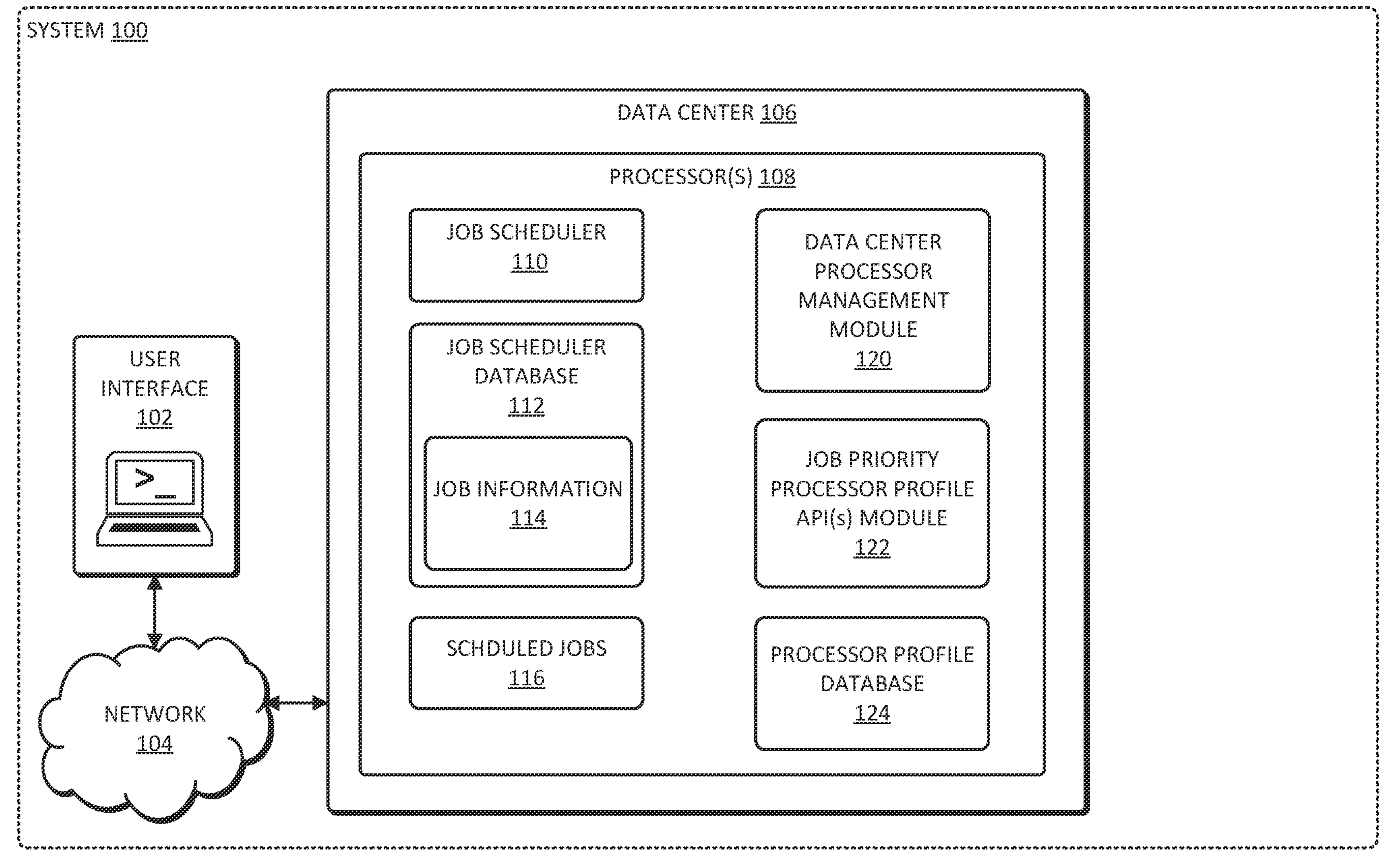
FIG. 1 illustrates a block diagram of a system to use processor settings to configure processors based, at least in part, on one or more job characteristics, in accordance with at least one embodiment.

In the following description, numerous specific details are set forth to provide a more thorough understanding of at least one embodiment. However, it will be apparent to one skilled in the art that the inventive concepts may be practiced without one or more of these specific details, and that any two or more aspects of any one or more embodiments described herein may be combined.

In at least one embodiment, a processor performs operations of a workload scheduler (e.g., job scheduler) of a data center that allows a user to provide information about a software workload to that workload scheduler. In at least one embodiment, information provided by a user to a workload scheduler includes an indication of a processor performance preference, a type of software workload to be scheduled, a priority of a software workload to be scheduled, or some combination thereof. In at least one embodiment, a processor performs operations of a workload scheduler to manage when and how a software workload is to be performed by other processors of a data center or any facility that includes computing devices (e.g., computers, servers, processors) and networking devices (e.g., routers, switches). In at least one embodiment, when a processor performs operations of a workload scheduler to manage when and how a software workload is to performed by other processors is referred to as scheduling. In at least one embodiment, a processor performs operations of a workload scheduler to indicate processor settings to be used by other processors when performing a software workload as part of a workload scheduling process. In at least one embodiment, a processor performs operations of a workload scheduler to indicate processor settings to be used by other processors when performing a specific software workload, such that a processor management application of a data center is able to set those processor settings on those other processors prior to performing that specific software workload. In at least one embodiment, a processor performs operations of a workload scheduler to cause a processor management application to check if processor settings to be used to perform a software workload have been set prior to performance of that software workload. In at least one embodiment, a processor performs operations of a workload scheduler to cause a processor management application to adjust processor settings of other processors performing a software workload by using processor performance metrics observed during performance of that software workload.

In at least one embodiment, a processor performs operations of a processor management application to receive or otherwise obtain, from a workload scheduler, information about a software workload to set processor settings prior to performance of that software workload by other processors. In at least one embodiment, a processor performs operations of a processor management application to use information about a software workload to identify, from a data structure (e.g., a data table, a lookup table), a combination of processor settings that are to cause other processors of a data center to perform that software workload according to performance preferences of a user, according to a priority of that software workload, within processor performance constraints, within data center constraints, or some combination thereof and as further described herein. In at least one embodiment, a combination of processor settings is referred to as a processor settings profile or a processor profile.

In at least one embodiment, a processor performs an application programming interface (API) function to cause one or more processors to be configured to operate at one or more clock frequencies based, at least in part, on one or more inputs to that API. In at least one embodiment, an API function is referred to as an API. In at least one embodiment, a processor performs an API to indicate one or more computing resources to be used by one or more instructions based, at least in part, on one or more inputs to that API. In at least one embodiment, a processor performs an API to indicate a priority, with which to perform one or more instructions based, at least in part, on one or more inputs to that API. In at least one embodiment, a processor performs an API to identify one or more settings to be used to configure one or more processors to operate at one or more processor clock frequencies based, at least in part, on one or more clock frequency inputs to that API. In at least one embodiment, a processor performs an API to identify one or more settings to be used to configure one or more processors to operate at one or more processor clock frequencies based, at least in part, on one or more priority inputs to that API. In at least one embodiment, a processor performs an API to identify one or more settings to be used to configure one or more processors to operate at one or more processor clock frequencies based, at least in part, on one or more processors to be used. In at least one embodiment, a processor comprising performs an API to cause one or more instructions to be performed based, at least in part, on one more processor setting inputs to that API.

FIG. 1 illustrates a block diagram of a system 100 that includes one or more processors comprising one or more circuits to receive or otherwise obtain information about a software workload from a user and identify a processor settings profile used to perform that software workload. In at least one embodiment, one or more aspects of one or more embodiments described herein in conjunction with FIG. 1 are combined with one or more aspects of one or more embodiments described herein, including those described at least in conjunction with FIGS. 2-31. In at least one embodiment, one or more processors perform one or more operations of system 100. In at least one embodiment, one or more processors that perform one or more operations of system 100 are any one processor, or combination of processors, described herein, including processor(s) 108, processor group 208 of FIG. 2, processor(s) 308 of FIG. 3, processor(s) 408 of FIG. 4, processor group 508, APU 3800 of FIG. 38, CPU 4100 described in conjunction with FIG. 41, graphics processor 4310 described in conjunction with FIG. 43A, parallel processing unit ("PPU") 5000 described in conjunction with FIG. 50, or one or more SMs 5114 of FIG. 49. In at least one embodiment, processor(s) 108 perform an operation used by system 100, such as an operation of processor profiles module 104. In at least one embodiment, processor(s) 108 perform one or more operations described in conjunction with FIG. 2, such as an operation of job priority processor profile API(s) 222. In at least one embodiment, processor(s) 108 perform one or more operations described in conjunction with FIG. 3, such as an operation used to generate new processor profile 330. In at least one embodiment, processor(s) 108 perform one or more operations of described in conjunction with FIG. 4, such as selecting, using job priority, selected processor profile 427. In at least one embodiment, processor(s) 108 perform one or more operations described in conjunction with FIG. 5, such an operation of job scheduler 510 used to receive a job priority from a user processor group 508. In at least one embodiment, processor(s) 108 perform one or more operations described in conjunction with FIG. 6, such as an operation to access processor profiles stored in a data structure with operation 604. In at least one embodiment, processor(s) 108 perform one or more operations of API(s) 710 of FIG. 7. In at least one embodiment, processor(s) 108 perform one or more operations described in conjunction with FIG. 8, such as identifying processor settings from a database. In at least one embodiment, processor(s) 108 perform one or more operations of FIGS. 9-31.

In at least one embodiment, as used in any implementation described herein, unless otherwise clear from context or stated explicitly to contrary, terms such as "system," "device," "components," and "module," and nominalized verbs (e.g., compiler, scheduler, manager, and/or other terms) each refers to any combination of software logic, firmware logic, hardware logic, and/or circuitry configured to provide functionality described herein. In at least one embodiment, any combination of software logic, firmware logic, hardware logic, and/or circuitry configured to provide functionality described herein is referred to as a component. In at least one embodiment, any component described herein are combined and/or communicatively connected with at least one other component, regardless of how such components are described to be combined and/or communicatively connected in other embodiments. In at least one embodiment, software may be embodied as a software package, code, and/or instruction set or instructions. In at least one embodiment, hardware includes, singly or in any combination, hardwired circuitry, programmable circuitry, state machine circuitry, fixed function circuitry, execution unit circuitry, and/or firmware that stores instructions executed by programmable circuitry. In at least one embodiment, modules may, collectively or individually, be embodied as circuitry that forms part of a larger system, for example, an integrated circuit (IC), system on-chip (SoC), and so forth. In at least one embodiment, any one or more architectures of any circuits of one or more modules are represented as a register-transfer level (RTL) representation and/or another fabless representation that may be licensed and/or used in tape-out, a final phase in IC design before being used in manufacturing an IC.

In at least one embodiment, system 100 is any computing system that includes one or more data centers or other facilities housing computing and networking devices. In at least one embodiment, system 100 is used to perform high performance computing tasks, neural network training, neural network inferencing, or some combination thereof. In at least one embodiment, system 100 includes an edge computing system, an accelerated computing system, a cloud computing system, a hybrid cloud computing system, or some combination thereof. In at least one embodiment, system 100 is computing system that includes multiple distributed components connected by a network, such as an internet network. In at least one embodiment, system 100 is used in fields such as healthcare, genomics, engineering, aerospace, urban planning, graphics processing, finance, data storage and management, online commerce, meteorology, physics modeling, or some combination thereof. In at least one embodiment, system 100 is used to perform artificial intelligence (AI) tasks such as image classification, image segmentation, autonomous driving, manufacturing defect identification, or some combination thereof. In at least one embodiment, neural networks are a type of AI.

In at least one embodiment, system 100 includes a user interface 102, through which a user provides inputs that provide information about one or more software workloads. In at least one embodiment, a software workload is referred to as a job, which is a term used further herein. In at least one embodiment, user interface 102 is a user interface of job scheduler 110. In at least one embodiment, at least a portion of job scheduler 110 is implemented on a computing device that operates user interface 102. In at least one embodiment, user interface 102 is a user interface of a processor management application. In at least one embodiment, a processor management application is any combination of hardware, firmware, or software such as data center processor management module 120, which is described further herein. In at least one embodiment, at least a portion of data center processor management module 120 is implemented on a computing device that operates user interface 102.

In at least one embodiment, user interface 102 is communicatively connected to network 104. In at least one embodiment, network 104 may be one or more of any type of network, such as a managed network (e.g., enterprise network), cloud network, internet, local private network, or some combination thereof. In an embodiment, network 104 is a local network. In at least one embodiment, network 104 is communicatively connected to any on or more components of data center 106.

In at least one embodiment, system 100 includes data center 106. In at least one embodiment, data center 106 is one or more data centers. In at least one embodiment, data center 106 is at least a portion of data center 3400 described at least in conjunction with FIG. 34. In at least one embodiment, a data center is any facility which houses computer and networking devices. In at least one embodiment, a data center includes processors that perform operations in parallel to process massive data sets of multiple dimensions. In at least one embodiment, a data center performs one or more AI tasks. In at least one embodiment, at least a portion of computing resources of data center 106 is accessed remotely by a user via network 104 to schedule and perform jobs.

Figure 38:
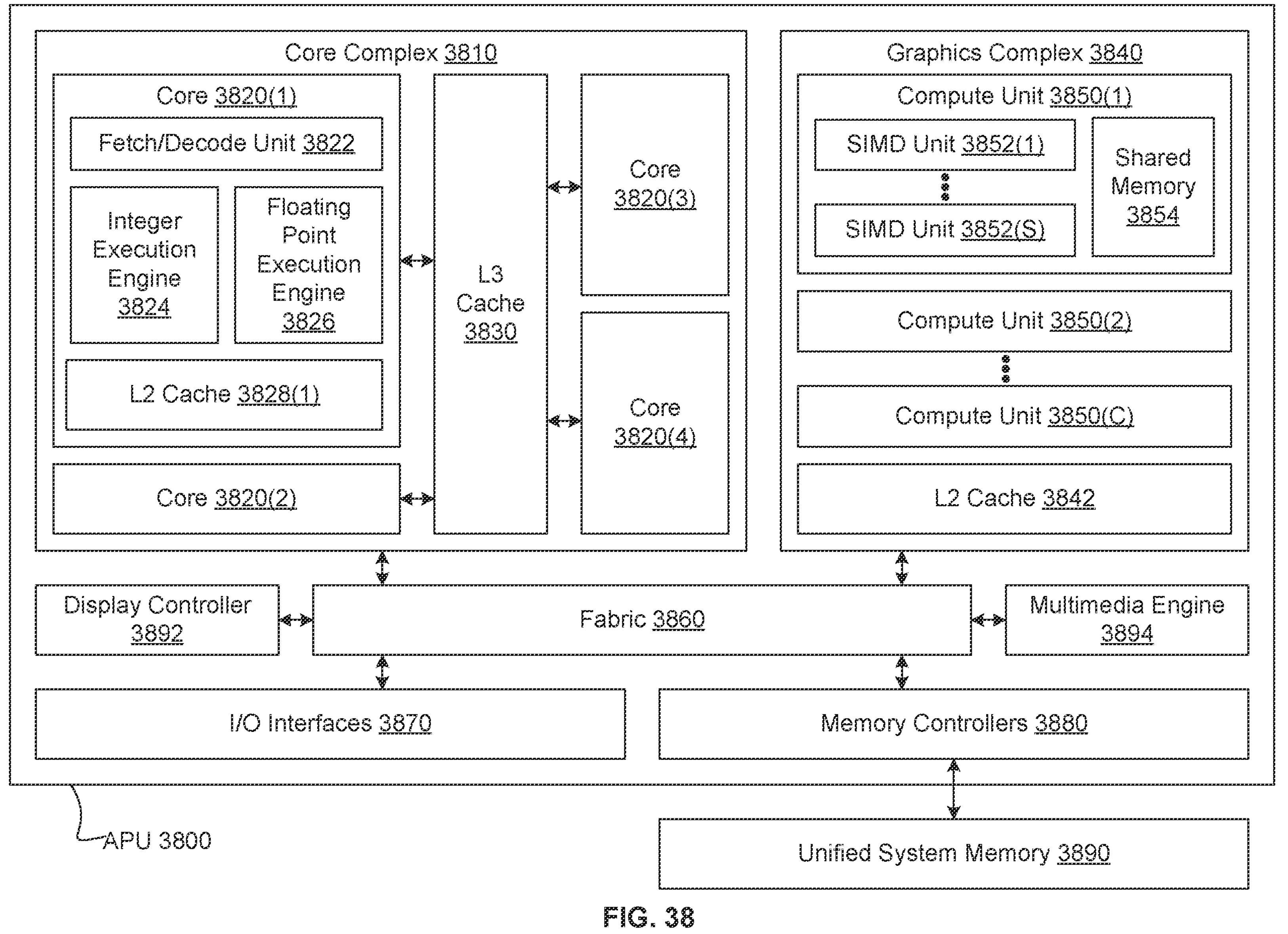
FIG. 38 illustrates an APU, in accordance with at least one embodiment.
Figure 43A:
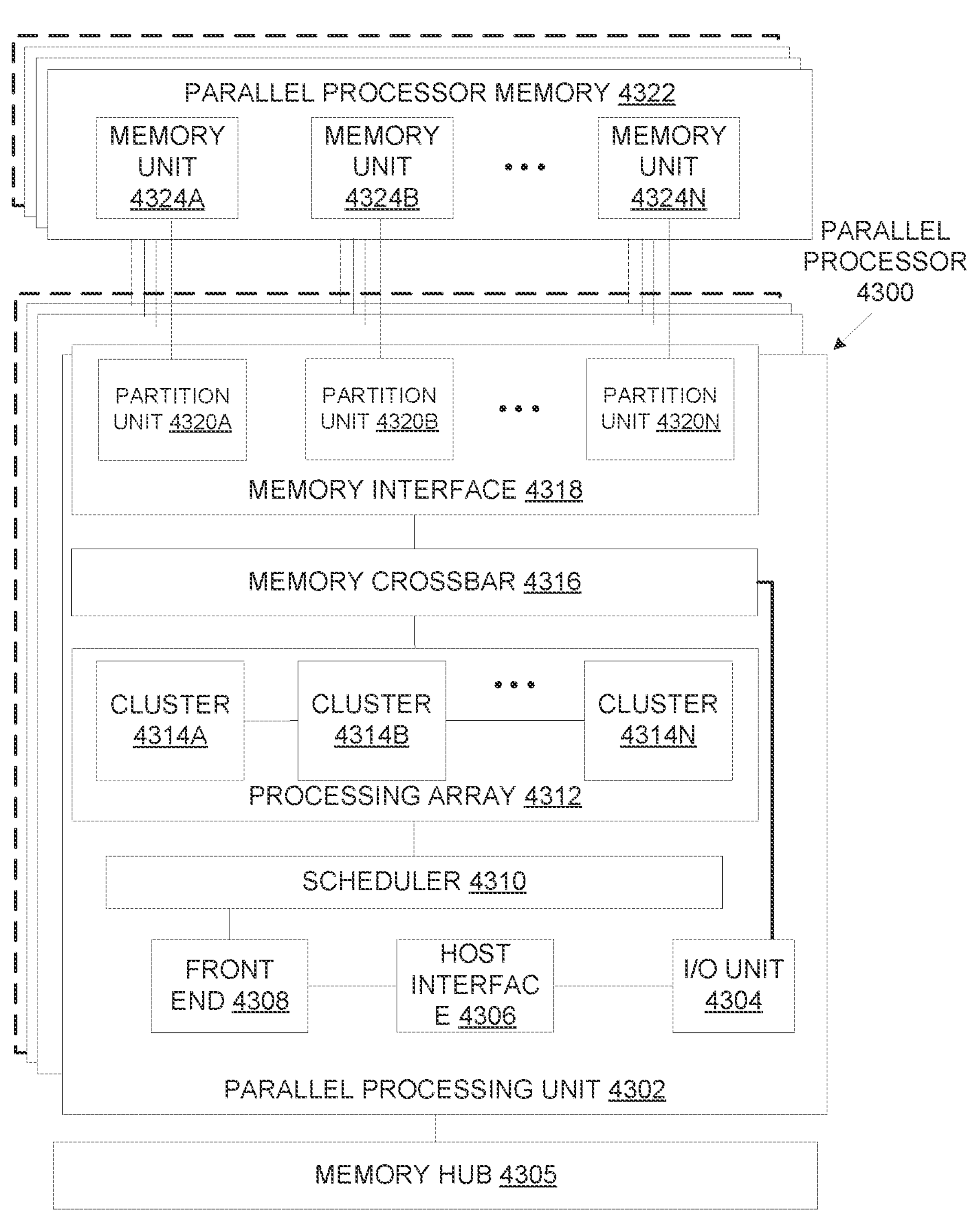
FIG. 43A illustrates a parallel processor, in accordance with at least one embodiment.
Figure 50:
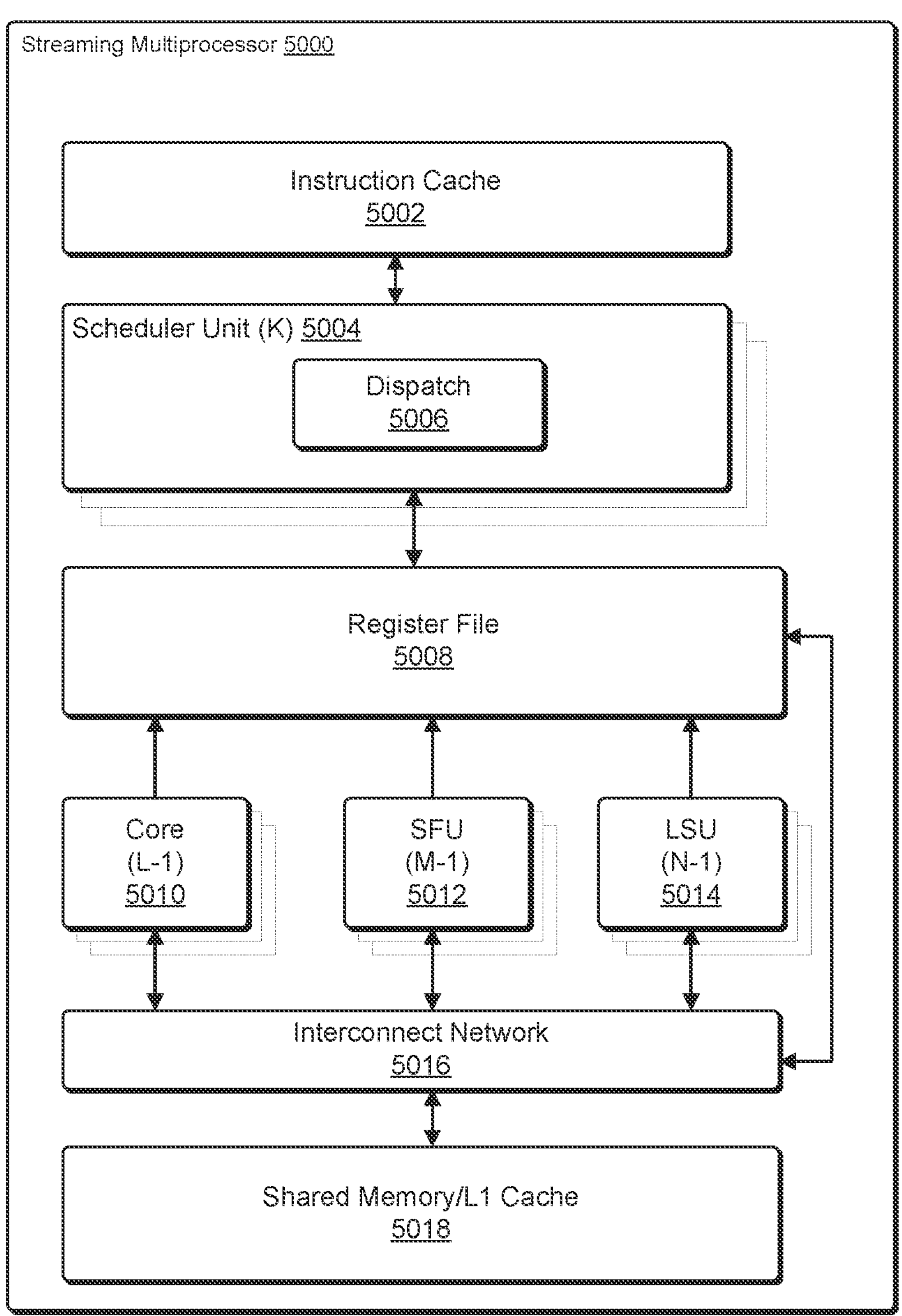
FIG. 50 illustrates a streaming multiprocessor, in accordance with at least one embodiment.

In at least one embodiment, system 100 includes processor(s) 108, which is any one processor, or combination of processors, described herein, including processor group 508, APU 3800 of FIG. 38, CPU 4100 described in conjunction with FIG. 41, graphics processor 4310 described in conjunction with FIG. 43A, and PPU 5000 described in conjunction with FIG. 50.

In at least one embodiment, any processor described herein, including processor(s) 108, comprise one or more circuits. In at least one embodiment, processor(s) 108 is one or more processors implemented in a computing system designed to perform AI tasks, such as image classification, autonomous driving, or some combination thereof. In at least one embodiment, processor(s) 108 is one or more processors implemented in an edge computing device, a workstation, a server, or some combination thereof, such as an NVIDIA® DGX™ workstation. In at least one embodiment, processor(s) 108 is one or more AMD® Epics™ Embedded processors and/or one or more NVIDIA® A100™ GPUs. In at least one embodiment, processor(s) 108 is one or more different types of processors implemented as part of a heterogeneous computing device.

In at least one embodiment, processor(s) 108 are a group of processors. In at least one embodiment, two or more processor(s) 108 are installed in different locations, such as two different data centers communicatively connected by a network. In at least one embodiment, processor(s) 108 are one or more graphics processing units (GPUs) of a group of GPUs. In at least one embodiment, a group of GPUs is referred to as a GPU cluster. In at least one embodiment, processor(s) 108 are one or more portions of one or more GPUs, where each portion comprises a portion of GPU memory and a portion of GPU computing hardware that are configured to operate as an independent, separate, and complete GPU. In at least one embodiment, a portion of GPU computing hardware is a portion of streaming multiprocessors (SMs) of a GPU, such as SMs 5114 of FIG. 51. In at least one embodiment, processor(s) 108 are portions of one or more GPUs and are referred to as partitions. In at least one embodiment, processor(s) 108 are portions of one or more GPUs configured by a GPU partitioning system such as NVIDIA® Multi-Instance GPUs (MIG).

In at least one embodiment, system 100 includes job scheduler 110. In at least one embodiment, job scheduler 110 is implemented on processor(s) 108. In at least one embodiment, processor(s) 108 perform one or more operations of job scheduler 110. In at least one embodiment, any description of a scheduler or module performing an operation refers a processor performing that scheduler or module to perform that operation. In at least one embodiment, a job scheduler is referred to as a software workload scheduler, a scheduling software application, or a scheduler. In at least one embodiment, job scheduler 110 is job scheduler 3432 of FIG. 34. In at least one embodiment, job scheduler 110 is any combination of hardware, firmware, or software that manages when and how jobs are to be performed by one or more processors. In at least one embodiment, a job is any software workload, software instruction, or set of software instructions identifiable as a unit of work to be performed by one or more processors. In at least one embodiment, a software instruction is referred to as an instruction. In at least one embodiment, job scheduler 110 is at least a part of computing management system such as SchedMD® SLURM®, Oracle® Grid Engine, Oracle® Scheduler, IBM® Spectrum LSF, or some combination thereof. In at least one embodiment, job scheduler 110 is at last a part of a distributed resource management (DRM) system. In at least one embodiment, a job is any computing workload as defined by a user or application. In at least one embodiment, a job is referred to as a set of one or more tasks, processes, or operations. In at least one embodiment, a job is a kernel, which is a set of instructions to be performed by one or more processors in parallel. In at least one embodiment, a job is a container, which is a set of instructions that can be performed by one or more processors in different computing environments using different hardware, firmware, software, or some combination thereof. In at least one embodiment, different types of jobs include jobs such as those related to physics modeling, image classification, cloud-based document management, web-hosting, or some combination thereof.

Figure 2:
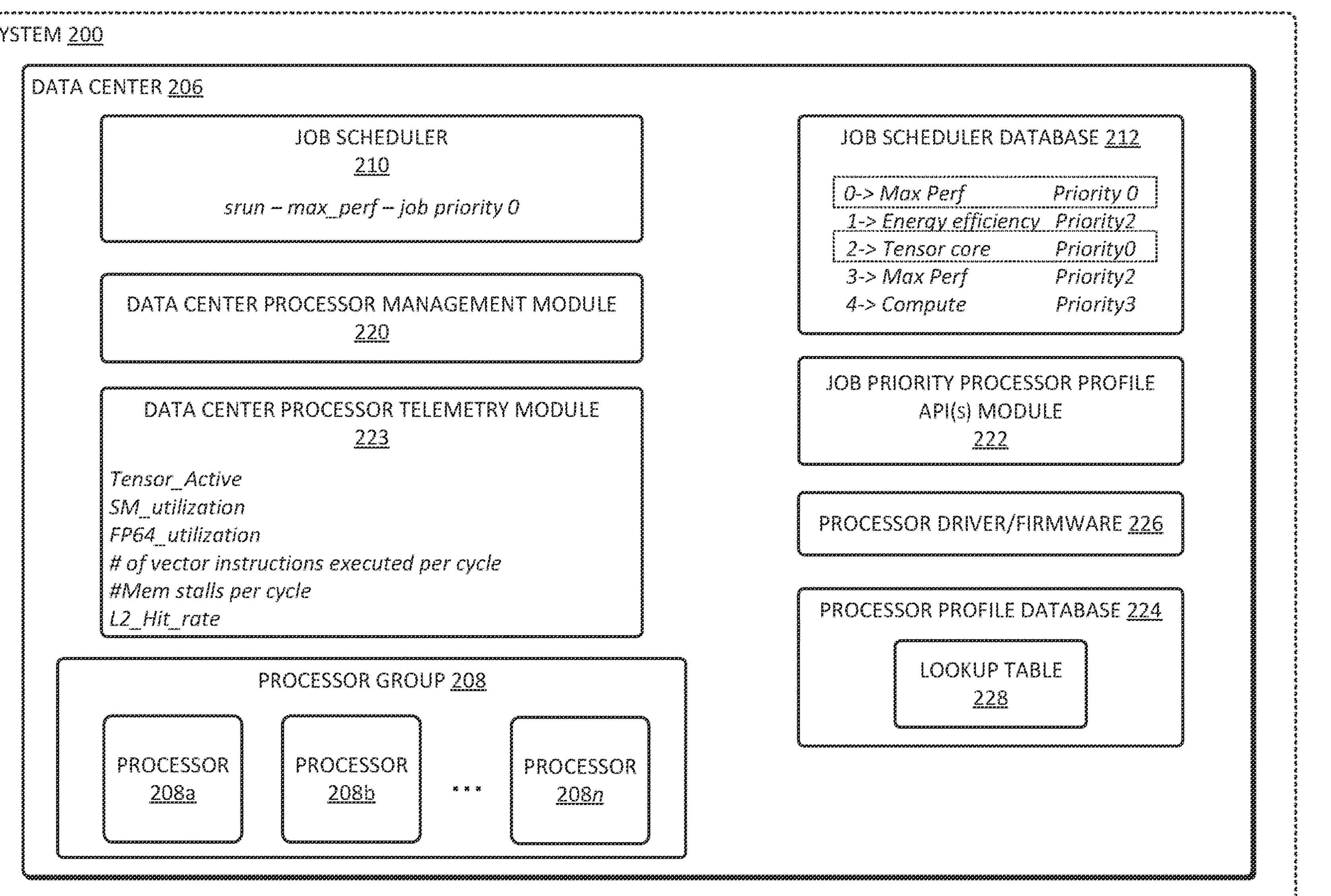
FIG. 2 illustrates a block diagram of a system to use processor settings to configure processors based, at least in part, on one or more job characteristics, in accordance with at least one embodiment.

In at least one embodiment, system 100 includes job scheduler database 112, which is one or more data storage devices that store information about jobs, such as job IDs, processor performance preferences, job types, job priorities, specific processors assigned to perform specific jobs, or some combination thereof, and as described further herein, including in conjunction with FIG. 2. In at least one embodiment, job scheduler database 112 is implemented as part of job scheduler 110. In at least one embodiment, job scheduler database 112 is updated with information received from user interface 102.

In at least one embodiment, system 100 includes job information 114. In at least one embodiment, information about jobs stored on job scheduler database 112 is job information 114. In at least one embodiment, job information 114 includes one or more indications of information about jobs. In at least one embodiment, information about job is referred to as one or more characteristics of that job. In at least one embodiment, job information 114 includes an indication of a specific job, such as a job ID, to be scheduled. In at least one embodiment, job information 114 includes an indication of a specific job already scheduled. In at least one embodiment, job information 114 includes an indication of a job type, such as compute-bound or memory-bound. In at least one embodiment, a compute-bound job is referred to as a compute-intensive, tensor-core-intensive, math-bound, or arithmetically-intensive job. In at least one embodiment, a memory-bound job is referred to as a memory-intensive job. In at least one embodiment, a memory transfer rate and/or amount of memory available on a processor is an operating specification of a processor that factors into whether a particular job type should be performed by that processor. In at least one embodiment, a job type describes a number and type of mathematical operations to be performed as part of that job, a number and type of data formats to be used during performance of that job, or some combination thereof. In at least one embodiment, a job type describes a number and type of memory transfers required to perform a job. In at least one embodiment, job information 114 includes one or more indications of a job priority, which is described further herein at least in conjunction with FIG. 2. In at least one embodiment, job information 114 includes on or more indications of specific processors (e.g., GPU handles) that have been assigned by job scheduler 110 to perform a specific job. In at least one embodiment, processors assigned to perform a job by a job scheduler are referred to as processors allocated by a job scheduler to perform a job.

In at least one embodiment, system 100 includes scheduled jobs 116. In at least one embodiment, scheduled jobs 116 is any combination of hardware, firmware, or software implemented as part of job scheduler 110. In at least one embodiment, scheduled jobs 116 includes a storage device that stores indications of jobs that have been scheduled to be performed according to one or more factors, such as wait time, a trigger, available computing resources, or some combination thereof. In at least one embodiment, job scheduler 110 schedules jobs on a first-in first-out (FIFO) basis. In at least one embodiment, scheduled jobs 116 is a job queue. In at least one embodiment, scheduled jobs 116 includes indications of information about jobs as described herein. In at least one embodiment, scheduled jobs 116 includes an indication of a processor profile to be used to perform a specific job as described further herein.

In at least one embodiment, system 100 includes data center processor management module 120. In at least one embodiment, data center processor management module 120 is hardware, firmware, software, or some combination thereof, used to set processor settings values of processors of a data center, such as processor(s) 108. In at least one embodiment, processor settings are values that are used by a data center processor management module 120 to configure one or more processors to operate at one or more processor settings values or within a range of those processor settings values. In at least one embodiment, a range of processor settings values is calculated based on a percentage of a processor settings value. In at least one embodiment, data center processor management module 120 configures one or more processors to operate at a processor settings value or within a range of processor settings value by managing or modifying how instructions are input or performed by a processor; by causing devices (e.g., microcontrollers, voltage regulator modules, switches) to control power consumption, fan speed; by causing specific circuits or portions of circuits of a processor to be used; by physically modifying an aspect of a processor (e.g., modifying a logic component); by using techniques known by those with ordinary skill in the art; or some combination thereof.

In at least one embodiment, processor settings values are referred to as processor settings. In at least one embodiment, data center processor management module 120 is referred to as a computing resources manager, a resources manager (RM), or a processor management application. In at least one embodiment, data center processor management module 120 includes any combination of hardware, firmware, or software that manages a communication between components of a data center, such as between a job scheduler and a processor, using a communication protocol. In at least one embodiment, one or more portions of data center processor management module 120 that manages communication between components of a data center is implemented as a separate module. In at least one embodiment, one or more portions of data center processor management module 120 are implemented on a computing network, in a computing facility, on a node, or some combination thereof, that is separate from another computing network, computing facility, node, or some combination thereof, on which another portion of data center processor management module 120 is implemented. In at least one embodiment, a portion of a module that is implemented separately from another portion of that module or other module is referred to as being out-of-band, remote, or distributed.

In at least one embodiment, data center processor management module 120 includes at least a portion of NVIDIA® Data Center GPU Manager (DCGM), including one or more of API functions of that system. In at least one embodiment, at least a portion of data center processor management module 120 manages processor settings and/or configuration of processors at a low-level. In at least one embodiment, low-level management of a processor refers to management that includes commands and/or instructions sent to and useable by a processor driver. In at least one embodiment, a portion of a data center processor management module 120 that performs low-level management of a processor is implemented as a separate module. In at least one embodiment, at least a portion of a data center processor management module 120 includes an interface (e.g., user interface) and API library that a user or application (e.g., job scheduler) can use with a portion of data center processor management module 120 that performs low-level management of a processor. In at least one embodiment, any one or more portions of data center processor management module 120 that perform low-level management of processors, include an interface to perform low-level management of processors, includes API functions to perform low-level management of processors, or some combination thereof, is referred to as a resource manager system management interface (RMSMI). In at least one embodiment, RMSMIs are included in multiple embodiments described herein, including, at least, in embodiments described in conjunction with FIGS. 10-14. In at least one embodiment, a portion of an RMSMI is one or more portions of an NVIDIA® System Management Interface (SMI) system, including one or more API functions of that system. In at least one embodiment, a portion of an RMSMI is on or more one or more portions of a processor management library such as AMD® ROCm SMI Library or NVIDIA® Management Library (NVML).

In at least one embodiment, at least a portion of data center processor management module 120 is a baseboard management controller (BMC), which is used, at least in part, to monitor and controlling processors of a computing system. In at least one embodiment, at last a portion of data center processor management module 120 is an interface (e.g., user interface), and API library that a user or application (e.g., job scheduler) can use with a portion of data center processor management module 120 that performs baseboard management. any one or more portions of data center processor management module 120 that perform baseboard management, include an interface to perform baseboard management, includes API functions to perform baseboard management, or some combination thereof, is referred to as a resource manager baseboard management interface (RMBMCI). In at least one embodiment, RMBMCIs are included in multiple embodiments described herein, including, at least, in embodiments described in conjunction with FIGS. 10-14. In at least one embodiment, a portion of an RMBMCI is one or more portions of an NVIDIA® Baseboard Management Controller (BMC), including one or more API functions of that system, or similar.

In at least one embodiment, at least a portion of data center processor management module 120 is one or more processor drivers, such as GPU drivers. In at least one embodiment, a processor driver is a driver, such as driver 226 of FIG. 2 and driver 704 of FIG. 7. In at least one embodiment, a processor performs a processor driver to configure that processor and/or another processor according to processor settings selected and/or identified as otherwise described herein. In at least one embodiment, a processor driver of data center processor management module 120 is referred to as a resource manager driver (RM Driver). In at least one embodiment, RMSMIs are included in multiple embodiments described herein, including, at least, in embodiments described in conjunction with FIG. 14.

In at least one embodiment, data center processor management module 120 is implemented on a processor of one or more processor(s) 108 that is different from a processor of one or more processor(s) 108 on which job scheduler 110 is implemented. In at least one embodiment, data center processor management module 120 is implemented on a computing device (e.g., server) different from a computing device on which job scheduler 110 is implemented. In at least one embodiment, data center processor management module 120 is implemented in a data center different from a data center in which job scheduler 110 is implemented.

In at least one embodiment, system 100 includes job priority processor profile API(s) module 122. In at least one embodiment, job priority processor profile API(s) module 122 are one or more API functions used to receive information about jobs to be scheduled and as described further herein. In at least one embodiment, job priority processor profile API(s) module 122 are one or more API functions used to identify a processor profile to be used to perform a job, based on information about a job including processor performance preference, job type, job priority, operating specifications of specific processors, or some combination thereof and as described further herein. In at least one embodiment, job priority processor profile API(s) module 122 are on or more API functions used to ensure that processor profiles identified by other API functions are set on processors prior to performing specific jobs and as described further herein.

In at least one embodiment, an API of job priority processor profile API(s) module 122 identifies a processor profile based, at least in part, on a job priority and constraints provided by a user or application. In at least one embodiment, constraints include any parameter, metric, measurement, specification, value, or some combination thereof, that are to be followed and/or met when performing a job on a group of processors. In at least one embodiment, constraints are values of performance metrics not to be exceeded by a portion of a processor, an entire processor, or a data center during performance of a job, as with performance metrics such as Fmax, maxTGP, Vmax, or some combination thereof. In at least one embodiment, constraints are minimum values of performance metrics to be met or exceeded by a portion of a processor, an entire processor, or a data center during performance of a job, as with performance metrics such as a minimum clock frequency or minimum power consumption. In at least one embodiment, constraints include hardware constraints, such as one or more types of processors to be used to perform a job.

In at least one embodiment, a job priority is an indication of a level of urgency with which a job should be performed by one or more processors. In at least one embodiment, a job scheduler calculates a job priority of a job based on factors such as a job type, amount of time a job has been waiting in a queue, a user's history of using computing resources, available computing resources, or some combination thereof. In at least one embodiment, a job scheduler calculates a job priority based on an estimated time required to complete performance of a job. In at least one embodiment, a job scheduler calculates a job priority based on an estimated amount of power required to complete performance of a job. In at least one embodiment, a job scheduler calculates a job priority based on an estimated power consumption required to complete performance of a job. In at least one embodiment, a processor performs operations of job scheduler 110 to assign a background job, which has a lower job priority than that of more urgent job. In at least one embodiment, a lower-priority background job is a job that performs a nightly update of a database, whereas higher-priority job is job that performs AI-assisted medical segmentation in medical images to help detect cancerous cells. In at least one embodiment, a job priority is any value suitable to indicate a job priority, such as a numerical value, a string of letters and numbers, or a word such as low, medium, or high.

In at least one embodiment, a processor of processor(s) 108 perform one or more API functions of job priority processor profile API(s) module 122 to cause other processors of processor(s) 108 to perform a job according to information about that job, including processor performance preference, job type, job priority, and types of processors assigned to perform that job. In at least one embodiment, processor settings of a processor profile are any parameters that can be modified to affect processor performance, such as maximum operating frequency (Fmax or Fmax cap), maximum total graphics power (max TGP), a ratio of clock frequencies between two devices connected to a crossbar (Xbar ratio), memory clock frequency (MCLK), maximum voltage allowed to be consumed (Vmax), fan speed, or some combination thereof. In at least one embodiment, an Xbar ratio is referred to as a Char ratio. In at least one embodiment, an Xbar ratio is a ratio between a graphics processing cluster clock and a crossbar clock. In at least one embodiment, an Xbar ratio is a ratio between two crossbar clocks.

In at least one embodiment, a processor of processor(s) 108 perform one or more API functions of job priority processor profile API(s) module 122 to cause an indication of a processor profile to be used when performing a job to be sent to job scheduler 110. In at least one embodiment, an indication of a processor profile is stored in scheduled jobs 116 to correspond with a specific job to be performed by processor(s) 108 of data center 106.

In at least one embodiment, system 100 includes processor profile database 124. In at least one embodiment, processor profile database 124 is any combination of hardware, firmware, or software used to store processor profiles or indications of those processor profiles. In at least one embodiment, processor profile database 124 is one or more data structures (e.g., tables, trec graphs) that correlate a processor profile with a combination of information about a job, which is described further herein. In at least one embodiment, processor profile database 124 includes a lookup table that includes processor profiles, functions, and biases, such as profile and bias interaction lookup table 306 (lookup table 306) of FIG. 3.

FIG. 2 illustrates a block diagram of a system 200 that includes a job scheduler of a data center used to schedule a job to be performed by processors according to a processor settings profile based, at least in part, on information about a job, in at least one embodiment. In at least one embodiment, one or more aspects of one or more embodiments described herein in conjunction with FIG. 2 are combined with one or more aspects of one or more embodiments described herein, including those described at least in conjunction with FIGS. 1 and 3-31. In at least one embodiment, one or more processors perform one or more operations of system 200. In at least one embodiment, one or more processors that perform one or more operations of system 200 are any one processor, or combination of processors, described herein, including processor(s) 108 of FIG. 1, processor group 208, processor(s) 308 of FIG. 3, processor(s) 408 of FIG. 4, processor group 508, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, one or more processors of processor group 208 performs one or more operations of system 100, such as an operation of processor profiles module 104. In at least one embodiment, one or more processors of processor group 208 performs one or more operations described in conjunction with FIG. 3, such as an operation used to generate new processor profile 330. In at least one embodiment, one or more processors of processor group 208 perform one or more operations described in conjunction with FIG. 4, such as selecting, using job priority, selected processor profile 427. In at least one embodiment, one or more processors of processor group 208 perform one or more operations described in conjunction with FIG. 5, such an operation of job scheduler 510 used to receive a job priority from a user processor group 508. In at least one embodiment, one or more processors of processor group 208 perform one or more operations described in conjunction with FIG. 6, such as an operation to access processor profiles stored in a data structure with operation 604. In at least one embodiment, one or more processors of processor group 208 perform one or more operations of API(s) 710 of FIG. 7. In at least one embodiment, one or more processors of processor group 208 perform one or more operations of FIG. 8, such as an operation to identify optimal processor settings from a database. In at least one embodiment, one or more processors of processor group 208 perform one or more operations described in conjunction with FIGS. 9-31.

In at least one embodiment, system 200 includes data center 206. In at least one embodiment, data center 206 is data center 106 of FIG. 1. In at least one embodiment, data center 206 is one or more data centers. In at least one embodiment, data center 206 is at least a portion of data center 3200 described at least in conjunction with FIG. 32.

In at least one embodiment, any component or module of data center 206 is implemented on any other component or module of data center 206. In at least one embodiment, any component or module of data center 206 is communicatively connected with any other component or module of data center 206. In at least one embodiment, any component or module of data center 206 is part of a distributed computing system, where any two components and/or modules are each implemented on a different computing systems (e.g., data centers, servers) connected by a network.

In at least one embodiment, system 200 includes job scheduler 210. In at least one embodiment, job scheduler 210 is at least a portion of job scheduler 110 of FIG. 1. In at least one embodiment, job scheduler 210 receives a command input by a user via user interface, such as user interface 102 of FIG. 1. In at least one embodiment, job scheduler 210 receives a command to schedule a job, where that command includes indications of a specific job (e.g., job ID), processor performance preference, job type, job priority, or some combination thereof. In at least one embodiment, job scheduler 210 receives a command to submit a job for performance by processors, where that command includes indications of a specific job as inputs. In at least one embodiment, a command to submit a job for performance is a command of a job scheduler, such as a SchedMD® Slurm job scheduler. In at least one embodiment, a command input via a user interface is represented in psudocode as srun-max_perf-job priority0, where srun is a command to submit a job for performance, max_perf is an indication of a processor performance prefence, and jobpriority0 is an indication of job priority of 0, where such indications are described further herein. In at least one embodiment, a command that submits a job to job scheduler 210 includes an indication of that job, such as a job ID. In at least one embodiment, a command that submits a job to job scheduler 210 includes an indication of a job type. In at least one embodiment, a command that submits a job to job scheduler 210 includes one or more indications of constraints to be applied to performance of that job, such as a constraint or limit on an amount of power to be used to complete that job.

In at least one embodiment, a command of a job scheduler is referred to as an API function. In at least one embodiment, an API of job scheduler 210 is stored in job priority processor profile API(s) module 222. In at least one embodiment, job priority processor profile API(s) module 222 is job priority processor profile API(s) module 122 of FIG. 1. In at least one embodiment, at least a portion of job priority processor profile API(s) module 222 is implemented as part of job scheduler 210. In at least one embodiment, at least a portion of job priority processor profile API(s) module 222 is implemented as part of data center processor management module 220. In at least one embodiment, when a user or application enters a command, that is referred to as invoking an API of job priority processor profile API(s) module 222. In at least one embodiment, when a job scheduler receives a command, that refers to a user or application inputting a command line comprising text that causes a processor to perform one or more API functions. In at least one embodiment, an API function is referred to as an API.

In at least one embodiment, a processor performance preference are processor target metrics. In at least one embodiment, processor target metrics are processor metrics that processors are to attempt to achieve or maintain during performance of a job. In at least one embodiment, processor performance metrics include one or more clock frequencies at which one or more processors are to operate. In at least one embodiment, processor metrics that are measured with test runs of jobs include any metric used to measure performance characteristics of a group of processors that perform a job. In at least one embodiment, processor metrics include any type of throughput metric that measures a number of operations performed for a given period of time. In at least one embodiment, a processor metric is a type of measurement related to power consumed and/or a temperature reached by one or more processors. In at least one embodiment, a processor metric is referred to as a performance metric.

In at least one embodiment, a processor performance preference is a user preference of how that user would prefer processors to perform a job. In at least one embodiment, a processor performance preference is a preset combination of two or more processor metrics stored in a database. In at least one embodiment, a processor performance preference is a processor profile. In at least one embodiment, a processor performance preference is referred to as maximum performance, or max_perf in pseudocode, where such a preference is associated with setting one or more processor settings so that a job is estimated to be performed within a given amount of time, such as a shortest possible time, and/or by consuming a specific amount of power, such as a maximum amount of power. In at least one embodiment, a processor performance preference is referred to as energy efficiency, or energy_efficiency in pseudocode, where such a preference is associated with setting one or more processor settings so that a job is estimated to be performed with a least amount of power consumed within a given amount of time. In at least one embodiment, a processor performance preference is referred to as tensor core, or tensor core in pseudocode, where such a preference is associated with setting one or more processor settings to maximize tensor core performance according to some metric, such as floating point operations per second (FLOPS). In at least one embodiment, a tensor core is a portion of a GPU specially designed to perform mathematical operations using tensors and as described herein at least in conjunction with FIG. 52. In at least one embodiment, a tensor core is an NVIDIA® Tensor Core. In at least one embodiment, a processor performance preference is referred to as compute, or compute in pseudocode, where such a preference is associated with setting one or more processor settings to maximize compute core performance according to some metric, such as FLOPS. In at least one embodiment, a compute core is a portion of a GPU such as processing cores 5210 of FIG. 52. In at least one embodiment, compute cores are processing cores of a GPU such as NVIDIA® CUDA™ cores or AMD® Compute Units. In at least one embodiment, a job scheduler 210 uses an indication of a processor performance preference to assign specific processors to perform a job, at least in part, because those processors (e.g., processors with tensor cores) are configured to perform a job according a processor performance preference (e.g., tensor core) better than other processors (e.g., processors without tensor cores).

In at least one embodiment, job scheduler database 212 stores information about a priority of a job. In at least one embodiment, a priority is referred to as a priority level. In at least one embodiment, two jobs indexed as job 0 and job 2 have default priorities of 0. In at least one embodiment, a job priority is indicated by an integer, where a lower number, such as −1023, indicates a lowest possible priority, and a higher integer, such as 1024 indicates a highest possible priority. In at least one embodiment, a default job priority is represented by integer 0. In at least one embodiment, a job priority indicates an urgency with which a job is to be performed. In at least one embodiment, factors included in calculating a job priority based on urgency are computing resources required by that job, amount of time that job has waited in a job queue to be performed, when that job must be completed by, or some combination thereof.

In at least one embodiment, in response to receiving or otherwise obtaining information about a job to be scheduled via a command, job scheduler 210 assigns one or more processors to perform that job. In at least one embodiment, job scheduler 210 indicates one or more processors to perform a job by generating and storing one or more identifiers of those one or more processors (e.g., GPU handle) in job scheduler database, such that those one or more identifiers are correlated with that job.

In at least one embodiment, in response to receiving a command to schedule a specific job based on information about a job, job scheduler 210 stores that information in a job scheduler database 212. In at least one embodiment, job scheduler database 212 is job scheduler database 112 of FIG. 1. In at least one embodiment, job scheduler database 212 is depicted in FIG. 2 as having 5 jobs stored in a queue, in positions 0 through 4. In at least one embodiment, job scheduler database 212 stores an indication of a processor performance preference corresponding to a specific job. In at least one embodiment, processor performance preferences include maximum performance (max perf), energy efficiency (energy efficiency), tensor core (tensor core), compute (compute), or some combination thereof.

In at least one embodiment, in response to receiving a command to schedule a specific job based on information about a job, job scheduler 210 enters a command or otherwise invokes an API of data center processor management module 220 to identify on or more processor profiles based on that information about that job. In at least one embodiment, data center processor management module 220 is data center processor management module 120 of FIG. 1. In at least one embodiment, job scheduler 210 sends information about a job from job scheduler database 212 to data center processor management module 220. In at least one embodiment, data center processor management module 220 receives or otherwise obtains information about a job from job scheduler database 212. In at least one embodiment, one or more APIs of data center management module 220 receives or otherwise obtains as inputs, from job scheduler database 212, indications of a processor performance preference, job type, job priority, a type of processor to perform a job, or some combination thereof. In at least one embodiment, job scheduler database 212 is implemented as part of job scheduler 210.

In at least one embodiment, a processor performs operations of data center processor telemetry module 223 to transfer processor performance metrics of one or more processors of processor group 208 to data center processor management module 220. In at least one embodiment, data center processor management module 220 receives or otherwise obtains processor performance metrics from data center processor telemetry module 223. In at least one embodiment, processor performance metrics are metrics observed while one or more processors perform a job. In at least one embodiment, processor performance metrics include an indication of tensor core activity (Tensor_Active), a percentage of SMs being used (SM_utilization), a fraction of cycles using FP64 cores (FP64_utilization), a number of vector instructions executed per cycle (# of vector instructions executed per cycle), a number of instances where operations must wait to be performed due to memory constraints (# Mem stalls per cycle), a percentage of data transfers that are served by an L2 cache instead of DRAM (L2_Hit_rate), or some combination thereof.

In at least one embodiment, processor performance metrics of processors performing a job are used by data center processor management module 220 to identify a job type of a job being performed. In at least one embodiment, processor performance metrics are used, at least in part, to identify that a job being performed requires a processor to utilize tensor cores, and therefore, identify that job as being a tensor core-intensive job. In at least one embodiment, when a data center processor management module 220 identifies a job type of a job being performed by processors, data center processor management module 220 uses that identification to modify processor settings to cause those processors to more optimally perform that job according to one or more metrics, such as FLOPS. In at least one embodiment, a data center processor management module 220 uses an identification of a job type based on data center processor telemetry metrics to generate a new performance profile as described further herein at least in conjunction with FIG. 3.

In at least one embodiment, at least a portion of processor driver/firmware 226 is implemented on a processor. In at least one embodiment, at least a portion of processor driver/firmware 226 is implemented on data center processor management module 220. In at least one embodiment, driver/firmware 226 includes at least a portion of driver 704 of FIG. 7. In at least one embodiment, at least a portion of processor driver/firmware 226 is driver/runtime 804 of FIG. 8. In at least one embodiment, process driver/firmware 226 performs one or more operations of data center processor management module 220, such as identifying a processor profile based on information about a job as described herein. In at least one embodiment, at least a portion of job priority processor profile API(s) module 222 is implemented as a part of processor driver/firmware 226. In at least one embodiment, processor driver/firmware 226 includes one or more API(s) described herein.

In at least one embodiment, processor profile database 224 is accessible by data center processor management module 220, job priority processor profile API(s) module 222, processor driver/firmware 226, or some combination thereof. In at least one embodiment, processor profile database 224 is processor profile database 124 of FIG. 1. In at least one embodiment, any module or component of data center 206 accesses processor profile database 224 to, at least in part, identify a processor profile to be used by processors when performing a specific job. In at least one embodiment, one or more data structures of processor profile database 224 is accessible by data center processor management module 220, job priority processor profile API(s) module 222, processor driver/firmware 226, or some combination thereof.

In at least one embodiment, processor profile database 224 includes one or more data structures that store information about a job such that one or more processor profiles are correlated with that information. In at least one embodiment, a data structure is lookup table 228. In at least one embodiment, lookup table 228 is any one or more data structures that correlate information about a job with a processor profile, such as a hash table, an index, a graph, or some combination thereof. In at least one embodiment, lookup table 228 stores indications of information about a job. In at least one embodiment, lookup table 228 correlates an indication or combination of indications of information about job with a processor profile. In at least one embodiment, lookup table 228 is one or more data structures that include lookup table 328 of FIG. 3. In at least one embodiment, lookup table 228 is accessible by data center processor management module 220, job priority processor profile API(s) module 222, processor driver/firmware 226, or some combination thereof, to identify one or more processor profiles to be used by processors when performing a specific job.

In at least one embodiment, data center 206 includes processor group 208. In at least one embodiment, processor(s) 108 include processor group 208. In at least one embodiment, processor group 208 includes processors 208*a-n*. In at least one embodiment, one or more of processors 208*a-n* are portions of a processor, such as partitions of streaming multiprocessors and memory of a GPU, each configured to act as independent GPUs and as described further herein. In at least one embodiment, processor group 208 is a cluster of computing resources, such as a thread block cluster described in conjunction with FIG. 40, a multi-GPU cluster described in conjunction with FIG. 44, a compute cluster of compute clusters 4436A-4436H of FIG. 44, a cluster of clusters 4514A-4514N of FIG. 45, a general processing cluster ("GPC") of GPCs 5018 of FIG. 50, a data processing cluster (DPC) 5106 of FIG. 51, or some combination thereof.

Figure 3:
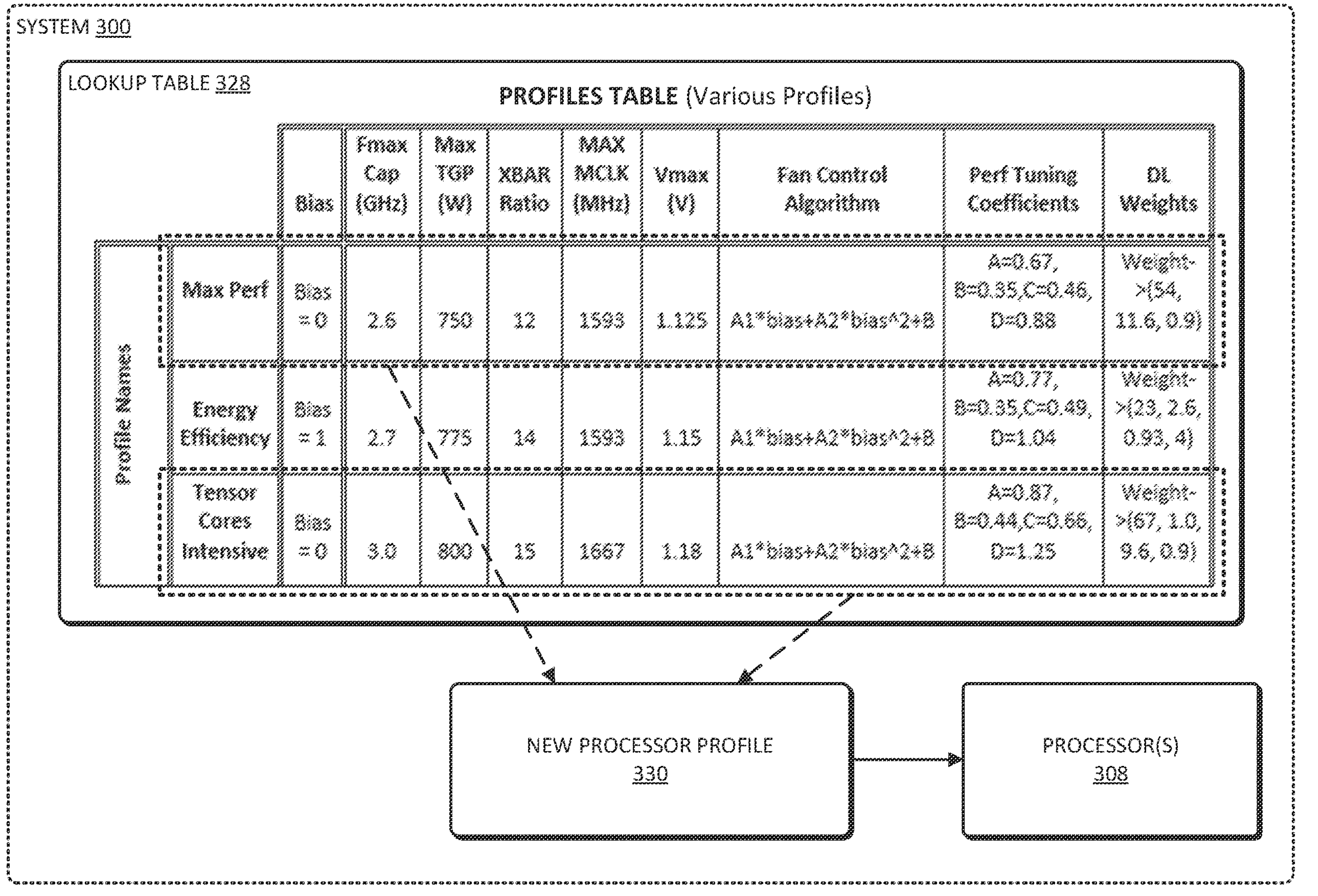
FIG. 3 illustrates a block diagram of a system that includes a data structure used to identify to processor settings to be used by processors to perform a job based, at least in part, on one or more job characteristics, in accordance with at least one embodiment.

FIG. 3 illustrates a block diagram of a system 300 that includes a lookup table used, at least in part, to identify one or more processor profiles based on information about a job as part of a job scheduling process, in at least one embodiment. In at least one embodiment, one or more aspects of one or more embodiments described herein in conjunction with FIG. 3 are combined with one or more aspects of one or more embodiments described herein, including those described at least in conjunction with FIGS. 1-2 and 4-31. In at least one embodiment, one or more processors perform one or more operations of system 300. In at least one embodiment, one or more processors that perform one or more operations of system 300 are any one processor, or combination of processors, described herein, including processor(s) 108 of FIG. 1, processor group 208 of FIG. 2, processor(s) 308, processor(s) 408 of FIG. 4, processor group 508, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, processor(s) 308 perform one or more operations of system 100 of FIG. 1, such as an operation of job scheduler 110. In at least one embodiment, processor(s) 308 perform one or more operations of system 200 of FIG. 2, such as an operation used to identify a processor profile using lookup table 228. In at least one embodiment, processor(s) 308 perform one or more operations described in conjunction with FIG. 4, such as selecting, using job priority, selected processor profile 427. In at least one embodiment, processor(s) 308 perform one or more operations described in conjunction with FIG. 5, such an operation of job scheduler 510 used to receive a job priority from a user processor group 508. In at least one embodiment, processor(s) 308 perform one or more operations described in conjunction with FIG. 6, such as an operation to access processor profiles stored in a data structure with operation 604. In at least one embodiment, processor(s) 308 perform one or more operations of API(s) 710 of FIG. 7. In at least one embodiment, processor(s) 308 perform one or more operations described in conjunction with FIG. 8, such as identifying processor settings from a database. In at least one embodiment, processor(s) 308 perform one or more operations of operations described in conjunction with FIGS. 9-31.

In at least one embodiment, system 300 includes a data center, such as data center 106 of FIG. 1. In at least one embodiment, system 300 includes lookup table 328. In at least one embodiment, lookup table 328 is at least a portion of lookup table 228 of FIG. 2. In at least one embodiment, lookup table 328 is depicted visually using rows and columns. In at least one embodiment, lookup table includes processor profiles, or indications thereof, such as max perf, energy efficiency, tensor cores intensive. In at least one embodiment, each processor profile includes values and/or formulas used to set and/or control processor settings.

In at least one embodiment, lookup table 328 includes any information about any on or more processor settings that may affect a processor's performance of a job. In at least one embodiment, lookup table 328 includes values related a maximum processor clock frequency (Fmax cap), a maximum total graphics power (max TGP), a crossbar ratio (Xbar ratio), a maximum memory clock (max Mclk), a maximum operating voltage (Vmax), or some combination thereof. In at least one embodiment, lookup table 328 includes an algorithm used to calculate fan speed, which is referred to as a fan control algorithm. In at least one embodiment, an input of a fan control algorithm is a bias value, which is described further herein. In at least one embodiment, lookup table 328 includes performance tuning coefficients, where such coefficients are used in algorithms used to set processor settings. In at least one embodiment, performance tuning coefficients are used as coefficients in a fan control algorithm. In at least one embodiment, lookup table 328 includes constraints on weights of a neural network used, at least in part, to perform a job. In at least one embodiment, weights of a neural network are deep learning (DL) weights. In at least one embodiment, a list of DL weight constraints, also referred to as DL weights, indicates a minimum and/or maximum value of weights to be used during mathematical operations. In at least one embodiment, weight constraints are important because processors perform mathematical operations more slowly or more quickly depending on which range of values and/or data formats are used during those operations.

In at least one embodiment, lookup table 328 includes a bias. In at least one embodiment, a bias is a value that indicates a percent increase or decrease of one or more processor settings. In at least one embodiment, a bias is a value inserted into a fan control algorithm to adjust a processor fan speed. In at least one embodiment, a bias is generated by a data center processor management module, such as data center processor management module 220 of FIG. 2, to cause one or more processor settings of a default processor profile to be increased or decreased. In at least one embodiment, a default processor profile includes one or more default processor setting values. In at least one embodiment, a data center processor management module is referred to as a resources manager (RM) in conjunction with FIG. 3 and other figures. In at least one embodiment, a resources manager uses a bias to define a job priority with greater detail when data center processors must perform multiple jobs with identical priorities. In at least one embodiment, a resources manager uses a bias to better define job priorities of two different jobs. In at least one embodiment, using a bias allows to better modify processor settings to optimize performance of multiple jobs according to various factors, such as efficiency in power use, amount of time required to complete a job, or some combination thereof.

In at least one embodiment, a bias value is an integer. In at least one embodiment, as a bias value increases, one or more processor settings increase. In at least one embodiment, a bias of 1 increases a default maximum processor clock frequency (Fmax cap) of an energy efficiency profile from 2.6 GHz to 2.7 GHZ. In at least one embodiment, a bias of 0 leaves unchanged processor settings of a default processor profile.

In at least one embodiment, a bias value is used to adjust processor settings provides an advantage over modifying a job priority value because a bias value allows an RM to adjust a priority of a job, instead of having to communicate with job scheduler to assign a new job priority, which slows performance in scheduling that job. In at least one embodiment, a bias value provides an advantage over creating additional processor profiles that incorporate varying processor settings because each processor profile requires much more data to be stored when compared to simply inputting a single bias value into a formula to adjust processor settings and/or using a single bias value to adjust one or more processor settings by given percentage.

In at least one embodiment, processor profiles stored in lookup table 328 are correlated with one or more indications of information about a job. In at least one embodiment, one or more indications of information about a job include one or more indications of a processor performance preference, a job type, a job priority, a type of processor, or some combination thereof. In at least one embodiment, an indication of a processor performance preference of maximum performance input as part of a command of a job scheduler, as described further herein, causes an RM to identify a maximum performance profile in lookup table 328. In at least one embodiment, after identifying a maximum performance profile in lookup table 328, that profile is stored with an indication of one or more processor settings to be used to implement a maximum performance profile on a processor. In at least one embodiment, an indication of one or more processor settings to be used by a processor profile is one or more indications of one or more memory addresses where those settings and/or associated formulas are stored.

In at least one embodiment, a type of processor is based on operating specifications of that processor. In at least one embodiment, operating specifications include a maximum TGP, indications of processor core types (e.g., tensor cores, compute cores), amounts of different types of memory (e.g., L2 cache, DRAM) on a processor, or some combination thereof. In at least one embodiment, an amount of memory is referred to as a memory capacity. In at least one embodiment, a type of processor causes an RM to modify a default processor settings profile if that processor has a max TGP below a default max TGP of a processor settings profile. In at least one embodiment, a type of processor cause an RM to modify how it incorporates a bias factor into processor settings of a processor settings profile if that bias factor would cause a processor setting to exceed an operating limit, such as max TGP, of that processor. In at least one embodiment, an RM determines that a maximum clock speed of a processor should be lowered if a job type is tensor-intensive and a processor assigned to perform that job has no tensor cores and has limited memory, such that a default clock speed is faster than required to perform that job, and therefore, that default clock speed does not speed up performance of that job and causes wasteful power consumption if not lowered.

In at least one embodiment, a job to be performed with a maximum performance processor profile and another job to be performed with a tensor cores intensive processor profile (both of which are outlined in dashed line in FIG. 3) have identical job priorities of 0, identical biases of 0, and are scheduled to be performed concurrently in data center. In at least one embodiment, due to equal biases assigned to two different jobs that will, at least in part, be concurrently performed, a resources manager generates new processor profile 330, by combining and/or selecting various processor settings that are estimated to optimally perform both jobs according to one or more factors, such as FLOPS. In at least one embodiment, a new processor profile generated by a resources manager adds that profile to lookup table 328. In at least one embodiment, one or more existing processor profiles of lookup table 328 are created after experimental simulations and/or benchmarks of different jobs performed by different computing resources.

In at least one embodiment, a resources manager sends an indication of new processor profile 330 to a job scheduler. In at least one embodiment, a job scheduler schedules one or more jobs with an indication of new processor profile 330. In at least one embodiment, prior to performing one or more jobs using new processor profile 330, a job scheduler sends an indication of new processor profile 330 back to a resources manager, where that module checks if processor settings of processor(s) 308 have been set according to new processor profile 330. In at least one embodiment, if processor settings of processor(s) 308 have not been set accordingly, a resources manager sets those processor settings. In at least one embodiment, if a resources manager determines that processor settings have been set according to new processor profile 330, that module sends an indication back to a job scheduler to cause that job scheduler to launch one or more jobs to be performed using new processor profile 330. In at least one embodiment, one or more operations described in conjunction with new processor profile 330 are applied to other processor profiles of lookup table 328. In at least one embodiment, processor(s) 308 are any one or more processors of processor(s) 108 of FIG. 1 or processor group 208 of FIG. 2.

Figure 4:
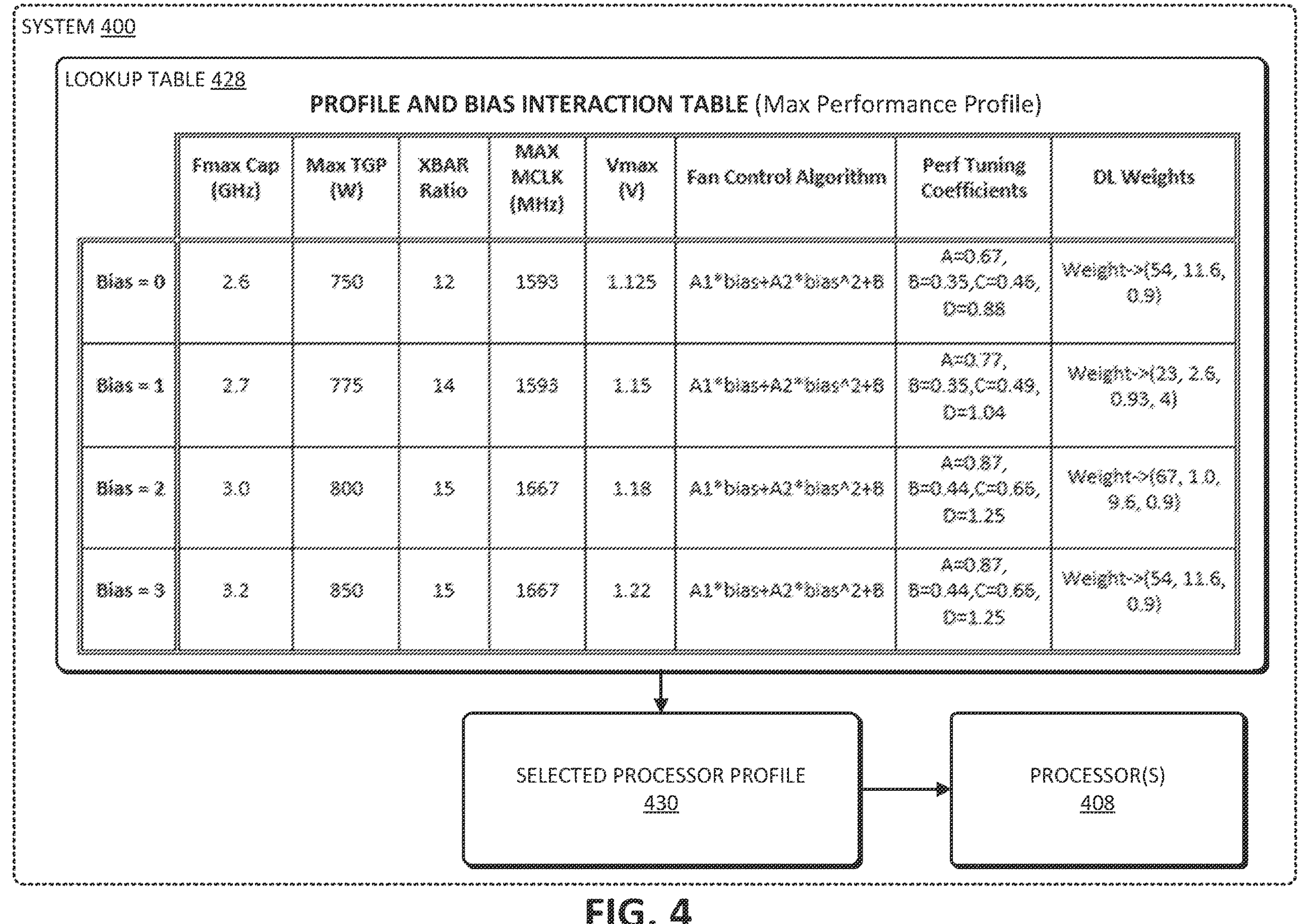
FIG. 4 illustrates a block diagram of a system that includes a data structure used to identify to processor settings to be used by processors to perform a job based, at least in part, on one or more job characteristics, in accordance with at least one embodiment.

FIG. 4 illustrates a block diagram of a system 400 that includes a lookup table used, at least in part, to identify one or more processor profiles based on information about a job as part of a job scheduling process, in at least one embodiment. In at least one embodiment, one or more aspects of one or more embodiments described herein in conjunction with FIG. 4 are combined with one or more aspects of one or more embodiments described herein, including those described at least in conjunction with FIGS. 1-3 and 5-31. In at least one embodiment, one or more processors perform one or more operations of system 400. In at least one embodiment, one or more processors that perform one or more operations of system 400 are any one processor, or combination of processors, described herein, including processor(s) 108 of FIG. 1, processor group 208 of FIG. 2, processor(s) 308 of FIG. 3, processor(s) 408, processor group 508, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, one or more operations of system 400 performed by a processor are one or more operations of system 100 of FIG. 1, such as an operation of job scheduler 110. In at least one embodiment, processor(s) 408 perform one or more operations of system 200 of FIG. 2, such as an operation used to identify a processor profile using lookup table 228. In at least one embodiment, processor(s) 408 perform one or more operations described in conjunction with FIG. 3, such generating new performance profile 330. In at least one embodiment, processor(s) 408 perform one or more operations described in conjunction with FIG. 5, such an operation of job scheduler 510 used to receive a job priority from a user processor group 508. In at least one embodiment, processor(s) 408 perform one or more operations described in conjunction with FIG. 6, such as an operation to access processor profiles stored in a data structure with operation 604. In at least one embodiment, processor(s) 408 perform one or more operations of API(s) 710 of FIG. 7. In at least one embodiment, processor(s) 408 perform one or more operations described in conjunction with FIG. 8, such identifying processor settings from a database. In at least one embodiment, processor(s) 408 perform one or more operations described in conjunction with FIGS. 9-31.

In at least one embodiment, system 400 includes a data center, such as data center 106 of FIG. 1. In at least one embodiment, processor profile database 124 of FIG. 1 includes one or more portions of lookup table 228 of FIG. 2, lookup table 328 of FIG. 3, lookup table 428, or some combination thereof. In at least one embodiment, lookup table 428 is used in conjunction with lookup table 328. In at least one embodiment, lookup table 428 includes processor settings of four different versions of a maximum performance profile according to bias. In at least one embodiment, lookup table 428 is referred to as a profile and bias interaction table. In at least one embodiment, processor settings of a maximum performance profile are organized by bias. In at least one embodiment, one or more processor settings of a maximum performance profile increase as bias increases. In at least one embodiment, as bias increases, a fan control algorithm does not change, but its output changes because a bias value is input into that fan control algorithm.

In at least one embodiment, a resources manager identifies processor settings to be used based on a bias value. In at least one embodiment, identified processor settings are included in selected processor profile 430. In at least one embodiment, a resources manager sends an indication of selected processor profile 430 to a job scheduler. In at least one embodiment, a job scheduler schedules one or more jobs with an indication of selected processor profile 430. In at least one embodiment, prior to performing one or more jobs using selected processor profile 430, a job scheduler sends an indication of selected processor profile 430 back to a resources manager, where that manager checks if processor settings of processor(s) 408 have been set according to selected processor profile 430. In at least one embodiment, if processor settings of processor(s) 408 have not been set accordingly, a resources manager sets those processor settings. In at least one embodiment, if a resources manager determines that processor settings have been set according to selected processor profile 430, that module sends an indication back to a job scheduler to cause that job scheduler to launch one or more jobs to be performed using selected processor profile 430. In at least one embodiment, processor(s) 408 are any one or more processors of processor(s) 108 of FIG. 1, processor group 208 of FIG. 2, or processor(s) 308.

In at least one embodiment, lookup table 428 illustrates how bias settings, also referred to as bias values or bias factors, and processor settings and features are mapped. In at least one embodiment, firmware of a resource manager uses lookup table 428 to map bias factors to each processor setting and feature included in a processor settings profile, and helps bias performance of a processor using that profile. In at least one embodiment, bias factors and their mapping to processor settings and features are calculated, tuned, or otherwise determined, through simulations and/or experiments that include various jobs performed by various processors. In at least one embodiment, lookup table 428 includes sets of processor settings that cause optimal performance of jobs across a wide variety of jobs in various fields. In at least one embodiment, jobs are referred to as workloads or software workloads.

In at least one embodiment, a technique that maps bias factors and/or job characteristics to a processor settings profile may include an algorithm, formula, or model that outputs values as a function of bias, such as fan control algorithm of lookup table 428 described further herein. In at least one embodiment, performance tuning coefficients of lookup table 428 are used as coefficients in a performance tuning algorithm, formula, or model, that is implemented as part of a performance estimator of a processor. In at least one embodiment, a performance tuning algorithm, formula, or model uses performance tuning coefficients to determine processor performance at any given point while that processor is active. In at least one embodiment, a resource manager automatically incorporates a bias factor, when set, into one or more processor settings, features, sub-features, or models, to modify each of those settings, features, sub-features, or models to cause a processor to optimally perform a job.

Figure 5:
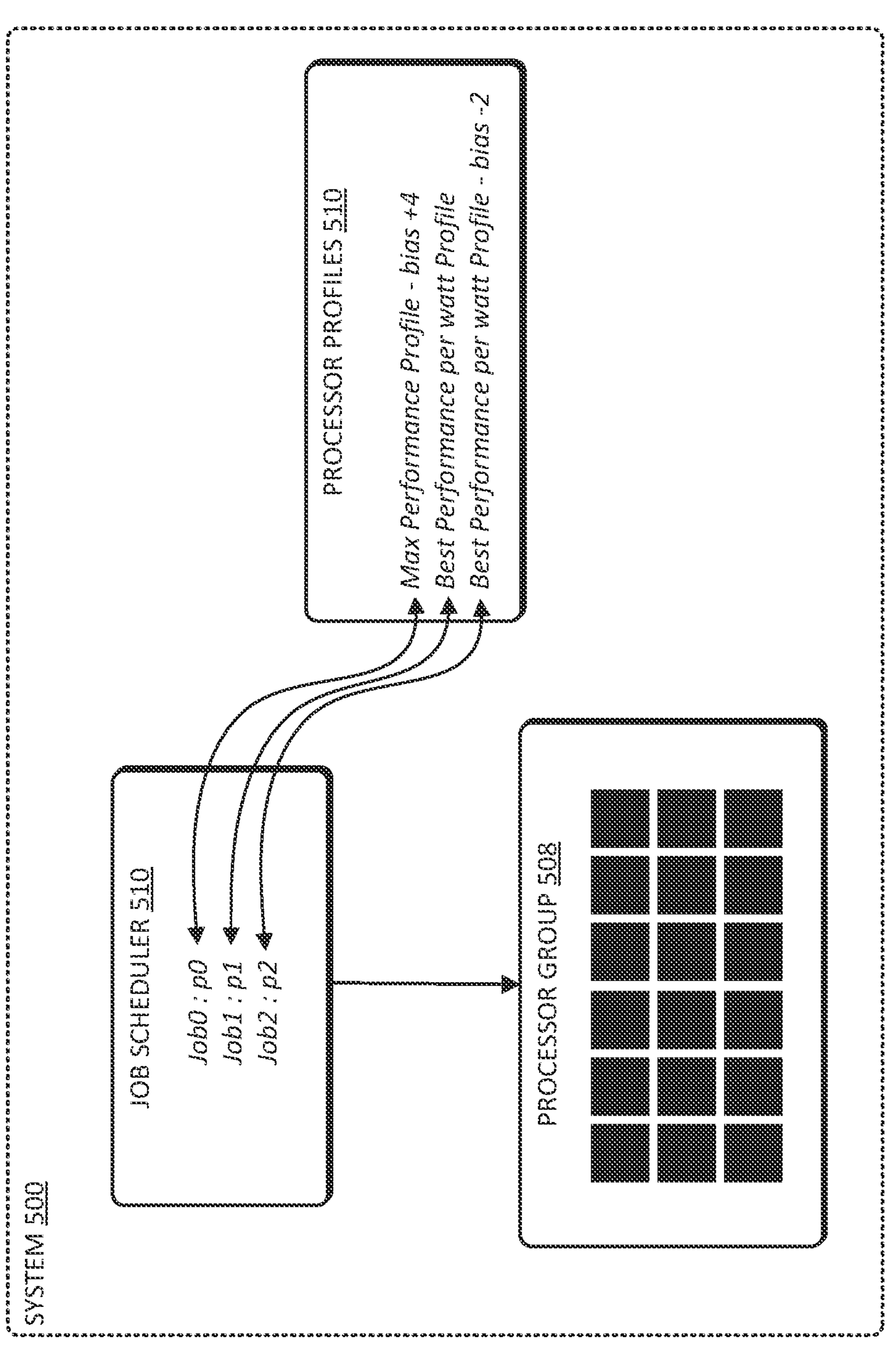
FIG. 5 illustrates a block diagram of a system that includes a job scheduler and processor settings profiles adjusted by a bias value, in accordance with at least one embodiment.

FIG. 5 illustrates a block diagram of a system 500 that includes a job scheduler used, at least in part, to schedule one or more jobs based, at least in part, on indications of one or more job characteristics, in at least one embodiment. In at least one embodiment, one or more aspects of one or more embodiments described herein in conjunction with FIG. 5 are combined with one or more aspects of one or more embodiments described herein, including those described at least in conjunction with FIGS. 1-4 and 6-31. In at least one embodiment, one or more processors perform one or more operations of system 500. In at least one embodiment, one or more processors that perform one or more operations of system 500 are any one processor, or combination of processors, described herein, including processor(s) 108 of FIG. 1, processor group 208 of FIG. 2, processor(s) 308 of FIG. 3, processor(s) 408 of FIG. 4, processor group 508, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, processor group 508 performs one or more operations of system 100 of FIG. 1, such as an operation of job scheduler 110. In at least one embodiment, processor group 508 performs one or more operations of system 200 of FIG. 2, such as an operation used to identify a processor profile using lookup table 228. In at least one embodiment, processor group 508 performs one or more operations described in conjunction with FIG. 3, such generating new performance profile 330. In at least one embodiment, processor group 508 performs one or more operations described in conjunction with FIG. 4, such an operation of used to select a processor profile to be applied to processor(s) 408. In at least one embodiment, processor group 508 performs one or more operations described in conjunction with FIG. 6, such as an operation to access processor profiles stored in a data structure with operation 604. In at least one embodiment, processor group 508 performs one or more operations of API(s) 710 of FIG. 7. In at least one embodiment, processor group 508 performs one or more operations described in conjunction with FIG. 8, such identifying processor settings from a database. In at least one embodiment, processor group 508 performs one or more operations described in conjunction with FIGS. 9-31.

In at least one embodiment, system 500 includes a data center, such as data center 106 of FIG. 1. In at least one embodiment, system 500 includes job scheduler 510 of a data center. In at least one embodiment, job scheduler 510 is job scheduler 110 of FIG. 1. In at least one embodiment, job scheduler 510 schedules jobs Job0, Job1, and Job2. In at least one embodiment, Job0, Job1, and Job2 are job IDs. In at least one embodiment, job IDs are stored in a job scheduler database. In at least one embodiment, each jobID is associated with a job priority, p0, p1, and p2. In at least one embodiment, a processor performs one or more operations described further herein at least in conjunction with FIGS. 1-4 and FIGS. 6-31 to identify processor profiles 510.

In at least one embodiment, each processor profile of processor profiles 510 is to be used to set processor settings of processors assigned to perform jobs submitted to job scheduler 510. In at least one embodiment, job scheduler 510 stores an indication of a processor profile to be used with a job when scheduling that job. In at least one embodiment, a Job0 is assigned a lowest job priority among multiple jobs, but a processor performance preference of max performance was input into job scheduler 510 by a user, while other jobs were indicated with a best performance per watt preference. In at least one embodiment, a processor performance preference that requires greater computing resources, such as power, than other processor performance preferences, causes a resources manager to assign a higher bias to that job indicated with a processor performance preference than a bias assigned to other jobs indicated with those other processor performance preferences, despite and/or because those other jobs have a higher job priority.

In at least one embodiment, system 500 includes a resources manager that allows a user to interact with and see, via a user interface, individual processor settings of one or more GPUs. In at least one embodiment, system 500 allows a user to see processor settings profiles that are stored in firmware of a GPU or as part of a resources manager. In at least one embodiment, processor settings profiles are referred to as performance policies, a profile mode, or a performance profile. In at least one embodiment, processor settings profiles are power policies, which include processor settings that manage power consumption of a processor.

In at least one embodiment, system 500 includes a resource manager that allows a user to see a list of processor performance preferences. In at least one embodiment, a list of processor performance preferences are shown as a list of power profiles of a settings page via a user interface. In at least one embodiment, a user interface is a graphical user interface (GUI). In at least one embodiment, system 500 allows a user to select or adjust processor performance preferences. In at least one embodiment, system 500 allows a user to adjust processor performance preferences according to a server room, server row, a server rack, a device, a blade server, or some combination thereof. In at least one embodiment, a processor performance preference is a more general way of identifying a processor settings profile that, when used to configure a processor, is estimated to achieve a threshold amount of performance. In at least one embodiment, a threshold amount of performance is a given amount of operations performed per watt consumed by a processor.

In at least one embodiment, system 500 allows a user to see and/or modify individual processor settings of default processor settings profiles stored in firmware of a resource manager. In at least one embodiment, a default processor settings profile stored in firmware of a resource manager is a maximum performance profile (Max Perf), which at least includes processor settings as follows: Vmax=1.1V, Fmax cap=2.6 Ghz, V939 ON, Min-TGP=500 W, Max-TGP=750 W, XBAR Ratio=10, MCLK=1593, Thermal policy=A, Vmax balancing feature=enabled, DLPPE=enabled. In at least one embodiment, Vmax, Fmax cap, Max-TGP, XBAR Ratio, and MCLK are described further herein. In at least one embodiment, Min-TGP is a minimum total graphics power setting of a processor, which represents a minimum power consumption of that processor under normal operating conditions. In at least one embodiment, Thermal policy=A represents specific set of settings and/or formulas used adjust those settings to prevent one or more portions of a processor from exceeding a given temperature. In at least one embodiment, Vmax balancing feature=enabled, refers to a resource manager that monitors power consumption multiple GPUs and adjusts Vmax of each GPU as those GPUs perform workloads such that power consumption across those GPUs are optimized to perform a number of operations per watt consumed. In at least one embodiment, DLPPE-enabled refers to deep learning parallel processing engines that have been enabled for use to perform neural network operations.

In at least one embodiment, a default maximum performance profile can be selected by a user to hit maximum performance as a base profile when performing a job. In at least one embodiment, a resource manager allows users to input a bias value to further increase a priority of a job to be performed. In at least one embodiment, a bias value is referred to as a bias factor. In at least one embodiment, a resource manager automatically generates a bias value to increase a priority of a job to be performed as described further herein. In at least one embodiment, a default maximum performance profile can be biased by a value of +4, as depicted in processor profiles 510. In at least one embodiment, each setting of a processor settings profile would be connected to or modified by a bias factor. In at least one embodiment, firmware of a resource manager has a policy to automatically adjust each processor feature or setting to include that bias factor.

In at least one embodiment, a resource manager of system 500 includes firmware and/or a driver that takes a user-provided priority of a job and adjusts characteristics of one or more circuits and power management policies of a processor, such as a CPU and/or GPU. In at least one embodiment, circuit settings are changed based on profiles and bias factors. In at least one embodiment, power management policies are adjusted based on a region of operation of a CPU and/or GPU. In at least one embodiment, changes to processor circuit settings, adjustments to characteristics of processor circuits, and adjustments to power management policies are each referred to as configuring a processor. In at least one embodiment, a resource manager dynamically adjusts voltage and frequency profiles based on a region of operation of GPUs (e.g., 700 W, 750 W, 800 W). In at least one embodiment, a noise aware frequency lock loop (NAFLL) clock circuit settings are different based on a voltage axis, and hence those circuit settings are tuned to optimum voltage ranges based on bias. In at least one embodiment, noise settings and thermal policies are automatically changed as a function of bias by firmware and/or drivers of a resource manger such that processor settings and various policies cause processors to operate within a given range of operation. In at least one embodiment, a resource manager of system 500 dynamically adjusts definitions of processor performance states (P-states) in Video BIOS (vBIOS) based on a bias factor applied to those definitions. In at least one embodiment, a definition of P-states includes one or more aspects of a processor settings profile, such as one or more processor settings. In at least one embodiment, a bias factor applied to a definition of P-state or to a processor settings profile causes a corresponding processor to be referred to as being in a bias mode. These are just few examples and essentially FW/driver will have tons of settings and policies to change as a function of bias.

In at least one embodiment, an indication of a processor profile stored by job scheduler 510 in a job queue is used by a resources manager to cause processor settings of processor group 508 to be set according to that indicated processor profile. In at least one embodiment, processor group 508 includes one or more processors of processor(s) 108 of FIG. 1, processor group 208 of FIG. 2, processor(s) 308 of FIG. 3, or processor(s) 408 of FIG. 4.

Figure 6:
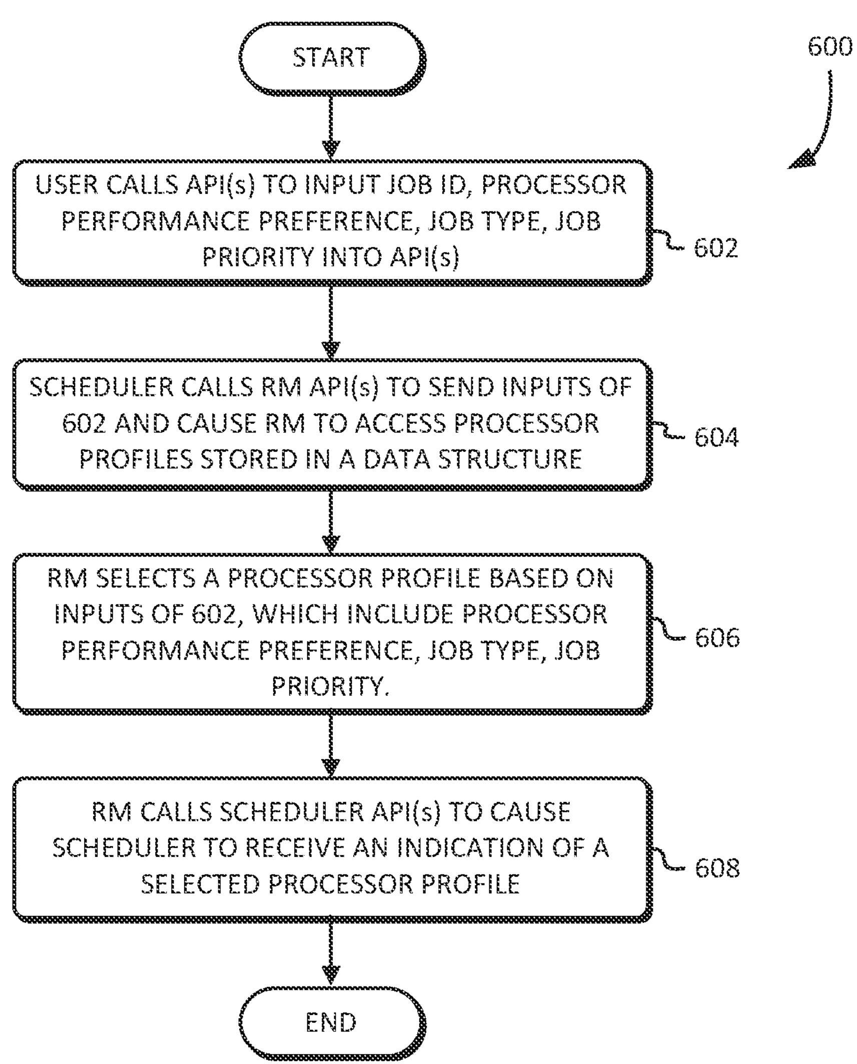
FIG. 6 illustrates a block diagram of a process used to configure processors based, at least in part, on one or more job characteristics, in accordance with at least one embodiment.

FIG. 6 illustrates a block diagram of process 600 to identify processor settings to be used based, at least in part, on one or more job characteristics, such as job priority, in at least one embodiment. In at least one embodiment, one or more aspects of one or more embodiments described herein in conjunction with FIG. 6 are combined with one or more aspects of one or more embodiments described herein, including those described at least in conjunction with FIGS. 1-5 and 7-31. In at least one embodiment, one or more processors perform one or more operations of process 600. In at least one embodiment, one or more processors that perform one or more operations of process 600 are any one processor, or combination of processors, described herein, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, a processor that performs one or more operations of process 600 perform one or more operations of system 100 of FIG. 1, such as an operation of job scheduler 110. In at least one embodiment, a processor that performs one or more operations of process 600 perform one or more operations of system 200 of FIG. 2, such as an operation used to identify a processor profile using lookup table 228. In at least one embodiment, a processor that performs one or more operations of process 600 perform one or more operations described in conjunction with FIG. 3, such generating new performance profile 330. In at least one embodiment, a processor that performs one or more operations of process 600 perform one or more operations described in conjunction with FIG. 4, such an operation of used to select a processor profile to be applied to processor(s) 408. In at least one embodiment, a processor that performs one or more operations of process 600 perform one or more operations described in conjunction with FIG. 5, such as identifying processor profiles 510. In at least one embodiment, a processor that performs one or more operations of process 600 perform one or more operations of API(s) 710 of FIG. 7. In at least one embodiment, a processor that performs one or more operations of process 600 perform one or more operations described in conjunction with FIG. 8, such as identifying processor settings from a database. In at least one embodiment, a processor that performs one or more operations of process 600 perform one or more operations of FIGS. 9-31.

In at least one embodiment, a user causes a processor to begin process 600 by calling API(s) of a job scheduler to input indications of one or more job characteristics, such as a job identifier (e.g., job ID), a processor performance preference, a job type, a job priority, or some combination thereof, into one or more API(s) with operation 602, and as described further herein at least in conjunction with FIGS. 1-2. In at least one embodiment, a processor performs operations of operation 602 using a single API or single command line. In at least one embodiment, a processor performs operations of operation 602 using two or more APIs or command lines. In at least one embodiment, a user inputs one or more indications of one or more job characteristics into one or more APIs by using a command line via a user interface, such as user interface 102 of FIG. 1.

In at least one embodiment, in response to a user entering a command line via a user interface as part of operation 602, a processor performs an API to cause one or more other processors to be configured to operate at one or more clock frequencies based, at least in part, on one or more inputs to that API. In at least one embodiment, to configure a processor to operate at a clock frequency refers to operations used to set a processor setting that controls a clock frequency of a processor used to perform a job, or as otherwise described herein at least in conjunction with FIGS. 1-5 and 7-31. In at least one embodiment, a processor performs an API to cause one or more other processors to be configured to operate according to one or more processor settings, such as Xbar ratio, Vmax, or as otherwise described herein at least in conjunction with FIGS. 1-5 and 7-31. In at least one embodiment, one or more inputs into an API of operation 602 comprise indications of one or more processor target metrics to be used by one or more processors when performing one or more instructions of a job. In at least one embodiment, processor target metrics include a time within which performance of a job is to be completed, an amount of power to be consumed when performing a job, or some combination thereof or as otherwise described herein. In at least one embodiment, one or more inputs into an API of operation 602 comprise indications of one or more processor performance preferences as described further herein at least in conjunction with FIG. 2. In at least one embodiment, one or more inputs into an API of operation 602 comprise indications of one or more processor settings profile as described further herein at least in conjunction with FIG. 1.

In at least one embodiment, one or more inputs into an API of operation 602 comprise one or more indications of a software workload to be performed by one or more processors. In at least one embodiment, a software workload is a job. In at least one embodiment, a software workload is a kernel. In at least one embodiment, a software workload is a set of instructions. In at least one embodiment, a processor is to perform an API of operation 602 to cause one or more processors to be configured to operate at one or more clock frequencies based, at least in part, on one or more observed processor performance metrics and as described further herein. In at least one embodiment, a processor is to perform an API of operation 602 to cause one or more processors to be configured to operate based, at least in part, on a maximum operating voltage (Vmax) or as otherwise described herein. In at least one embodiment, a processor is to perform an API of operation 602 to cause one or more processors to be configured to operate based, at least in part, on a crossbar ratio (Xbar ratio) or as otherwise described herein. In at least one embodiment, a processor is to perform an API of operation 602 to cause one or more processors to be configured to operate based, at least in part, a mathematical formula used to control fan speed.

In at least one embodiment, in response to a user entering a command line via a user interface as part of operation 602, a processor performs an API to indicate one or more computing resources to be used by one or more instructions based, at least in part, on one or more inputs to that API. In at least one embodiment, one or more inputs into an API of operation 602 comprise one or more indications of a type of one or more instructions that are to use one or more computing resources, where a type of instructions are a job type as described further herein. In at least one embodiment, computing resources include any combination of hardware, firmware, software, or power used to perform one or more instructions. In at least one embodiment, computing resources are one or more GPUs of a group of GPUs assigned to perform one or more instructions. In at least one embodiment, a processor performs an API of operation 602 to indicate one or more computing resources based, at least in part, on an indication of floating-point operations per second (FLOPS) to be performed by those one or more computing resources, or as otherwise described herein. In at least one embodiment, a processor performs an API of operation 602 to indicate one or more computing resources based, at least in part, on one or more indications of a memory transfer rate of one or more computing resources and as described further herein. In at least one embodiment, one or more indications of one or more computing resources are to be used by one or more schedulers when scheduling one or more instructions or as otherwise described herein. In at least one embodiment, one or more computing resources are one or more portions of a graphics processing unit (GPU) assigned to perform one or more instructions or as otherwise described herein.

In at least one embodiment, in response to a user entering a command line via a user interface as part of operation 602, a processor performs an API to indicate a priority, with which to perform one or more instructions based, at least in part, on one or more inputs to that API, or as otherwise described herein. In at least one embodiment, a priority is a job priority of one or more instructions to be performed by one or more computing resources, or as otherwise described herein. In at least one embodiment, a processor performs an API of operation 602 to indicate one or more settings of one or more computing resources used to perform one or more instructions based, at least in part, on a priority of those one or more instructions. In at least one embodiment, a processor performs an API of operation 602 to indicate a priority based, at least in part, on an estimated time required to complete performance of one or more instructions. In at least one embodiment, a processor performs an API of operation 602 to indicate a priority based, at least in part, on an estimated power consumption required to complete performance of one or more instructions. In at least one embodiment, a priority indicated by an API of operation 602 is to be used by one or more schedulers when scheduling one or more instructions. In at least one embodiment, one or more instructions are to be performed by one or more computing resources that are one or more portions of graphics processing units (GPUs).

In at least one embodiment, a processor continues process 600 by performing a job scheduler to call API(s) of a resource manager (RM) to send inputs of operation 602 to that resource manager and cause that resource manager to access a database of processor profiles stored in a data structure with operation 604 or as otherwise described herein. In at least one embodiment, a data structure of operation 604 is a lookup table, such as lookup table 228 of FIG. 2, lookup table 328 of FIG. 3, or lookup table 428 of FIG. 4. In at least one embodiment, a data structure of operation 604 is stored in a processor profile database, such as processor profile database 124 of FIG. 1 or processor profile database 224 of FIG. 2.

In at least one embodiment, a processor continues process 600 by performing RM API(s) to cause that RM to select a processor profile, from a data structure, based on inputs of operation 602, which include a processor performance preference, job type, job priority, or some combination thereof, with operation 606. In at least one embodiment, selecting a processor profile is referred to as identifying a processor profile, which is described further herein. In at least one embodiment, a processor performs an API of operation 606 to identify one or more settings to be used to configure one or more processors to operate at one or more processor clock frequencies based, at least in part, on one or more clock frequency inputs to that API. In at least one embodiment, a processor performs an API of operation 606 to identify one or more settings to be used to configure one or more processors to operate according to processor settings such as Xbar ratio and Vmax, or as otherwise described herein. In at least one embodiment, a processor performs an API of operation 606 to identify one or more settings to be used to configure one or more processors to perform one or more instructions based, at least in part, on one or more indications of processor performance profiles input to that API, or as otherwise described herein. In at least one embodiment, one or more settings to be used to configure one or more processors to operate at one or more processor clock frequencies is based, at least in part, on one or more processor performance metrics observed during performance of one or more instructions by one or more processors, and as described further herein. In at least one embodiment, one or more settings to be used to configure one or more processors to operate at one or more processor clock frequencies includes a crossbar (Xbar) ratio setting. In at least one embodiment, a processor performs an API of operation 606 to identify one or more settings from a data structure that correlates one or more indications of those one or more settings with one or more clock frequency inputs, or as otherwise described herein. In at least one embodiment, a processor performs an API of operation 606 to identify one or more settings based, at least in part, on a value used to bias one or more default settings used to configure one or more processors, or as otherwise described herein. In at least one embodiment, a processor performs an API of operation 606 to identify one or more settings based, at least in part, on one or more memory clock settings, or as otherwise described herein.

In at least one embodiment, a processor performs an API of operation 606 to identify one or more settings to be used to configure one or more processors to operate at one or more processor clock frequencies based, at least in part, on computing resource inputs to that API. In at least one embodiment, computing resource inputs are indications of types of computing resources that may be required by a job, where types of computing resources may include tensor cores, compute cores, processor memory, or some combination thereof, or as otherwise described herein. In at least one embodiment, a computing resource input is an indication of a job type. In at least one embodiment, computing resource inputs include indications that one or more sets of instructions to be performed by one or more processors is compute bound as described further herein. In at least one embodiment, computing resource inputs include indications that one or more sets of instructions to be performed by one or more processors is memory bound as described further herein. In at least one embodiment, computing resource inputs include indications of types of instructions to be performed by one or more processors, where such types are job types as described further herein. In at least one embodiment, computing resource inputs include indications of computing resources used during performance of one or more instructions by one or more processors, where such indications are based on observed processor metrics as described further herein. In at least one embodiment, computing resource inputs include indications of a number of processors required to perform one or more sets of instructions.

In at least one embodiment, a processor performs an API of operation 606 to identify one or more settings to be used to configure one or more processors to operate at one or more processor clock frequencies based, at least in part, on one or more priority inputs to that API. In at least one embodiment, a priority input is an indication of job priority. In at least one embodiment, an indication of a job priority is referred to as a priority of one or more instructions to be scheduled to be performed by processors of a data center, or as otherwise described further herein. In at least one embodiment, an API of operation 606 receives or otherwise obtains a priority input from a scheduler of one or more instructions to be performed by processors of a data center. In at least one embodiment, a scheduler of one or more instructions is a job scheduler as described further herein. In at least one embodiment, an API of operation 606 identifies one or more settings to be used to configure one or more processors based, at least in part, on priority inputs that correspond to a set of instructions, such as a specific job, and on priority inputs that correspond to another set of instructions, such as another job. In at least one embodiment, priority inputs of multiple jobs can be used during performance of an API to identify a bias value to be applied to each job, or as otherwise described herein. In at least one embodiment, a processor performs an API to identify one or more settings to be used to configure one or more processors based, at least in part, on a percentage increase or decrease of one or more default values of those one or more settings or as otherwise described herein in conjunction with bias values. In at least one embodiment, a processor performs an API to identify one or more settings to be used to configure one or more processors based, at least in part, on an integer to bias default values of those one or more settings, or as otherwise described herein in conjunction with bias values.

In at least one embodiment, a processor performs an API of operation 606 to input GPU handles as described further herein. In at least one embodiment, a processor performs an API of operation 606 to identify one or more settings to be used to configure one or more processors to operate at one or more processor clock frequencies based, at least in part, on one or more processors to be used. In at least one embodiment, indications of one or more processors to be used to perform one or more instructions are generated by a scheduler, such as a job scheduler. In at least one embodiment, a scheduler assigns one or more processors to perform a job based, at least in part, on processor availability in a data center. In at least one embodiment, a processor performs an API to identify settings to be used to configure one or more processors based, at least in part on hardware specifications of processors assigned to perform instructions, hardware specifications such as whether a processor includes tensor cores, or as otherwise described herein. In at least one embodiment, indications of one or more processors to be used to perform instructions are input into an API of 606. In at least one embodiment, a processor performs an API of operation 606 to identify one or more settings based, at least in part, on types of processors to be used, where types include an accelerator used to perform neural network operations, a partition of a GPU using NVIDIA® MIG, or as otherwise described herein. In at least one embodiment, a processor performs an API of operation 606 to identify one or more settings based, at least in part, on operating specifications of one or more processors to be used, operating specifications such as a maximum total graphics power (max TGP). In at least one embodiment, different models of GPUs have different max TGPs, where one GPU may have a max TGP of 700 W and another GPU may have a max TGP of 1000 W. In at least one embodiment, a processor performs an API of operation 606 to identify one or more settings based, at least in part, on using one or more data tables that correlate those one or more settings with one or more processors to be used, or as otherwise described herein.

In at least one embodiment, a processor continues process 600 by performing a resource manager to perform API(s) of that resource manager to send an indication of a selected processor profile. In at least one embodiment, a processor causes a resource manager to call API(s) of a job scheduler to cause that job scheduler to receive an indication of a selected processor profile being sent from that resource manager with operation 608. In at least one embodiment, a jobID associated with that selected processor profile is sent by a resource manager to a job scheduler. In at least one embodiment, a processor performs an API to cause one or more instructions to be performed based, at least in part, on one more processor setting inputs to that API. In at least one embodiment, an indication of one or more instructions to be performed and an indication of one or more processor settings have been stored in a queue of a scheduler, such as a job scheduler. In at least one embodiment, an indication of one or mor processor settings is an indication of a processor settings profile as described further herein. In at least one embodiment, a processor performing a resources manager invokes an API of a job scheduler, and inputs a job identifier and an indication of a processor profile into that API. In at least one embodiment, in response to receiving those inputs, that API causes that job identifier and processor profile indication to be stored in a job queue, or as otherwise described herein. In at least one embodiment, within a given time prior to a scheduled performance of a job, a resources manager checks if processor settings have been set with respect to those processors that will perform that job. In at least one embodiment, a resources manager includes a processor management application, where an application is a software application. In at least one embodiment, a resources manager is referred to as a processor management application. In at least one embodiment, if a resources manager determines that processor settings have not been set, that module will immediately set those processor settings. In at least one embodiment, when a resources manager identifies that processor settings have been set, then that module sends an acknowledgement to a job scheduler to allow that job scheduler to launch that job.

Figure 7:
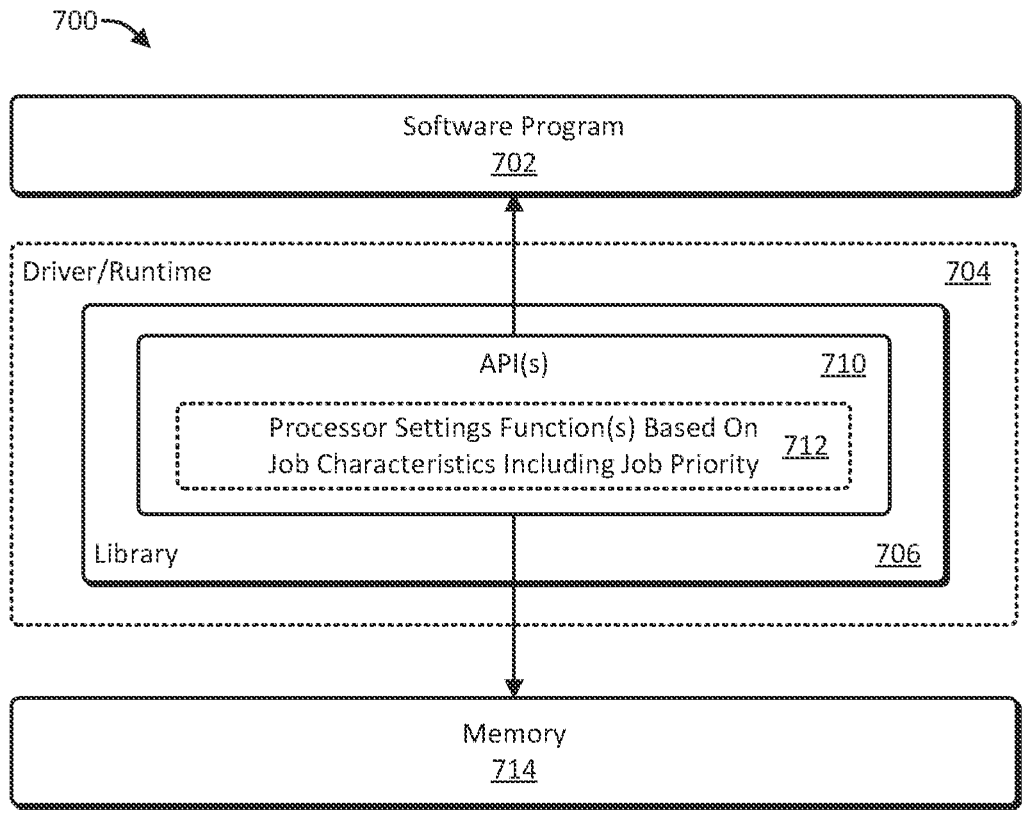
FIG. 7 illustrates a block diagram of system that includes a driver and/or runtime used to identify processor settings based, at least in part, on one or more job characteristics; in accordance with at least one embodiment.

FIG. 7 illustrates a block diagram of a driver and/or runtime comprising one or more libraries to provide one or more application programming interfaces (APIs), according to at least one embodiment. In at least one embodiment, any one processor, or combination of processors, perform API(s) 710, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, CPU 4100 of FIG. 41, graphics processor 4340 of FIG. 43B, general purpose graphics processing unit (GPGPU) 4430 of FIG. 44B, and parallel processing unit (PPU) 5000 of FIG. 50. In at least one embodiment, API(s) 710 are described further herein, which includes API(s) used to identify a processor settings profile based on one or more job characteristics such as job priority. In at least one embodiment, an invocation of API(s) 710 cause any one or more operations of any one or more components or modules described herein, such job scheduler 110 or data center processor management module 120 of FIG. 1, to be performed by one or more processors. In at least one embodiment, an invocation of API(s) 710 causes one or more processors to perform any one or more operations described in conjunction with FIGS. 1-31. In at least one embodiment, API(s) 710 receives as input, indications of job characteristics and causes an identification of processor settings to be used when performing a job, or as otherwise described herein.

In at least one embodiment, a software program 702 is a software module. In at least one embodiment, a software program 702 comprises one or more software modules. In at least one embodiment, one or more APIs 710 are sets of software instructions that, if executed, cause one or more processors to perform one or more computational operations. In at least one embodiment, one or more APIs 710 are distributed or otherwise provided as a part of one or more libraries 706, runtimes 704, drivers 704, and/or any other grouping of software and/or executable code further described herein. In at least one embodiment, one or more APIs 710 perform one or more computational operations in response to invocation by software programs 702. In at least one embodiment, a software program 702 is a collection of software code, commands, instructions, or other sequences of text to instruct a computing device to perform one or more computational operations and/or invoke one or more other sets of instructions, such as APIs 710 or function(s) 712, to be executed. In at least one embodiment, functionality provided by one or more APIs 710 include software functions, such as those usable to accelerate one or more portions of software programs 702 using one or more parallel processing units (PPUs), such as graphics processing units (GPUs). In at least one embodiment, a software program is a compiler.

In at least one embodiment, APIs 710 are hardware interfaces to one or more circuits to perform one or more computational operations. In at least one embodiment, one or more software APIs 710 described herein are implemented as one or more circuits to perform one or more techniques described herein. In at least one embodiment, one or more software programs 702 comprise instructions that, if executed, cause one or more hardware devices and/or circuits to perform one or more techniques further described herein.

In at least one embodiment, software programs 702, such as user-implemented software programs, utilize one or more application programming interfaces (APIs) 710 to perform various computing operations or any computing operation performed by parallel processing units (PPUs), such as graphics processing units (GPUs), as further described herein. In at least one embodiment, one or more APIs 710 provide a set of callable function(s) 712, referred to herein as APIs, API functions, and/or functions, that individually perform one or more computing operations, such as computing operations related to parallel computing. For example, in an embodiment, one or more APIs 710 provide function(s) 712 to cause a scheduler to schedule instructions to be performed by processors based on latency of interconnects coupled to these processors. In at least one embodiment, API(s) 710 provide one or more function(s) 712 that are one or more neural networks, such as a neural network trained to improve efficiency of processor use during rasterization processes.

In at least one embodiment, one or more software programs 702 interact or otherwise communicate with one or more APIs 710 to perform one or more computing operations using one or more PPUs, such as GPUs. In at least one embodiment, one or more computing operations using one or more PPUs comprise at least one or more groups of computing operations to be accelerated by execution at least in part by said one or more PPUs. In at least one embodiment, one or more software programs 702 interact with one or more APIs 710 to facilitate parallel computing using a remote or local interface.

In at least one embodiment, an interface is software instructions that, if executed, provide access to one or more function(s) 712 provided by one or more APIs 710. In at least one embodiment, an interface is user interface 102 of FIG. 1. In at least one embodiment, a software program 702 uses a local interface when a software developer compiles one or more software programs 702 in conjunction with one or more libraries 706 comprising or otherwise providing access to one or more APIs 710. In at least one embodiment, one or more software programs 702 are compiled statically in conjunction with pre-compiled libraries 706 or uncompiled source code comprising instructions to perform one or more APIs 710. In at least one embodiment, one or more software programs 702 are compiled dynamically and said one or more software programs utilize a linker to link to one or more pre-compiled libraries 706 comprising one or more APIs 710.

In at least one embodiment, a software program 702 uses a remote interface when a software developer executes a software program that utilizes or otherwise communicates with a library 706 comprising one or more APIs 710 over a network or other remote communication medium. In at least one embodiment, one or more libraries 706 comprising one or more APIs 710 are to be performed by a remote computing service, such as a computing resource services provider. In another embodiment, one or more libraries 706 comprising one or more APIs 710 are to be performed by any other computing host providing said one or more APIs 710 to one or more software programs 702.

In at least one embodiment, a processor performing or using one or more software programs 702 calls, uses, performs, or otherwise implements one or more APIs 710 to allocate and otherwise manage memory to be used by said software programs 702. In at least one embodiment, one or more software programs 702 utilize one or more APIs 710 to allocate and otherwise manage memory to be used by one or more portions of said software programs 702 to be accelerated using one or more PPUs, such as GPUs or any other accelerator or processor further described herein. Those software programs 702 may be performed by one or more processors based, at least in part, on latency of interconnects coupled to one or more processors using function(s) 712 provided, in an embodiment, by one or more APIs 710.

In at least one embodiment, an API 710 is an API to facilitate parallel computing. In at least one embodiment, an API 710 is any other API further described herein. In at least one embodiment, an API 710 is provided by a driver and/or runtime 704. In at least one embodiment, an API 710 is provided by a CUDA user-mode driver. In at least one embodiment, an API 710 is provided by a CUDA runtime. In at least one embodiment, a driver 704 is data values and software instructions that, if executed, perform or otherwise facilitate operation of one or more function(s) 712 of an API 710 during load and execution of one or more portions of a software program 702. In at least one embodiment, a runtime 704 is data values and software instructions that, if executed, perform or otherwise facilitate operation of one or more function(s) 712 of an API 710 during execution of a software program 702. In at least one embodiment, one or more software programs 702 utilize one or more APIs 710 implemented or otherwise provided by a driver and/or runtime 704 to perform combined arithmetic operations by said one or more software programs 702 during execution by one or more PPUs, such as GPUs.

In at least one embodiment, one or more software programs 702 utilize one or more APIs 710 provided by a driver and/or runtime 704 to perform combined arithmetic operations of one or more PPUs, such as GPUs. In at least one embodiment, one or more APIs 710 provide combined arithmetic operations through a driver and/or runtime 704, as described above. In at least one embodiment, one or more software programs 702 utilize one or more APIs 710 provided by a driver and/or runtime 704 to allocate or otherwise reserve one or more blocks of memory 714 of one or more PPUs, such as GPUs. In at least one embodiment, one or more software programs 702 utilize one or more APIs 710 provided by a driver and/or runtime 704 to allocate or otherwise reserve blocks of memory. In at least one embodiment, one or more APIs 710 are to perform combined mathematical functions as described herein.

In at least one embodiment, to improve software programs 702 usability and/or optimization of one or more portions of said software programs 702 to be accelerated by one or more PPUs, such as GPUs, one or more APIs 710 provide one or more API function(s) 712 to perform a scheduling system usable or used by one or more computing devices as described herein. In at least one embodiment, a processor performs one or more software programs to combine two or more application programming interfaces (APIs) into a single API. In at least one embodiment, a processor uses an API to cause a scheduler to select a thread selection mechanism and/or otherwise perform operations described herein. In at least one embodiment, an API invokes a scheduler to cause a resource allocation. In at least one embodiment, a processor uses an exemplary API to schedule one or more instructions to be performed by one or more processors based, at least in part, on latency of one or more interconnects coupled to these one or more processors.

In at least one embodiment, memory 714 is system memory 3904 of computing stem 3900. In at least one embodiment, memory 714 is any form of hardware that stores data and is referred to as storage or data storage. In at least one embodiment, memory 714 stores data used in various operations described herein, including indications of job characteristics as described herein at least in conjunction with FIG. 1. In at least one embodiment, memory 714 stores data used in various operations described herein, including default processor settings of a processor settings profile, or as otherwise described herein.

In at least one embodiment, memory 714 is a computer readable storage medium and/or code stored on said computer readable storage medium in a form of a computer program including a plurality of computer readable instructions executable by one or more processors. In at least one embodiment, a computer readable storage medium is a non-transitory computer readable medium. In at least one embodiment, at least some computer readable instructions usable to perform operations described herein are not stored solely using transitory signals (e.g., a propagating transient electric or electromagnetic transmission). In at least one embodiment, a non-transitory computer readable medium does not necessarily include non-transitory data storage circuitry (e.g., buffers, caches, and queues) within transceivers of transitory signals. In at least one embodiment, memory 714 is implemented as a non-transitory computer readable storage medium storing executable instructions that, if executed by one or more processors of a computer system, cause said computer system to perform one or more operations of an API to identify one or more settings to be used to configure one or more processors based, at least in part, one or more characteristics of a job to be performed by those one or more processors as described in conjunction with FIG. 1, or as otherwise described herein.

Figure 8:
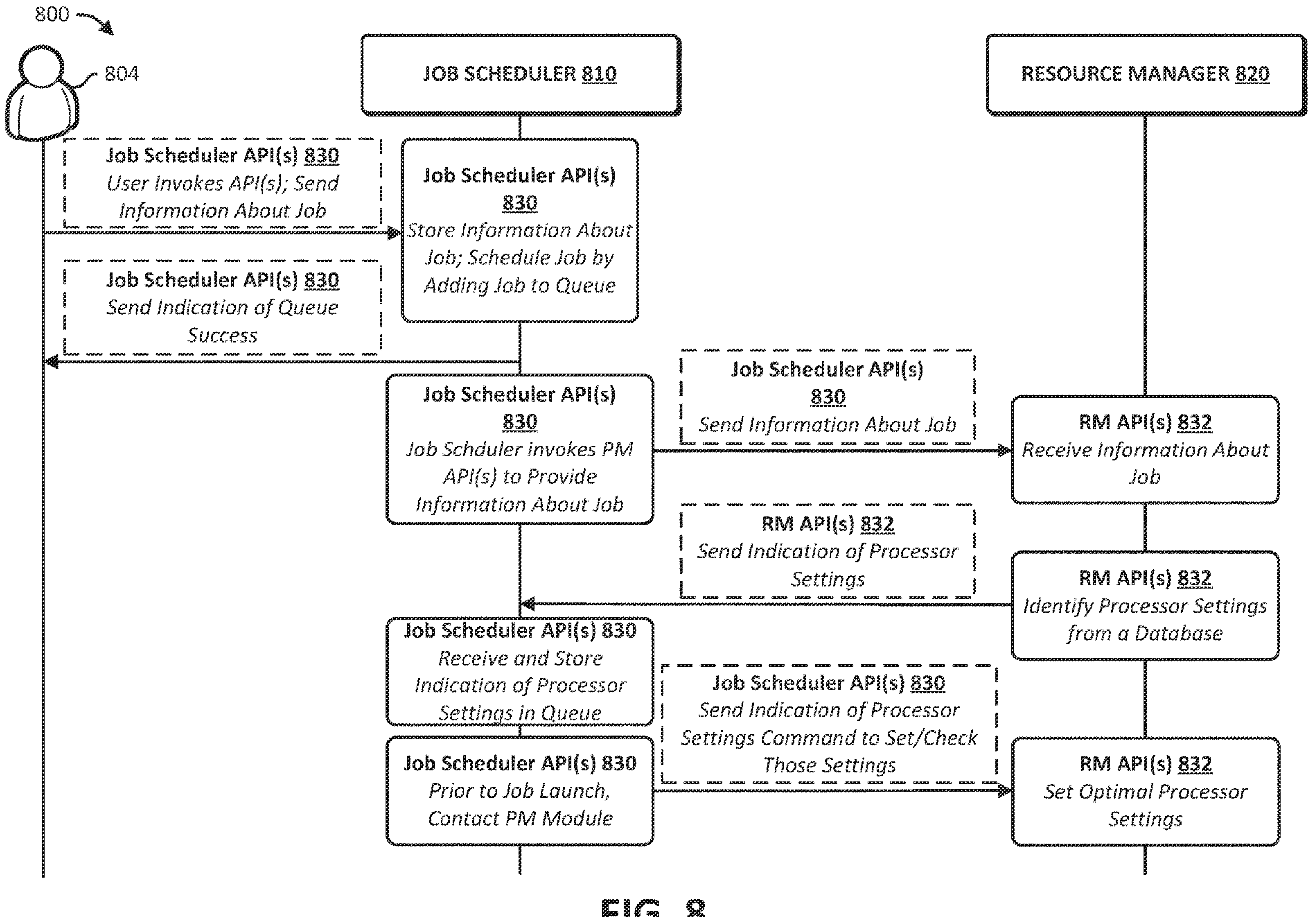
FIG. 8 illustrates a call flow diagram of a system used to identify processor settings based, at least in part, on one or more job characteristics, in accordance with at least one embodiment.

FIG. 8 illustrates a call flow diagram 800 of a system used to identify processor settings to be used when performing a job based on job characteristics, including job priority, in at least one embodiment. In at least one embodiment, one or more aspects of one or more embodiments described herein in conjunction with FIG. 8 are combined with one or more aspects of one or more embodiments described herein, including those described at least in conjunction with FIGS. 1-7 and 8A-31. In at least one embodiment, one or more processors perform one or more operations of system 800. In at least one embodiment, one or more processors that perform one or more operations of system 800 are any one processor, or combination of processors, described herein, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, a processor that performs one or more operations of system 800 performs one or more operations of system 100 of FIG. 1, such as an operation of job scheduler 110. In at least one embodiment, a processor that performs one or more operations of system 800 performs one or more operations of system 200 of FIG. 2, such as an operation used to identify a processor profile using lookup table 228. In at least one embodiment, a processor that performs one or more operations of system 800 performs one or more operations described in conjunction with FIG. 3, such generating new performance profile 330. In at least one embodiment, a processor that performs one or more operations of system 800 performs one or more operations described in conjunction with FIG. 4, such an operation of used to select a processor profile to be applied to processor(s) 408. In at least one embodiment, a processor that performs one or more operations of system 800 performs one or more operations described in conjunction with FIG. 5, such as identifying processor profiles 510. In at least one embodiment, a processor that performs one or more operations of system 800 performs one or more operations described in conjunction with FIG. 6, such as selecting a processor settings profile with operation 606. In at least one embodiment, a processor that performs one or more operations of system 800 performs one or more APIs of FIG. 7, such as API(s) 710. In at least one embodiment, a processor that performs one or more operations of system 800 performs one or more operations described in conjunction with FIGS. 9-31.

In at least one embodiment, call flow diagram 800 represents at least a portion of a system used to identify processor settings used to perform a job in a data center or as otherwise described herein. In at least one embodiment, call flow diagram 800 includes references that indicate APIs of which components or modules cause an action or operation to be performed by those APIs. In at least one embodiment, each action or operation performed by API(s) in call flow diagram 800 is a performed by a separate API. In at least one embodiment, a reference to API(s) performing an action or operation refers to one or more APIs of those API(s) performing that action or operation. In at least one embodiment, any reference to an API performing an action or operation refers to a processor performing an action or operation of that API.

In at least one embodiment, user 804 invokes one or more APIs of job scheduler 810 to submit a job along with information about that job, which is otherwise described herein at least in conjunction with FIG. 1. In at least one embodiment, job scheduler 810 is at least a portion of one or mor job schedulers described herein, such as job scheduler 110 of FIG. 1. In at least one embodiment, APIs of job scheduler 810 are job scheduler API(s) 830. In at least one embodiment, one or more job scheduler API(s) 830 are one or more APIs described in conjunction with FIG. 6 or FIG. 7. In at least one embodiment, information about a job, such as processor performance preference, job type, job priority, job ID, or some combination thereof, is input into job scheduler API(s) 830, which is otherwise described herein. In at least one embodiment, in response to receiving information about a job, job scheduler API(s) 830 cause a job scheduler to store information about that job in a job database as described further herein. In at least one embodiment, in response to receiving information about a job, job scheduler API(s) 830 cause a job scheduler to schedule that job by, in part, adding an indication of that job to a job queue. In at least one embodiment, a user does not supply a priority of a job because job scheduler 810 generates a priority of that job. In at least one embodiment, in response to scheduling a job, job scheduler API(s) send an indication of job scheduling or queue success back to user 804.

In at least one embodiment, in response to scheduling a job and receiving information about that job, job scheduler 810 performs job scheduler API(s) 830 to invoke one or more APIs of resource manager 820. In at least one embodiment, resource manager 820 is a data center processor management module, such as data center processor management module 120 of FIG. 1. In at least one embodiment, resource manager 820 is referred to as RM module 820. In at least one embodiment, one or more APIs of RM module 820 are referred to as RM API(s) 832. In at least one embodiment, job scheduler API(s) 830 sends information about a job to be received as inputs by RM API(s) 832.

In at least one embodiment, in response to receiving information about a job via RM API(s) 832, RM module 820 performs operations of RM API(s) to identify processor settings best suited to perform a job according to received job information. In at least one embodiment, identified processor settings is a selected processor settings profile as described herein. In at least one embodiment, in response to identifying processor settings, RM API(s) 832 invoke job scheduler API(s) 830 to receive an indication of those processor settings sent from RM module 820 to job scheduler 810. In at least one embodiment, in response to receiving an indication of processor settings from RM module 820, job scheduler 810 stores that indication in a job queue such that it is correlated with specific job. In at least one embodiment, prior to launching a job, job scheduler API(s) 830 contacts RM module 820 and invokes RM API(s) 832 to receive or otherwise obtain an indication of processor settings to be used to perform that job. In at least one embodiment, in response to receiving an indication of processor settings to be used processors to perform a job to be launched, RM module 820 checks if those processor settings have been set on those processors that will perform that job. In at least one embodiment, if those processor settings have not been set, RM module 820 sets those processors settings or configures those processors in accordance with those processor settings. In at least one embodiment, in response to a determination that indicated processor settings have been set, or that processors have been configured according to those processor settings, RM API(s) 832 sends an indication to job scheduler 810 that those processors are ready to perform that job. In at least one embodiment, upon receiving an indication that those processors are ready to perform that job, job scheduler 810 launches that job and causes that job to be performed by those processors.

Figure 8A:
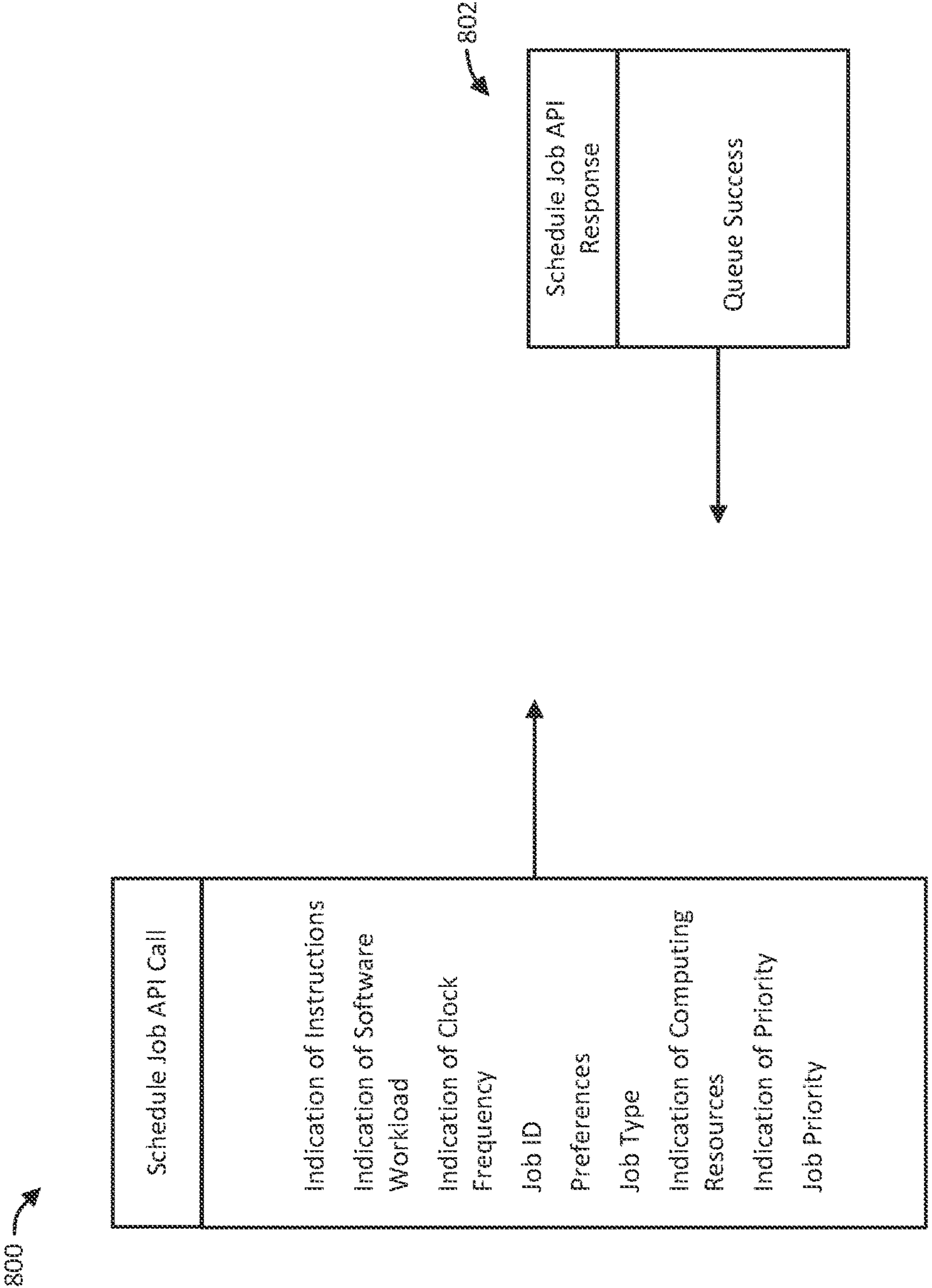
FIG. 8A illustrates a diagram of a schedule job API call, in accordance with at least on embodiment.
Figure 8C:
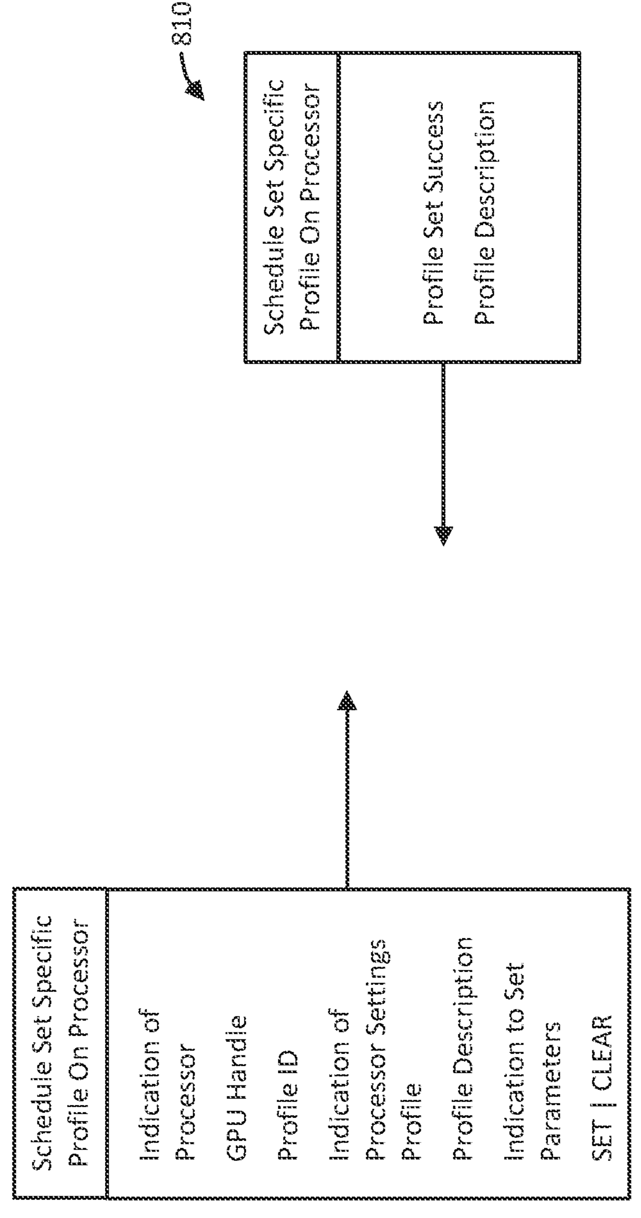
FIG. 8C illustrates a diagram of a schedule set specific profile on processor API call.

FIGS. 8A-8C illustrate a diagrams of API calls used, at least in part, to identify processor settings to be used when performing a job based on job characteristics, including job priority, in at least one embodiment. In at least one embodiment, one or more aspects of one or more embodiments described herein in conjunction with FIGS. 8A-8C are combined with one or more aspects of one or more embodiments described herein, including those described at least in conjunction with FIGS. 1-8 and 9-31. In at least one embodiment, one or more processors perform one or more operations described in conjunction with FIGS. 8A-8C. In at least one embodiment, one or more processors that perform one or more operations described in conjunction with FIGS. 8A-8C are any one processor, or combination of processors, described herein, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, a processor that performs one or more operations described in conjunction with FIGS. 8A-8C performs one or more operations of system 100 of FIG. 1, such as an operation of job scheduler 110. In at least one embodiment, a processor that performs one or more operations described in conjunction with FIGS. 8A-8C performs one or more operations of system 200 of FIG. 2, such as an operation used to identify a processor profile using lookup table 228. In at least one embodiment, a processor that performs one or more operations described in conjunction with FIGS. 8A-8C performs one or more operations described in conjunction with FIG. 3, such generating new performance profile 330. In at least one embodiment, a processor that performs one or more operations described in conjunction with FIGS. 8A-8C performs one or more operations described in conjunction with FIG. 4, such an operation of used to select a processor profile to be applied to processor(s) 408. In at least one embodiment, a processor that performs one or more operations described in conjunction with FIGS. 8A-8C performs one or more operations described in conjunction with FIG. 5, such as identifying processor profiles 510. In at least one embodiment, a processor that performs one or more operations of described in conjunction with FIGS. 8A-8C performs one or more operations described in conjunction with FIG. 6, such as selecting a processor settings profile with operation 606. In at least one embodiment, a processor that performs one or more operations described in conjunction with FIGS. 8A-8C performs one or more APIs of FIG. 7, such as API(s) 710. In at least one embodiment, a processor that performs one or more operations described in conjunction with FIGS. 8A-8C performs one or more APIs of FIG. 8, such as job scheduler APIs 830. In at least one embodiment, a processor that performs one or more operations of system 800 performs one or more operations described in conjunction with FIGS. 9-31.

FIG. 8A illustrates a diagram of a schedule job API call 800, according to at least one embodiment. In at least one embodiment, schedule job API call 800 is a call of one or more of job scheduler API(s) 830 of FIG. 8. In at least one embodiment, schedule job API call 800 is used (e.g., called by a user, application, or library) to receive one or more parameters of a job ID, preferences, job type, job priority, or some combination thereof, or as otherwise described herein. In at least one embodiment, a parameter received or otherwise obtained by an API is referred to as an input. In at least one embodiment, a job ID is any type of identifier or indication of a job, one or more instructions, or a software workload, or as otherwise described herein. In at least one embodiment, a job priority is any indication of priority of a job, one or more instructions, or a software workload. In at least one embodiment, preferences include an indication of a processor performance preference as described herein, or as otherwise described herein. In at least one embodiment, schedule job API call 800 calls an API named srun.

In at least one embodiment, schedule job API call 800 calls an API of a job scheduler that schedules jobs, but has been modified to receive parameters used by a resource manager to configure processors as described further herein. In at least one embodiment, parameters received by a job scheduling API are referred to as hints. In at least one embodiment, parameters received by a job schedule API are any hints that can be used to configure processors of a data center. In at least one embodiment, schedule job API call 800 calls an API to schedule a job and receive a parameter indicating a processor performance preference. In at least one embodiment, schedule job API call 800 calls an API to schedule a job and receive a parameter indicating a job type, which is described further herein. In at least one embodiment, a schedule job API call 800 calls an API to schedule a job and receive a parameter indicating computing resources to be used, which is described further herein. In at least one embodiment, a parameter of computing resources to be used is based on an input to an API indicating a type of processor to be used, such as a processor with tensor-cores or with a specified amount of memory. In at least one embodiment, schedule job API call 800 calls an API to schedule a job and receive a parameter indicating a job priority, which is described further herein. In at least one embodiment, a job priority parameter is an indication of a priority of one or more instructions or a software workload. In at least one embodiment, schedule job API call 800 is one or more API calls, where each API receives one or more inputs of a job ID, preferences, job type, job priority, or some combination thereof.

In at least one embodiment, response 802 to schedule job API call 800 includes an indication of queue success. In at least one embodiment, an indication of queue success indicates that that a job was successfully queued. In at least one embodiment, an indication of queue success indicates that inputs received as part of a schedule job API call 800 have been stored in a job database, or as otherwise described herein. In at least one embodiment, response 802 to schedule job API call 800 includes an operation to store parameters input to schedule job API in a storage device, such as a job scheduler database, or as otherwise described herein. In at least one embodiment, response 802 to schedule job API call 800 includes an operation performed by a processor to call an API of a resource manager to identify one or more processor performance profiles. In at least one embodiment, response 802 to schedule job API call 800 includes an operation to call an API of a resource manager such as Intel® Data Center Manager (DCM), AMD® ROCm, or NVIDIA® Data Center GPU Manager (DCGM).

FIG. 8B illustrates a diagram of a get all available profiles API call 804, according to at least one embodiment. In at least one embodiment, get all available profiles API call 804 is a call of one or more of resource manager API(s) 832 of FIG. 8. In at least one embodiment, get all available profiles API call 804 is used (e.g., called by a user, application, or library) to receive or otherwise obtain one or more parameters of a job ID, preferences, job type, job priority, or some combination thereof, or as otherwise described herein. In at least one embodiment, get all available profiles API call 804 causes a processor to receive or otherwise obtain parameters as described in conjunction with schedule job API call 800 of FIG. 8A. In at least one embodiment, get all available profiles API call 804 is used to receive or otherwise obtain parameters that indicate one or more processor performance preferences, job types, job priorities, GPU handles, or some combination thereof. In at least one embodiment, processor performance preferences are referred to as preferences. In at least one embodiment, a GPU handle is any indication of a specific processor, which identifies a specific processor.

In at least one embodiment, get all available profiles API call 804 calls an API of a resource manager to identify one or more processor performance profiles. In at least one embodiment, get all available profiles API call 804 calls an API of a resource manager such as Intel® Data Center Manager (DCM), AMD® ROCm, or NVIDIA® Data Center GPU Manager (DCGM).

In at least one embodiment, response 806 to get all available profiles API call 804 includes a profile ID, a profile description, or some combination thereof. In at least one embodiment, a profile ID is an indication of a specific processor settings profile, such as one stored in lookup table 428 of FIG. 4. In at least one embodiment, a profile description is text describing a processor settings profile identified by a profile ID. In at least one embodiment, a profile description includes phrases such as maximum performance, energy efficiency, tensor core intensive, compute core intensive, memory intensive, or some combination thereof. In at least one embodiment, response 806 is sent to a job scheduler, where that job scheduler causes a profile ID to be stored such that a specific job is correlated with that profile ID, or as otherwise described herein. In at least one embodiment, a profile ID is an indication of processor settings sent from RM module 820 to job scheduler 810 as described in conjunction with FIG. 8.

FIG. 8C illustrates a diagram of a schedule set specific profile on processor API call 808, according to at least one embodiment. In at least one embodiment, schedule set specific profile on processor API call 808 is a call of one or more of job scheduler API(s) 830 of FIG. 8. In at least one embodiment, schedule set specific profile on processor API call 808 is used (e.g., called by a user, application, or library) to receive or otherwise obtain one or more parameters of a profile ID, profile description, GPU handle, or some combination thereof, or as otherwise described herein. In at least one embodiment, schedule set specific profile on processor API call 808 is used (e.g., called by a user, application, or library) to receive or otherwise obtain one or more parameters to set and clear a set of one or more other parameters, such as profile ID, profile description, GPU handle, or some combination thereof. In at least one embodiment, a profile ID is an indication of processor settings sent from RM module 820 to job scheduler 810 as described in conjunction with FIG. 8.

In at least one embodiment, response 810 to schedule set specific profile on processor API call 808 includes an operation performed by a processor to set a GPU handle, profile ID, profile description, or some combination thereof, to be correlated with a job ID by storing that GPU handle, profile ID, profile description, or some combination thereof, in a job queue or a data structure associated with that job queue. In at least one embodiment, response 810 to schedule set specific profile on processor API call 808 includes an operation performed by a processor to clear a GPU handle, profile ID, profile description, or some combination thereof, from a job queue once a corresponding job has been launched. In at least one embodiment, to clear parameters refers to deleting or otherwise removing those parameters from a set stored as a data structure. In at least one embodiment, response 810 to schedule set specific profile on processor API call 808 includes an indication of set profile success sent to a user or application.

Figure 9:
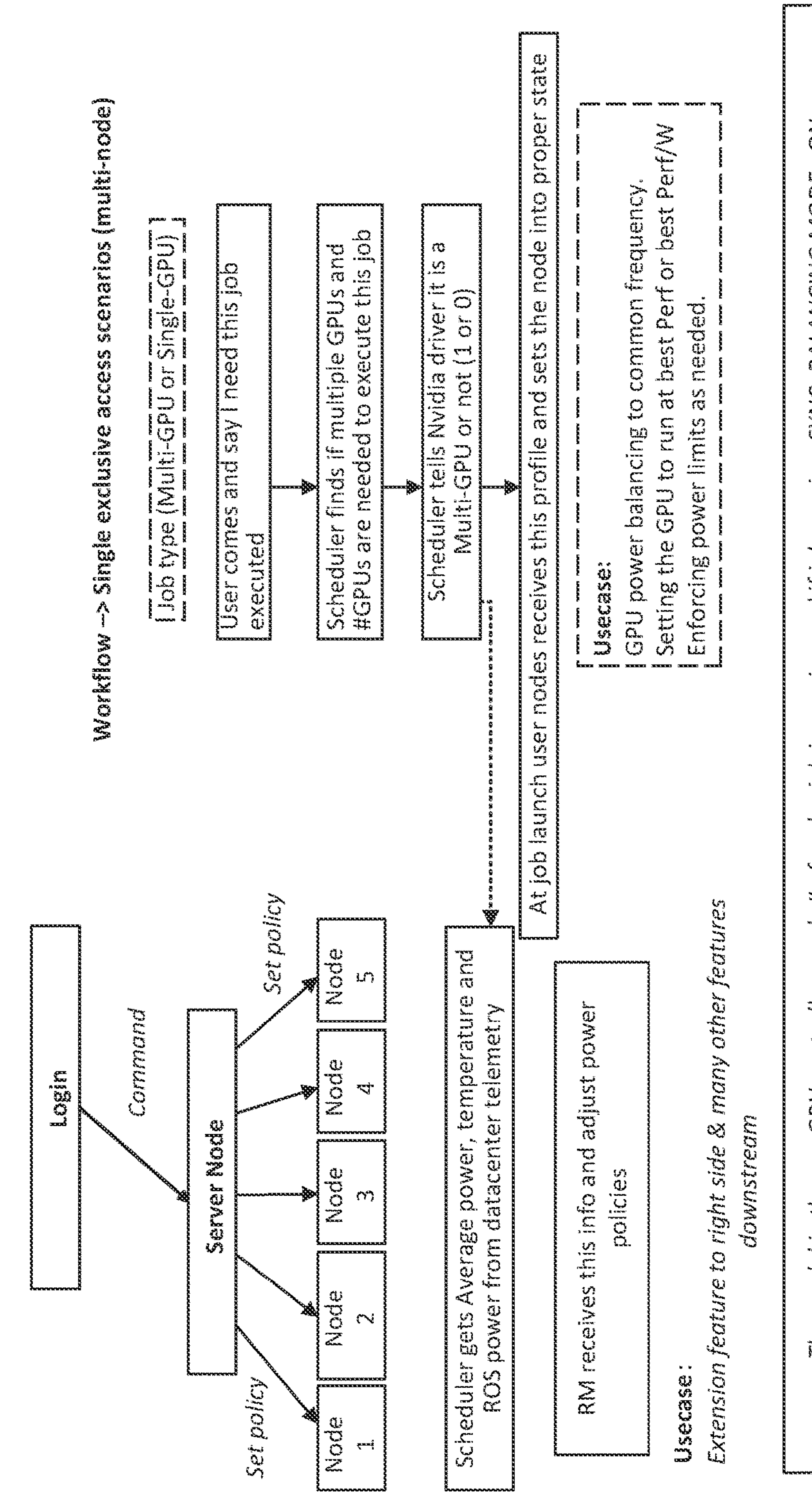
FIG. 9 illustrates a block diagram of a system used to identify power policies of multiple nodes, in accordance with at least one embodiment.

FIG. 9 illustrates a block diagram of system 900 used to identify processor settings to be used when performing a job based on job characteristics, including job priority, in at least one embodiment. In at least one embodiment, one or more aspects of one or more embodiments described herein in conjunction with FIG. 9 are combined with one or more aspects of one or more embodiments described herein, including those described at least in conjunction with FIGS. 1-8 and 10-31. In at least one embodiment, one or more processors perform one or more operations of system 900. In at least one embodiment, one or more processors that perform one or more operations of system 900 are any one processor, or combination of processors, described herein, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, one or more operations of system 900 are one or more operations of system 100 of FIG. 1, such as an operation of job scheduler 110. In at least one embodiment, one or more operations of system 900 are one or more operations of system 200 of FIG. 2, such as an operation used to identify a processor profile using lookup table 228. In at least one embodiment, one or more operations of system 900 are one or more operations described in conjunction with FIG. 3, such generating new performance profile 330. In at least one embodiment, one or more operations of system 900 are one or more operations described in conjunction with FIG. 4, such an operation of used to select a processor profile to be applied to processor(s) 408. In at least one embodiment, one or more operations of system 900 are one or more operations described in conjunction with FIG. 5, such as identifying processor profiles 510. In at least one embodiment, one or more operations of system 900 are one or more operations described in conjunction with FIG. 6, such as selecting a processor settings profile with operation 606. In at least one embodiment, a processor performs one or more APIs 710 of FIG. 7 to perform one or more operations of system 900. In at least one embodiment, a processor performs one or more APIs of system 800 to perform one or more operations of system 900.

In at least one embodiment, FIG. 9 illustrates a system describing autonomous processor performance balancing across N-number of nodes. In at least one embodiment, a node is any computing system such as a server. In at least one embodiment, a node is a processor, such as a GPU. In at least one embodiment, a node is a portion of a processor, such as a partition of a GPU, which is described further herein. In at least one embodiment, a reference to a command to set policy refers to configuring processors according to processor settings. In at least one embodiment, a reference to RM refers to a resource manager. In at least one embodiment, an RM is a resources manager, such as data center processor management module 120 of FIG. 1. In at least one embodiment, a reference to a job being executed refers to a job being launched and/or performed by processors.

Figure 10:
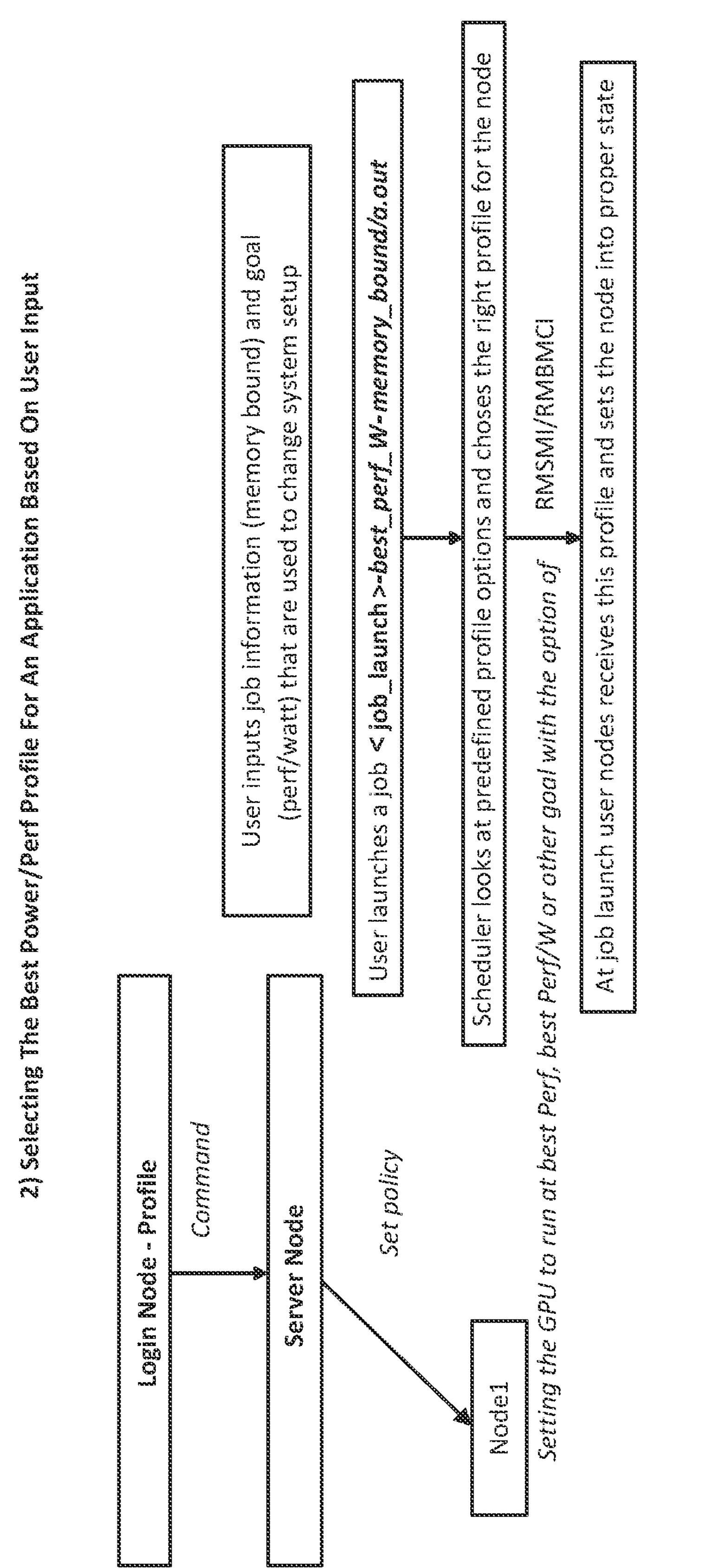
FIG. 10 illustrates a block diagram of a system used to identify a processor settings profile that is estimated to meet a target performance per watt value, in accordance with at least one embodiment.

FIG. 10 illustrates a block diagram of system 1000 used to identify processor settings to be used when performing a job based on job characteristics, including job priority, in at least one embodiment. In at least one embodiment, one or more aspects of one or more embodiments described herein in conjunction with FIG. 10 are combined with one or more aspects of one or more embodiments described herein, including those described at least in conjunction with FIGS. 1-9 and 11-31. In at least one embodiment, one or more processors perform one or more operations of system 1000. In at least one embodiment, one or more processors that perform one or more operations of system 1000 are any one processor, or combination of processors, described herein, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, one or more operations of system 1000 are one or more operations of system 100 of FIG. 1, such as an operation of job scheduler 110. In at least one embodiment, one or more operations of system 1000 are one or more operations of system 200 of FIG. 2, such as an operation used to identify a processor profile using lookup table 228. In at least one embodiment, one or more operations of system 1000 are one or more operations described in conjunction with FIG. 3, such generating new performance profile 330. In at least one embodiment, one or more operations of system 1000 are one or more operations described in conjunction with FIG. 4, such an operation of used to select a processor profile to be applied to processor(s) 408. In at least one embodiment, one or more operations of system 1000 are one or more operations described in conjunction with FIG. 5, such as identifying processor profiles 510. In at least one embodiment, one or more operations of system 1000 are one or more operations described in conjunction with FIG. 6, such as selecting a processor settings profile with operation 606. In at least one embodiment, a processor performs one or more APIs 710 of FIG. 7 to perform one or more operations of system 1000. In at least one embodiment, a processor performs one or more APIs of system 800 to perform one or more operations of system 1000.

In at least one embodiment, FIG. 10 depicts a system used to select a best power and/or best performance profile of an application based on user input. In at least one embodiment, a reference to a scheduler of system 1000 refers to a job scheduler, such as job scheduler 110 of FIG. 1. In at least one embodiment, a reference to an RM refers to a resource manager, which is any combination of hardware, firmware, or software that manages configuration and/or operation of one or more processors or as otherwise described herein. In at least one embodiment, an RM is a data center processor management module, such as data center processor management module 120 of FIG. 1. In at least one embodiment, RM includes any combination of hardware, firmware, or software that manages a communication between components of a data center, such as between a job scheduler and a processor, using a communication protocol. In at least one embodiment, a reference to RMSMI refers to a resource manager system management interface, or an aspect thereof, as described further herein at least in conjunction with data center processor management module 120 of FIG. 1. In at least one embodiment, a reference to RMBMCI refers to a resource manager baseboard management controller interface, or an aspect thereof, as described further herein at least in conjunction with data center processor management module 120 of FIG. 1. In at least one embodiment, a reference to RM Driver refers to a processor driver of a resource manager as described further herein at least in conjunction with data center processor management module 120 of FIG. 1.

Figure 11:
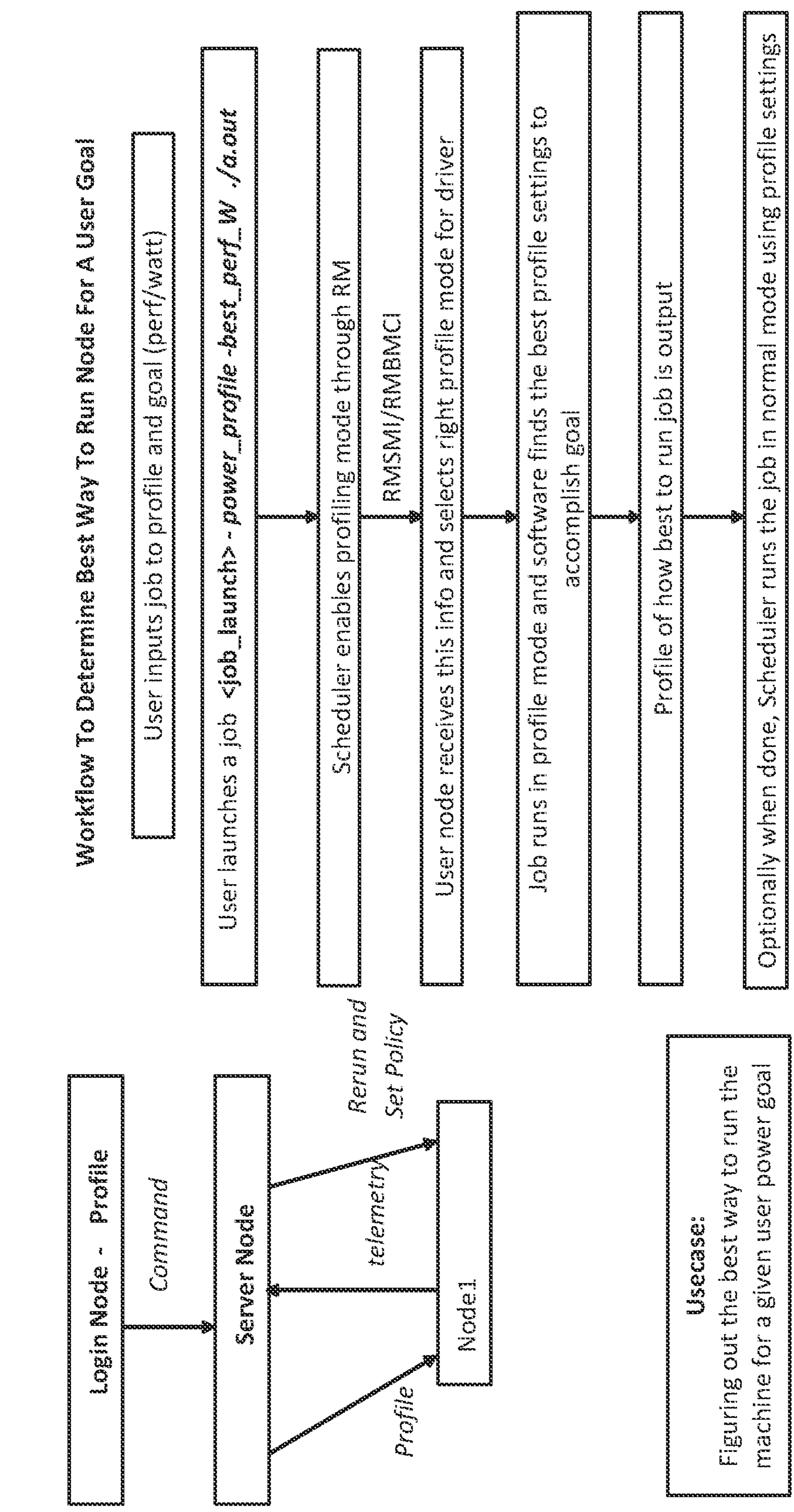
FIG. 11 illustrates a block diagram of a system used to identify a processor settings profile that is estimated to meet a target performance per watt value, in accordance with at least one embodiment.

FIG. 11 illustrates a block diagram of system 1100 used to identify processor settings to be used when performing a job based on job characteristics, including job priority, in at least one embodiment. In at least one embodiment, one or more aspects of one or more embodiments described herein in conjunction with FIG. 11 are combined with one or more aspects of one or more embodiments described herein, including those described at least in conjunction with FIGS. 1-10 and 12-31. In at least one embodiment, one or more processors perform one or more operations of system 1100. In at least one embodiment, one or more processors that perform one or more operations of system 1100 are any one processor, or combination of processors, described herein, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, one or more operations of system 1100 are one or more operations of system 100 of FIG. 1, such as an operation of job scheduler 110. In at least one embodiment, one or more operations of system 1100 are one or more operations of system 200 of FIG. 2, such as an operation used to identify a processor profile using lookup table 228. In at least one embodiment, one or more operations of system 1100 are one or more operations described in conjunction with FIG. 3, such generating new performance profile 330. In at least one embodiment, one or more operations of system 1100 are one or more operations described in conjunction with FIG. 4, such an operation of used to select a processor profile to be applied to processor(s) 408. In at least one embodiment, one or more operations of system 1100 are one or more operations described in conjunction with FIG. 5, such as identifying processor profiles 510. In at least one embodiment, one or more operations of system 1100 are one or more operations described in conjunction with FIG. 6, such as selecting a processor settings profile with operation 606. In at least one embodiment, a processor performs one or more APIs 710 of FIG. 7 to perform one or more operations of system 1100. In at least one embodiment, a processor performs one or more APIs of system 800 to perform one or more operations of system 1100.

In at least one embodiment, FIG. 11 depicts a system used to select a best power and/or best performance profile of an application based on user input. In at least one embodiment, system 1100 is an extension of system 1000 of FIG. 10. In at least one embodiment, a reference to a goal refers to a processor performance preference as described herein. In at least one embodiment, a reference to a goal refers to a processor target metrics as described herein.

Figure 12:
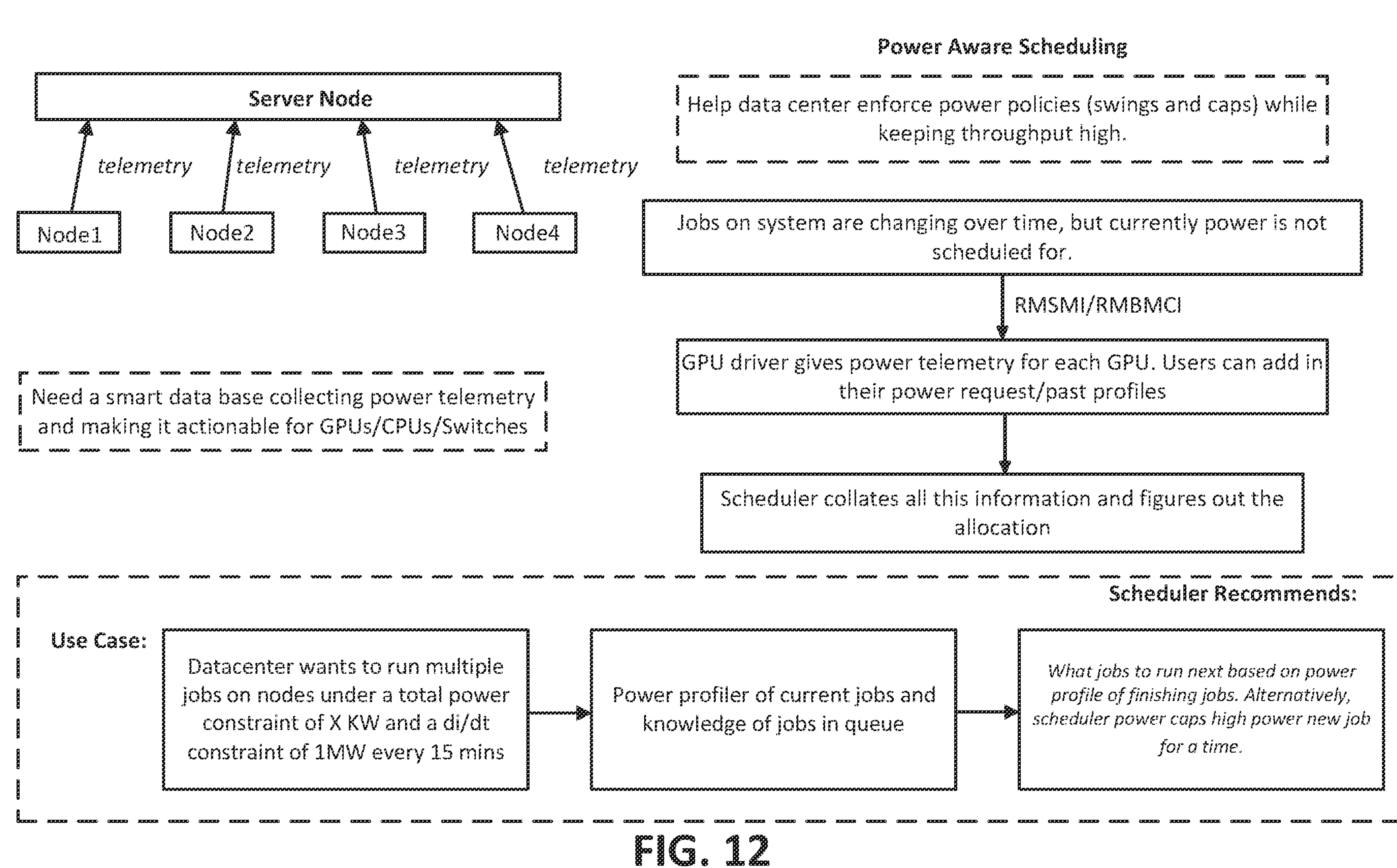
FIG. 12 illustrates a block diagram of a system used to power information to schedulers, in accordance with at least one embodiment.

FIG. 12 illustrates a block diagram of system 1200 used to identify processor settings to be used when performing a job based on job characteristics, including job priority, in at least one embodiment. In at least one embodiment, one or more aspects of one or more embodiments described herein in conjunction with FIG. 12 are combined with one or more aspects of one or more embodiments described herein, including those described at least in conjunction with FIGS. 1-11 and 13-31. In at least one embodiment, one or more processors perform one or more operations of system 1200. In at least one embodiment, one or more processors that perform one or more operations of system 1200 are any one processor, or combination of processors, described herein, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, one or more operations of system 1200 are one or more operations of system 100 of FIG. 1, such as an operation of job scheduler 110. In at least one embodiment, one or more operations of system 1200 are one or more operations of system 200 of FIG. 2, such as an operation used to identify a processor profile using lookup table 228. In at least one embodiment, one or more operations of system 1200 are one or more operations described in conjunction with FIG. 3, such generating new performance profile 330. In at least one embodiment, one or more operations of system 1200 are one or more operations described in conjunction with FIG. 4, such an operation of used to select a processor profile to be applied to processor(s) 408. In at least one embodiment, one or more operations of system 1200 are one or more operations described in conjunction with FIG. 5, such as identifying processor profiles 510. In at least one embodiment, one or more operations of system 1200 are one or more operations described in conjunction with FIG. 6, such as selecting a processor settings profile with operation 606. In at least one embodiment, a processor performs one or more APIs 710 of FIG. 7 to perform one or more operations of system 1200. In at least one embodiment, a processor performs one or more APIs of system 800 to perform one or more operations of system 1200. In at least one embodiment, FIG. 12 depicts a system of tools used by schedulers to be power aware. In at least one embodiment, system 1200 is an extension of system 1000 of FIG. 10 and system 1100 of FIG. 11.

Figure 13:
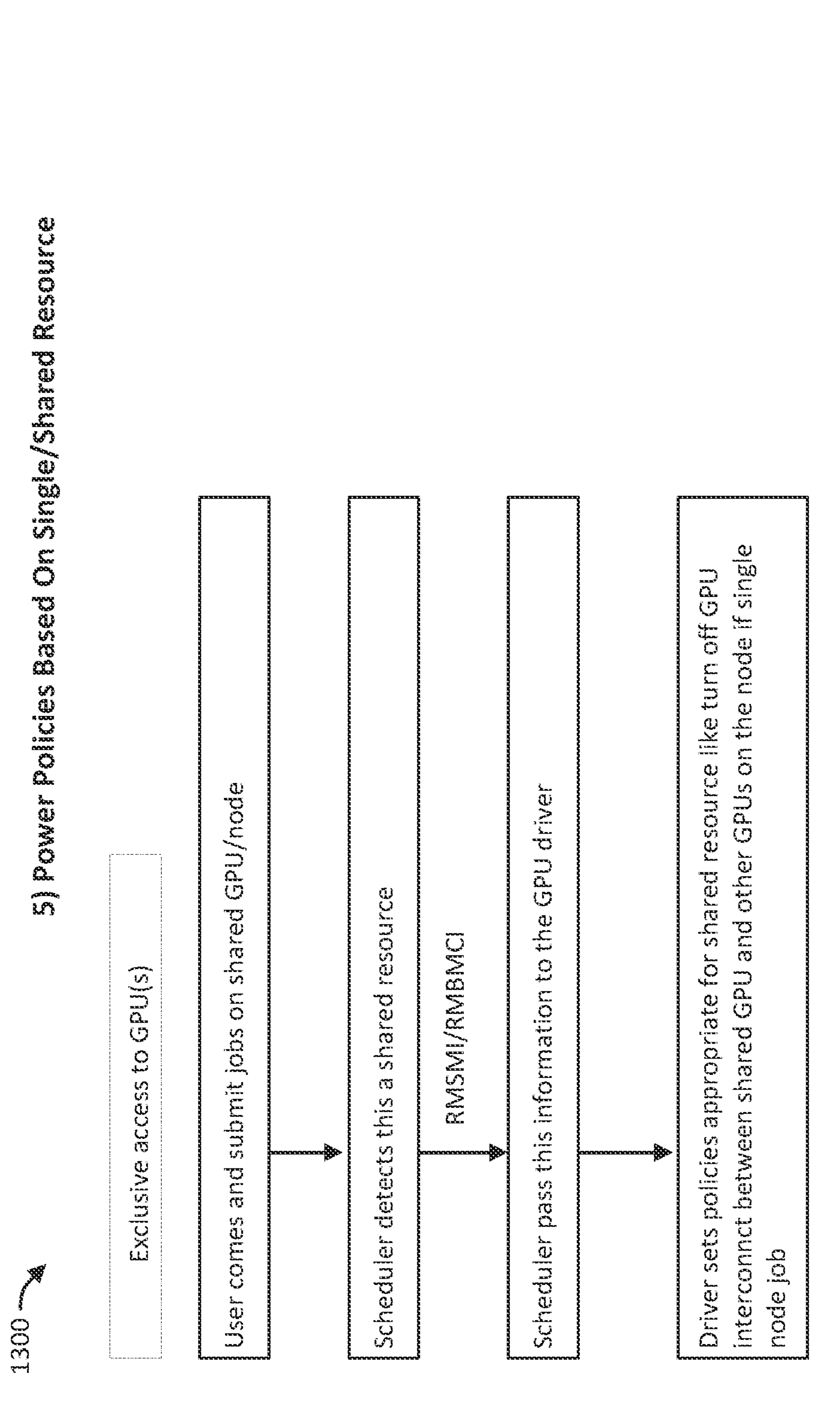
FIG. 13 illustrates a block diagram of a system used to identify power policies to be applied to one or more nodes that are shared by multiple users, according to at least on embodiment.

FIG. 13 illustrates a block diagram of system 1300 used to identify processor settings to be used when performing a job based on job characteristics, including job priority, in at least one embodiment. In at least one embodiment, one or more aspects of one or more embodiments described herein in conjunction with FIG. 13 are combined with one or more aspects of one or more embodiments described herein, including those described at least in conjunction with FIGS. 1-12 and 14-31. In at least one embodiment, one or more processors perform one or more operations of system 1300. In at least one embodiment, one or more processors that perform one or more operations of system 1300 are any one processor, or combination of processors, described herein, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, one or more operations of system 1300 are one or more operations of system 100 of FIG. 1, such as an operation of job scheduler 110. In at least one embodiment, one or more operations of system 1300 are one or more operations of system 200 of FIG. 2, such as an operation used to identify a processor profile using lookup table 228. In at least one embodiment, one or more operations of system 1300 are one or more operations described in conjunction with FIG. 3, such generating new performance profile 330. In at least one embodiment, one or more operations of system 1300 are one or more operations described in conjunction with FIG. 4, such an operation of used to select a processor profile to be applied to processor(s) 408. In at least one embodiment, one or more operations of system 1300 are one or more operations described in conjunction with FIG. 5, such as identifying processor profiles 510. In at least one embodiment, one or more operations of system 1300 are one or more operations described in conjunction with FIG. 6, such as selecting a processor settings profile with operation 606. In at least one embodiment, a processor performs one or more APIs 710 of FIG. 7 to perform one or more operations of system 1300. In at least one embodiment, a processor performs one or more APIs of system 800 to perform one or more operations of system 1300. In at least one embodiment, FIG. 13 depicts a system to identify power policies to be applied to a single and/or shared computing resource.

FIG. 14 illustrates a block diagram of system 1400 used to identify processor settings to be used when performing a job based on job characteristics, including job priority, in at least one embodiment. In at least one embodiment, one or more aspects of one or more embodiments described herein in conjunction with FIG. 14 are combined with one or more aspects of one or more embodiments described herein, including those described at least in conjunction with FIGS. 1-13 and 15-31. In at least one embodiment, one or more processors perform one or more operations of system 1400. In at least one embodiment, one or more processors that perform one or more operations of system 1400 are any one processor, or combination of processors, described herein, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, one or more operations of system 1400 are one or more operations of system 100 of FIG. 1, such as an operation of job scheduler 110. In at least one embodiment, one or more operations of system 1400 are one or more operations of system 200 of FIG. 2, such as an operation used to identify a processor profile using lookup table 228. In at least one embodiment, one or more operations of system 1400 are one or more operations described in conjunction with FIG. 3, such generating new performance profile 330. In at least one embodiment, one or more operations of system 1400 are one or more operations described in conjunction with FIG. 4, such an operation of used to select a processor profile to be applied to processor(s) 408. In at least one embodiment, one or more operations of system 1400 are one or more operations described in conjunction with FIG. 5, such as identifying processor profiles 510. In at least one embodiment, one or more operations of system 1400 are one or more operations described in conjunction with FIG. 6, such as selecting a processor settings profile with operation 606. In at least one embodiment, a processor performs one or more APIs 710 of FIG. 7 to perform one or more operations of system 1400. In at least one embodiment, a processor performs one or more APIs of system 800 to perform one or more operations of system 1400. In at least one embodiment, FIG. 14 depicts a system to identify power policies to be applied to a single and/or shared computing resource. In at least one embodiment, FIG. 14 illustrates a system to identify a power policy based on whether one or more GPUs are operating in multi-instance GPU (MIG) mode, which is described further herein.

FIG. 15 illustrates a block diagram of system 1500 used to identify processor settings to be used when performing a job based on job characteristics, including job priority, in at least one embodiment. In at least one embodiment, one or more aspects of one or more embodiments described herein in conjunction with FIG. 15 are combined with one or more aspects of one or more embodiments described herein, including those described at least in conjunction with FIGS. 1-14 and 16-31. In at least one embodiment, one or more processors perform one or more operations of system 1500. In at least one embodiment, one or more processors that perform one or more operations of system 1500 are any one processor, or combination of processors, described herein, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, one or more operations of system 1500 are one or more operations of system 100 of FIG. 1, such as an operation of job scheduler 110. In at least one embodiment, one or more operations of system 1500 are one or more operations of system 200 of FIG. 2, such as an operation used to identify a processor profile using lookup table 228. In at least one embodiment, one or more operations of system 1500 are one or more operations described in conjunction with FIG. 3, such generating new performance profile 330. In at least one embodiment, one or more operations of system 1500 are one or more operations described in conjunction with FIG. 4, such an operation of used to select a processor profile to be applied to processor(s) 408. In at least one embodiment, one or more operations of system 1500 are one or more operations described in conjunction with FIG. 5, such as identifying processor profiles 510. In at least one embodiment, one or more operations of system 1500 are one or more operations described in conjunction with FIG. 6, such as selecting a processor settings profile with operation 606. In at least one embodiment, a processor performs one or more APIs 710 of FIG. 7 to perform one or more operations of system 1500. In at least one embodiment, a processor performs one or more APIs of system 800 to perform one or more operations of system 1500. In at least one embodiment, FIG. 15 depicts a system to identify power policies to be applied to a single and/or shared computing resource. In at least one embodiment, FIG. 15 illustrates a system to identify a power policy based on whether one or more GPUs are operating in multi-instance GPU (MIG) mode, which is described further herein. In at least one embodiment, system 1500 includes a workflow to identify processor profiles based on a single exclusive access scenario using multiple nodes. In at least one embodiment, single exclusive access to multiple nodes refers to a user having exclusive access to multiple nodes to perform a job.

Figure 16:
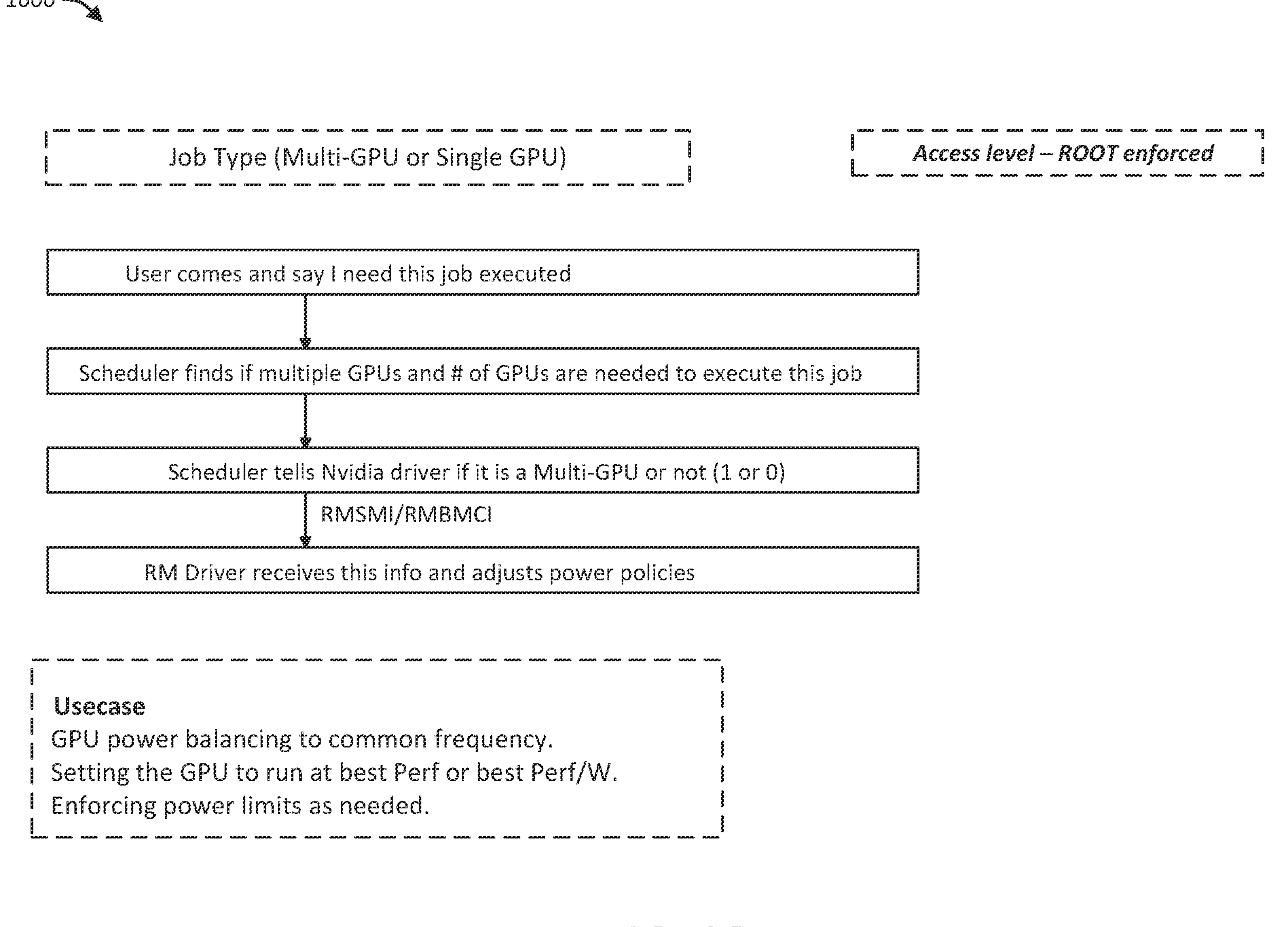
FIG. 16 illustrates a block diagram of a system used to identify a power policy to be applied to one or more nodes based, at least in part, on a number of graphics processing units (GPUs) required to perform a job, according to at least on embodiment.

FIG. 16 illustrates a block diagram of system 1600 used to identify processor settings to be used when performing a job based on job characteristics, including job priority, in at least one embodiment. In at least one embodiment, one or more aspects of one or more embodiments described herein in conjunction with FIG. 16 are combined with one or more aspects of one or more embodiments described herein, including those described at least in conjunction with FIGS. 1-15 and 17-31. In at least one embodiment, one or more processors perform one or more operations of system 1600. In at least one embodiment, one or more processors that perform one or more operations of system 1600 are any one processor, or combination of processors, described herein, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, one or more operations of system 1600 are one or more operations of system 100 of FIG. 1, such as an operation of job scheduler 110. In at least one embodiment, one or more operations of system 1600 are one or more operations of system 200 of FIG. 2, such as an operation used to identify a processor profile using lookup table 228. In at least one embodiment, one or more operations of system 1600 are one or more operations described in conjunction with FIG. 3, such generating new performance profile 330. In at least one embodiment, one or more operations of system 1600 are one or more operations described in conjunction with FIG. 4, such an operation of used to select a processor profile to be applied to processor(s) 408. In at least one embodiment, one or more operations of system 1600 are one or more operations described in conjunction with FIG. 5, such as identifying processor profiles 510. In at least one embodiment, one or more operations of system 1600 are one or more operations described in conjunction with FIG. 6, such as selecting a processor settings profile with operation 606. In at least one embodiment, a processor performs one or more APIs of system 800 to perform one or more operations of system 1600. In at least one embodiment, a processor performs one or more APIs 710 of FIG. 7 to perform one or more operations of system 1600. In at least one embodiment, FIG. 16 depicts a system to identify power policies to be applied to a single and/or shared computing resource. In at least one embodiment, system 1600 includes a workflow used to identify, in part, whether a job requires multiple GPUs or a single GPU.

Figure 17:
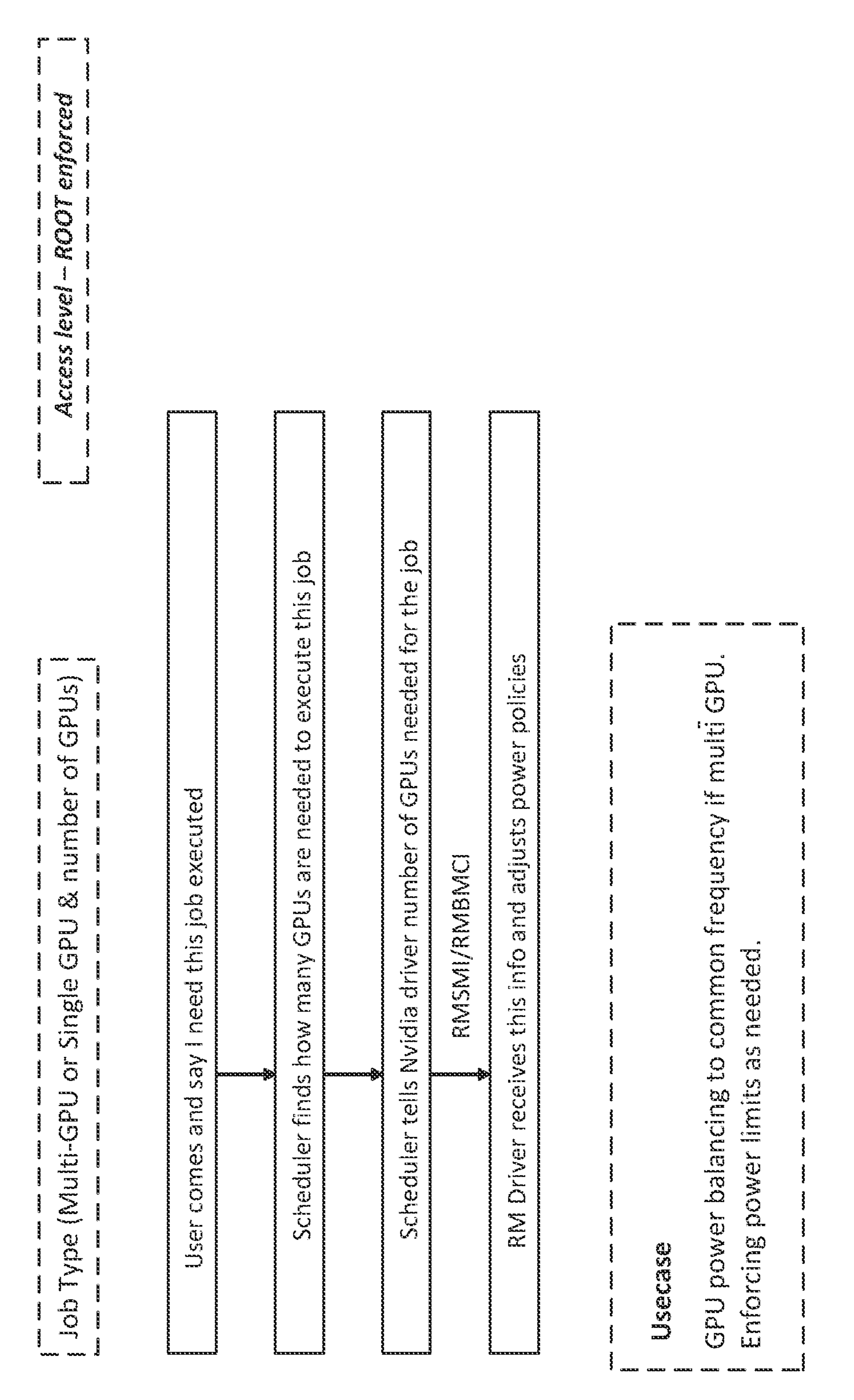
FIG. 17 illustrates a block diagram of a system used to identify a power policy to be applied to one or more nodes based, at least in part, on a number of GPUs required to perform a job, according to at least on embodiment.

FIG. 17 illustrates a block diagram of system 1700 used to identify processor settings to be used when performing a job based on job characteristics, including job priority, in at least one embodiment. In at least one embodiment, one or more aspects of one or more embodiments described herein in conjunction with FIG. 17 are combined with one or more aspects of one or more embodiments described herein, including those described at least in conjunction with FIGS. 1-16 and 18-31. In at least one embodiment, one or more processors perform one or more operations of system 1700. In at least one embodiment, one or more processors that perform one or more operations of system 1700 are any one processor, or combination of processors, described herein, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, one or more operations of system 1700 are one or more operations of system 100 of FIG. 1, such as an operation of job scheduler 110. In at least one embodiment, one or more operations of system 1700 are one or more operations of system 200 of FIG. 2, such as an operation used to identify a processor profile using lookup table 228. In at least one embodiment, one or more operations of system 1700 are one or more operations described in conjunction with FIG. 3, such generating new performance profile 330. In at least one embodiment, one or more operations of system 1700 are one or more operations described in conjunction with FIG. 4, such an operation of used to select a processor profile to be applied to processor(s) 408. In at least one embodiment, one or more operations of system 1700 are one or more operations described in conjunction with FIG. 5, such as identifying processor profiles 510. In at least one embodiment, one or more operations of system 1700 are one or more operations described in conjunction with FIG. 6, such as selecting a processor settings profile with operation 606. In at least one embodiment, a processor performs one or more APIs 710 of FIG. 7 to perform one or more operations of system 1700. In at least one embodiment, a processor performs one or more APIs of system 800 to perform one or more operations of system 1700. In at least one embodiment, FIG. 17 illustrates a system to identify a processor settings profile to cause a power policy to be used based on a number of GPUs required to perform a job.

Figure 18:
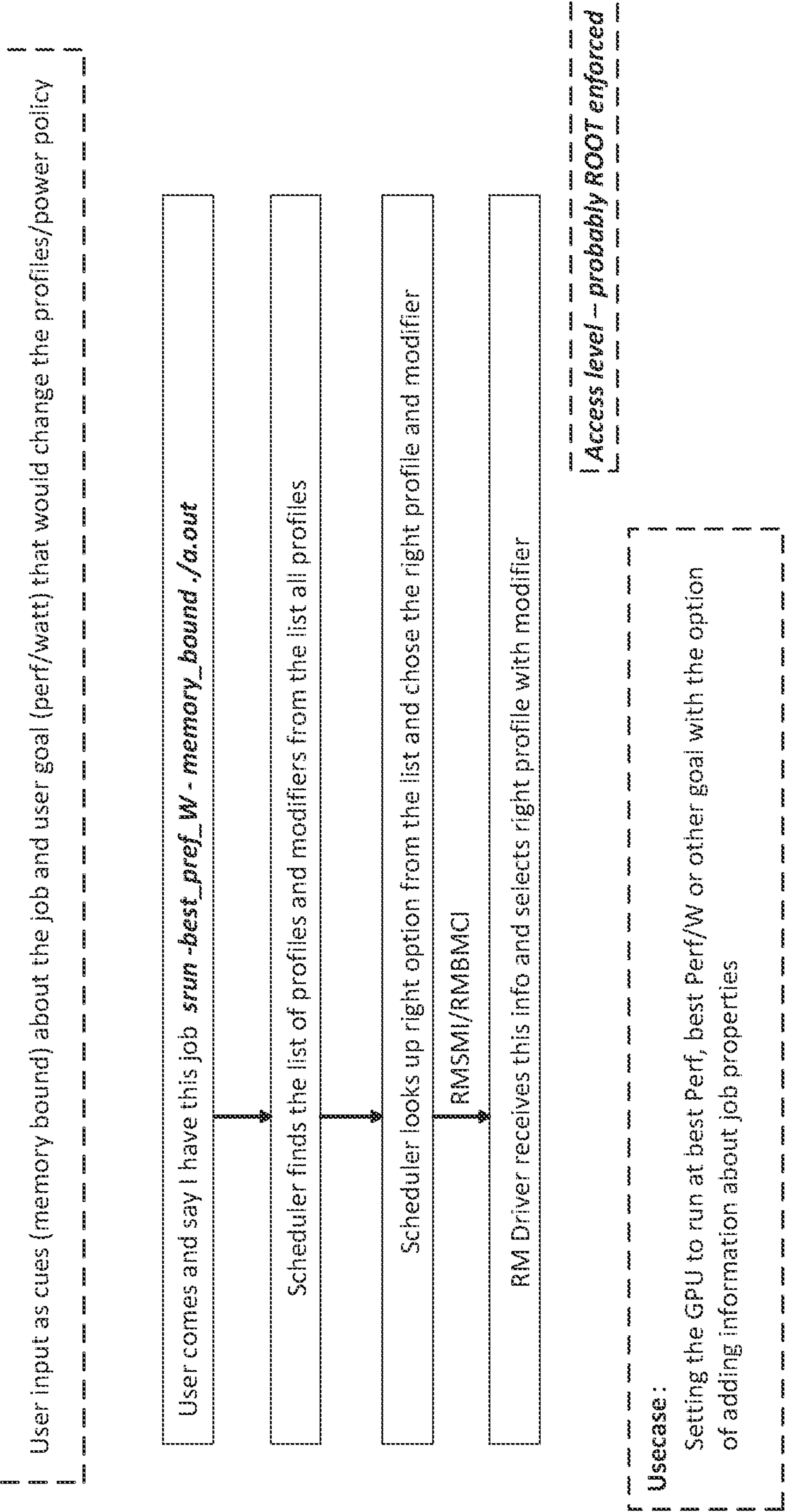
FIG. 18 illustrates a block diagram of a system used to identify a processor settings profile using user inputs in a single exclusive access scenario, in accordance with at least one embodiment.

FIG. 18 illustrates a block diagram of system 1800 used to identify processor settings to be used when performing a job based on job characteristics, including job priority, in at least one embodiment. In at least one embodiment, one or more aspects of one or more embodiments described herein in conjunction with FIG. 18 are combined with one or more aspects of one or more embodiments described herein, including those described at least in conjunction with FIGS. 1-17 and 19-31. In at least one embodiment, one or more processors perform one or more operations of system 1800. In at least one embodiment, one or more processors that perform one or more operations of system 1800 are any one processor, or combination of processors, described herein, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, one or more operations of system 1800 are one or more operations of system 100 of FIG. 1, such as an operation of job scheduler 110. In at least one embodiment, one or more operations of system 1800 are one or more operations of system 200 of FIG. 2, such as an operation used to identify a processor profile using lookup table 228. In at least one embodiment, one or more operations of system 1800 are one or more operations described in conjunction with FIG. 3, such generating new performance profile 330. In at least one embodiment, one or more operations of system 1800 are one or more operations described in conjunction with FIG. 4, such an operation of used to select a processor profile to be applied to processor(s) 408. In at least one embodiment, one or more operations of system 1800 are one or more operations described in conjunction with FIG. 5, such as identifying processor profiles 510. In at least one embodiment, one or more operations of system 1800 are one or more operations described in conjunction with FIG. 6, such as selecting a processor settings profile with operation 606. In at least one embodiment, a processor performs one or more APIs 710 of FIG. 7 to perform one or more operations of system 1800. In at least one embodiment, a processor performs one or more APIs of system 800 to perform one or more operations of system 1800. In at least one embodiment, system 1800 includes a workflow used to identify a processor settings profile based on a single exclusive access scenario using multiple nodes.

Figure 19:
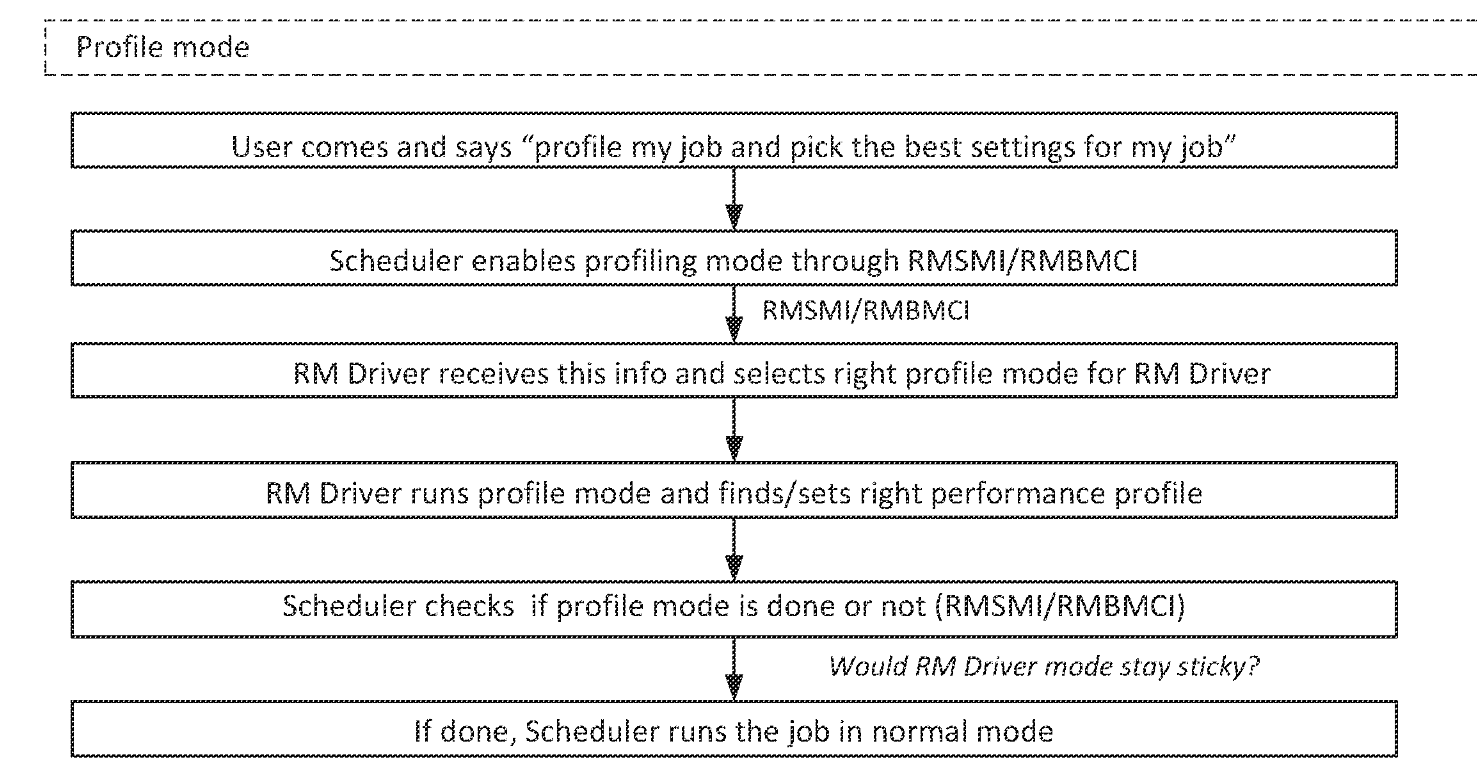
FIG. 19 illustrates a block diagram of a system used to identify a processor settings profile based on that system profiling a job, in accordance with at least one embodiment.

FIG. 19 illustrates a block diagram of system 1900 used to identify processor settings to be used when performing a job based on job characteristics, including job priority, in at least one embodiment. In at least one embodiment, one or more aspects of one or more embodiments described herein in conjunction with FIG. 19 are combined with one or more aspects of one or more embodiments described herein, including those described at least in conjunction with FIGS. 1-18 and 20-31. In at least one embodiment, one or more processors perform one or more operations of system 1900. In at least one embodiment, one or more processors that perform one or more operations of system 1900 are any one processor, or combination of processors, described herein, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, one or more operations of system 1900 are one or more operations of system 100 of FIG. 1, such as an operation of job scheduler 110. In at least one embodiment, one or more operations of system 1900 are one or more operations of system 200 of FIG. 2, such as an operation used to identify a processor profile using lookup table 228. In at least one embodiment, one or more operations of system 1900 are one or more operations described in conjunction with FIG. 3, such generating new performance profile 330. In at least one embodiment, one or more operations of system 1900 are one or more operations described in conjunction with FIG. 4, such an operation of used to select a processor profile to be applied to processor(s) 408. In at least one embodiment, one or more operations of system 1900 are one or more operations described in conjunction with FIG. 5, such as identifying processor profiles 510. In at least one embodiment, one or more operations of system 1900 are one or more operations described in conjunction with FIG. 6, such as selecting a processor settings profile with operation 606. In at least one embodiment, a processor performs one or more APIs 710 of FIG. 7 to perform one or more operations of system 1900. In at least one embodiment, a processor performs one or more APIs of system 800 to perform one or more operations of system 1900. In at least one embodiment, system 1800 includes a workflow used to identify a processor settings profile based on a single exclusive access scenario using multiple nodes.

FIG. 20 illustrates a block diagram of system 2000 used to identify processor settings to be used when performing a job based on job characteristics, including job priority, in at least one embodiment. In at least one embodiment, one or more aspects of one or more embodiments described herein in conjunction with FIG. 20 are combined with one or more aspects of one or more embodiments described herein, including those described at least in conjunction with FIGS. 1-19 and 21-31. In at least one embodiment, one or more processors perform one or more operations of system 2000. In at least one embodiment, one or more processors that perform one or more operations of system 2000 are any one processor, or combination of processors, described herein, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, one or more operations of system 2000 are one or more operations of system 100 of FIG. 1, such as an operation of job scheduler 110. In at least one embodiment, one or more operations of system 2000 are one or more operations of system 200 of FIG. 2, such as an operation used to identify a processor profile using lookup table 228. In at least one embodiment, one or more operations of system 2000 are one or more operations described in conjunction with FIG. 3, such generating new performance profile 330. In at least one embodiment, one or more operations of system 2000 are one or more operations described in conjunction with FIG. 4, such an operation of used to select a processor profile to be applied to processor(s) 408. In at least one embodiment, one or more operations of system 2000 are one or more operations described in conjunction with FIG. 5, such as identifying processor profiles 510. In at least one embodiment, one or more operations of system 2000 are one or more operations described in conjunction with FIG. 6, such as selecting a processor settings profile with operation 606. In at least one embodiment, a processor performs one or more APIs 710 of FIG. 7 to perform one or more operations of system 2000. In at least one embodiment, a processor performs one or more APIs of system 800 to perform one or more operations of system 2000. In at least one embodiment, system 2000 includes multiple GPUs and telemetry information used to inform data center administrators which jobs to club on a same busbar, and which jobs not to club on that bus bar. In at least one embodiment, clubbing a jobs on a same busbar refers to connecting nodes performing those jobs to that same busbar. In at least one embodiment, a busbar is an electrically conductive connection that distributes power to connected nodes.

FIG. 21 illustrates a block diagram of system 2100 used to identify processor settings to be used when performing a job based on job characteristics, including job priority, in at least one embodiment. In at least one embodiment, one or more aspects of one or more embodiments described herein in conjunction with FIG. 21 are combined with one or more aspects of one or more embodiments described herein, including those described at least in conjunction with FIGS. 1-20 and 22-31. In at least one embodiment, one or more processors perform one or more operations of system 2100. In at least one embodiment, one or more processors that perform one or more operations of system 2100 are any one processor, or combination of processors, described herein, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, one or more operations of system 2100 are one or more operations of system 100 of FIG. 1, such as an operation of job scheduler 110. In at least one embodiment, one or more operations of system 2100 are one or more operations of system 200 of FIG. 2, such as an operation used to identify a processor profile using lookup table 228. In at least one embodiment, one or more operations of system 2100 are one or more operations described in conjunction with FIG. 3, such generating new performance profile 330. In at least one embodiment, one or more operations of system 2100 are one or more operations described in conjunction with FIG. 4, such an operation of used to select a processor profile to be applied to processor(s) 408. In at least one embodiment, one or more operations of system 2100 are one or more operations described in conjunction with FIG. 5, such as identifying processor profiles 510. In at least one embodiment, one or more operations of system 2100 are one or more operations described in conjunction with FIG. 6, such as selecting a processor settings profile with operation 606. In at least one embodiment, a processor performs one or more APIs 710 of FIG. 7 to perform one or more operations of system 2100. In at least one embodiment, a processor performs one or more APIs of system 800 to perform one or more operations of system 2100. In at least one embodiment, system 2100 includes multiple GPUs and telemetry information used to inform data center administrators which jobs which jobs are worse with regard to a rate of change of current over short periods of time.

Figure 22:
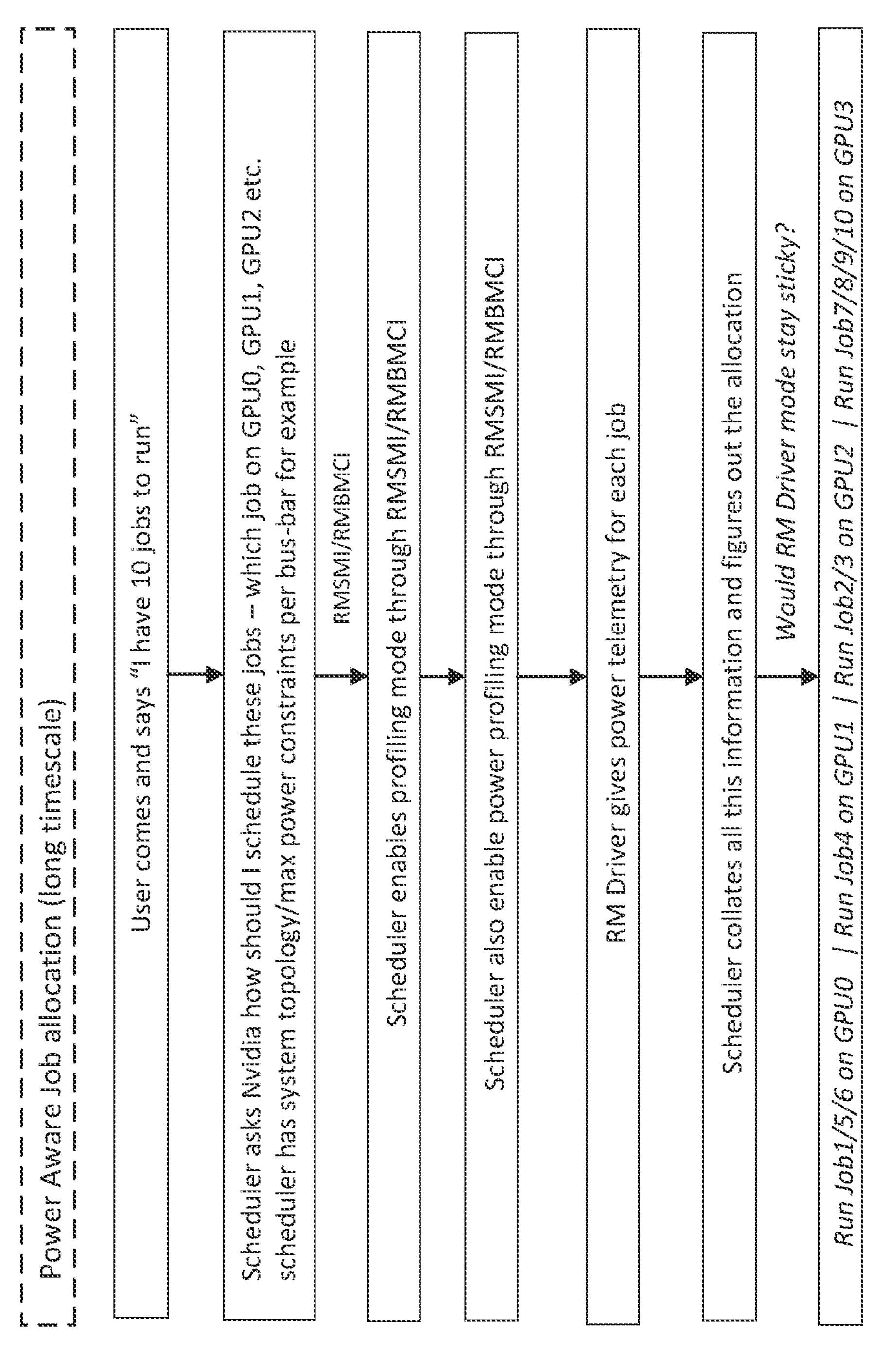
FIG. 22 illustrates a block diagram of system used to identify a power profile and allocation of GPUs, in accordance with at least one embodiment.

FIG. 22 illustrates a block diagram of system 2200 used to identify processor settings to be used when performing a job based on job characteristics, including job priority, in at least one embodiment. In at least one embodiment, one or more aspects of one or more embodiments described herein in conjunction with FIG. 22 are combined with one or more aspects of one or more embodiments described herein, including those described at least in conjunction with FIGS. 1-21 and 23-31. In at least one embodiment, one or more processors perform one or more operations of system 2200. In at least one embodiment, one or more processors that perform one or more operations of system 2200 are any one processor, or combination of processors, described herein, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, one or more operations of system 2200 are one or more operations of system 100 of FIG. 1, such as an operation of job scheduler 110. In at least one embodiment, one or more operations of system 2200 are one or more operations of system 200 of FIG. 2, such as an operation used to identify a processor profile using lookup table 228. In at least one embodiment, one or more operations of system 2200 are one or more operations described in conjunction with FIG. 3, such generating new performance profile 330. In at least one embodiment, one or more operations of system 2200 are one or more operations described in conjunction with FIG. 4, such an operation of used to select a processor profile to be applied to processor(s) 408. In at least one embodiment, one or more operations of system 2200 are one or more operations described in conjunction with FIG. 5, such as identifying processor profiles 510. In at least one embodiment, one or more operations of system 2200 are one or more operations described in conjunction with FIG. 6, such as selecting a processor settings profile with operation 606. In at least one embodiment, a processor performs one or more APIs 710 of FIG. 7 to perform one or more operations of system 2200. In at least one embodiment, a processor performs one or more APIs of system 800 to perform one or more operations of system 2200. In at least one embodiment, system 2200 includes a workflow used to identify a processor settings profile based on a single exclusive access scenario using multiple nodes. In at least one embodiment, system 2200 takes into account whether an RM could be sticky, which refers to a feature that allows requests from a client or user to be repeatedly routed to identical nodes, which can maintain data integrity.

Figure 23:
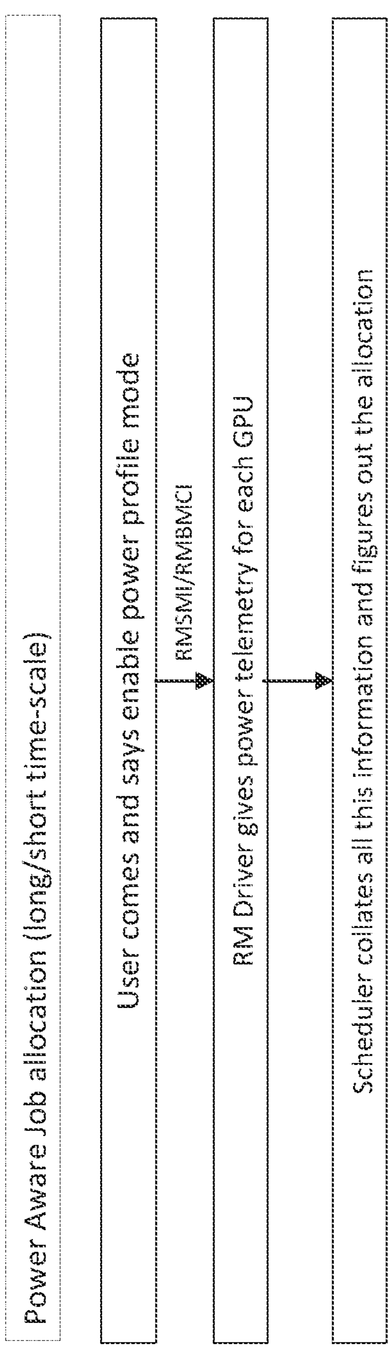
FIG. 23 illustrates a block diagram of a system that allocates GPUs based, at least in part, on power telemetry of multiple GPUs, in accordance with at least one embodiment.

FIG. 23 illustrates a block diagram of system 2300 used to identify processor settings to be used when performing a job based on job characteristics, including job priority, in at least one embodiment. In at least one embodiment, one or more aspects of one or more embodiments described herein in conjunction with FIG. 23 are combined with one or more aspects of one or more embodiments described herein, including those described at least in conjunction with FIGS. 1-22 and 24-31. In at least one embodiment, one or more processors perform one or more operations of system 2300. In at least one embodiment, one or more processors that perform one or more operations of system 2300 are any one processor, or combination of processors, described herein, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, one or more operations of system 2300 are one or more operations of system 100 of FIG. 1, such as an operation of job scheduler 110. In at least one embodiment, one or more operations of system 2300 are one or more operations of system 200 of FIG. 2, such as an operation used to identify a processor profile using lookup table 228. In at least one embodiment, one or more operations of system 2300 are one or more operations described in conjunction with FIG. 3, such generating new performance profile 330. In at least one embodiment, one or more operations of system 2300 are one or more operations described in conjunction with FIG. 4, such an operation of used to select a processor profile to be applied to processor(s) 408. In at least one embodiment, one or more operations of system 2300 are one or more operations described in conjunction with FIG. 5, such as identifying processor profiles 510. In at least one embodiment, one or more operations of system 2300 are one or more operations described in conjunction with FIG. 6, such as selecting a processor settings profile with operation 606. In at least one embodiment, a processor performs one or more APIs 710 of FIG. 7 to perform one or more operations of system 2300. In at least one embodiment, a processor performs one or more APIs of system 800 to perform one or more operations of system 2300. In at least one embodiment, system 2300 includes a workflow used to identify a processor settings profile based on a single exclusive access scenario using multiple nodes.

Figure 24:
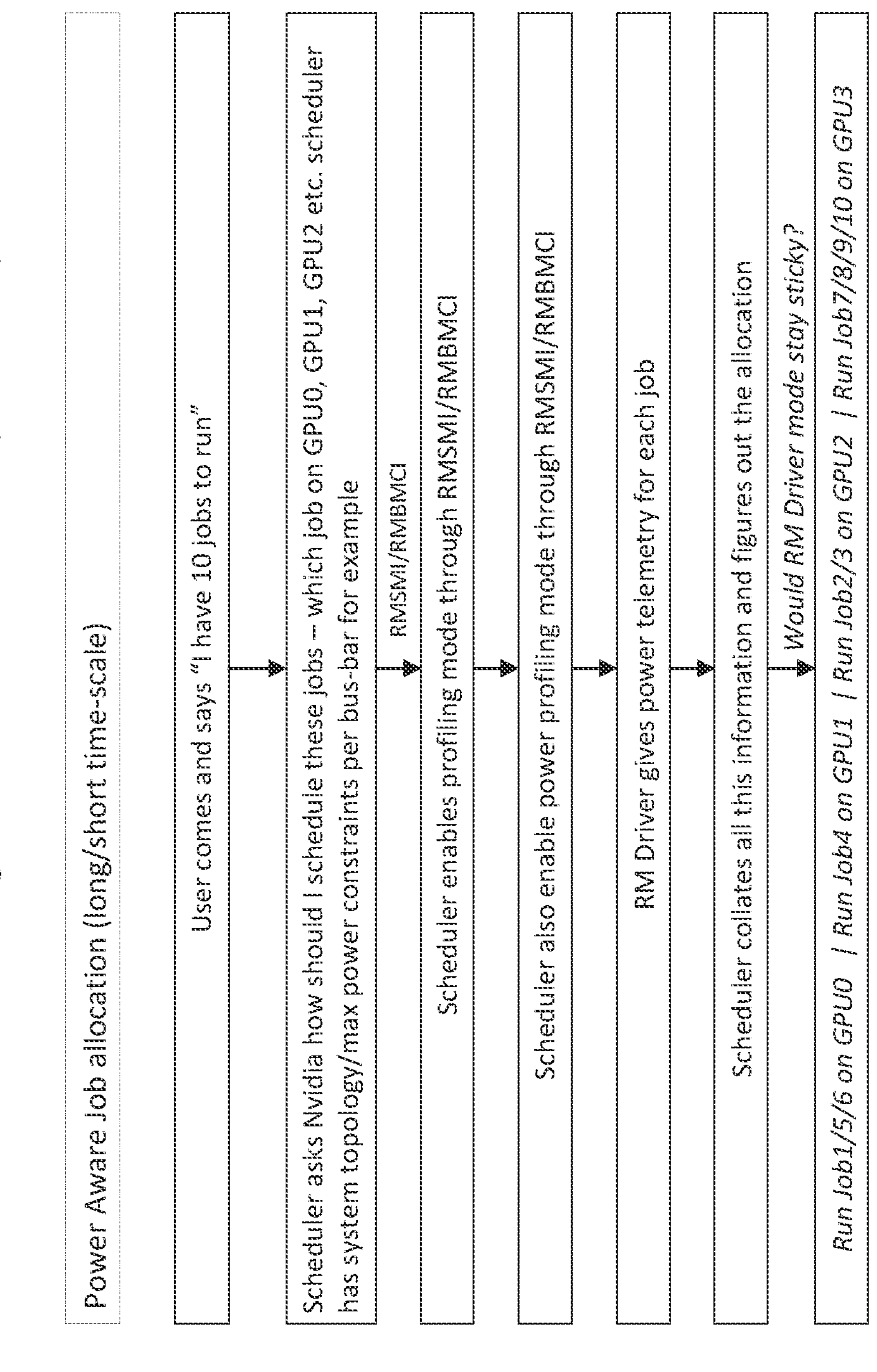
FIG. 24 illustrates a block diagram of a system used to identify a processor settings profile and allocate GPUs, in accordance with at least one embodiment.

FIG. 24 illustrates a block diagram of system 2400 used to identify processor settings to be used when performing a job based on job characteristics, including job priority, in at least one embodiment. In at least one embodiment, one or more aspects of one or more embodiments described herein in conjunction with FIG. 24 are combined with one or more aspects of one or more embodiments described herein, including those described at least in conjunction with FIGS. 1-23 and 25-31. In at least one embodiment, one or more processors perform one or more operations of system 2400. In at least one embodiment, one or more processors that perform one or more operations of system 2400 are any one processor, or combination of processors, described herein, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, one or more operations of system 2400 are one or more operations of system 100 of FIG. 1, such as an operation of job scheduler 110. In at least one embodiment, one or more operations of system 2400 are one or more operations of system 200 of FIG. 2, such as an operation used to identify a processor profile using lookup table 228. In at least one embodiment, one or more operations of system 2400 are one or more operations described in conjunction with FIG. 3, such generating new performance profile 330. In at least one embodiment, one or more operations of system 2400 are one or more operations described in conjunction with FIG. 4, such an operation of used to select a processor profile to be applied to processor(s) 408. In at least one embodiment, one or more operations of system 2400 are one or more operations described in conjunction with FIG. 5, such as identifying processor profiles 510. In at least one embodiment, one or more operations of system 2400 are one or more operations described in conjunction with FIG. 6, such as selecting a processor settings profile with operation 606. In at least one embodiment, a processor performs one or more APIs 710 of FIG. 7 to perform one or more operations of system 2400. In at least one embodiment, a processor performs one or more APIs of system 800 to perform one or more operations of system 2400. In at least one embodiment, system 2400 includes a workflow used to identify a processor settings profile based on a single exclusive access scenario using multiple nodes. In at least one embodiment, system 2200 takes into account whether an RM could be sticky, which refers to a feature that allows requests from a client or user to be repeatedly routed to identical nodes, which can maintain data integrity.

Figure 25:
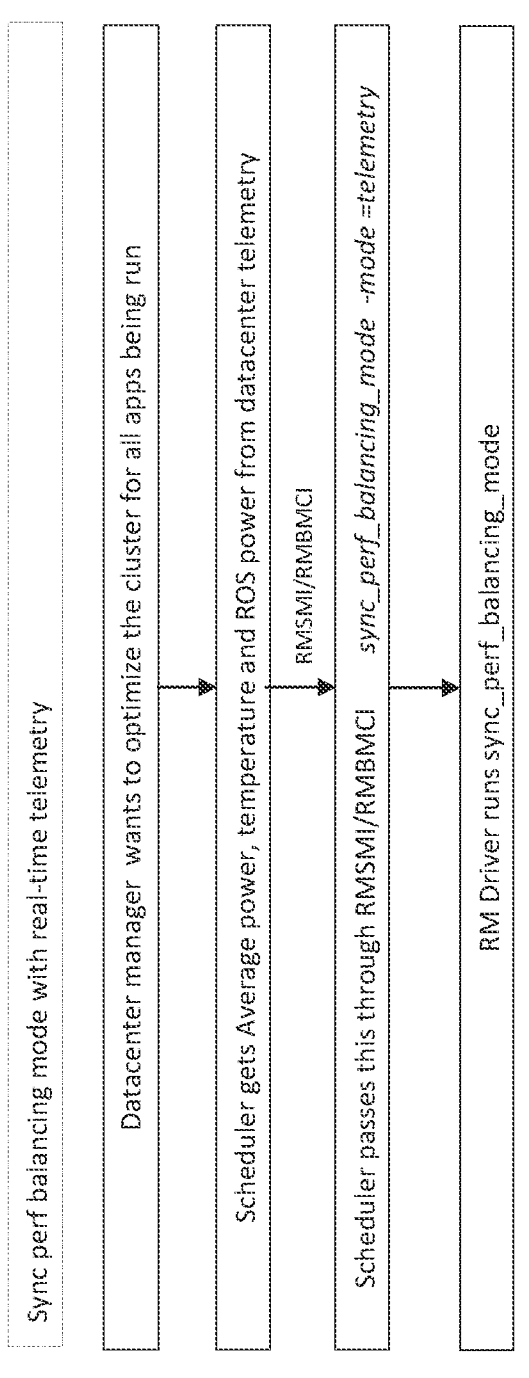
FIG. 25 illustrates a block diagram of a system used to identify a processor settings profile and allocate GPUs using GPU telemetry data, in accordance with at least one embodiment.

FIG. 25 illustrates a block diagram of system 2500 used to identify processor settings to be used when performing a job based on job characteristics, including job priority, in at least one embodiment. In at least one embodiment, one or more aspects of one or more embodiments described herein in conjunction with FIG. 25 are combined with one or more aspects of one or more embodiments described herein, including those described at least in conjunction with FIGS. 1-24 and 26-31. In at least one embodiment, one or more processors perform one or more operations of system 2500. In at least one embodiment, one or more processors that perform one or more operations of system 2500 are any one processor, or combination of processors, described herein, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, one or more operations of system 2500 are one or more operations of system 100 of FIG. 1, such as an operation of job scheduler 110. In at least one embodiment, one or more operations of system 2500 are one or more operations of system 200 of FIG. 2, such as an operation used to identify a processor profile using lookup table 228. In at least one embodiment, one or more operations of system 2500 are one or more operations described in conjunction with FIG. 3, such generating new performance profile 330. In at least one embodiment, one or more operations of system 2500 are one or more operations described in conjunction with FIG. 4, such an operation of used to select a processor profile to be applied to processor(s) 408. In at least one embodiment, one or more operations of system 2500 are one or more operations described in conjunction with FIG. 5, such as identifying processor profiles 510. In at least one embodiment, one or more operations of system 2500 are one or more operations described in conjunction with FIG. 6, such as selecting a processor settings profile with operation 606. In at least one embodiment, a processor performs one or more APIs 710 of FIG. 7 to perform one or more operations of system 2500. In at least one embodiment, a processor performs one or more APIs of system 800 to perform one or more operations of system 2500. In at least one embodiment, system 2500 includes a workflow used to identify a processor settings profile based on a single exclusive access scenario using multiple nodes.

FIG. 26 illustrates a block diagram of system 2600 used to identify processor settings to be used when performing a job based on job characteristics, including job priority, in at least one embodiment. In at least one embodiment, one or more aspects of one or more embodiments described herein in conjunction with FIG. 26 are combined with one or more aspects of one or more embodiments described herein, including those described at least in conjunction with FIGS. 1-15 and 27-31. In at least one embodiment, one or more processors perform one or more operations of system 2600. In at least one embodiment, one or more processors that perform one or more operations of system 2600 are any one processor, or combination of processors, described herein, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, one or more operations of system 2600 are one or more operations of system 100 of FIG. 1, such as an operation of job scheduler 110. In at least one embodiment, one or more operations of system 2600 are one or more operations of system 200 of FIG. 2, such as an operation used to identify a processor profile using lookup table 228. In at least one embodiment, one or more operations of system 2600 are one or more operations described in conjunction with FIG. 3, such generating new performance profile 330. In at least one embodiment, one or more operations of system 2600 are one or more operations described in conjunction with FIG. 4, such an operation of used to select a processor profile to be applied to processor(s) 408. In at least one embodiment, one or more operations of system 2600 are one or more operations described in conjunction with FIG. 5, such as identifying processor profiles 510. In at least one embodiment, one or more operations of system 2600 are one or more operations described in conjunction with FIG. 6, such as selecting a processor settings profile with operation 606. In at least one embodiment, a processor performs one or more APIs 710 of FIG. 7 to perform one or more operations of system 2600. In at least one embodiment, a processor performs one or more APIs of system 800 to perform one or more operations of system 2600. In at least one embodiment, system 2600 includes a workflow used to identify a processor settings profile based on a shared access scenario using either a single node or multiple nodes.

Figure 27:
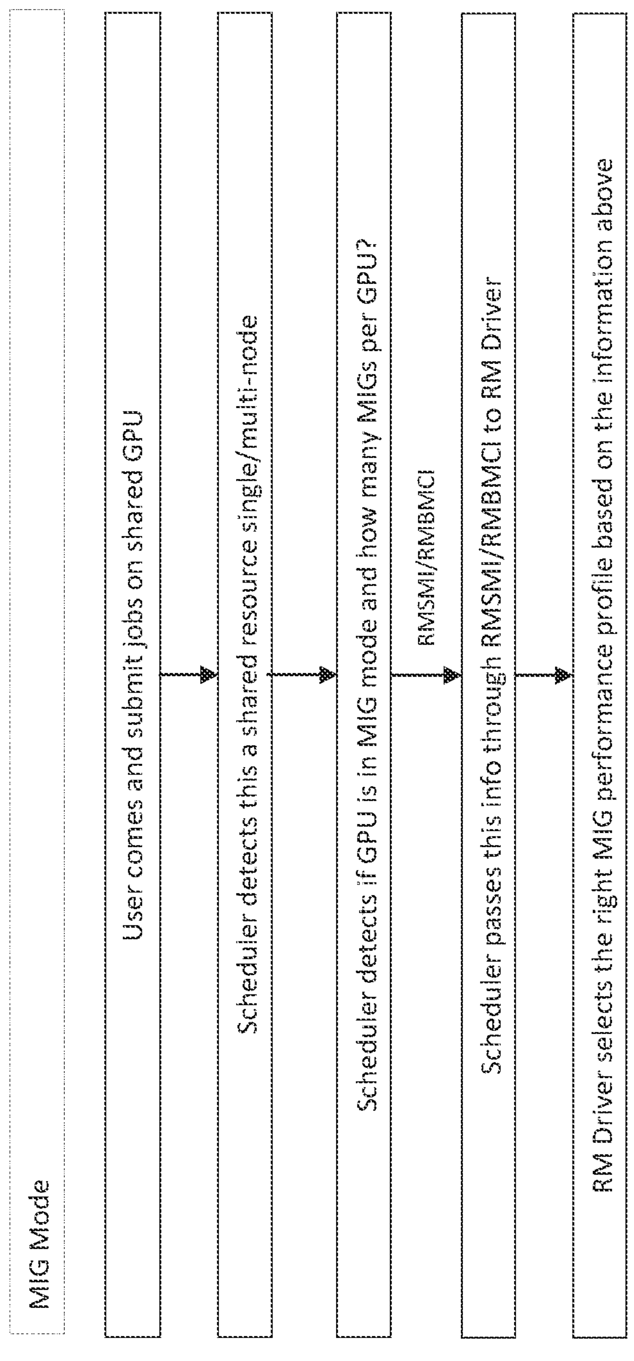
FIG. 27 illustrates a block diagram of a system used to identify a processor settings profile based, at least in part, on nodes that are partitioned, in accordance with at least one embodiment.

FIG. 27 illustrates a block diagram of system 2700 used to identify processor settings to be used when performing a job based on job characteristics, including job priority, in at least one embodiment. In at least one embodiment, one or more aspects of one or more embodiments described herein in conjunction with FIG. 27 are combined with one or more aspects of one or more embodiments described herein, including those described at least in conjunction with FIGS. 1-26 and 28-31. In at least one embodiment, one or more processors perform one or more operations of system 2700. In at least one embodiment, one or more processors that perform one or more operations of system 2700 are any one processor, or combination of processors, described herein, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, one or more operations of system 2700 are one or more operations of system 100 of FIG. 1, such as an operation of job scheduler 110. In at least one embodiment, one or more operations of system 2700 are one or more operations of system 200 of FIG. 2, such as an operation used to identify a processor profile using lookup table 228. In at least one embodiment, one or more operations of system 2700 are one or more operations described in conjunction with FIG. 3, such generating new performance profile 330. In at least one embodiment, one or more operations of system 2700 are one or more operations described in conjunction with FIG. 4, such an operation of used to select a processor profile to be applied to processor(s) 408. In at least one embodiment, one or more operations of system 2700 are one or more operations described in conjunction with FIG. 5, such as identifying processor profiles 510. In at least one embodiment, one or more operations of system 2700 are one or more operations described in conjunction with FIG. 6, such as selecting a processor settings profile with operation 606. In at least one embodiment, a processor performs one or more APIs 710 of FIG. 7 to perform one or more operations of system 2700. In at least one embodiment, a processor performs one or more APIs of system 800 to perform one or more operations of system 2700. In at least one embodiment, system 2700 includes a workflow used to identify a processor settings profile based on GPUs that are running in MIG mode, where those GPUs are able to be partitioned or as otherwise described herein.

Figure 28:
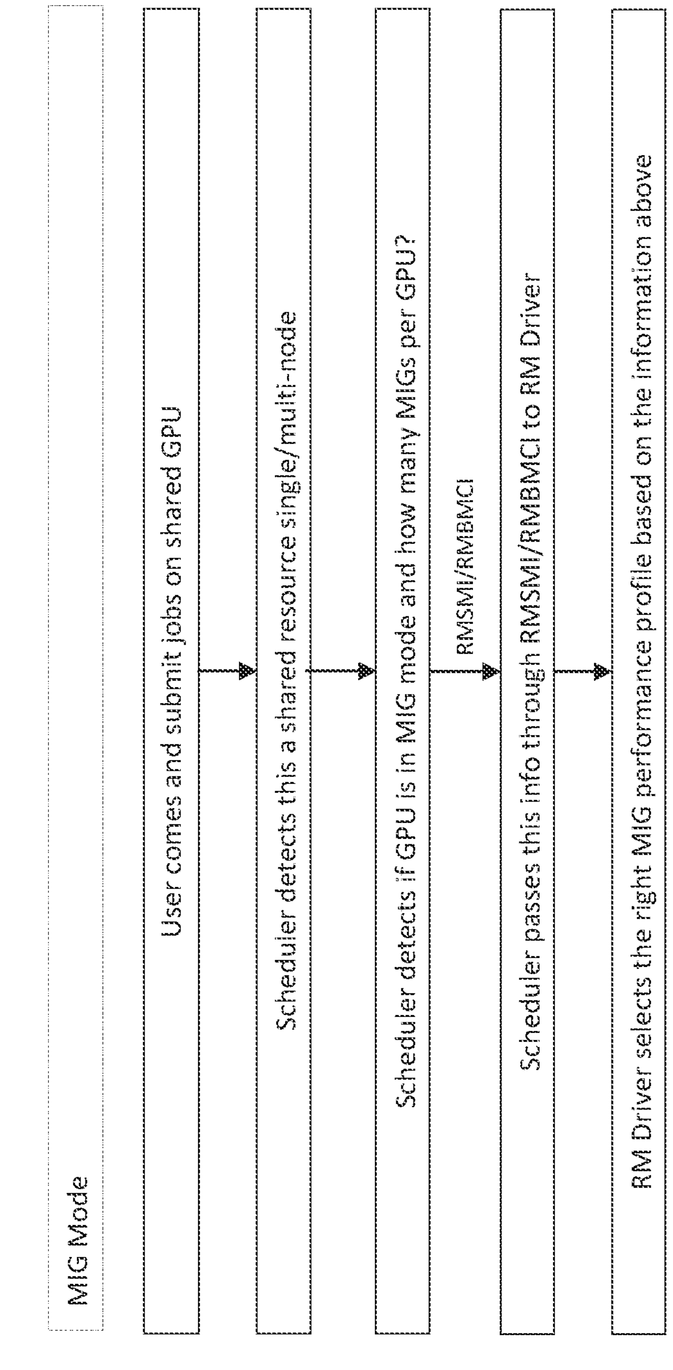
FIG. 28 illustrates a block diagram of a system used to identify a processor settings profile based, at least in part, on nodes that are partitioned, in accordance with at least one embodiment.

FIG. 28 illustrates a block diagram of system 2800 used to identify processor settings to be used when performing a job based on job characteristics, including job priority, in at least one embodiment. In at least one embodiment, one or more aspects of one or more embodiments described herein in conjunction with FIG. 28 are combined with one or more aspects of one or more embodiments described herein, including those described at least in conjunction with FIGS. 1-27 and 28-31. In at least one embodiment, one or more processors perform one or more operations of system 2800. In at least one embodiment, one or more processors that perform one or more operations of system 2800 are any one processor, or combination of processors, described herein, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, one or more operations of system 2800 are one or more operations of system 100 of FIG. 1, such as an operation of job scheduler 110. In at least one embodiment, one or more operations of system 2800 are one or more operations of system 200 of FIG. 2, such as an operation used to identify a processor profile using lookup table 228. In at least one embodiment, one or more operations of system 2800 are one or more operations described in conjunction with FIG. 3, such generating new performance profile 330. In at least one embodiment, one or more operations of system 2800 are one or more operations described in conjunction with FIG. 4, such an operation of used to select a processor profile to be applied to processor(s) 408. In at least one embodiment, one or more operations of system 2800 are one or more operations described in conjunction with FIG. 5, such as identifying processor profiles 510. In at least one embodiment, one or more operations of system 2800 are one or more operations described in conjunction with FIG. 6, such as selecting a processor settings profile with operation 606. In at least one embodiment, a processor performs one or more APIs 710 of FIG. 7 to perform one or more operations of system 2800. In at least one embodiment, a processor performs one or more APIs of system 800 to perform one or more operations of system 2800. In at least one embodiment, system 2800 includes a workflow used to identify a processor settings profile based on a shared access scenario using a single node or multiple nodes while taking into account that those nodes may be capable of running in MIG mode. In at least one embodiment, an identified processor settings profile is a MIG-based performance profile.

Figure 29:
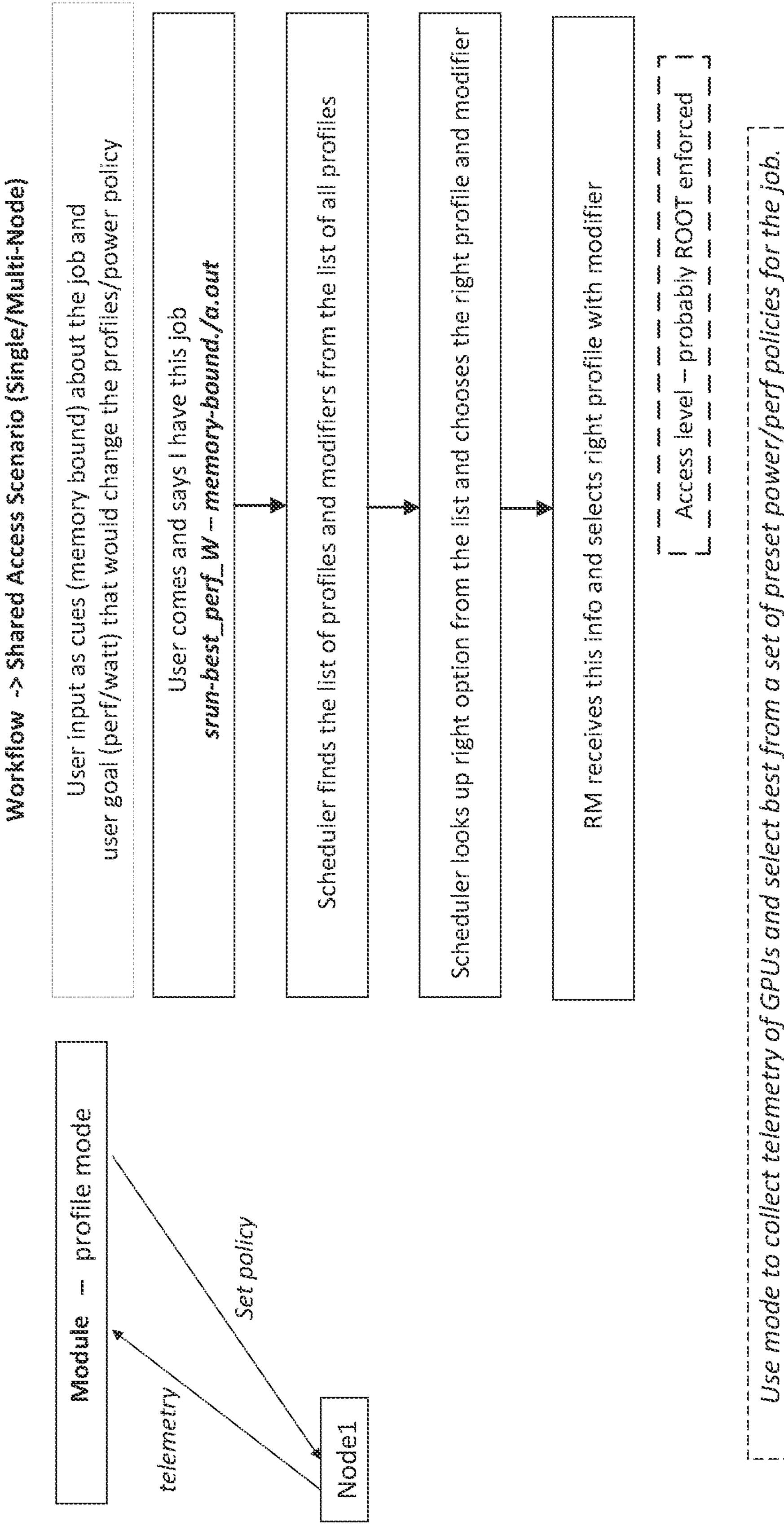
FIG. 29 illustrates a block diagram of a system used to identify a processor settings profile based, at least in part, on job characteristics, in accordance with at least one embodiment.

FIG. 29 illustrates a block diagram of system 2900 used to identify processor settings to be used when performing a job based on job characteristics, including job priority, in at least one embodiment. In at least one embodiment, one or more aspects of one or more embodiments described herein in conjunction with FIG. 29 are combined with one or more aspects of one or more embodiments described herein, including those described at least in conjunction with FIGS. 1-28 and 29-31. In at least one embodiment, one or more processors perform one or more operations of system 2900. In at least one embodiment, one or more processors that perform one or more operations of system 2900 are any one processor, or combination of processors, described herein, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, one or more operations of system 2900 are one or more operations of system 100 of FIG. 1, such as an operation of job scheduler 110. In at least one embodiment, one or more operations of system 2900 are one or more operations of system 200 of FIG. 2, such as an operation used to identify a processor profile using lookup table 228. In at least one embodiment, one or more operations of system 2900 are one or more operations described in conjunction with FIG. 3, such generating new performance profile 330. In at least one embodiment, one or more operations of system 2900 are one or more operations described in conjunction with FIG. 4, such an operation of used to select a processor profile to be applied to processor(s) 408. In at least one embodiment, one or more operations of system 2900 are one or more operations described in conjunction with FIG. 5, such as identifying processor profiles 510. In at least one embodiment, one or more operations of system 2900 are one or more operations described in conjunction with FIG. 6, such as selecting a processor settings profile with operation 606. In at least one embodiment, a processor performs one or more APIs 710 of FIG. 7 to perform one or more operations of system 2900. In at least one embodiment, a processor performs one or more APIs of system 800 to perform one or more operations of system 2900. In at least one embodiment, system 2900 includes a workflow used to identify a processor settings profile based on a shared access scenario using a single node or multiple node. In at least one embodiment, a scheduler finds a list of processor settings profiles and selects a processor settings profile to be applied to processors assigned to perform a job.

Figure 30:
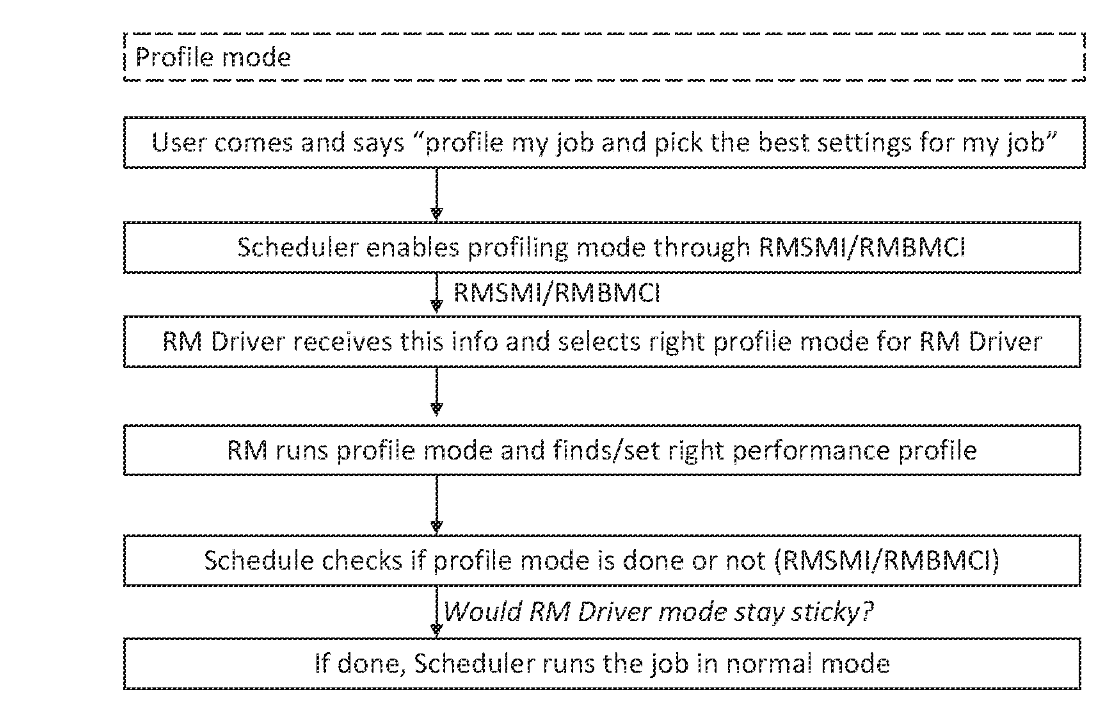
FIG. 30 illustrates a block diagram of a system used to identify a processor settings profile based on that system profiling a job, in accordance with at least one embodiment.

FIG. 30 illustrates a block diagram of system 3000 used to identify processor settings to be used when performing a job based on job characteristics, including job priority, in at least one embodiment. In at least one embodiment, one or more aspects of one or more embodiments described herein in conjunction with FIG. 30 are combined with one or more aspects of one or more embodiments described herein, including those described at least in conjunction with FIGS. 1-29 and 31. In at least one embodiment, one or more processors perform one or more operations of system 3000. In at least one embodiment, one or more processors that perform one or more operations of system 3000 are any one processor, or combination of processors, described herein, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, one or more operations of system 3000 are one or more operations of system 100 of FIG. 1, such as an operation of job scheduler 110. In at least one embodiment, one or more operations of system 3000 are one or more operations of system 200 of FIG. 2, such as an operation used to identify a processor profile using lookup table 228. In at least one embodiment, one or more operations of system 3000 are one or more operations described in conjunction with FIG. 3, such generating new performance profile 330. In at least one embodiment, one or more operations of system 3000 are one or more operations described in conjunction with FIG. 4, such an operation of used to select a processor profile to be applied to processor(s) 408. In at least one embodiment, one or more operations of system 3000 are one or more operations described in conjunction with FIG. 5, such as identifying processor profiles 510. In at least one embodiment, one or more operations of system 3000 are one or more operations described in conjunction with FIG. 6, such as selecting a processor settings profile with operation 606. In at least one embodiment, a processor that performs one or more operations of system 3000 performs one or more operations of API(s) 710 of FIG. 7. In at least one embodiment, a processor performs one or more APIs of system 800 to perform one or more operations of system 3000. In at least one embodiment, system 3000 includes a workflow used to identify a processor settings profile based on single exclusive access scenario using multiple nodes. In at least one embodiment, system 3000 identifies a best power per performance profile for a job. In at least one embodiment, system 3000 is an extension of system 2900 of FIG. 29.

Figure 31:
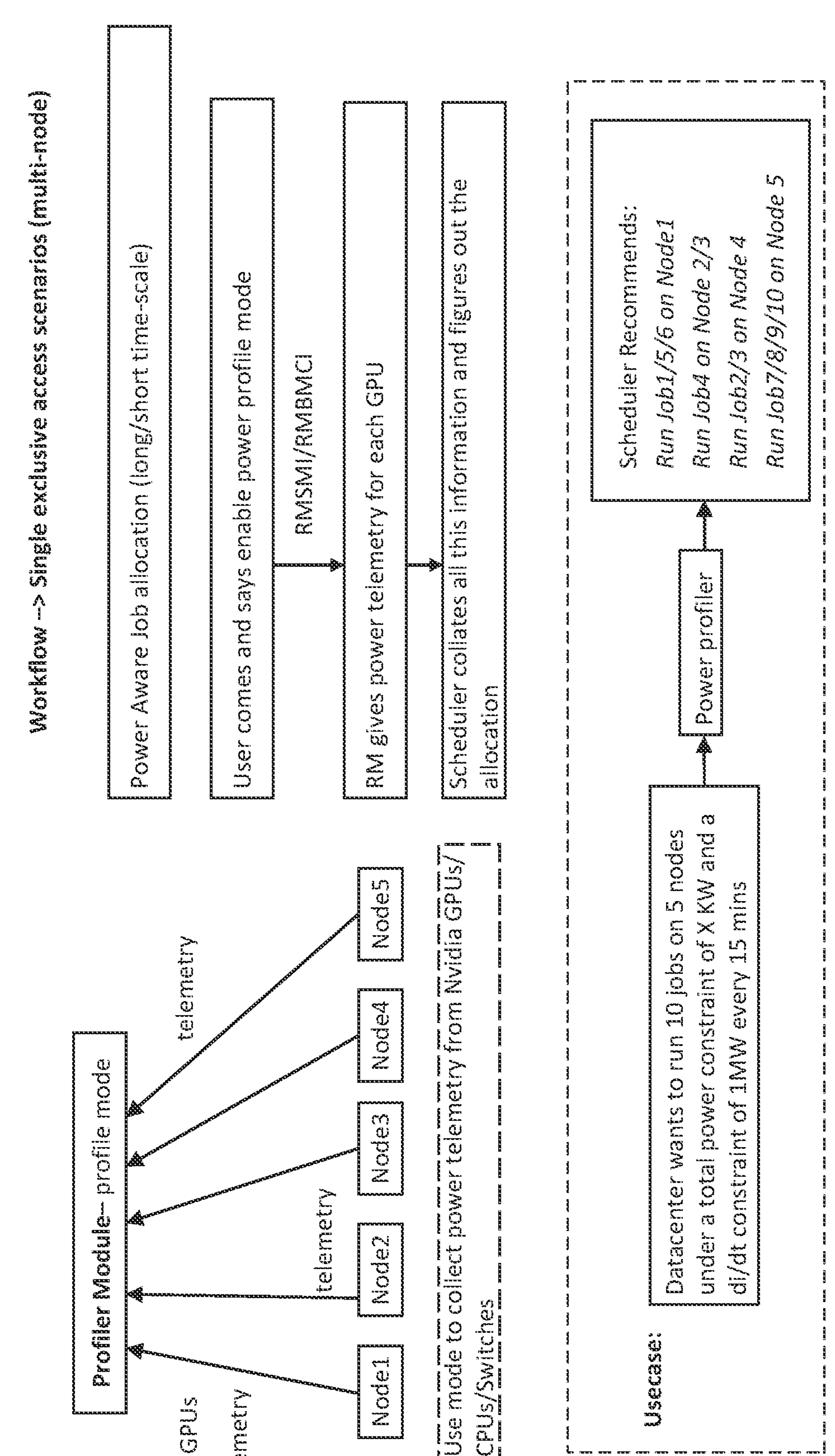
FIG. 31 illustrates a block diagram of a system used to cause schedulers to receive power information of multiple GPUs, in accordance with at least one embodiment.

FIG. 31 illustrates a block diagram of system 3100 used to identify processor settings to be used when performing a job based on job characteristics, including job priority, in at least one embodiment. In at least one embodiment, one or more aspects of one or more embodiments described herein in conjunction with FIG. 31 are combined with one or more aspects of one or more embodiments described herein, including those described at least in conjunction with FIGS. 1-30. In at least one embodiment, one or more processors perform one or more operations of system 3100. In at least one embodiment, one or more processors that perform one or more operations of system 3100 are any one processor, or combination of processors, described herein, including processor(s) 108 of FIG. 1, processor group 208 of FIG. 2, processor(s) 308 of FIG. 3, processor(s) 408 of FIG. 4, processor group 508 of FIG. 5, APU 3800 of FIG. 38, CPU 4100 described in conjunction with FIG. 41, graphics processor 4310 described in conjunction with FIG. 43A, PPU 5000 described in conjunction with FIG. 50, or one or more SMs 5114 of FIG. 49. In at least one embodiment, one or more operations of system 3100 are one or more operations of system 100 of FIG. 1, such as an operation of job scheduler 110. In at least one embodiment, one or more operations of system 3100 are one or more operations of system 200 of FIG. 2, such as an operation used to identify a processor profile using lookup table 228. In at least one embodiment, one or more operations of system 3100 are one or more operations described in conjunction with FIG. 3, such generating new performance profile 330. In at least one embodiment, one or more operations of system 3100 are one or more operations described in conjunction with FIG. 4, such an operation of used to select a processor profile to be applied to processor(s) 408. In at least one embodiment, one or more operations of system 3100 are one or more operations described in conjunction with FIG. 5, such as identifying processor profiles 510. In at least one embodiment, one or more operations of system 3100 are one or more operations described in conjunction with FIG. 6, such as selecting a processor settings profile with operation 606. In at least one embodiment, a processor that performs one or more operations of system 3100 performs one or more operations of API(s) 710 of FIG. 7. In at least one embodiment, a processor performs one or more APIs of system 800 to perform one or more operations of system 3100. In at least one embodiment, system 3100 includes tools used by schedulers to be power aware. In at least one embodiment, system 3100 includes a workflow used to identify an allocation of nodes in a single exclusive access scenario using multiple nodes. In at least one embodiment, system 3100 is an extension of system 2900 of FIG. 29 and/or an extension of system 3000 of FIG. 30.

Data Center

FIG. 32 illustrates an exemplary data center 3200, in accordance with at least one embodiment. In at least one embodiment, data center 3200 includes, without limitation, a data center infrastructure layer 3210, a framework layer 3220, a software layer 3230 and an application layer 3240.

In at least one embodiment, data center 3200 can be configured to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, data center 3200 can be configured to execute a schedule job API to receive inputs to cause an indication of computing resources to be used to by software instructions. In at least one embodiment, data center 3200 can be configured to execute a schedule job API to receive inputs to indicate a priority with which to perform instructions.

In at least one embodiment, data center 3200 can be configured to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, data center 3200 can be configured to execute a get all available profiles API to receive frequency inputs, computing resource inputs, priority inputs, processor identifiers, or some combination thereof, to identify a processor settings profile, or as otherwise described herein.

In at least one embodiment, data center 3200 can be configured to execute a schedule set specific profile on processor API to receive an indication of a processor settings profile to cause instructions to be performed by processors configured according to that processor settings profile, or as otherwise described herein.

In at least one embodiment, as shown in FIG. 32, data center infrastructure layer 3210 may include a resource orchestrator 3212, grouped computing resources 3214, and node computing resources ("node C.R.s") 3216(1)-3216(N), where "N" represents any whole, positive integer. In at least one embodiment, node C.R.s 3216(1)-3216(N) may include, but are not limited to, any number of central processing units ("CPUs") or other processors (including accelerators, field programmable gate arrays ("FPGAs"), data processing units ("DPUs") in network devices, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 3216(1)-3216(N) may be a server having one or more of above-mentioned computing resources.

In at least one embodiment, at least one component shown or described with respect to FIG. 32 is used to implement techniques and/or functions described in connection with FIGS. 1-33. In at least one embodiment, node computing resources ("node C.R.s") 716(1)-716(N) performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, grouped computing resources 3214 may include separate groupings of node C.R.s housed within one or more racks (not shown), or many racks housed in data centers at various geographical locations (also not shown). Separate groupings of node C.R.s within grouped computing resources 3214 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 3212 may configure or otherwise control one or more node C.R.s 3216(1)-3216(N) and/or grouped computing resources 3214. In at least one embodiment, resource orchestrator 3212 may include a software design infrastructure ("SDI") management entity for data center 3200. In at least one embodiment, resource orchestrator 3212 may include hardware, software or some combination thereof.

In at least one embodiment, as shown in FIG. 32, framework layer 3220 includes, without limitation, a job scheduler 3232, a configuration manager 3234, a resource manager 3236 and a distributed file system 3238. In at least one embodiment, framework layer 3220 may include a framework to support software 3252 of software layer 3230 and/or one or more application(s) 3242 of application layer 3240. In at least one embodiment, software 3252 or application(s) 3242 may respectively include web-based service software or applications, such as those provided by Amazon Web Services, Google Cloud and Microsoft Azure. In at least one embodiment, framework layer 3220 may be, but is not limited to, a type of free and open-source software web application framework such as Apache Spark™ (hereinafter "Spark") that may utilize distributed file system 3238 for large-scale data processing (e.g., "big data"). In at least one embodiment, job scheduler 3232 may include a Spark driver to facilitate scheduling of workloads supported by various layers of data center 3200. In at least one embodiment, configuration manager 3234 may be capable of configuring different layers such as software layer 3230 and framework layer 3220, including Spark and distributed file system 3238 for supporting large-scale data processing. In at least one embodiment, resource manager 3236 may be capable of managing clustered or grouped computing resources mapped to or allocated for support of distributed file system 3238 and job scheduler 3232. In at least one embodiment, clustered or grouped computing resources may include grouped computing resource 3214 at data center infrastructure layer 3210. In at least one embodiment, resource manager 3236 may coordinate with resource orchestrator 3212 to manage these mapped or allocated computing resources.

In at least one embodiment, software 3252 included in software layer 3230 may include software used by at least portions of node C.R.s 3216(1)-3216(N), grouped computing resources 3214, and/or distributed file system 3238 of framework layer 3220. One or more types of software may include, but are not limited to, Internet web page search software, e-mail virus scan software, database software, and streaming video content software.

In at least one embodiment, application(s) 3242 included in application layer 3240 may include one or more types of applications used by at least portions of node C.R.s 3216(1)-3216(N), grouped computing resources 3214, and/or distributed file system 3238 of framework layer 3220. In at least one or more types of applications may include, without limitation, CUDA applications.

In at least one embodiment, any of configuration manager 3234, resource manager 3236, and resource orchestrator 3212 may implement any number and type of self-modifying actions based on any amount and type of data acquired in any technically feasible fashion. In at least one embodiment, self-modifying actions may relieve a data center operator of data center 3200 from making possibly bad configuration decisions and possibly avoiding underutilized and/or poor performing portions of a data center.

Computer-Based Systems

The following figures set forth, without limitation, exemplary computer-based systems that can be used to implement at least one embodiment.

Figure 33:
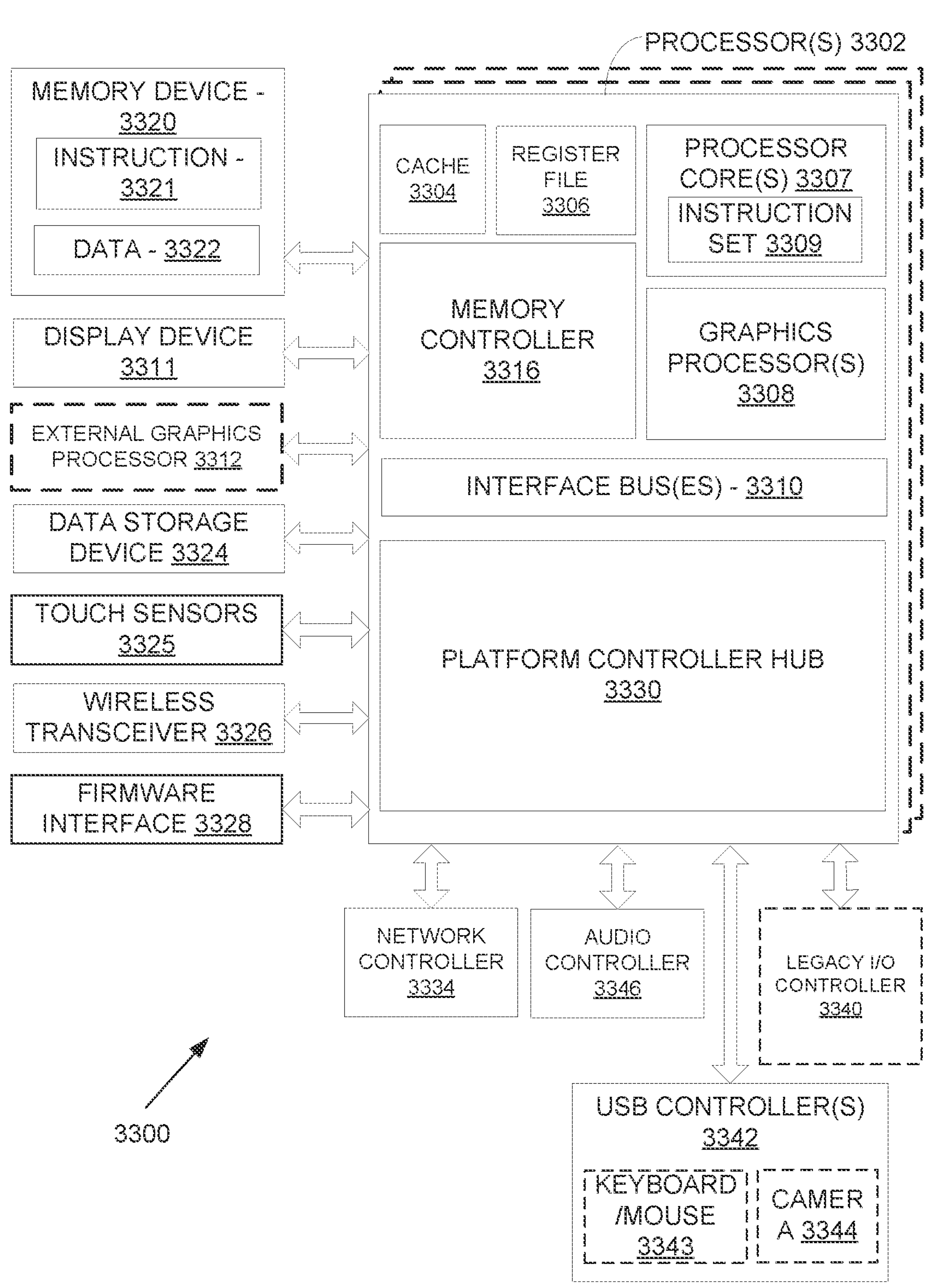
FIG. 33 illustrates a processing system, in accordance with at least one embodiment.

FIG. 33 illustrates a processing system 3300, in accordance with at least one embodiment. In at least one embodiment, processing system 3300 includes one or more processors 3302 and one or more graphics processors 3308, and may be a single processor desktop system, a multiprocessor workstation system, or a server system having a large number of processors 3302 or processor cores 3307. In at least one embodiment, processing system 3300 is a processing platform incorporated within a system-on-a-chip ("SoC") integrated circuit for use in mobile, handheld, or embedded devices. In at least one embodiment, a processors core 3307 is referred to as a computing unit or compute unit.

In at least one embodiment, processing system 3300 can be configured to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, processing system 3300 can be configured to execute a schedule job API to receive inputs to cause an indication of computing resources to be used to by software instructions. In at least one embodiment, processing system 3300 can be configured to execute a schedule job API to receive inputs to indicate a priority with which to perform instructions.

In at least one embodiment, processing system 3300 can be configured to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, processing system 3300 can be configured to execute a get all available profiles API to receive frequency inputs, computing resource inputs, priority inputs, processor identifiers, or some combination thereof, to identify a processor settings profile, or as otherwise described herein.

In at least one embodiment, processing system 3300 can be configured to execute a schedule set specific profile on processor API to receive an indication of a processor settings profile to cause instructions to be performed by processors configured according to that processor settings profile, or as otherwise described herein.

In at least one embodiment, at least one component shown or described with respect to FIG. 33 is used to implement techniques and/or functions described in connection with FIGS. 1-33. In at least one embodiment, processing system 3300 performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, processing system 3300 can include, or be incorporated within a server-based gaming platform, a game console, a media console, a mobile gaming console, a handheld game console, or an online game console. In at least one embodiment, processing system 3300 is a mobile phone, smart phone, tablet computing device or mobile Internet device. In at least one embodiment, processing system 3300 can also include, couple with, or be integrated within a wearable device, such as a smart watch wearable device, smart eyewear device, augmented reality device, or virtual reality device. In at least one embodiment, processing system 3300 is a television or set top box device having one or more processors 3302 and a graphical interface generated by one or more graphics processors 3308.

In at least one embodiment, one or more processors 3302 each include one or more processor cores 3307 to process instructions which, when executed, perform operations for system and user software. In at least one embodiment, each of one or more processor cores 3307 is configured to process a specific instruction set 3309. In at least one embodiment, instruction set 3309 may facilitate Complex Instruction Set Computing ("CISC"), Reduced Instruction Set Computing ("RISC"), or computing via a Very Long Instruction Word ("VLIW"). In at least one embodiment, processor cores 3307 may each process a different instruction set 3309, which may include instructions to facilitate emulation of other instruction sets. In at least one embodiment, processor core 3307 may also include other processing devices, such as a digital signal processor ("DSP").

In at least one embodiment, processor 3302 includes cache memory ('cache") 3304. In at least one embodiment, processor 3302 can have a single internal cache or multiple levels of internal cache. In at least one embodiment, cache memory is shared among various components of processor 3302. In at least one embodiment, processor 3302 also uses an external cache (e.g., a Level 3 ("L3") cache or Last Level Cache ("LLC")) (not shown), which may be shared among processor cores 3307 using known cache coherency techniques. In at least one embodiment, register file 3306 is additionally included in processor 3302 which may include different types of registers for storing different types of data (e.g., integer registers, floating point registers, status registers, and an instruction pointer register). In at least one embodiment, register file 3306 may include general-purpose registers or other registers.

In at least one embodiment, one or more processor(s) 3302 are coupled with one or more interface bus(es) 3310 to transmit communication signals such as address, data, or control signals between processor 3302 and other components in processing system 3300. In at least one embodiment interface bus 3310, in one embodiment, can be a processor bus, such as a version of a Direct Media Interface ("DMI") bus. In at least one embodiment, interface bus 3310 is not limited to a DMI bus, and may include one or more Peripheral Component Interconnect buses (e.g., "PCI," PCI Express ("PCIe")), memory buses, or other types of interface buses. In at least one embodiment processor(s) 3302 include an integrated memory controller 3316 and a platform controller hub 3330. In at least one embodiment, memory controller 3316 facilitates communication between a memory device and other components of processing system 3300, while platform controller hub ("PCH") 3330 provides connections to Input/Output ("I/O") devices via a local I/O bus. In at least one embodiment, one or more Peripheral Component Interconnect buses include PCIe Gen 5, which provides an interface for processors.

In at least one embodiment, memory device 3320 can be a dynamic random access memory ("DRAM") device, a static random access memory ("SRAM") device, flash memory device, phase-change memory device, or some other memory device having suitable performance to serve as processor memory. In at least one embodiment memory device 3320 can operate as system memory for processing system 3300, to store data 3322 and instructions 3321 for use when one or more processors 3302 executes an application or process. In at least one embodiment, memory controller 3316 also couples with an optional external graphics processor 3312, which may communicate with one or more graphics processors 3308 in processors 3302 to perform graphics and media operations. In at least one embodiment, a display device 3311 can connect to processor(s) 3302. In at least one embodiment display device 3311 can include one or more of an internal display device, as in a mobile electronic device or a laptop device or an external display device attached via a display interface (e.g., DisplayPort, etc.). In at least one embodiment, display device 3311 can include a head mounted display ("HMD") such as a stereoscopic display device for use in virtual reality ("VR") applications or augmented reality ("AR") applications.

In at least one embodiment, platform controller hub 3330 enables peripherals to connect to memory device 3320 and processor 3302 via a high-speed I/O bus. In at least one embodiment, I/O peripherals include, but are not limited to, an audio controller 3346, a network controller 3334, a firmware interface 3328, a wireless transceiver 3326, touch sensors 3325, a data storage device 3324 (e.g., hard disk drive, flash memory, etc.). In at least one embodiment, data storage device 3324 can connect via a storage interface (e.g., SATA) or via a peripheral bus, such as PCI, or PCIe. In at least one embodiment, touch sensors 3325 can include touch screen sensors, pressure sensors, or fingerprint sensors. In at least one embodiment, wireless transceiver 3326 can be a Wi-Fi transceiver, a Bluetooth transceiver, or a mobile network transceiver such as a 3G, 4G, or Long Term Evolution ("LTE") transceiver. In at least one embodiment, firmware interface 3328 enables communication with system firmware, and can be, for example, a unified extensible firmware interface ("UEFI"). In at least one embodiment, network controller 3334 can enable a network connection to a wired network. In at least one embodiment, a high-performance network controller (not shown) couples with interface bus 3310. In at least one embodiment, audio controller 3346 is a multi-channel high definition audio controller. In at least one embodiment, processing system 3300 includes an optional legacy I/O controller 3340 for coupling legacy (e.g., Personal System 2 ("PS/2")) devices to processing system 3300. In at least one embodiment, platform controller hub 3330 can also connect to one or more Universal Serial Bus ("USB") controllers 3342 connect input devices, such as keyboard and mouse 3343 combinations, a camera 3344, or other USB input devices.

In at least one embodiment, an instance of memory controller 3316 and platform controller hub 3330 may be integrated into a discreet external graphics processor, such as external graphics processor 3312. In at least one embodiment, platform controller hub 3330 and/or memory controller 3316 may be external to one or more processor(s) 3302. For example, in at least one embodiment, processing system 3300 can include an external memory controller 3316 and platform controller hub 3330, which may be configured as a memory controller hub and peripheral controller hub within a system chipset that is in communication with processor(s) 3302.

Figure 34:
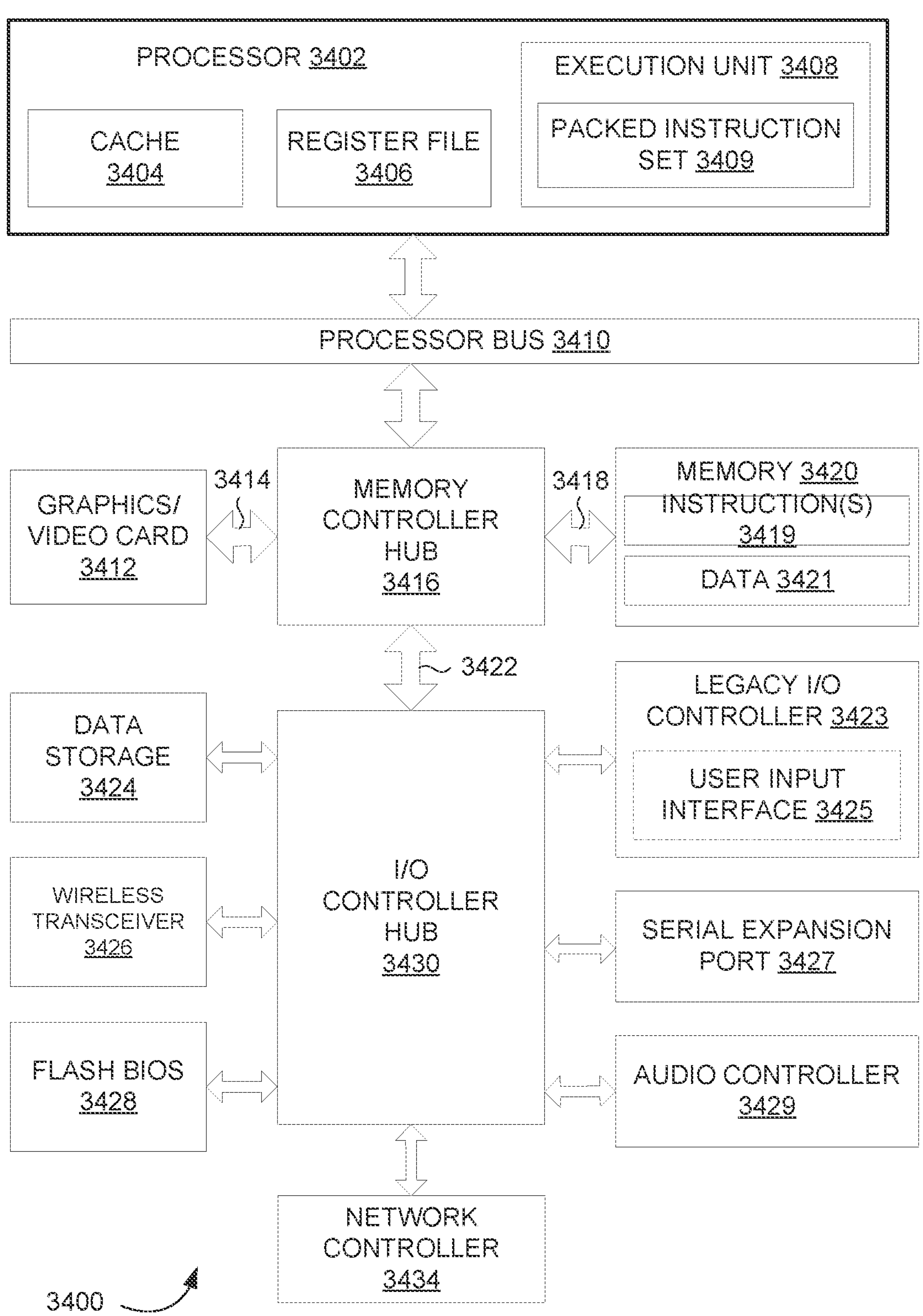
FIG. 34 illustrates a computer system, in accordance with at least one embodiment.

FIG. 34 illustrates a computer system 3400, in accordance with at least one embodiment. In at least one embodiment, computer system 3400 may be a system with interconnected devices and components, an SOC, or some combination. In at least on embodiment, computer system 3400 is formed with a processor 3402 that may include execution units to execute an instruction. In at least one embodiment, computer system 3400 may include, without limitation, a component, such as processor 3402 to employ execution units including logic to perform algorithms for processing data. In at least one embodiment, computer system 3400 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 3400 may execute a version of WINDOWS' operating system available from Microsoft Corporation of Redmond, Wash., although other operating systems (UNIX and Linux for example), embedded software, and/or graphical user interfaces, may also be used.

In at least one embodiment, COMPUTING SYSTEM 3400 can be configured to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, COMPUTING SYSTEM 3400 can be configured to execute a schedule job API to receive inputs to cause an indication of computing resources to be used to by software instructions. In at least one embodiment, COMPUTING SYSTEM 3400 can be configured to execute a schedule job API to receive inputs to indicate a priority with which to perform instructions.

In at least one embodiment, COMPUTING SYSTEM 3400 can be configured to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, COMPUTING SYSTEM 3400 can be configured to execute a get all available profiles API to receive frequency inputs, computing resource inputs, priority inputs, processor identifiers, or some combination thereof, to identify a processor settings profile, or as otherwise described herein.

In at least one embodiment, COMPUTING SYSTEM 3400 can be configured to execute a schedule set specific profile on processor API to receive an indication of a processor settings profile to cause instructions to be performed by processors configured according to that processor settings profile, or as otherwise described herein.

In at least one embodiment, at least one component shown or described with respect to FIG. 34 is used to implement techniques and/or functions described in connection with FIGS. 1-33. In at least one embodiment, computer system 3400 performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, computer system 3400 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions.

In at least one embodiment, computer system 3400 may include, without limitation, processor 3402 that may include, without limitation, one or more execution units 3408 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 3400 is a single processor desktop or server system. In at least one embodiment, computer system 3400 may be a multiprocessor system. In at least one embodiment, processor 3402 may include, without limitation, a CISC microprocessor, a RISC microprocessor, a VLIW microprocessor, a processor implementing a combination of instruction sets, or any other processor device, such as a digital signal processor, for example. In at least one embodiment, processor 3402 may be coupled to a processor bus 3410 that may transmit data signals between processor 3402 and other components in computer system 3400.

In at least one embodiment, processor 3402 may include, without limitation, a Level 1 ("L1") internal cache memory ("cache") 3404. In at least one embodiment, processor 3402 may have a single internal cache or multiple levels of internal cache. In at least one embodiment, cache memory may reside external to processor 3402. In at least one embodiment, processor 3402 may also include a combination of both internal and external caches. In at least one embodiment, a register file 3406 may store different types of data in various registers including, without limitation, integer registers, floating point registers, status registers, and instruction pointer register.

In at least one embodiment, execution unit 3408, including, without limitation, logic to perform integer and floating point operations, also resides in processor 3402. Processor 3402 may also include a microcode ("ucode") read only memory ("ROM") that stores microcode for certain macro instructions. In at least one embodiment, execution unit 3408 may include logic to handle a packed instruction set 3409. In at least one embodiment, by including packed instruction set 3409 in an instruction set of a general-purpose processor 3402, along with associated circuitry to execute instructions, operations used by many multimedia applications may be performed using packed data in a general-purpose processor 3402. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 3408 may also be used in microcontrollers, embedded processors, graphics devices, DSPs, and other types of logic circuits. In at least one embodiment, computer system 3400 may include, without limitation, a memory 3420. In at least one embodiment, memory 3420 may be implemented as a DRAM device, an SRAM device, flash memory device, or other memory device. Memory 3420 may store instruction(s) 3419 and/or data 3421 represented by data signals that may be executed by processor 3402.

In at least one embodiment, a system logic chip may be coupled to processor bus 3410 and memory 3420. In at least one embodiment, the system logic chip may include, without limitation, a memory controller hub ("MCH") 3416, and processor 3402 may communicate with MCH 3416 via processor bus 3410. In at least one embodiment, MCH 3416 may provide a high bandwidth memory path 3418 to memory 3420 for instruction and data storage and for storage of graphics commands, data and textures. In at least one embodiment, MCH 3416 may direct data signals between processor 3402, memory 3420, and other components in computer system 3400 and to bridge data signals between processor bus 3410, memory 3420, and a system I/O 3422. In at least one embodiment, system logic chip may provide a graphics port for coupling to a graphics controller. In at least one embodiment, MCH 3416 may be coupled to memory 3420 through high bandwidth memory path 3418 and graphics/video card 3412 may be coupled to MCH 3416 through an Accelerated Graphics Port ("AGP") interconnect 3414.

In at least one embodiment, computer system 3400 may use system I/O 3422 that is a proprietary hub interface bus to couple MCH 3416 to I/O controller hub ("ICH") 3430. In at least one embodiment, ICH 3430 may provide direct connections to some I/O devices via a local I/O bus. In at least one embodiment, local I/O bus may include, without limitation, a high-speed I/O bus for connecting peripherals to memory 3420, a chipset, and processor 3402. Examples may include, without limitation, an audio controller 3429, a firmware hub ("flash BIOS") 3428, a wireless transceiver 3426, a data storage 3424, a legacy I/O controller 3423 containing a user input interface 3425 and a keyboard interface, a serial expansion port 3427, such as a USB, and a network controller 3434. Data storage 3424 may comprise a hard disk drive, a floppy disk drive, a CD-ROM device, a flash memory device, or other mass storage device.

In at least one embodiment, FIG. 34 illustrates a system, which includes interconnected hardware devices or "chips." In at least one embodiment, FIG. 34 may illustrate an exemplary SoC. In at least one embodiment, devices illustrated in FIG. 34 may be interconnected with proprietary interconnects, standardized interconnects (e.g., PCIe), or some combination thereof. In at least one embodiment, one or more components of system 3400 are interconnected using compute express link ("CXL") interconnects.

Figure 35:
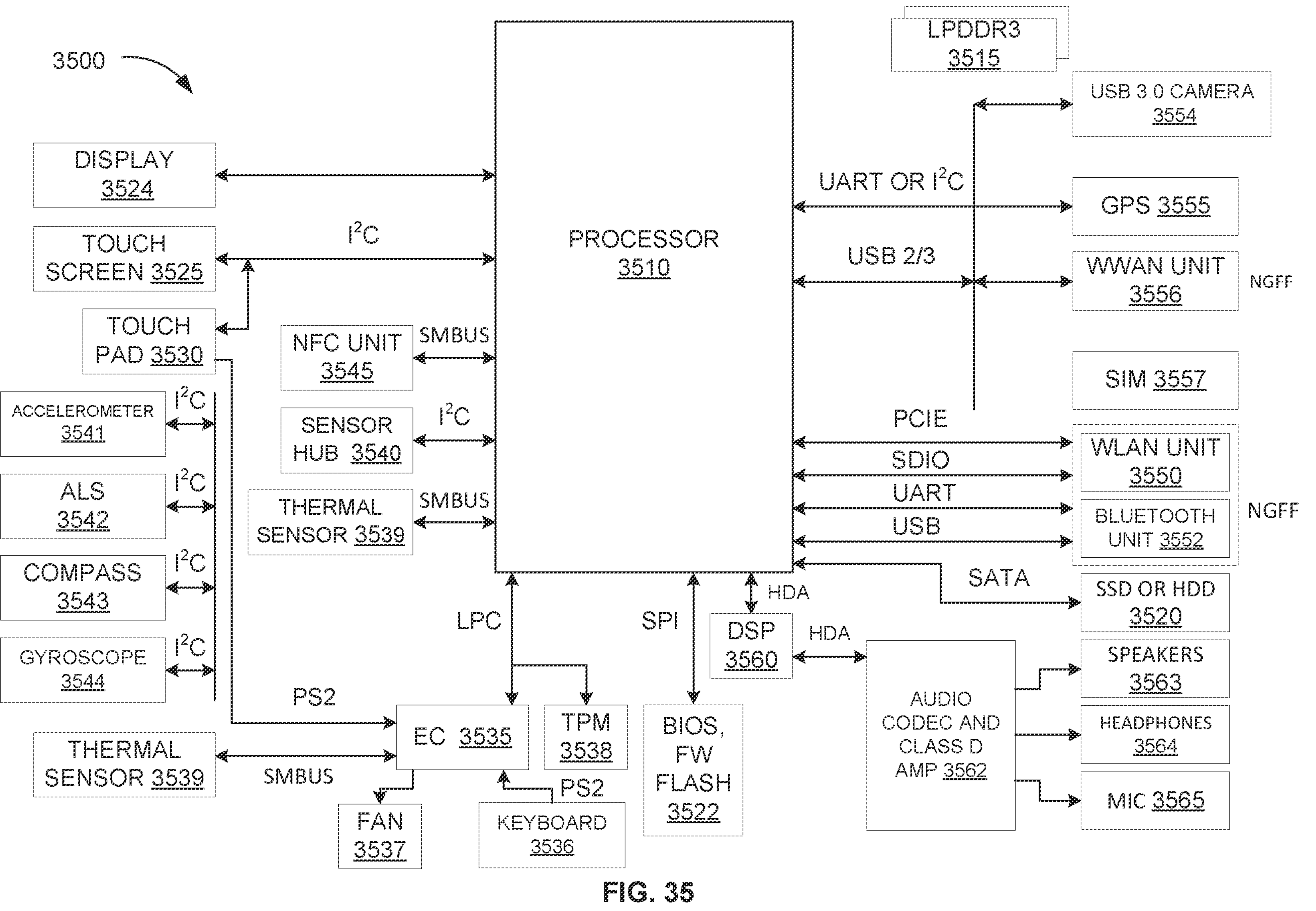
FIG. 35 illustrates a system, in accordance with at least one embodiment.

FIG. 35 illustrates a system 3500, in accordance with at least one embodiment. In at least one embodiment, system 3500 is an electronic device that utilizes a processor 3510. In at least one embodiment, system 3500 may be, for example and without limitation, a notebook, a tower server, a rack server, a blade server, an edge device communicatively coupled to one or more on-premise or cloud service providers, a laptop, a desktop, a tablet, a mobile device, a phone, an embedded computer, or any other suitable electronic device.

In at least one embodiment, SYSTEM 3500 can be configured to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, SYSTEM 3500 can be configured to execute a schedule job API to receive inputs to cause an indication of computing resources to be used to by software instructions. In at least one embodiment, SYSTEM 3500 can be configured to execute a schedule job API to receive inputs to indicate a priority with which to perform instructions.

In at least one embodiment, SYSTEM 3500 can be configured to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, SYSTEM 3500 can be configured to execute a get all available profiles API to receive frequency inputs, computing resource inputs, priority inputs, processor identifiers, or some combination thereof, to identify a processor settings profile, or as otherwise described herein.

In at least one embodiment, SYSTEM 3500 can be configured to execute a schedule set specific profile on processor API to receive an indication of a processor settings profile to cause instructions to be performed by processors configured according to that processor settings profile, or as otherwise described herein.

In at least one embodiment, at least one component shown or described with respect to FIG. 35 is used to implement techniques and/or functions described in connection with FIGS. 1-33. In at least one embodiment, system 3500 performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, system 3500 may include, without limitation, processor 3510 communicatively coupled to any suitable number or kind of components, peripherals, modules, or devices. In at least one embodiment, processor 3510 is coupled using a bus or interface, such as an I2C bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/Transmitter ("UART") bus. In at least one embodiment, FIG. 35 illustrates a system which includes interconnected hardware devices or "chips." In at least one embodiment, FIG. 35 may illustrate an exemplary SoC. In at least one embodiment, devices illustrated in FIG. 35 may be interconnected with proprietary interconnects, standardized interconnects (e.g., PCIe) or some combination thereof. In at least one embodiment, one or more components of FIG. 35 are interconnected using CXL interconnects.

In at least one embodiment, FIG. 35 may include a display 3524, a touch screen 3525, a touch pad 3530, a Near Field Communications unit ("NFC") 3545, a sensor hub 3540, a thermal sensor 3546, an Express Chipset ("EC") 3535, a Trusted Platform Module ("TPM") 3538, BIOS/firmware/flash memory ("BIOS, FW Flash") 3522, a DSP 3560, a Solid State Disk ("SSD") or Hard Disk Drive ("HDD") 3520, a wireless local area network unit ("WLAN") 3550, a Bluetooth unit 3552, a Wireless Wide Area Network unit ("WWAN") 3556, a Global Positioning System ("GPS") 3555, a camera ("USB 3.0 camera") 3554 such as a USB 3.0 camera, or a Low Power Double Data Rate ("LPDDR") memory unit ("LPDDR3") 3515 implemented in, for example, LPDDR3 standard. These components may each be implemented in any suitable manner.

In at least one embodiment, other components may be communicatively coupled to processor 3510 through components discussed above. In at least one embodiment, an accelerometer 3541, an Ambient Light Sensor ("ALS") 3542, a compass 3543, and a gyroscope 3544 may be communicatively coupled to sensor hub 3540. In at least one embodiment, a thermal sensor 3539, a fan 3537, a keyboard 3536, and a touch pad 3530 may be communicatively coupled to EC 3535. In at least one embodiment, a speaker 3563, a headphones 3564, and a microphone ("mic") 3565 may be communicatively coupled to an audio unit ("audio codec and class d amp") 3562, which may in turn be communicatively coupled to DSP 3560. In at least one embodiment, audio unit 3562 may include, for example and without limitation, an audio coder/decoder ("codec") and a class D amplifier. In at least one embodiment, a SIM card ("SIM") 3557 may be communicatively coupled to WWAN unit 3556. In at least one embodiment, components such as WLAN unit 3550 and Bluetooth unit 3552, as well as WWAN unit 3556 may be implemented in a Next Generation Form Factor ("NGFF").

Figure 36:
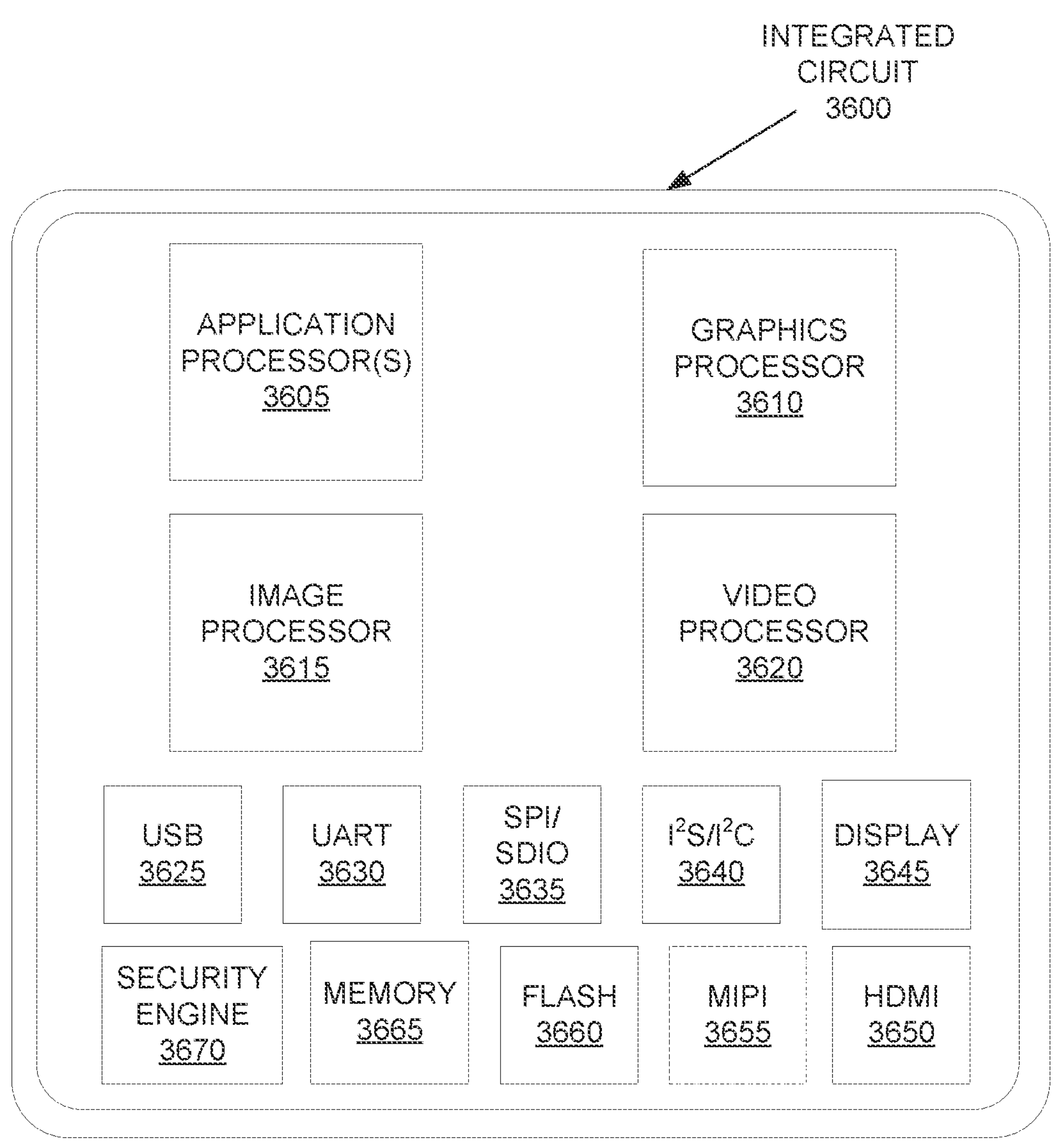
FIG. 36 illustrates an exemplary integrated circuit, in accordance with at least one embodiment.

FIG. 36 illustrates an exemplary integrated circuit 3600, in accordance with at least one embodiment. In at least one embodiment, exemplary integrated circuit 3600 is an SoC that may be fabricated using one or more IP cores. In at least one embodiment, integrated circuit 3600 includes one or more application processor(s) 3605 (e.g., CPUs, DPUs), at least one graphics processor 3610, and may additionally include an image processor 3615 and/or a video processor 3620, any of which may be a modular IP core. In at least one embodiment, integrated circuit 3600 includes peripheral or bus logic including a USB controller 3625, a UART controller 3630, an SPI/SDIO controller 3635, and an $I^2S/I^2C$ controller 3640. In at least one embodiment, integrated circuit 3600 can include a display device 3645 coupled to one or more of a high-definition multimedia interface ("HDMI") controller 3650 and a mobile industry processor interface ("MIPI") display interface 3655. In at least one embodiment, storage may be provided by a flash memory subsystem 3660 including flash memory and a flash memory controller. In at least one embodiment, a memory interface may be provided via a memory controller 3665 for access to SDRAM or SRAM memory devices. In at least one embodiment, some integrated circuits additionally include an embedded security engine 3670.

In at least one embodiment, exemplary integrated circuit 3600 can be configured to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, exemplary integrated circuit 3600 can be configured to execute a schedule job API to receive inputs to cause an indication of computing resources to be used to by software instructions. In at least one embodiment, exemplary integrated circuit 3600 can be configured to execute a schedule job API to receive inputs to indicate a priority with which to perform instructions.

In at least one embodiment, exemplary integrated circuit 3600 can be configured to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, exemplary integrated circuit 3600 can be configured to execute a get all available profiles API to receive frequency inputs, computing resource inputs, priority inputs, processor identifiers, or some combination thereof, to identify a processor settings profile, or as otherwise described herein.

In at least one embodiment, exemplary integrated circuit 3600 can be configured to execute a schedule set specific profile on processor API to receive an indication of a processor settings profile to cause instructions to be performed by processors configured according to that processor settings profile, or as otherwise described herein.

In at least one embodiment, at least one component shown or described with respect to FIG. 36 is used to implement techniques and/or functions described in connection with FIGS. 1-33. In at least one embodiment, IC 3600 performs one or more operations of an API to identify one or more settings to be used to configure one or more processors based, at least in part, one or more characteristics of a job to be performed by the one or more processors as described in conjunction with FIG. 1, or as otherwise described herein.

Figure 37:
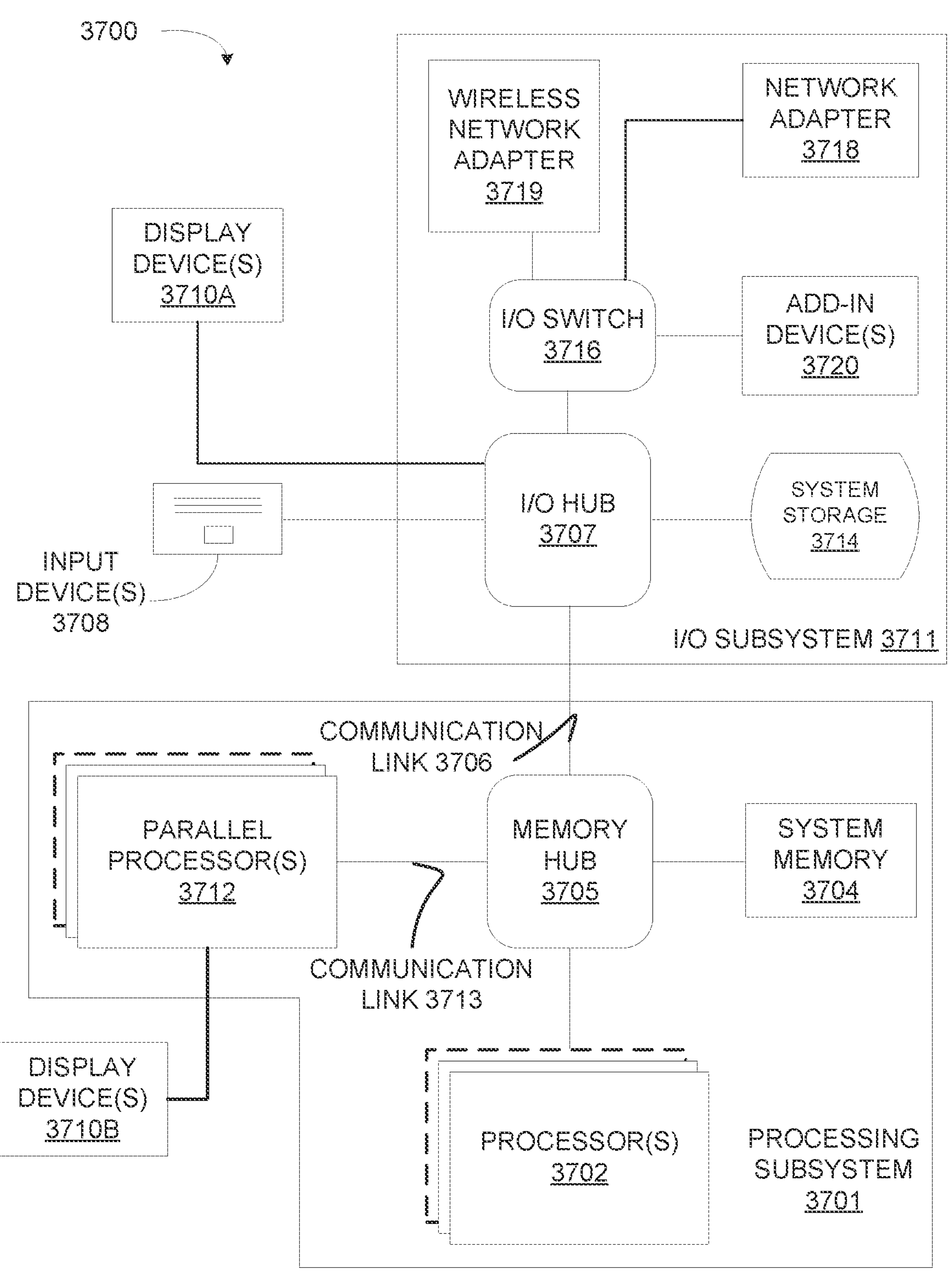
FIG. 37 illustrates a computing system, in accordance with at least one embodiment.

FIG. 37 illustrates a computing system 3700, according to at least one embodiment; In at least one embodiment, computing system 3700 includes a processing subsystem 3701 having one or more processor(s) 3702 and a system memory 3704 communicating via an interconnection path that may include a memory hub 3705. In at least one embodiment, memory hub 3705 may be a separate component within a chipset component or may be integrated within one or more processor(s) 3702. In at least one embodiment, memory hub 3705 couples with an I/O subsystem 3711 via a communication link 3706. In at least one embodiment, I/O subsystem 3711 includes an I/O hub 3707 that can enable computing system 3700 to receive input from one or more input device(s) 3708. In at least one embodiment, I/O hub 3707 can enable a display controller, which may be included in one or more processor(s) 3702, to provide outputs to one or more display device(s) 3710A. In at least one embodiment, one or more display device(s) 3710A coupled with I/O hub 3707 can include a local, internal, or embedded display device.

In at least one embodiment, computing system 3700 can be configured to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, computing system 3700 can be configured to execute a schedule job API to receive inputs to cause an indication of computing resources to be used to by software instructions. In at least one embodiment, computing system 3700 can be configured to execute a schedule job API to receive inputs to indicate a priority with which to perform instructions.

In at least one embodiment, computing system 3700 can be configured to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, computing system 3700 can be configured to execute a get all available profiles API to receive frequency inputs, computing resource inputs, priority inputs, processor identifiers, or some combination thereof, to identify a processor settings profile, or as otherwise described herein.

In at least one embodiment, computing system 3700 can be configured to execute a schedule set specific profile on processor API to receive an indication of a processor settings profile to cause instructions to be performed by processors configured according to that processor settings profile, or as otherwise described herein.

In at least one embodiment, at least one component shown or described with respect to FIG. 37 is used to implement techniques and/or functions described in connection with FIGS. 1-33. In at least one embodiment, computing system 3700 performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, processing subsystem 3701 includes one or more parallel processor(s) 3712 coupled to memory hub 3705 via a bus or other communication link 3713. In at least one embodiment, communication link 3713 may be one of any number of standards based communication link technologies or protocols, such as, but not limited to PCIe, or may be a vendor specific communications interface or communications fabric. In at least one embodiment, one or more parallel processor(s) 3712 form a computationally focused parallel or vector processing system that can include a large number of processing cores and/or processing clusters, such as a many integrated core processor or compute units. In at least one embodiment, one or more parallel processor(s) 3712 form a graphics processing subsystem that can output pixels to one of one or more display device(s) 3710A coupled via I/O Hub 3707. In at least one embodiment, one or more parallel processor(s) 3712 can also include a display controller and display interface (not shown) to enable a direct connection to one or more display device(s) 3710B.

In at least one embodiment, a system storage unit 3714 can connect to I/O hub 3707 to provide a storage mechanism for computing system 3700. In at least one embodiment, an I/O switch 3716 can be used to provide an interface mechanism to enable connections between I/O hub 3707 and other components, such as a network adapter 3718 and/or wireless network adapter 3719 that may be integrated into a platform, and various other devices that can be added via one or more add-in device(s) 3720. In at least one embodiment, network adapter 3718 can be an Ethernet adapter or another wired network adapter. In at least one embodiment, wireless network adapter 3719 can include one or more of a Wi-Fi, Bluetooth, NFC, or other network device that includes one or more wireless radios.

In at least one embodiment, computing system 3700 can include other components not explicitly shown, including USB or other port connections, optical storage drives, video capture devices, and the like, that may also be connected to I/O hub 3707. In at least one embodiment, communication paths interconnecting various components in FIG. 37 may be implemented using any suitable protocols, such as PCI based protocols (e.g., PCIe), or other bus or point-to-point communication interfaces and/or protocol(s), such as NVLink high-speed interconnect, or interconnect protocols.

In at least one embodiment, one or more parallel processor(s) 3712 incorporate circuitry optimized for graphics and video processing, including, for example, video output circuitry, and constitutes a graphics processing unit ("GPU"). In at least one embodiment, one or more parallel processor(s) 3712 incorporate circuitry optimized for general purpose processing. In at least embodiment, components of computing system 3700 may be integrated with one or more other system elements on a single integrated circuit. For example, in at least one embodiment, one or more parallel processor(s) 3712, memory hub 3705, processor(s) 3702, and I/O hub 3707 can be integrated into an SoC integrated circuit. In at least one embodiment, components of computing system 3700 can be integrated into a single package to form a system in package ("SIP") configuration. In at least one embodiment, at least a portion of the components of computing system 3700 can be integrated into a multi-chip module ("MCM"), which can be interconnected with other multi-chip modules into a modular computing system. In at least one embodiment, I/O subsystem 3711 and display devices 3710B are omitted from computing system 3700. In at least one embodiment, one or more parallel processor(s) 3712 include one or more tensor memory accelerators (TMA) units that can transfer blocks of data between global memory and shared memory. In at least one embodiment, one or more processors uses or access one or more TMAs to perform bi-directional copy operations, e.g., from global to shared memory and vice versa.

Processing Systems

The following figures set forth, without limitation, exemplary processing systems that can be used to implement at least one embodiment.

FIG. 38 illustrates an accelerated processing unit ("APU") 3800, in accordance with at least one embodiment. In at least one embodiment, APU 3800 is developed by AMD Corporation of Santa Clara, CA. In at least one embodiment, APU 3800 can be configured to execute a schedule job API to receive indications, as inputs, of a processor performance preference, job type, job priority, or some combination thereof, to cause processors to be configured to operate at a clock frequency, or as otherwise described herein. In at least one embodiment, APU 3800 can be configured to execute a schedule job API to receive inputs to cause an indication of computing resources to be used to by software instructions. In at least one embodiment, APU 3800 can be configured to execute a schedule job API to receive inputs to indicate a priority with which to perform instructions.

In at least one embodiment, APU 3800 can be configured to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, APU 3800 can be configured to execute a get all available profiles API to receive frequency inputs, computing resource inputs, priority inputs, processor identifiers, or some combination thereof, to identify a processor settings profile, or as otherwise described herein.

In at least one embodiment, APU 3800 can be configured to execute a schedule set specific profile on processor API to receive an indication of a processor settings profile to cause instructions to be performed by processors configured according to that processor settings profile, or as otherwise described herein. In at least one embodiment, APU 3800 includes, without limitation, a core complex 3810, a graphics complex 3840, fabric 3860, I/O interfaces 3870, memory controllers 3880, a display controller 3892, and a multimedia engine 3894. In at least one embodiment, APU 3800 may include, without limitation, any number of core complexes 3810, any number of graphics complexes 3850, any number of display controllers 3892, and any number of multimedia engines 3894 in any combination. For explanatory purposes, multiple instances of like objects are denoted herein with reference numbers identifying the object and parenthetical numbers identifying the instance where needed.

In at least one embodiment, at least one component shown or described with respect to FIG. 38 is used to implement techniques and/or functions described in connection with FIGS. 1-33. In at least one embodiment, APU 3800 performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, core complex 3810 is a CPU, graphics complex 3840 is a GPU, and APU 3800 is a processing unit that integrates, without limitation, 3810 and 3840 onto a single chip. In at least one embodiment, some tasks may be assigned to core complex 3810 and other tasks may be assigned to graphics complex 3840. In at least one embodiment, core complex 3810 is configured to execute main control software associated with APU 3800, such as an operating system. In at least one embodiment, core complex 3810 is the master processor of APU 3800, controlling and coordinating operations of other processors. In at least one embodiment, core complex 3810 issues commands that control the operation of graphics complex 3840. In at least one embodiment, core complex 3810 can be configured to execute host executable code derived from CUDA source code, and graphics complex 3840 can be configured to execute device executable code derived from CUDA source code.

In at least one embodiment, core complex 3810 includes, without limitation, cores 3820(1)-3820(4) and an L3 cache 3830. In at least one embodiment, core complex 3810 may include, without limitation, any number of cores 3820 and any number and type of caches in any combination. In at least one embodiment, cores 3820 are configured to execute instructions of a particular instruction set architecture ("ISA"). In at least one embodiment, each core 3820 is a CPU core. In at least one embodiment, core 3820 is referred to as a computing unit or compute unit.

In at least one embodiment, each core 3820 includes, without limitation, a fetch/decode unit 3822, an integer execution engine 3824, a floating point execution engine 3826, and an L2 cache 3828. In at least one embodiment, fetch/decode unit 3822 fetches instructions, decodes such instructions, generates micro-operations, and dispatches separate micro-instructions to integer execution engine 3824 and floating point execution engine 3826. In at least one embodiment, fetch/decode unit 3822 can concurrently dispatch one micro-instruction to integer execution engine 3824 and another micro-instruction to floating point execution engine 3826. In at least one embodiment, integer execution engine 3824 executes, without limitation, integer and memory operations. In at least one embodiment, floating point engine 3826 executes, without limitation, floating point and vector operations. In at least one embodiment, fetch-decode unit 3822 dispatches micro-instructions to a single execution engine that replaces both integer execution engine 3824 and floating point execution engine 3826.

In at least one embodiment, each core 3820(*i*), where i is an integer representing a particular instance of core 3820, may access L2 cache 3828(*i*) included in core 3820(*i*). In at least one embodiment, each core 3820 included in core complex 3810(*j*), where j is an integer representing a particular instance of core complex 3810, is connected to other cores 3820 included in core complex 3810(*j*) via L3 cache 3830(*j*) included in core complex 3810(*j*). In at least one embodiment, cores 3820 included in core complex 3810(*j*), where j is an integer representing a particular instance of core complex 3810, can access all of L3 cache 3830(*j*) included in core complex 3810(*j*). In at least one embodiment, L3 cache 3830 may include, without limitation, any number of slices.

In at least one embodiment, graphics complex 3840 can be configured to perform compute operations in a highly-parallel fashion. In at least one embodiment, graphics complex 3840 is configured to execute graphics pipeline operations such as draw commands, pixel operations, geometric computations, and other operations associated with rendering an image to a display. In at least one embodiment, graphics complex 3840 is configured to execute operations unrelated to graphics. In at least one embodiment, graphics complex 3840 is configured to execute both operations related to graphics and operations unrelated to graphics.

In at least one embodiment, graphics complex 3840 includes, without limitation, any number of compute units 3850 and an L2 cache 3842. In at least one embodiment, compute units 3850 share L2 cache 3842. In at least one embodiment, L2 cache 3842 is partitioned. In at least one embodiment, graphics complex 3840 includes, without limitation, any number of compute units 3850 and any number (including zero) and type of caches. In at least one embodiment, graphics complex 3840 includes, without limitation, any amount of dedicated graphics hardware.

In at least one embodiment, each compute unit 3850 includes, without limitation, any number of SIMD units 3852 and a shared memory 3854. In at least one embodiment, each SIMD unit 3852 implements a SIMD architecture and is configured to perform operations in parallel. In at least one embodiment, each compute unit 3850 may execute any number of thread blocks, but each thread block executes on a single compute unit 3850. In at least one embodiment, a thread block includes, without limitation, any number of threads of execution. In at least one embodiment, a workgroup is a thread block. In at least one embodiment, each SIMD unit 3852 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 3854. In at least one embodiment, each compute unit 3850 includes one or more thread block clusters, where a thread block cluster can enable programmatic control of locality at a granularity larger than a single thread block of a single streaming multiprocessor (SM). In at least one embodiment, thread block clusters (also referred to as "clusters") enables multiple thread blocks running concurrently across streaming multiprocessors to synchronize and collaboratively fetch, exchange, or otherwise use data.

In at least one embodiment, fabric 3860 is a system interconnect that facilitates data and control transmissions across core complex 3810, graphics complex 3840, I/O interfaces 3870, memory controllers 3880, display controller 3892, and multimedia engine 3894. In at least one embodiment, APU 3800 may include, without limitation, any amount and type of system interconnect in addition to or instead of fabric 3860 that facilitates data and control transmissions across any number and type of directly or indirectly linked components that may be internal or external to APU 3800. In at least one embodiment, I/O interfaces 3870 are representative of any number and type of I/O interfaces (e.g., PCI, PCI-Extended ("PCI-X"), PCIe, gigabit Ethernet ("GBE"), USB, etc.). In at least one embodiment, various types of peripheral devices are coupled to I/O interfaces 3870. In at least one embodiment, peripheral devices that are coupled to I/O interfaces 3870 may include, without limitation, keyboards, mice, printers, scanners, joysticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 3894 includes, without limitation, any amount and type of circuitry that is related to multimedia, such as a video decoder, a video encoder, an image signal processor, etc. In at least one embodiment, memory controllers 3880 facilitate data transfers between APU 3800 and a unified system memory 3890. In at least one embodiment, core complex 3810 and graphics complex 3840 share unified system memory 3890.

In at least one embodiment, APU 3800 implements a memory subsystem that includes, without limitation, any amount and type of memory controllers 3880 and memory devices (e.g., shared memory 3854) that may be dedicated to one component or shared among multiple components. In at least one embodiment, APU 3800 implements a cache subsystem that includes, without limitation, one or more cache memories (e.g., L2 caches 3928, L3 cache 3830, and L2 cache 3842) that may each be private to or shared between any number of components (e.g., cores 3820, core complex 3810, SIMD units 3852, compute units 3850, and graphics complex 3840).

Figure 39:
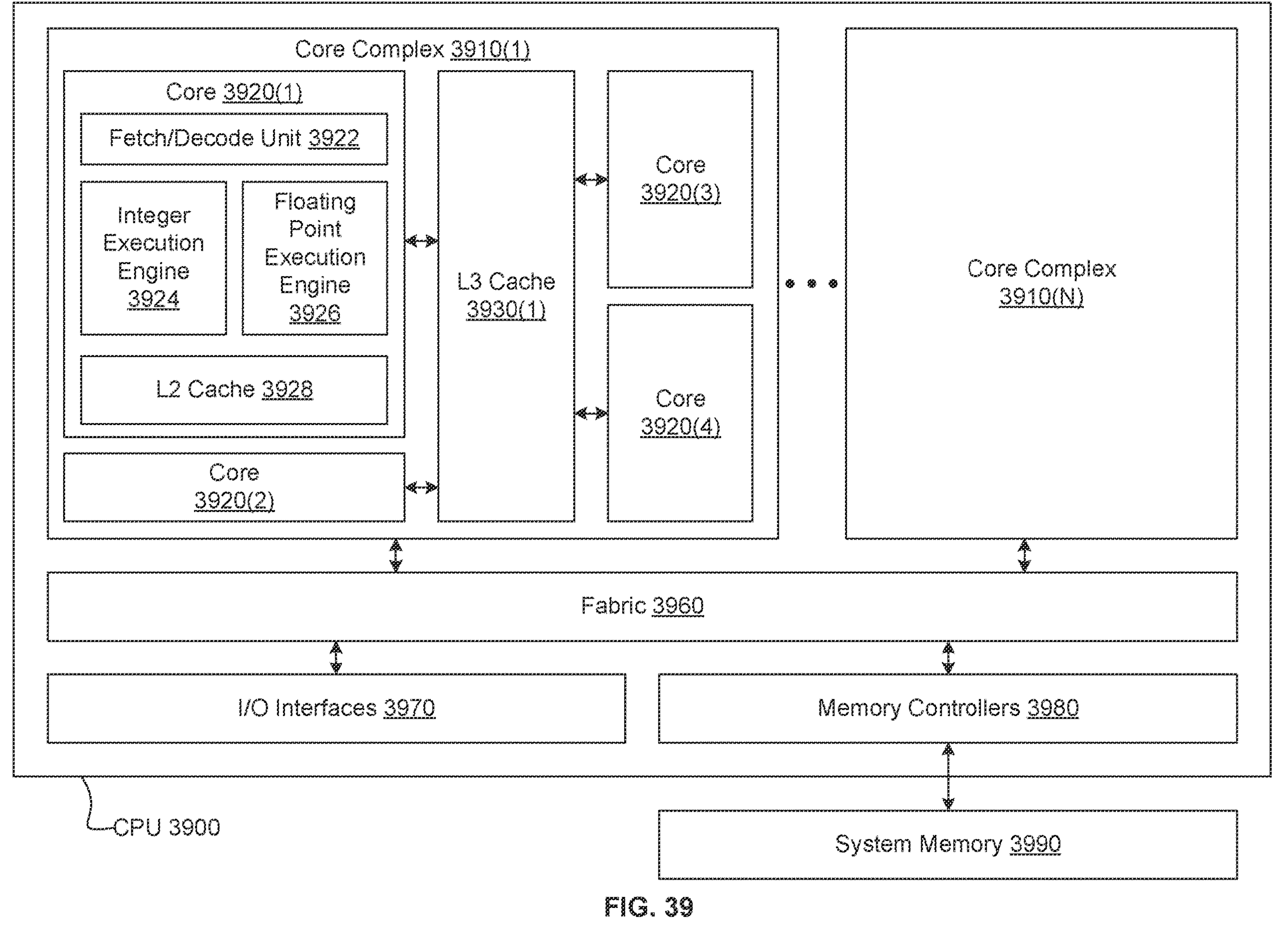
FIG. 39 illustrates a CPU, in accordance with at least one embodiment.

FIG. 39 illustrates a CPU 3900, in accordance with at least one embodiment. In at least one embodiment, CPU 3900 is developed by AMD Corporation of Santa Clara, CA. In at least one embodiment, CPU 3900 can be configured to execute an application program. In at least one embodiment, CPU 3900 is configured to execute main control software, such as an operating system. In at least one embodiment, CPU 3900 issues commands that control the operation of an external GPU (not shown). In at least one embodiment, CPU 3900 can be configured to execute host executable code derived from CUDA source code, and an external GPU can be configured to execute device executable code derived from such CUDA source code. In at least one embodiment, CPU 3900 includes, without limitation, any number of core complexes 3910, fabric 3960, I/O interfaces 3970, and memory controllers 3980.

In at least one embodiment, CPU 3900 can be configured to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, CPU 3900 can be configured to execute a schedule job API to receive inputs to cause an indication of computing resources to be used to by software instructions. In at least one embodiment, CPU 3900 can be configured to execute a schedule job API to receive inputs to indicate a priority with which to perform instructions.

In at least one embodiment, CPU 3900 can be configured to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, CPU 3900 can be configured to execute a get all available profiles API to receive frequency inputs, computing resource inputs, priority inputs, processor identifiers, or some combination thereof, to identify a processor settings profile, or as otherwise described herein.

In at least one embodiment, CPU 3900 can be configured to execute a schedule set specific profile on processor API to receive an indication of a processor settings profile to cause instructions to be performed by processors configured according to that processor settings profile, or as otherwise described herein.

In at least one embodiment, at least one component shown or described with respect to FIG. 39 is used to implement techniques and/or functions described in connection with FIGS. 1-33. In at least one embodiment, CPU 3900 performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, core complex 3910 includes, without limitation, cores 3920(1)-3920(4) and an L3 cache 3930. In at least one embodiment, core complex 3910 may include, without limitation, any number of cores 3920 and any number and type of caches in any combination. In at least one embodiment, cores 3920 are configured to execute instructions of a particular ISA. In at least one embodiment, each core 3920 is a CPU core.

In at least one embodiment, each core 3920 includes, without limitation, a fetch/decode unit 3922, an integer execution engine 3924, a floating point execution engine 3926, and an L2 cache 3928. In at least one embodiment, fetch/decode unit 3922 fetches instructions, decodes such instructions, generates micro-operations, and dispatches separate micro-instructions to integer execution engine 3924 and floating point execution engine 3926. In at least one embodiment, fetch/decode unit 3922 can concurrently dispatch one micro-instruction to integer execution engine 3924 and another micro-instruction to floating point execution engine 3926. In at least one embodiment, integer execution engine 3924 executes, without limitation, integer and memory operations. In at least one embodiment, floating point engine 3926 executes, without limitation, floating point and vector operations. In at least one embodiment, fetch-decode unit 3922 dispatches micro-instructions to a single execution engine that replaces both integer execution engine 3924 and floating point execution engine 3926.

In at least one embodiment, each core 3920(*i*), where i is an integer representing a particular instance of core 3920, may access L2 cache 3928(*i*) included in core 3920(*i*). In at least one embodiment, each core 3920 included in core complex 3910(*j*), where j is an integer representing a particular instance of core complex 3910, is connected to other cores 3920 in core complex 3910(*j*) via L3 cache 3930(*j*) included in core complex 3910(*j*). In at least one embodiment, cores 3920 included in core complex 3910(*j*), where j is an integer representing a particular instance of core complex 3910, can access all of L3 cache 3930(*j*) included in core complex 3910(*j*). In at least one embodiment, L3 cache 3930 may include, without limitation, any number of slices.

In at least one embodiment, fabric 3960 is a system interconnect that facilitates data and control transmissions across core complexes 3910(1)-3910(N) (where N is an integer greater than zero), I/O interfaces 3970, and memory controllers 3980. In at least one embodiment, CPU 3900 may include, without limitation, any amount and type of system interconnect in addition to or instead of fabric 3960 that facilitates data and control transmissions across any number and type of directly or indirectly linked components that may be internal or external to CPU 3900. In at least one embodiment, I/O interfaces 3970 are representative of any number and type of I/O interfaces (e.g., PCI, PCI-X, PCIe, GBE, USB, etc.). In at least one embodiment, various types of peripheral devices are coupled to I/O interfaces 3970 In at least one embodiment, peripheral devices that are coupled to I/O interfaces 3970 may include, without limitation, displays, keyboards, mice, printers, scanners, joysticks or other types of game controllers, media recording devices, external storage devices, network interface cards, and so forth.

In at least one embodiment, memory controllers 3980 facilitate data transfers between CPU 3900 and a system memory 3990. In at least one embodiment, core complex 3910 and graphics complex 3940 share system memory 3990. In at least one embodiment, CPU 3900 implements a memory subsystem that includes, without limitation, any amount and type of memory controllers 3980 and memory devices that may be dedicated to one component or shared among multiple components. In at least one embodiment, CPU 3900 implements a cache subsystem that includes, without limitation, one or more cache memories (e.g., L2 caches 3928 and L3 caches 3930) that may each be private to or shared between any number of components (e.g., cores 3920 and core complexes 3910).

Figure 40:
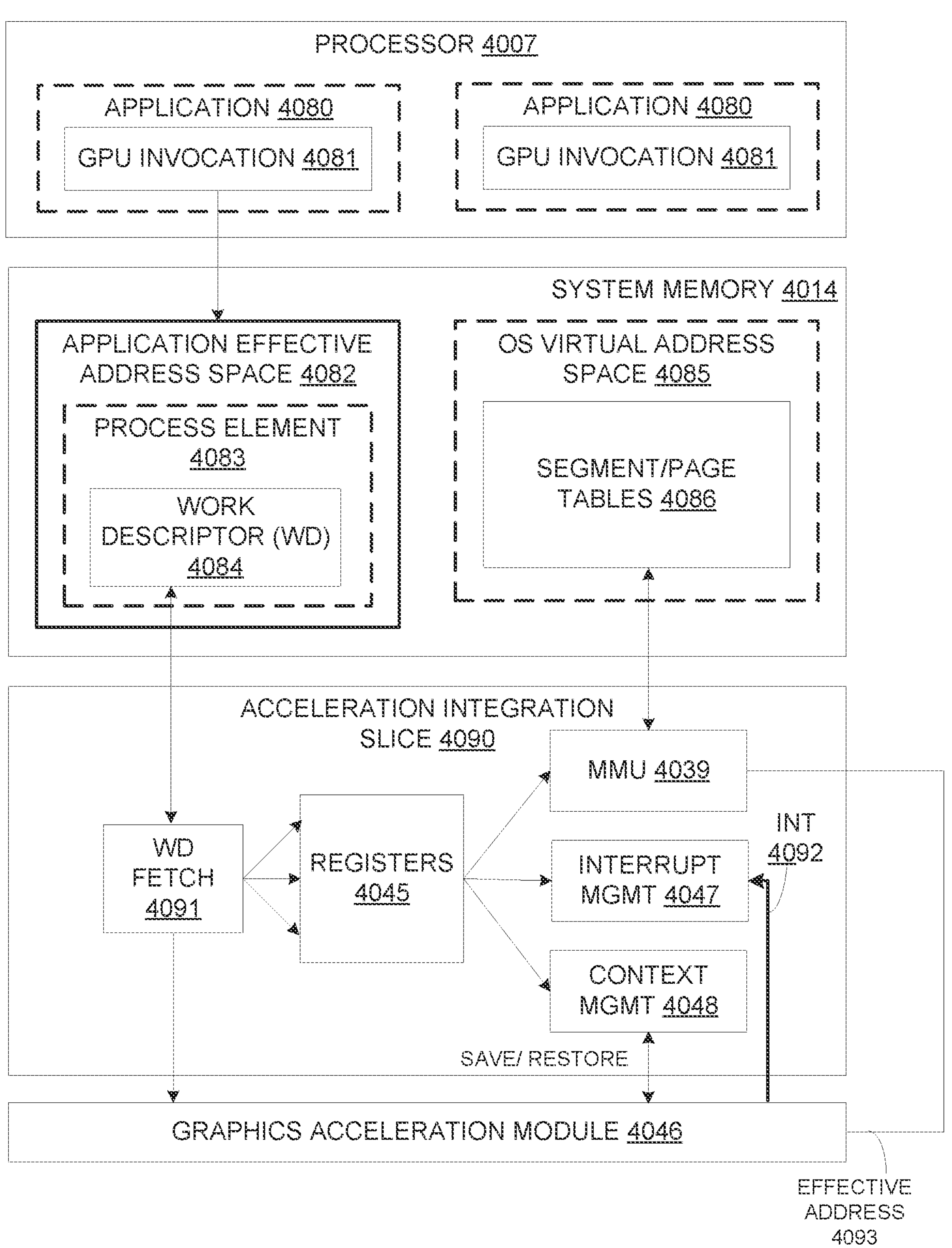
FIG. 40 illustrates an exemplary accelerator integration slice, in accordance with at least one embodiment.

FIG. 40 illustrates an exemplary accelerator integration slice 4090, in accordance with at least one embodiment. As used herein, a "slice" comprises a specified portion of processing resources of an accelerator integration circuit. In at least one embodiment, the accelerator integration circuit provides cache management, memory access, context management, and interrupt management services on behalf of multiple graphics processing engines included in a graphics acceleration module. The graphics processing engines may each comprise a separate GPU. Alternatively, the graphics processing engines may comprise different types of graphics processing engines within a GPU such as graphics execution units, media processing engines (e.g., video encoders/decoders), samplers, and blit engines. In at least one embodiment, the graphics acceleration module may be a GPU with multiple graphics processing engines. In at least one embodiment, the graphics processing engines may be individual GPUs integrated on a common package, line card, or chip.

In at least one embodiment, exemplary accelerator integration slice 4090 can be configured to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, exemplary accelerator integration slice 4090 can be configured to execute a schedule job API to receive inputs to cause an indication of computing resources to be used to by software instructions. In at least one embodiment, exemplary accelerator integration slice 4090 can be configured to execute a schedule job API to receive inputs to indicate a priority with which to perform instructions.

In at least one embodiment, exemplary accelerator integration slice 4090 can be configured to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, exemplary accelerator integration slice 4090 can be configured to execute a get all available profiles API to receive frequency inputs, computing resource inputs, priority inputs, processor identifiers, or some combination thereof, to identify a processor settings profile, or as otherwise described herein.

In at least one embodiment, exemplary accelerator integration slice 4090 can be configured to execute a schedule set specific profile on processor API to receive an indication of a processor settings profile to cause instructions to be performed by processors configured according to that processor settings profile, or as otherwise described herein.

In at least one embodiment, at least one component shown or described with respect to FIG. 40 is used to implement techniques and/or functions described in connection with FIGS. 1-33. In at least one embodiment, accelerated integration slice 4090 performs one or more operations of an API to identify one or more settings to be used to configure one or more processors based, at least in part, one or more characteristics of a job to be performed by the one or more processors as described in conjunction with FIG. 1, or as otherwise described herein.

An application effective address space 4082 within system memory 4014 stores process elements 4083. In one embodiment, process elements 4083 are stored in response to GPU invocations 4081 from applications 4080 executed on processor 4007. A process element 4083 contains process state for corresponding application 4080. A work descriptor ("WD") 4084 contained in process element 4083 can be a single job requested by an application or may contain a pointer to a queue of jobs. In at least one embodiment, WD 4084 is a pointer to a job request queue in application effective address space 4082.

Graphics acceleration module 4046 and/or individual graphics processing engines can be shared by all or a subset of processes in a system. In at least one embodiment, an infrastructure for setting up process state and sending WD 4084 to graphics acceleration module 4046 to start a job in a virtualized environment may be included.

In at least one embodiment, a dedicated-process programming model is implementation-specific. In this model, a single process owns graphics acceleration module 4046 or an individual graphics processing engine. Because graphics acceleration module 4046 is owned by a single process, a hypervisor initializes an accelerator integration circuit for an owning partition and an operating system initializes accelerator integration circuit for an owning process when graphics acceleration module 4046 is assigned.

In operation, a WD fetch unit 4091 in accelerator integration slice 4090 fetches next WD 4084 which includes an indication of work to be done by one or more graphics processing engines of graphics acceleration module 4046. Data from WD 4084 may be stored in registers 4045 and used by a memory management unit ("MMU") 4039, interrupt management circuit 4047 and/or context management circuit 4048 as illustrated. For example, one embodiment of MMU 4039 includes segment/page walk circuitry for accessing segment/page tables 4086 within OS virtual address space 4085. Interrupt management circuit 4047 may process interrupt events ("INT") 4092 received from graphics acceleration module 4046. When performing graphics operations, an effective address 4093 generated by a graphics processing engine is translated to a real address by MMU 4039.

In one embodiment, a same set of registers 4045 are duplicated for each graphics processing engine and/or graphics acceleration module 4046 and may be initialized by a hypervisor or operating system. Each of these duplicated registers may be included in accelerator integration slice 4090. Exemplary registers that may be initialized by a hypervisor are shown in Table 1.

TABLE 1

| | Hypervisor Initialized Registers |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

| | Operating System Initialized Registers |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 4084 is specific to a particular graphics acceleration module 4046 and/or a particular graphics processing engine. It contains all information required by a graphics processing engine to do work or it can be a pointer to a memory location where an application has set up a command queue of work to be completed.

Figure 41A:
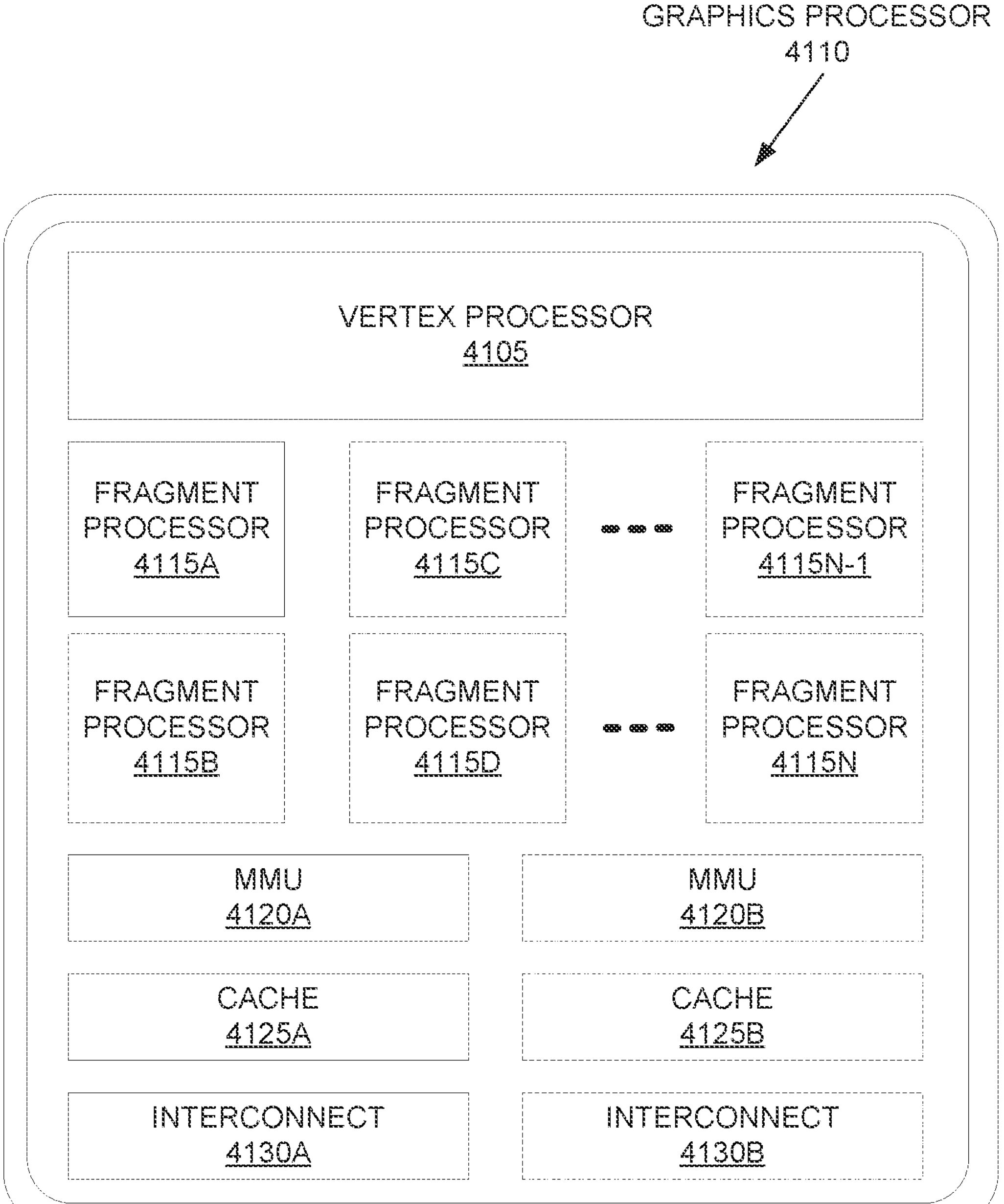
FIGS. 41A-41B illustrate exemplary graphics processors, in accordance with at least one embodiment.
Figure 41B:
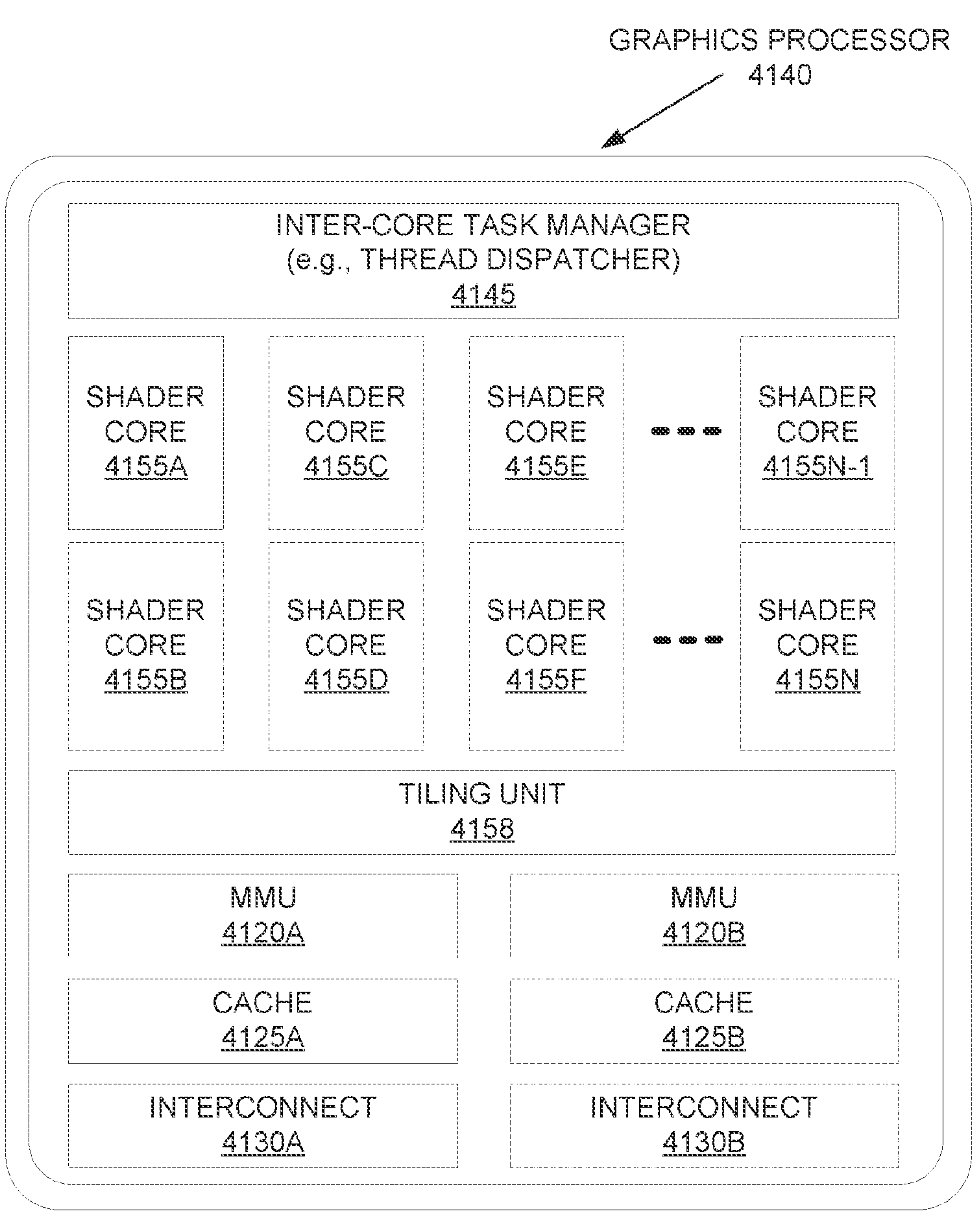

FIGS. 41A-41B illustrate exemplary graphics processors, in accordance with at least one embodiment. In at least one embodiment, any of the exemplary graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the exemplary graphics processors are for use within an SoC.

FIG. 41A illustrates an exemplary graphics processor 4110 of an SoC integrated circuit that may be fabricated using one or more IP cores, in accordance with at least one embodiment. FIG. 41B illustrates an additional exemplary graphics processor 4140 of an SoC integrated circuit that may be fabricated using one or more IP cores, in accordance with at least one embodiment. In at least one embodiment, graphics processor 4110 of FIG. 41A is a low power graphics processor core. In at least one embodiment, graphics processor 4140 of FIG. 41B is a higher performance graphics processor core. In at least one embodiment, each of graphics processors 4110, 4140 can be variants of graphics processor 3610 of FIG. 36.

In at least one embodiment, exemplary graphics processor 4110 and/or graphics processor 4140 can be configured to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, exemplary graphics processor 4110 and/or graphics processor 4140 can be configured to execute a schedule job API to receive inputs to cause an indication of computing resources to be used to by software instructions. In at least one embodiment, exemplary graphics processor 4110 and/or graphics processor 4140 can be configured to execute a schedule job API to receive inputs to indicate a priority with which to perform instructions.

In at least one embodiment, exemplary graphics processor 4110 and/or graphics processor 4140 can be configured to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, exemplary graphics processor 4110 and/or graphics processor 4140 can be configured to execute a get all available profiles API to receive frequency inputs, computing resource inputs, priority inputs, processor identifiers, or some combination thereof, to identify a processor settings profile, or as otherwise described herein.

In at least one embodiment, exemplary graphics processor 4110 and/or graphics processor 4140 can be configured to execute a schedule set specific profile on processor API to receive an indication of a processor settings profile to cause instructions to be performed by processors configured according to that processor settings profile, or as otherwise described herein.

In at least one embodiment, at least one component shown or described with respect to FIGS. 41A-41B is used to implement techniques and/or functions described in connection with FIGS. 1-33. In at least one embodiment, graphics processor 4140 performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, graphics processor 4110 includes a vertex processor 4105 and one or more fragment processor(s) 4115A-4115N (e.g., 4115A, 4115B, 4115C, 4115D, through 4115N-1, and 4115N). In at least one embodiment, graphics processor 4110 can execute different shader programs via separate logic, such that vertex processor 4105 is optimized to execute operations for vertex shader programs, while one or more fragment processor(s) 4115A-4115N execute fragment (e.g., pixel) shading operations for fragment or pixel shader programs. In at least one embodiment, vertex processor 4105 performs a vertex processing stage of a 3D graphics pipeline and generates primitives and vertex data. In at least one embodiment, fragment processor(s) 4115A-4115N use primitive and vertex data generated by vertex processor 4105 to produce a framebuffer that is displayed on a display device. In at least one embodiment, fragment processor(s) 4115A-4115N are optimized to execute fragment shader programs as provided for in an OpenGL API, which may be used to perform similar operations as a pixel shader program as provided for in a Direct 3D API.

In at least one embodiment, graphics processor 4110 additionally includes one or more MMU(s) 4120A-4120B, cache(s) 4125A-4125B, and circuit interconnect(s) 4130A-4130B. In at least one embodiment, one or more MMU(s) 4120A-4120B provide for virtual to physical address mapping for graphics processor 4110, including for vertex processor 4105 and/or fragment processor(s) 4115A-4115N, which may reference vertex or image/texture data stored in memory, in addition to vertex or image/texture data stored in one or more cache(s) 4125A-4125B. In at least one embodiment, one or more MMU(s) 4120A-4120B may be synchronized with other MMUs within a system, including one or more MMUs associated with one or more application processor(s) 3605, image processors 3615, and/or video processors 3620 of FIG. 36, such that each processor 3605-3620 can participate in a shared or unified virtual memory system. In at least one embodiment, one or more circuit interconnect(s) 4130A-4130B enable graphics processor 4110 to interface with other IP cores within an SoC, either via an internal bus of the SoC or via a direct connection.

In at least one embodiment, graphics processor 4140 includes one or more MMU(s) 4120A-4120B, caches 4125A-4125B, and circuit interconnects 4130A-4130B of graphics processor 4110 of FIG. 41A. In at least one embodiment, graphics processor 4140 includes one or more shader core(s) 4155A-4155N (e.g., 4155A, 4155B, 4155C, 4155D, 4155E, 4155F, through 4155N-1, and 4155N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 4140 includes an inter-core task manager 4145, which acts as a thread dispatcher to dispatch execution threads to one or more shader cores 4155A-4155N and a tiling unit 4158 to accelerate tiling operations for tile-based rendering, in which rendering operations for a scene are subdivided in image space, for example to exploit local spatial coherence within a scene or to optimize use of internal caches.

Figure 42A:
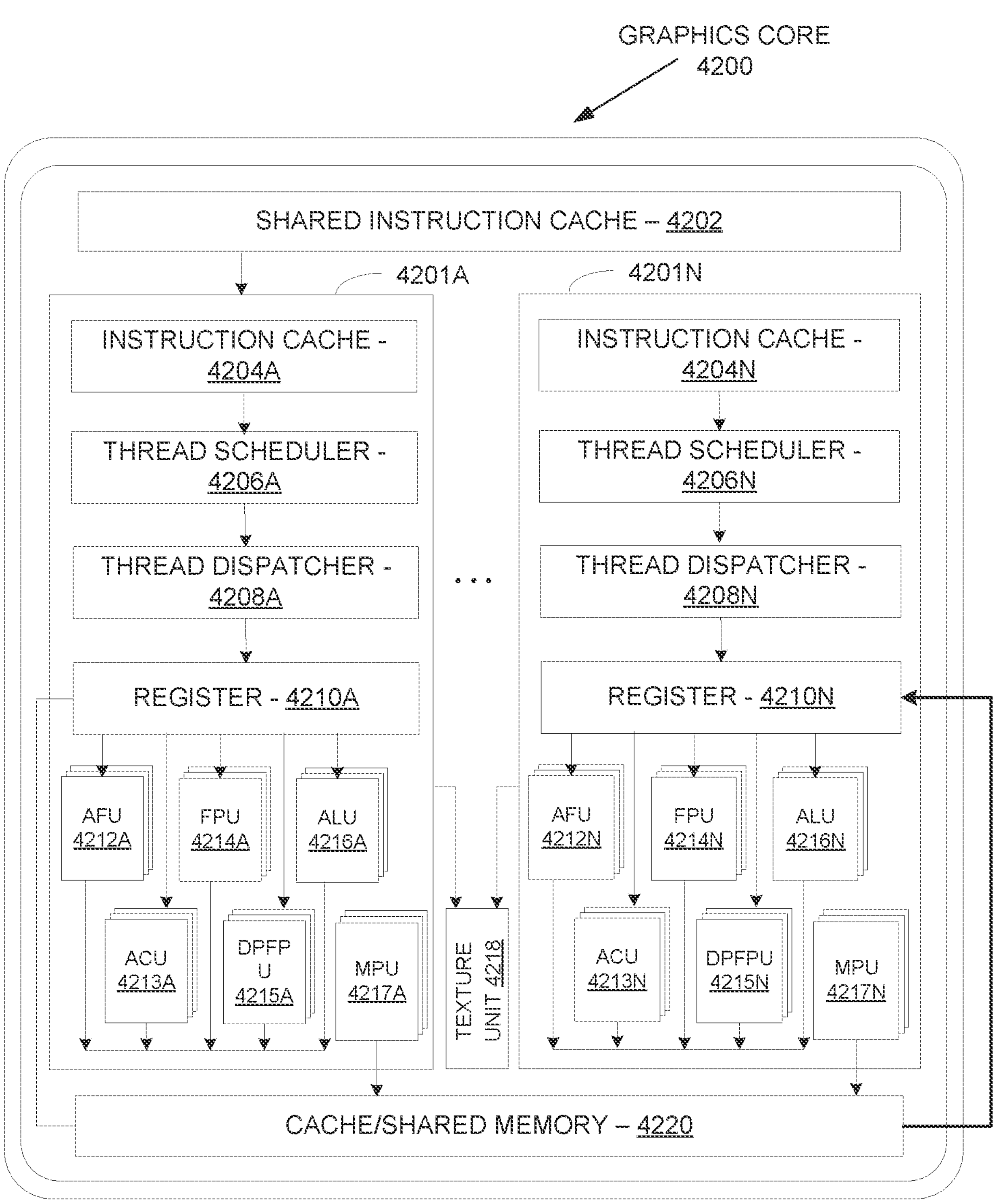
FIG. 42A illustrates a graphics core, in accordance with at least one embodiment.

FIG. 42A illustrates a graphics core 4200, in accordance with at least one embodiment. In at least one embodiment, graphics core 4200 may be included within graphics processor 3610 of FIG. 36. In at least one embodiment, graphics core 4200 may be a unified shader core 4155A-4155N as in FIG. 41B. In at least one embodiment, graphics core 4200 includes a shared instruction cache 4202, a texture unit 4218, and a cache/shared memory 4220 that are common to execution resources within graphics core 4200. In at least one embodiment, graphics core 4200 can include multiple slices 4201A-4201N or partition for each core, and a graphics processor can include multiple instances of graphics core 4200. Slices 4201A-4201N can include support logic including a local instruction cache 4204A-4204N, a thread scheduler 4206A-4206N, a thread dispatcher 4208A-4208N, and a set of registers 4210A-4210N. In at least one embodiment, slices 4201A-4201N can include a set of additional function units ("AFUs") 4212A-4212N, floating-point units ("FPUs") 4214A-4214N, integer arithmetic logic units ("ALUs") 4216-4216N, address computational units ("ACUs") 4213A-4213N, double-precision floating-point units ("DPFPUs") 4215A-4215N, and matrix processing units ("MPUs") 4217A-4217N. In at least one embodiment, a graphics core 4200 is referred to as a compute unit or computing unit.

In at least one embodiment, FPUs 4214A-4214N can perform single-precision (32-bit) and half-precision (16-bit) floating point operations, while DPFPUs 4215A-4215N perform double precision (64-bit) floating point operations. In at least one embodiment, ALUs 4216A-4216N can perform variable precision integer operations at 8-bit, 16-bit, and 32-bit precision, and can be configured for mixed precision operations. In at least one embodiment, MPUs 4217A-4217N can also be configured for mixed precision matrix operations, including half-precision floating point and 8-bit integer operations. In at least one embodiment, MPUs 4217-4217N can perform a variety of matrix operations to accelerate CUDA programs, including enabling support for accelerated general matrix to matrix multiplication ("GEMM"). In at least one embodiment, AFUs 4212A-4212N can perform additional logic operations not supported by floating-point or integer units, including trigonometric operations (e.g., Sine, Cosine, etc.).

Figure 42B:
FIG. 42B illustrates a GPGPU, in accordance with at least one embodiment.

FIG. 42B illustrates a general-purpose graphics processing unit ("GPGPU") 4230, in accordance with at least one embodiment. In at least one embodiment, GPGPU 4230 is highly-parallel and suitable for deployment on a multi-chip module. In at least one embodiment, GPGPU 4230 can be configured to enable highly-parallel compute operations to be performed by an array of GPUs. In at least one embodiment, GPGPU 4230 can be linked directly to other instances of GPGPU 4230 to create a multi-GPU cluster to improve execution time for CUDA programs. In at least one embodiment, GPGPU 4230 includes a host interface 4232 to enable a connection with a host processor. In at least one embodiment, host interface 4232 is a PCIe interface. In at least one embodiment, host interface 4232 can be a vendor specific communications interface or communications fabric. In at least one embodiment, GPGPU 4230 receives commands from a host processor and uses a global scheduler 4234 to distribute execution threads associated with those commands to a set of compute clusters 4236A-4236H. In at least one embodiment, compute clusters 4236A-4236H share a cache memory 4238. In at least one embodiment, cache memory 4238 can serve as a higher-level cache for cache memories within compute clusters 4236A-4236H.

In at least one embodiment, at least one component shown or described with respect to FIGS. 42A-42B is used to implement techniques and/or functions described in connection with FIGS. 1-33. In at least one embodiment, GPGPU 4230 performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, graphics core 4200 and/or GPGPU 4230 can be configured to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, graphics core 4200 and/or GPGPU 4230 can be configured to execute a schedule job API to receive inputs to cause an indication of computing resources to be used to by software instructions. In at least one embodiment, graphics core 4200 and/or GPGPU 4230 can be configured to execute a schedule job API to receive inputs to indicate a priority with which to perform instructions.

In at least one embodiment, graphics core 4200 and/or GPGPU 4230 can be configured to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, graphics core 4200 and/or GPGPU 4230 can be configured to execute a get all available profiles API to receive frequency inputs, computing resource inputs, priority inputs, processor identifiers, or some combination thereof, to identify a processor settings profile, or as otherwise described herein.

In at least one embodiment, graphics core 4200 and/or GPGPU 4230 can be configured to execute a schedule set specific profile on processor API to receive an indication of a processor settings profile to cause instructions to be performed by processors configured according to that processor settings profile, or as otherwise described herein.

In at least one embodiment, GPGPU 4230 includes memory 4244A-4244B coupled with compute clusters 4236A-4236H via a set of memory controllers 4242A-4242B. In at least one embodiment, memory 4244A-4244B can include various types of memory devices including DRAM or graphics random access memory, such as synchronous graphics random access memory ("SGRAM"), including graphics double data rate ("GDDR") memory.

In at least one embodiment, compute clusters 4236A-4236H each include a set of graphics cores, such as graphics core 4200 of FIG. 42A, which can include multiple types of integer and floating point logic units that can perform computational operations at a range of precisions including suited for computations associated with CUDA programs. For example, in at least one embodiment, at least a subset of floating point units in each of compute clusters 4236A-4236H can be configured to perform 16-bit or 32-bit floating point operations, while a different subset of floating point units can be configured to perform 64-bit floating point operations.

In at least one embodiment, multiple instances of GPGPU 4230 can be configured to operate as a compute cluster. Compute clusters 4236A-4236H may implement any technically feasible communication techniques for synchronization and data exchange. In at least one embodiment, multiple instances of GPGPU 4230 communicate over host interface 4232. In at least one embodiment, GPGPU 4230 includes an I/O hub 4239 that couples GPGPU 4230 with a GPU link 4240 that enables a direct connection to other instances of GPGPU 4230. In at least one embodiment, GPU link 4240 is coupled to a dedicated GPU-to-GPU bridge that enables communication and synchronization between multiple instances of GPGPU 4230. In at least one embodiment GPU link 4240 couples with a high speed interconnect to transmit and receive data to other GPGPUs 4230 or parallel processors. In at least one embodiment, multiple instances of GPGPU 4230 are located in separate data processing systems and communicate via a network device that is accessible via host interface 4232. In at least one embodiment GPU link 4240 can be configured to enable a connection to a host processor in addition to or as an alternative to host interface 4232. In at least one embodiment, GPGPU 4230 can be configured to execute a CUDA program.

FIG. 43A illustrates a parallel processor 4300, in accordance with at least one embodiment. In at least one embodiment, various components of parallel processor 4300 may be implemented using one or more integrated circuit devices, such as programmable processors, application specific integrated circuits ("ASICs"), or FPGAs.

In at least one embodiment, parallel processor 4300 includes a parallel processing unit 4302. In at least one embodiment, parallel processing unit 4302 includes an I/O unit 4304 that enables communication with other devices, including other instances of parallel processing unit 4302. In at least one embodiment, I/O unit 4304 may be directly connected to other devices. In at least one embodiment, I/O unit 4304 connects with other devices via use of a hub or switch interface, such as memory hub 4305. In at least one embodiment, connections between memory hub 4305 and I/O unit 4304 form a communication link. In at least one embodiment, I/O unit 4304 connects with a host interface 4306 and a memory crossbar 4316, where host interface 4306 receives commands directed to performing processing operations and memory crossbar 4316 receives commands directed to performing memory operations.

In at least one embodiment, when host interface 4306 receives a command buffer via I/O unit 4304, host interface 4306 can direct work operations to perform those commands to a front end 4308. In at least one embodiment, front end 4308 couples with a scheduler 4310, which is configured to distribute commands or other work items to a processing array 4312. In at least one embodiment, scheduler 4310 ensures that processing array 4312 is properly configured and in a valid state before tasks are distributed to processing array 4312. In at least one embodiment, scheduler 4310 is implemented via firmware logic executing on a microcontroller. In at least one embodiment, microcontroller implemented scheduler 4310 is configurable to perform complex scheduling and work distribution operations at coarse and fine granularity, enabling rapid preemption and context switching of threads executing on processing array 4312. In at least one embodiment, host software can prove workloads for scheduling on processing array 4312 via one of multiple graphics processing doorbells. In at least one embodiment, workloads can then be automatically distributed across processing array 4312 by scheduler 4310 logic within a microcontroller including scheduler 4310.

In at least one embodiment, processing array 4312 can include up to "N" clusters (e.g., cluster 4314A, cluster 4314B, through cluster 4314N). In at least one embodiment, each cluster 4314A-4314N of processing array 4312 can execute a large number of concurrent threads. In at least one embodiment, scheduler 4310 can allocate work to clusters 4314A-4314N of processing array 4312 using various scheduling and/or work distribution algorithms, which may vary depending on the workload arising for each type of program or computation. In at least one embodiment, scheduling can be handled dynamically by scheduler 4310, or can be assisted in part by compiler logic during compilation of program logic configured for execution by processing array 4312. In at least one embodiment, different clusters 4314A-4314N of processing array 4312 can be allocated for processing different types of programs or for performing different types of computations.

In at least one embodiment, processing array 4312 can be configured to perform various types of parallel processing operations. In at least one embodiment, processing array 4312 is configured to perform general-purpose parallel compute operations. For example, in at least one embodiment, processing array 4312 can include logic to execute processing tasks including filtering of video and/or audio data, performing modeling operations, including physics operations, and performing data transformations.

In at least one embodiment, processing array 4312 is configured to perform parallel graphics processing operations. In at least one embodiment, processing array 4312 can include additional logic to support execution of such graphics processing operations, including, but not limited to texture sampling logic to perform texture operations, as well as tessellation logic and other vertex processing logic. In at least one embodiment, processing array 4312 can be configured to execute graphics processing related shader programs such as, but not limited to vertex shaders, tessellation shaders, geometry shaders, and pixel shaders. In at least one embodiment, parallel processing unit 4302 can transfer data from system memory via I/O unit 4304 for processing. In at least one embodiment, during processing, transferred data can be stored to on-chip memory (e.g., a parallel processor memory 4322) during processing, then written back to system memory.

In at least one embodiment, when parallel processing unit 4302 is used to perform graphics processing, scheduler 4310 can be configured to divide a processing workload into approximately equal sized tasks, to better enable distribution of graphics processing operations to multiple clusters 4314A-4314N of processing array 4312. In at least one embodiment, portions of processing array 4312 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 4314A-4314N may be stored in buffers to allow intermediate data to be transmitted between clusters 4314A-4314N for further processing.

In at least one embodiment, processing array 4312 can receive processing tasks to be executed via scheduler 4310, which receives commands defining processing tasks from front end 4308. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 4310 may be configured to fetch indices corresponding to tasks or may receive indices from front end 4308. In at least one embodiment, front end 4308 can be configured to ensure processing array 4312 is configured to a valid state before a workload specified by incoming command buffers (e.g., batch-buffers, push buffers, etc.) is initiated.

In at least one embodiment, each of one or more instances of parallel processing unit 4302 can couple with parallel processor memory 4322. In at least one embodiment, parallel processor memory 4322 can be accessed via memory crossbar 4316, which can receive memory requests from processing array 4312 as well as I/O unit 4304. In at least one embodiment, memory crossbar 4316 can access parallel processor memory 4322 via a memory interface 4318. In at least one embodiment, memory interface 4318 can include multiple partition units (e.g., a partition unit 4320A, partition unit 4320B, through partition unit 4320N) that can each couple to a portion (e.g., memory unit) of parallel processor memory 4322. In at least one embodiment, a number of partition units 4320A-4320N is configured to be equal to a number of memory units, such that a first partition unit 4320A has a corresponding first memory unit 4324A, a second partition unit 4320B has a corresponding memory unit 4324B, and an Nth partition unit 4320N has a corresponding Nth memory unit 4324N. In at least one embodiment, a number of partition units 4320A-4320N may not be equal to a number of memory devices.

In at least one embodiment, memory units 4324A-4324N can include various types of memory devices, including DRAM or graphics random access memory, such as SGRAM, including GDDR memory. In at least one embodiment, memory units 4324A-4324N may also include 3D stacked memory, including but not limited to high bandwidth memory ("HBM"). In at least one embodiment, render targets, such as frame buffers or texture maps may be stored across memory units 4324A-4324N, allowing partition units 4320A-4320N to write portions of each render target in parallel to efficiently use available bandwidth of parallel processor memory 4322. In at least one embodiment, a local instance of parallel processor memory 4322 may be excluded in favor of a unified memory design that utilizes system memory in conjunction with local cache memory.

In at least one embodiment, any one of clusters 4314A-4314N of processing array 4312 can process data that will be written to any of memory units 4324A-4324N within parallel processor memory 4322. In at least one embodiment, memory crossbar 4316 can be configured to transfer an output of each cluster 4314A-4314N to any partition unit 4320A-4320N or to another cluster 4314A-4314N, which can perform additional processing operations on an output. In at least one embodiment, each cluster 4314A-4314N can communicate with memory interface 4318 through memory crossbar 4316 to read from or write to various external memory devices. In at least one embodiment, memory crossbar 4316 has a connection to memory interface 4318 to communicate with I/O unit 4304, as well as a connection to a local instance of parallel processor memory 4322, enabling processing units within different clusters 4314A-4314N to communicate with system memory or other memory that is not local to parallel processing unit 4302. In at least one embodiment, memory crossbar 4316 can use virtual channels to separate traffic streams between clusters 4314A-4314N and partition units 4320A-4320N.

In at least one embodiment, multiple instances of parallel processing unit 4302 can be provided on a single add-in card, or multiple add-in cards can be interconnected. In at least one embodiment, different instances of parallel processing unit 4302 can be configured to interoperate even if different instances have different numbers of processing cores, different amounts of local parallel processor memory, and/or other configuration differences. For example, in at least one embodiment, some instances of parallel processing unit 4302 can include higher precision floating point units relative to other instances. In at least one embodiment, systems incorporating one or more instances of parallel processing unit 4302 or parallel processor 4300 can be implemented in a variety of configurations and form factors, including but not limited to desktop, laptop, or handheld personal computers, servers, workstations, game consoles, and/or embedded systems.

Figure 43B:
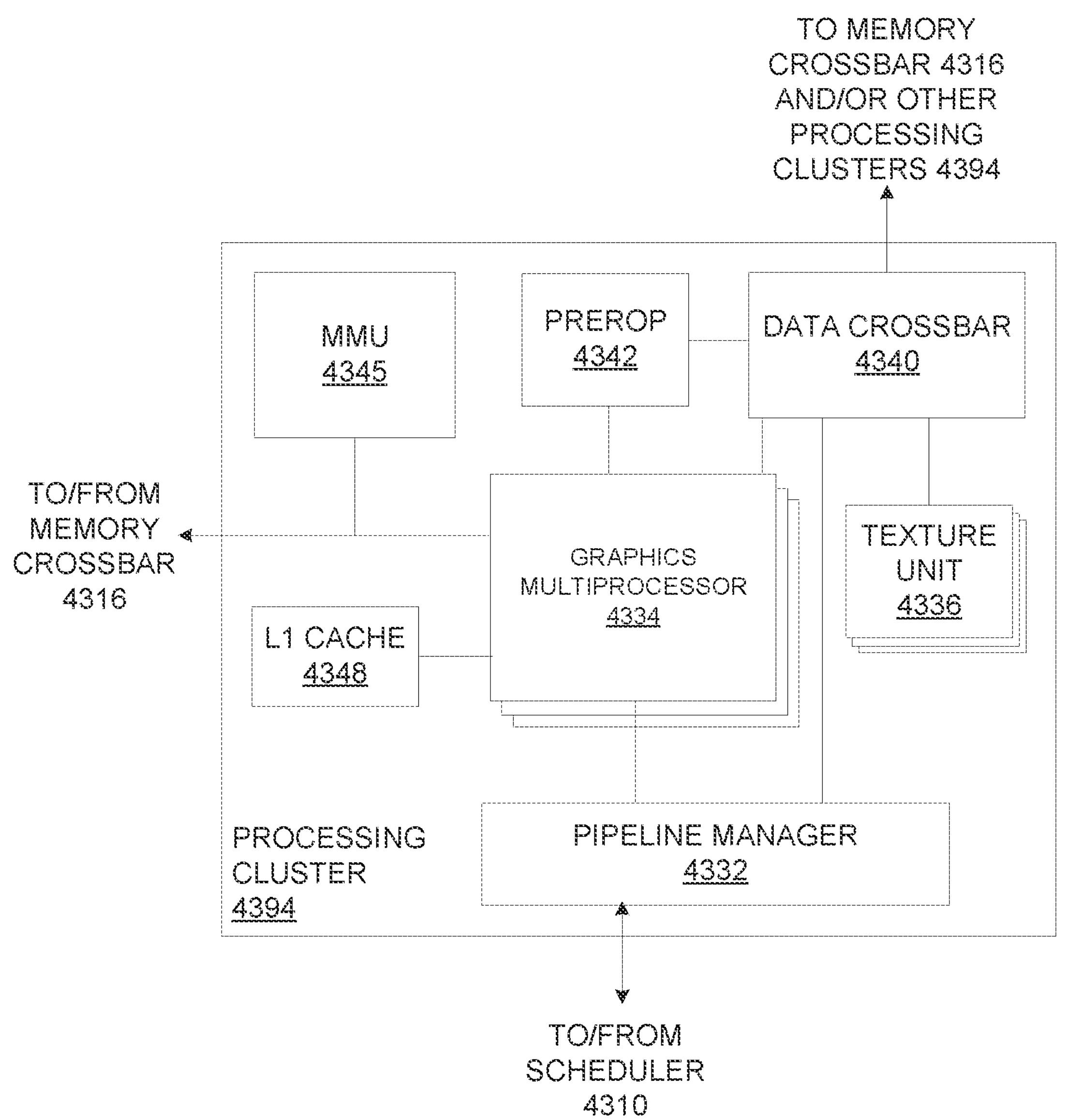
FIG. 43B illustrates a processing cluster, in accordance with at least one embodiment.

FIG. 43B illustrates a processing cluster 4394, in accordance with at least one embodiment. In at least one embodiment, processing cluster 4394 is included within a parallel processing unit. In at least one embodiment, processing cluster 4394 is one of processing clusters 4314A-4314N of FIG. 43. In at least one embodiment, processing cluster 4394 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units. In at least one embodiment, single instruction, multiple thread ("SIMT") techniques are used to support parallel execution of a large number of generally synchronized threads, using a common instruction unit configured to issue instructions to a set of processing engines within each processing cluster 4394.

In at least one embodiment, at least one component shown or described with respect to FIG. 43A-43B is used to implement techniques and/or functions described in connection with FIGS. 1-33. In at least one embodiment, processing cluster 4394 performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, parallel processor 4300 and/or processing cluster 4394 can be configured to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, parallel processor 4300 and/or processing cluster 4394 can be configured to execute a schedule job API to receive inputs to cause an indication of computing resources to be used to by software instructions. In at least one embodiment, parallel processor 4300 and/or processing cluster 4394 can be configured to execute a schedule job API to receive inputs to indicate a priority with which to perform instructions.

In at least one embodiment, parallel processor 4300 and/or processing cluster 4394 can be configured to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, parallel processor 4300 and/or processing cluster 4394 can be configured to execute a get all available profiles API to receive frequency inputs, computing resource inputs, priority inputs, processor identifiers, or some combination thereof, to identify a processor settings profile, or as otherwise described herein.

In at least one embodiment, parallel processor 4300 and/or processing cluster 4394 can be configured to execute a schedule set specific profile on processor API to receive an indication of a processor settings profile to cause instructions to be performed by processors configured according to that processor settings profile, or as otherwise described herein.

In at least one embodiment, operation of processing cluster 4394 can be controlled via a pipeline manager 4332 that distributes processing tasks to SIMT parallel processors. In at least one embodiment, pipeline manager 4332 receives instructions from scheduler 4310 of FIG. 43 and manages execution of those instructions via a graphics multiprocessor 4334 and/or a texture unit 4336. In at least one embodiment, graphics multiprocessor 4334 is an exemplary instance of a SIMT parallel processor. However, in at least one embodiment, various types of SIMT parallel processors of differing architectures may be included within processing cluster 4394. In at least one embodiment, one or more instances of graphics multiprocessor 4334 can be included within processing cluster 4394. In at least one embodiment, graphics multiprocessor 4334 can process data and a data crossbar 4340 can be used to distribute processed data to one of multiple possible destinations, including other shader units. In at least one embodiment, pipeline manager 4332 can facilitate distribution of processed data by specifying destinations for processed data to be distributed via data crossbar 4340.

In at least one embodiment, each graphics multiprocessor 4334 within processing cluster 4394 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 4394 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 4334. In at least one embodiment, a thread group may include fewer threads than a number of processing engines within graphics multiprocessor 4334. In at least one embodiment, when a thread group includes fewer threads than a number of processing engines, one or more of the processing engines may be idle during cycles in which that thread group is being processed. In at least one embodiment, a thread group may also include more threads than a number of processing engines within graphics multiprocessor 4334. In at least one embodiment, when a thread group includes more threads than the number of processing engines within graphics multiprocessor 4334, processing can be performed over consecutive clock cycles. In at least one embodiment, multiple thread groups can be executed concurrently on graphics multiprocessor 4334.

In at least one embodiment, graphics multiprocessor 4334 includes an internal cache memory to perform load and store operations. In at least one embodiment, graphics multiprocessor 4334 can forego an internal cache and use a cache memory (e.g., L1 cache 4348) within processing cluster 4394. In at least one embodiment, each graphics multiprocessor 4334 also has access to Level 2 ("L2") caches within partition units (e.g., partition units 4320A-4320N of FIG. 43A) that are shared among all processing clusters 4394 and may be used to transfer data between threads. In at least one embodiment, graphics multiprocessor 4334 may also access off-chip global memory, which can include one or more of local parallel processor memory and/or system memory. In at least one embodiment, any memory external to parallel processing unit 4302 may be used as global memory. In at least one embodiment, processing cluster 4394 includes multiple instances of graphics multiprocessor 4334 that can share common instructions and data, which may be stored in L1 cache 4348.

In at least one embodiment, each processing cluster 4394 may include an MMU 4345 that is configured to map virtual addresses into physical addresses. In at least one embodiment, one or more instances of MMU 4345 may reside within memory interface 4318 of FIG. 43. In at least one embodiment, MMU 4345 includes a set of page table entries ("PTEs") used to map a virtual address to a physical address of a tile and optionally a cache line index. In at least one embodiment, MMU 4345 may include address translation lookaside buffers ("TLBs") or caches that may reside within graphics multiprocessor 4334 or L1 cache 4348 or processing cluster 4394. In at least one embodiment, a physical address is processed to distribute surface data access locality to allow efficient request interleaving among partition units. In at least one embodiment, a cache line index may be used to determine whether a request for a cache line is a hit or miss.

In at least one embodiment, processing cluster 4394 may be configured such that each graphics multiprocessor 4334 is coupled to a texture unit 4336 for performing texture mapping operations, e.g., determining texture sample positions, reading texture data, and filtering texture data. In at least one embodiment, texture data is read from an internal texture L1 cache (not shown) or from an L1 cache within graphics multiprocessor 4334 and is fetched from an L2 cache, local parallel processor memory, or system memory, as needed. In at least one embodiment, each graphics multiprocessor 4334 outputs a processed task to data crossbar 4340 to provide the processed task to another processing cluster 4394 for further processing or to store the processed task in an L2 cache, a local parallel processor memory, or a system memory via memory crossbar 4316. In at least one embodiment, a pre-raster operations unit ("preROP") 4342 is configured to receive data from graphics multiprocessor 4334, direct data to ROP units, which may be located with partition units as described herein (e.g., partition units 4320A-4320N of FIG. 43). In at least one embodiment, PreROP 4342 can perform optimizations for color blending, organize pixel color data, and perform address translations.

Figure 43C:
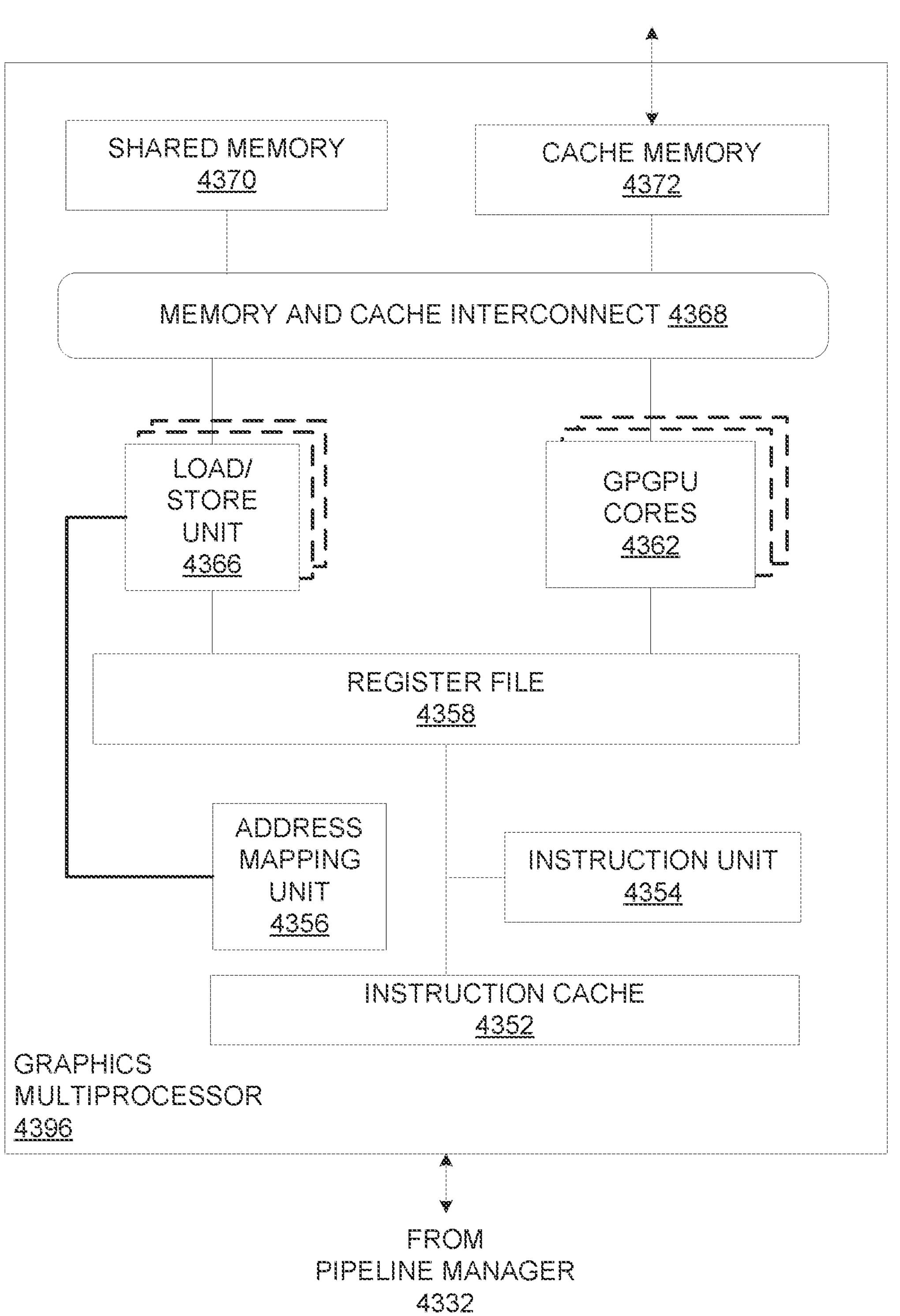
FIG. 43C illustrates a graphics multiprocessor, in accordance with at least one embodiment.

FIG. 43C illustrates a graphics multiprocessor 4396, in accordance with at least one embodiment. In at least one embodiment, graphics multiprocessor 4396 is graphics multiprocessor 4334 of FIG. 43B. In at least one embodiment, graphics multiprocessor 4396 couples with pipeline manager 4332 of processing cluster 4394. In at least one embodiment, graphics multiprocessor 4396 has an execution pipeline including but not limited to an instruction cache 4352, an instruction unit 4354, an address mapping unit 4356, a register file 4358, one or more GPGPU cores 4362, and one or more LSUs 4366. GPGPU cores 4362 and LSUs 4366 are coupled with cache memory 4372 and shared memory 4370 via a memory and cache interconnect 4368.

In at least one embodiment, graphics multiprocessor 4396 can be configured to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, graphics multiprocessor 4396 can be configured to execute a schedule job API to receive inputs to cause an indication of computing resources to be used to by software instructions. In at least one embodiment, graphics multiprocessor 4396 can be configured to execute a schedule job API to receive inputs to indicate a priority with which to perform instructions.

In at least one embodiment, graphics multiprocessor 4396 can be configured to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, graphics multiprocessor 4396 can be configured to execute a get all available profiles API to receive frequency inputs, computing resource inputs, priority inputs, processor identifiers, or some combination thereof, to identify a processor settings profile, or as otherwise described herein.

In at least one embodiment, graphics multiprocessor 4396 can be configured to execute a schedule set specific profile on processor API to receive an indication of a processor settings profile to cause instructions to be performed by processors configured according to that processor settings profile, or as otherwise described herein.

In at least one embodiment, instruction cache 4352 receives a stream of instructions to execute from pipeline manager 4332. In at least one embodiment, instructions are cached in instruction cache 4352 and dispatched for execution by instruction unit 4354. In at least one embodiment, instruction unit 4354 can dispatch instructions as thread groups (e.g., warps), with each thread of a thread group assigned to a different execution unit within GPGPU core 4362. In at least one embodiment, an instruction can access any of a local, shared, or global address space by specifying an address within a unified address space. In at least one embodiment, address mapping unit 4356 can be used to translate addresses in a unified address space into a distinct memory address that can be accessed by LSUs 4366.

In at least one embodiment, register file 4358 provides a set of registers for functional units of graphics multiprocessor 4396. In at least one embodiment, register file 4358 provides temporary storage for operands connected to data paths of functional units (e.g., GPGPU cores 4362, LSUs 4366) of graphics multiprocessor 4396. In at least one embodiment, register file 4358 is divided between each of functional units such that each functional unit is allocated a dedicated portion of register file 4358. In at least one embodiment, register file 4358 is divided between different thread groups being executed by graphics multiprocessor 4396.

In at least one embodiment, GPGPU cores 4362 can each include FPUs and/or integer ALUs that are used to execute instructions of graphics multiprocessor 4396. GPGPU cores 4362 can be similar in architecture or can differ in architecture. In at least one embodiment, a first portion of GPGPU cores 4362 include a single precision FPU and an integer ALU while a second portion of GPGPU cores 4362 include a double precision FPU. In at least one embodiment, FPUs can implement IEEE 754-2008 standard for floating point arithmetic or enable variable precision floating point arithmetic. In at least one embodiment, graphics multiprocessor 4396 can additionally include one or more fixed function or special function units to perform specific functions such as copy rectangle or pixel blending operations. In at least one embodiment one or more of GPGPU cores 4362 can also include fixed or special function logic.

In at least one embodiment, GPGPU cores 4362 include SIMD logic capable of performing a single instruction on multiple sets of data. In at least one embodiment GPGPU cores 4362 can physically execute SIMD4, SIMD8, and SIMD16 instructions and logically execute SIMD1, SIMD2, and SIMD32 instructions. In at least one embodiment, SIMD instructions for GPGPU cores 4362 can be generated at compile time by a shader compiler or automatically generated when executing programs written and compiled for single program multiple data ("SPMD") or SIMT architectures. In at least one embodiment, multiple threads of a program configured for an SIMT execution model can executed via a single SIMD instruction. For example, in at least one embodiment, eight SIMT threads that perform the same or similar operations can be executed in parallel via a single SIMD8 logic unit.

In at least one embodiment, memory and cache interconnect 4368 is an interconnect network that connects each functional unit of graphics multiprocessor 4396 to register file 4358 and to shared memory 4370. In at least one embodiment, memory and cache interconnect 4368 is a crossbar interconnect that allows LSU 4366 to implement load and store operations between shared memory 4370 and register file 4358. In at least one embodiment, register file 4358 can operate at a same frequency as GPGPU cores 4362, thus data transfer between GPGPU cores 4362 and register file 4358 is very low latency. In at least one embodiment, shared memory 4370 can be used to enable communication between threads that execute on functional units within graphics multiprocessor 4396. In at least one embodiment, cache memory 4372 can be used as a data cache for example, to cache texture data communicated between functional units and texture unit 4336. In at least one embodiment, shared memory 4370 can also be used as a program managed cached. In at least one embodiment, threads executing on GPGPU cores 4362 can programmatically store data within shared memory in addition to automatically cached data that is stored within cache memory 4372.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on the same package or chip as cores and communicatively coupled to cores over a processor bus/interconnect that is internal to a package or a chip. In at least one embodiment, regardless of the manner in which a GPU is connected, processor cores may allocate work to the GPU in the form of sequences of commands/instructions contained in a WD. In at least one embodiment, the GPU then uses dedicated circuitry/logic for efficiently processing these commands/instructions.

Figure 44:
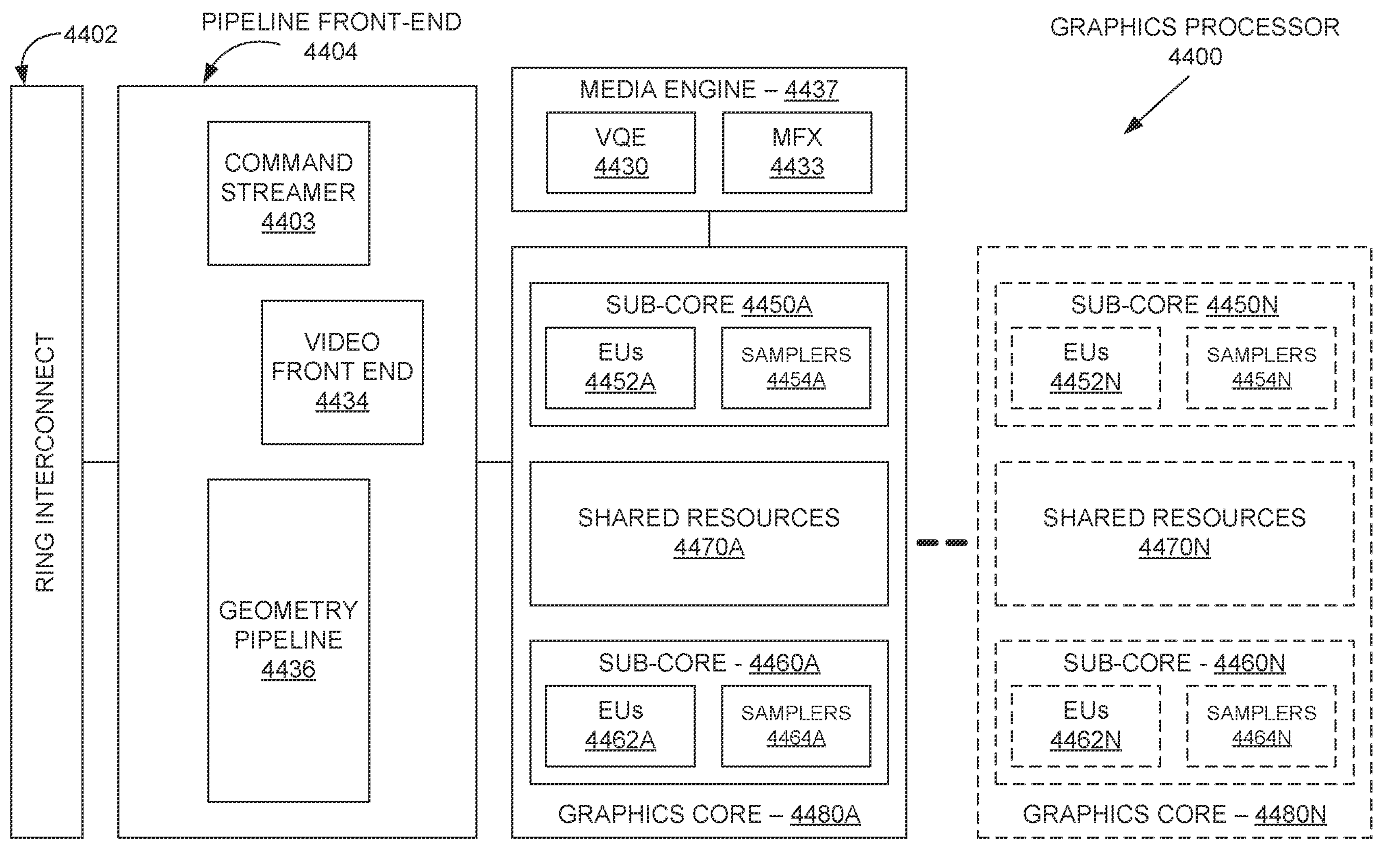
FIG. 44 illustrates a graphics processor, in accordance with at least one embodiment.

FIG. 44 illustrates a graphics processor 4400, in accordance with at least one embodiment. In at least one embodiment, graphics processor 4400 includes a ring interconnect 4402, a pipeline front-end 4404, a media engine 4437, and graphics cores 4480A-4480N. In at least one embodiment, ring interconnect 4402 couples graphics processor 4400 to other processing units, including other graphics processors or one or more general-purpose processor cores. In at least one embodiment, graphics processor 4400 is one of many processors integrated within a multi-core processing system.

In at least one embodiment, graphics processor 4400 can be configured to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, graphics processor 4400 can be configured to execute a schedule job API to receive inputs to cause an indication of computing resources to be used to by software instructions. In at least one embodiment, graphics processor 4400 can be configured to execute a schedule job API to receive inputs to indicate a priority with which to perform instructions.

In at least one embodiment, graphics processor 4400 can be configured to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, graphics processor 4400 can be configured to execute a get all available profiles API to receive frequency inputs, computing resource inputs, priority inputs, processor identifiers, or some combination thereof, to identify a processor settings profile, or as otherwise described herein.

In at least one embodiment, graphics processor 4400 can be configured to execute a schedule set specific profile on processor API to receive an indication of a processor settings profile to cause instructions to be performed by processors configured according to that processor settings profile, or as otherwise described herein.

In at least one embodiment, at least one component shown or described with respect to FIG. 44 is used to implement techniques and/or functions described in connection with FIGS. 1-33. In at least one embodiment, graphics processor 4400 performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, graphics processor 4400 receives batches of commands via ring interconnect 4402. In at least one embodiment, incoming commands are interpreted by a command streamer 4403 in pipeline front-end 4404. In at least one embodiment, graphics processor 4400 includes scalable execution logic to perform 3D geometry processing and media processing via graphics core(s) 4480A-4480N. In at least one embodiment, for 3D geometry processing commands, command streamer 4403 supplies commands to geometry pipeline 4436. In at least one embodiment, for at least some media processing commands, command streamer 4403 supplies commands to a video front end 4434, which couples with a media engine 4437. In at least one embodiment, media engine 4437 includes a Video Quality Engine ("VQE") 4430 for video and image post-processing and a multi-format encode/decode ("MFX") engine 4433 to provide hardware-accelerated media data encode and decode. In at least one embodiment, geometry pipeline 4436 and media engine 4437 each generate execution threads for thread execution resources provided by at least one graphics core 4480A.

In at least one embodiment, graphics processor 4400 includes scalable thread execution resources featuring modular graphics cores 4480A-4480N (sometimes referred to as core slices), each having multiple sub-cores 4450A-2250N, 4460A-4460N (sometimes referred to as core sub-slices). In at least one embodiment, graphics processor 4400 can have any number of graphics cores 4480A through 4480N. In at least one embodiment, graphics processor 4400 includes a graphics core 4480A having at least a first sub-core 4450A and a second sub-core 4460A. In at least one embodiment, graphics processor 4400 is a low power processor with a single sub-core (e.g., sub-core 4450A). In at least one embodiment, graphics processor 4400 includes multiple graphics cores 4480A-4480N, each including a set of first sub-cores 4450A-4450N and a set of second sub-cores 4460A-4460N. In at least one embodiment, each sub-core in first sub-cores 4450A-4450N includes at least a first set of execution units ("EUs") 4452A-4452N and media/texture samplers 4454A-4454N. In at least one embodiment, each sub-core in second sub-cores 4460A-4460N includes at least a second set of execution units 4462A-4462N and samplers 4464A-4464N. In at least one embodiment, each sub-core 4450A-4450N, 4460A-4460N shares a set of shared resources 4470A-4470N. In at least one embodiment, shared resources 4470 include shared cache memory and pixel operation logic.

Figure 45:
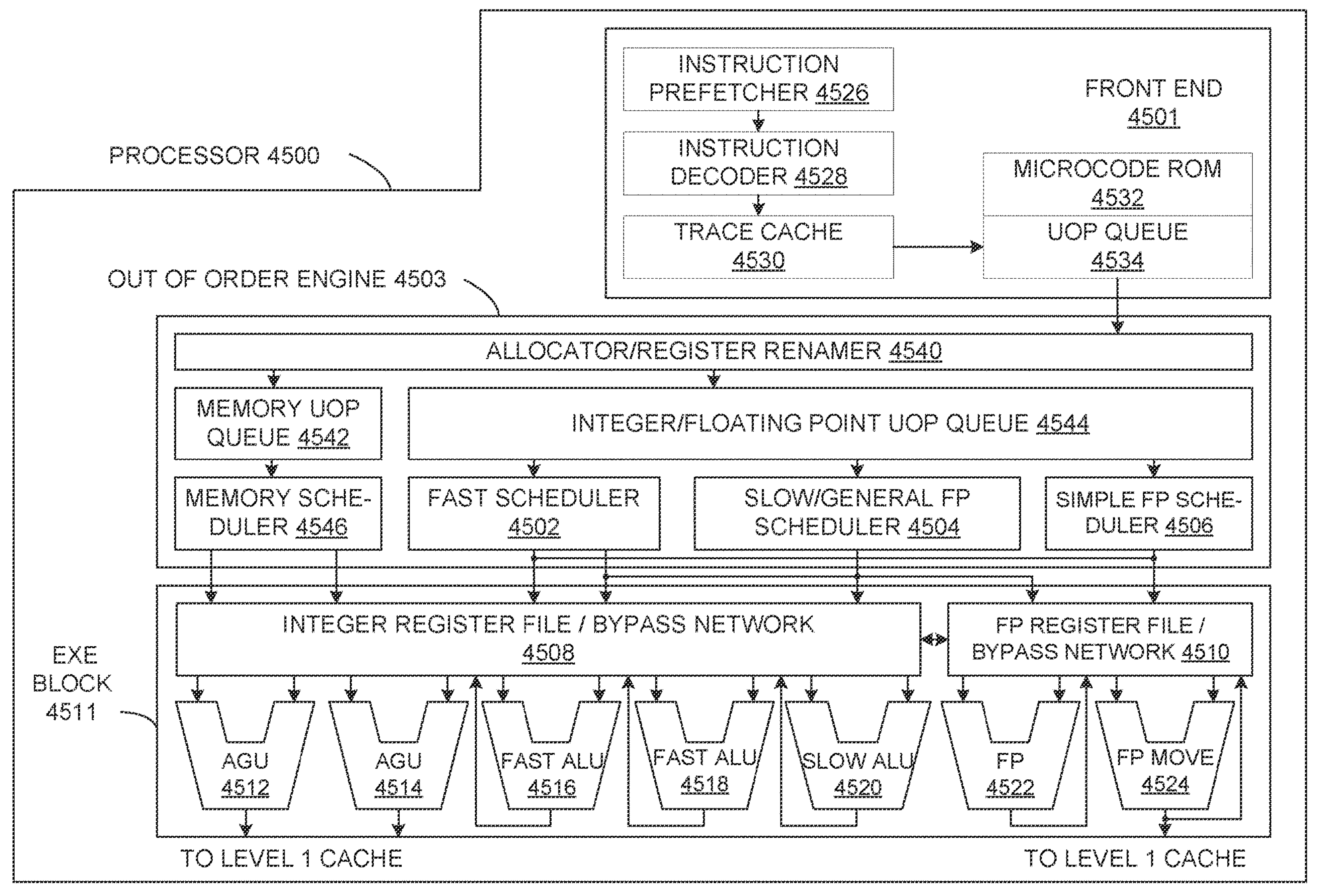
FIG. 45 illustrates a processor, in accordance with at least one embodiment.

FIG. 45 illustrates a processor 4500, in accordance with at least one embodiment. In at least one embodiment, processor 4500 may include, without limitation, logic circuits to perform instructions. In at least one embodiment, processor 4500 may perform instructions, including x86 instructions, ARM instructions, specialized instructions for ASICs, etc. In at least one embodiment, processor 4510 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany SIMD and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 4510 may perform instructions to accelerate CUDA programs.

In at least one embodiment, processor 4500 can be configured to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, processor 4500 can be configured to execute a schedule job API to receive inputs to cause an indication of computing resources to be used to by software instructions. In at least one embodiment, processor 4500 can be configured to execute a schedule job API to receive inputs to indicate a priority with which to perform instructions.

In at least one embodiment, processor 4500 can be configured to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, processor 4500 can be configured to execute a get all available profiles API to receive frequency inputs, computing resource inputs, priority inputs, processor identifiers, or some combination thereof, to identify a processor settings profile, or as otherwise described herein.

In at least one embodiment, processor 4500 can be configured to execute a schedule set specific profile on processor API to receive an indication of a processor settings profile to cause instructions to be performed by processors configured according to that processor settings profile, or as otherwise described herein.

In at least one embodiment, at least one component shown or described with respect to FIG. 45 is used to implement techniques and/or functions described in connection with FIGS. 1-33. In at least one embodiment, processor 4500 performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, processor 4500 includes an in-order front end ("front end") 4501 to fetch instructions to be executed and prepare instructions to be used later in processor pipeline. In at least one embodiment, front end 4501 may include several units. In at least one embodiment, an instruction prefetcher 4526 fetches instructions from memory and feeds instructions to an instruction decoder 4528 which in turn decodes or interprets instructions. For example, in at least one embodiment, instruction decoder 4528 decodes a received instruction into one or more operations called "micro-instructions" or "micro-operations" (also called "micro ops" or "uops") for execution. In at least one embodiment, instruction decoder 4528 parses instruction into an opcode and corresponding data and control fields that may be used by micro-architecture to perform operations. In at least one embodiment, a trace cache 4530 may assemble decoded uops into program ordered sequences or traces in a uop queue 4534 for execution. In at least one embodiment, when trace cache 4530 encounters a complex instruction, a microcode ROM 4532 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 4528 may access microcode ROM 4532 to perform instruction. In at least one embodiment, an instruction may be decoded into a small number of micro-ops for processing at instruction decoder 4528. In at least one embodiment, an instruction may be stored within microcode ROM 4532 should a number of micro-ops be needed to accomplish operation. In at least one embodiment, trace cache 4530 refers to an entry point programmable logic array ("PLA") to determine a correct micro-instruction pointer for reading microcode sequences to complete one or more instructions from microcode ROM 4532. In at least one embodiment, after microcode ROM 4532 finishes sequencing micro-ops for an instruction, front end 4501 of machine may resume fetching micro-ops from trace cache 4530.

In at least one embodiment, out-of-order execution engine ("out of order engine") 4503 may prepare instructions for execution. In at least one embodiment, out-of-order execution logic has a number of buffers to smooth out and re-order the flow of instructions to optimize performance as they go down a pipeline and get scheduled for execution. Out-of-order execution engine 4503 includes, without limitation, an allocator/register renamer 4540, a memory uop queue 4542, an integer/floating point uop queue 4544, a memory scheduler 4546, a fast scheduler 4502, a slow/general floating point scheduler ("slow/general FP scheduler") 4504, and a simple floating point scheduler ("simple FP scheduler") 4506. In at least one embodiment, fast schedule 4502, slow/general floating point scheduler 4504, and simple floating point scheduler 4506 are also collectively referred to herein as "uop schedulers 4502, 4504, 4506." Allocator/register renamer 4540 allocates machine buffers and resources that each uop needs in order to execute. In at least one embodiment, allocator/register renamer 4540 renames logic registers onto entries in a register file. In at least one embodiment, allocator/register renamer 4540 also allocates an entry for each uop in one of two uop queues, memory uop queue 4542 for memory operations and integer/floating point uop queue 4544 for non-memory operations, in front of memory scheduler 4546 and uop schedulers 4502, 4504, 4506. In at least one embodiment, uop schedulers 4502, 4504, 4506, determine when a uop is ready to execute based on readiness of their dependent input register operand sources and availability of execution resources uops need to complete their operation. In at least one embodiment, fast scheduler 4502 of at least one embodiment may schedule on each half of main clock cycle while slow/general floating point scheduler 4504 and simple floating point scheduler 4506 may schedule once per main processor clock cycle. In at least one embodiment, uop schedulers 4502, 4504, 4506 arbitrate for dispatch ports to schedule uops for execution.

In at least one embodiment, execution block 4511 includes, without limitation, an integer register file/bypass network 4508, a floating point register file/bypass network ("FP register file/bypass network") 4510, address generation units ("AGUs") 4512 and 4514, fast ALUs 4516 and 4518, a slow ALU 4520, a floating point ALU ("FP") 4522, and a floating point move unit ("FP move") 4524. In at least one embodiment, integer register file/bypass network 4508 and floating point register file/bypass network 4510 are also referred to herein as "register files 4508, 4510." In at least one embodiment, AGUSs 4512 and 4514, fast ALUs 4516 and 4518, slow ALU 4520, floating point ALU 4522, and floating point move unit 4524 are also referred to herein as "execution units 4512, 4514, 4516, 4518, 4520, 4522, and 4524." In at least one embodiment, an execution block may include, without limitation, any number (including zero) and type of register files, bypass networks, address generation units, and execution units, in any combination.

In at least one embodiment, register files 4508, 4510 may be arranged between uop schedulers 4502, 4504, 4506, and execution units 4512, 4514, 4516, 4518, 4520, 4522, and 4524. In at least one embodiment, integer register file/bypass network 4508 performs integer operations. In at least one embodiment, floating point register file/bypass network 4510 performs floating point operations. In at least one embodiment, each of register files 4508, 4510 may include, without limitation, a bypass network that may bypass or forward just completed results that have not yet been written into register file to new dependent uops. In at least one embodiment, register files 4508, 4510 may communicate data with each other. In at least one embodiment, integer register file/bypass network 4508 may include, without limitation, two separate register files, one register file for low-order thirty-two bits of data and a second register file for high order thirty-two bits of data. In at least one embodiment, floating point register file/bypass network 4510 may include, without limitation, 128-bit wide entries because floating point instructions typically have operands from 64 to 128 bits in width.

In at least one embodiment, execution units 4512, 4514, 4516, 4518, 4520, 4522, 4524 may execute instructions. In at least one embodiment, register files 4508, 4510 store integer and floating point data operand values that micro-instructions need to execute. In at least one embodiment, processor 4500 may include, without limitation, any number and combination of execution units 4512, 4514, 4516, 4518, 4520, 4522, 4524. In at least one embodiment, floating point ALU 4522 and floating point move unit 4524 may execute floating point, MMX, SIMD, AVX and SSE, or other operations. In at least one embodiment, floating point ALU 4522 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 4516, 4518. In at least one embodiment, fast ALUS 4516, 4518 may execute fast operations with an effective latency of half a clock cycle. In at least one embodiment, most complex integer operations go to slow ALU 4520 as slow ALU 4520 may include, without limitation, integer execution hardware for long-latency type of operations, such as a multiplier, shifts, flag logic, and branch processing. In at least one embodiment, memory load/store operations may be executed by AGUs 4512, 4514. In at least one embodiment, fast ALU 4516, fast ALU 4518, and slow ALU 4520 may perform integer operations on 64-bit data operands. In at least one embodiment, fast ALU 4516, fast ALU 4518, and slow ALU 4520 may be implemented to support a variety of data bit sizes including sixteen, thirty-two, 128, 256, etc. In at least one embodiment, floating point ALU 4522 and floating point move unit 4524 may be implemented to support a range of operands having bits of various widths. In at least one embodiment, floating point ALU 4522 and floating point move unit 4524 may operate on 128-bit wide packed data operands in conjunction with SIMD and multimedia instructions.

In at least one embodiment, uop schedulers 4502, 4504, 4506 dispatch dependent operations before parent load has finished executing. In at least one embodiment, as uops may be speculatively scheduled and executed in processor 4500, processor 4500 may also include logic to handle memory misses. In at least one embodiment, if a data load misses in a data cache, there may be dependent operations in flight in pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanisms of at least one embodiment of a processor may also be designed to catch instruction sequences for text string comparison operations.

In at least one embodiment, the term "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Figure 46:
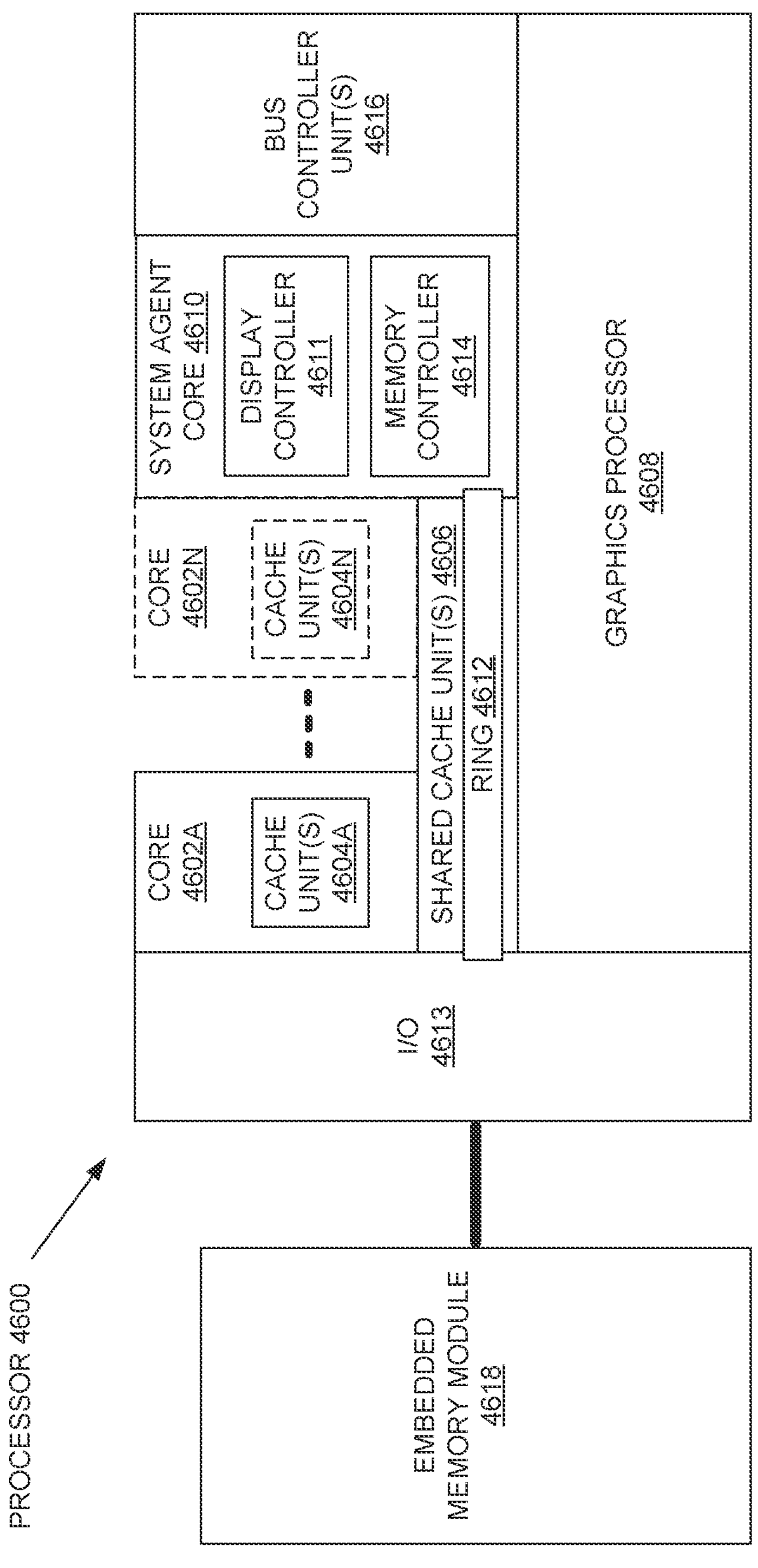
FIG. 46 illustrates a processor, in accordance with at least one embodiment.

FIG. 46 illustrates a processor 4600, in accordance with at least one embodiment. In at least one embodiment, processor 4600 includes, without limitation, one or more processor cores ("cores") 4602A-4602N, an integrated memory controller 4614, and an integrated graphics processor 4608. In at least one embodiment, processor 4600 can include additional cores up to and including additional processor core 4602N represented by dashed lined boxes. In at least one embodiment, each of processor cores 4602A-4602N includes one or more internal cache units 4604A-4604N. In at least one embodiment, each processor core also has access to one or more shared cached units 4606. In at least one embodiment, one or more processor cores 4602A-4602N are referred to as one or more compute units or computing units.

In at least one embodiment, processor 4600 can be configured to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, processor 4600 can be configured to execute a schedule job API to receive inputs to cause an indication of computing resources to be used to by software instructions. In at least one embodiment, processor 4600 can be configured to execute a schedule job API to receive inputs to indicate a priority with which to perform instructions.

In at least one embodiment, processor 4600 can be configured to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, processor 4600 can be configured to execute a get all available profiles API to receive frequency inputs, computing resource inputs, priority inputs, processor identifiers, or some combination thereof, to identify a processor settings profile, or as otherwise described herein.

In at least one embodiment, processor 4600 can be configured to execute a schedule set specific profile on processor API to receive an indication of a processor settings profile to cause instructions to be performed by processors configured according to that processor settings profile, or as otherwise described herein.

In at least one embodiment, at least one component shown or described with respect to FIG. @ 15 is used to implement techniques and/or functions described in connection with FIGS. 1-33. In at least one embodiment, processor 4600 performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, internal cache units 4604A-4604N and shared cache units 4606 represent a cache memory hierarchy within processor 4600. In at least one embodiment, cache memory units 4604A-4604N may include at least one level of instruction and data cache within each processor core and one or more levels of shared mid-level cache, such as an L2, L3, Level 4 ("L4"), or other levels of cache, where a highest level of cache before external memory is classified as an LLC. In at least one embodiment, cache coherency logic maintains coherency between various cache units 4606 and 4604A-4604N.

In at least one embodiment, processor 4600 may also include a set of one or more bus controller units 4616 and a system agent core 4610. In at least one embodiment, one or more bus controller units 4616 manage a set of peripheral buses, such as one or more PCI or PCI express buses. In at least one embodiment, system agent core 4610 provides management functionality for various processor components. In at least one embodiment, system agent core 4610 includes one or more integrated memory controllers 4614 to manage access to various external memory devices (not shown).

In at least one embodiment, one or more of processor cores 4602A-4602N include support for simultaneous multi-threading. In at least one embodiment, system agent core 4610 includes components for coordinating and operating processor cores 4602A-4602N during multi-threaded processing. In at least one embodiment, system agent core 4610 may additionally include a power control unit ("PCU"), which includes logic and components to regulate one or more power states of processor cores 4602A-4602N and graphics processor 4608.

In at least one embodiment, processor 4600 additionally includes graphics processor 4608 to execute graphics processing operations. In at least one embodiment, graphics processor 4608 couples with shared cache units 4606, and system agent core 4610, including one or more integrated memory controllers 4614. In at least one embodiment, system agent core 4610 also includes a display controller 4611 to drive graphics processor output to one or more coupled displays. In at least one embodiment, display controller 4611 may also be a separate module coupled with graphics processor 4608 via at least one interconnect, or may be integrated within graphics processor 4608.

In at least one embodiment, a ring based interconnect unit 4612 is used to couple internal components of processor 4600. In at least one embodiment, an alternative interconnect unit may be used, such as a point-to-point interconnect, a switched interconnect, or other techniques. In at least one embodiment, graphics processor 4608 couples with ring interconnect 4612 via an I/O link 4613.

In at least one embodiment, I/O link 4613 represents at least one of multiple varieties of I/O interconnects, including an on package I/O interconnect which facilitates communication between various processor components and a high-performance embedded memory module 4618, such as an eDRAM module. In at least one embodiment, each of processor cores 4602A-4602N and graphics processor 4608 use embedded memory modules 4618 as a shared LLC.

In at least one embodiment, processor cores 4602A-4602N are homogeneous cores executing a common instruction set architecture. In at least one embodiment, processor cores 4602A-4602N are heterogeneous in terms of ISA, where one or more of processor cores 4602A-4602N execute a common instruction set, while one or more other cores of processor cores 4602A-46-02N executes a subset of a common instruction set or a different instruction set. In at least one embodiment, processor cores 4602A-4602N are heterogeneous in terms of microarchitecture, where one or more cores having a relatively higher power consumption couple with one or more cores having a lower power consumption. In at least one embodiment, processor 4600 can be implemented on one or more chips or as an SoC integrated circuit.

Figure 47:
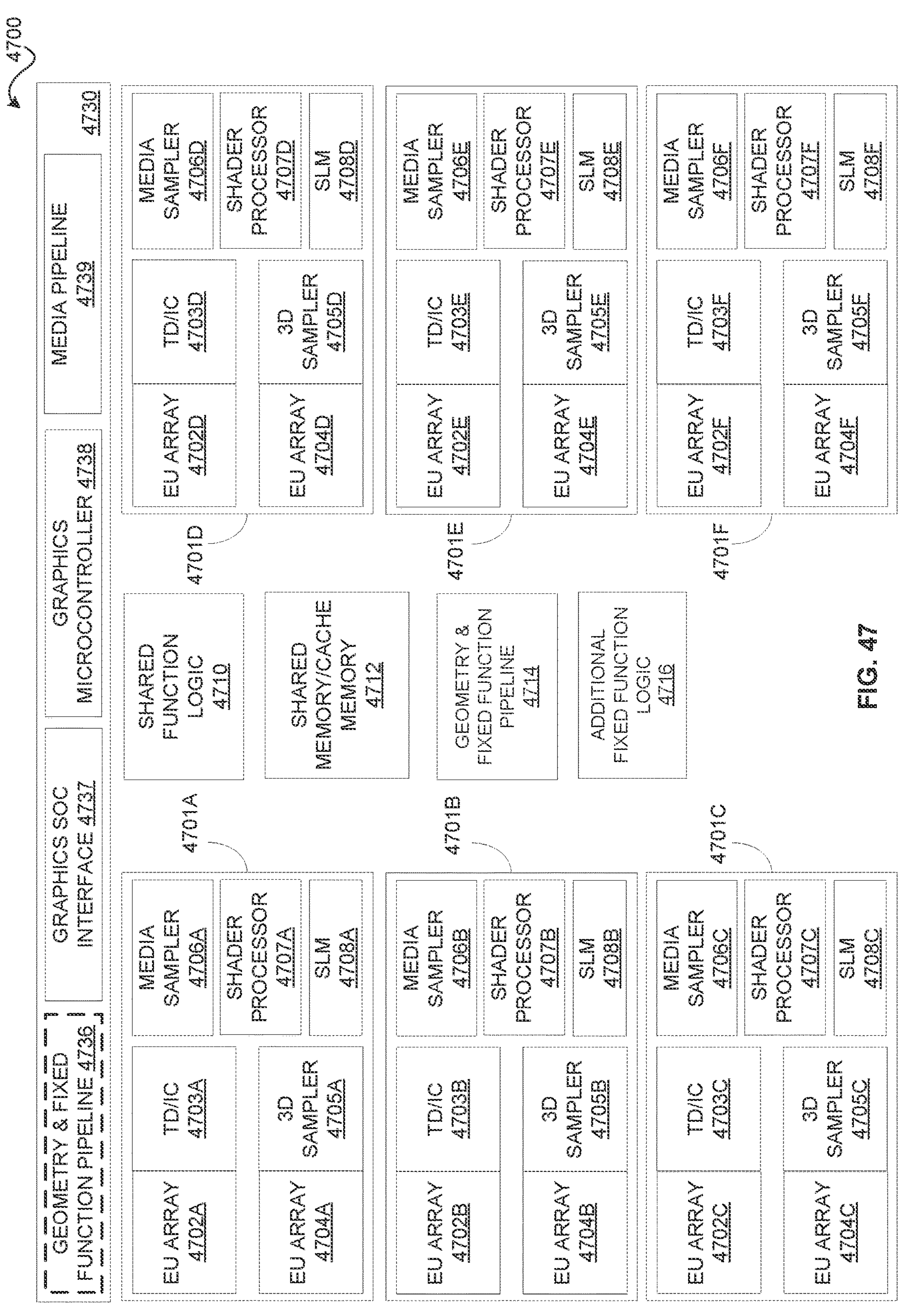
FIG. 47 illustrates a graphics processor core, in accordance with at least one embodiment.

FIG. 47 illustrates a graphics processor core 4700, in accordance with at least one embodiment described. In at least one embodiment, graphics processor core 4700 is included within a graphics core array. In at least one embodiment, graphics processor core 4700, sometimes referred to as a core slice, can be one or multiple graphics cores within a modular graphics processor. In at least one embodiment, graphics processor core 4700 is exemplary of one graphics core slice, and a graphics processor as described herein may include multiple graphics core slices based on target power and performance envelopes. In at least one embodiment, each graphics core 4700 can include a fixed function block 4730 coupled with multiple sub-cores 4701A-4701F, also referred to as sub-slices, that include modular blocks of general-purpose and fixed function logic.

In at least one embodiment, graphics core 4700 can be configured to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, graphics core 4700 can be configured to execute a schedule job API to receive inputs to cause an indication of computing resources to be used to by software instructions. In at least one embodiment, graphics core 4700 can be configured to execute a schedule job API to receive inputs to indicate a priority with which to perform instructions.

In at least one embodiment, graphics core 4700 can be configured to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, graphics core 4700 can be configured to execute a get all available profiles API to receive frequency inputs, computing resource inputs, priority inputs, processor identifiers, or some combination thereof, to identify a processor settings profile, or as otherwise described herein.

In at least one embodiment, graphics core 4700 can be configured to execute a schedule set specific profile on processor API to receive an indication of a processor settings profile to cause instructions to be performed by processors configured according to that processor settings profile, or as otherwise described herein.

In at least one embodiment, at least one component shown or described with respect to FIG. 47 is used to implement techniques and/or functions described in connection with FIGS. 1-33. In at least one embodiment, graphics core 4700 performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, fixed function block 4730 includes a geometry/fixed function pipeline 4736 that can be shared by all sub-cores in graphics processor 4700, for example, in lower performance and/or lower power graphics processor implementations. In at least one embodiment, geometry/fixed function pipeline 4736 includes a 3D fixed function pipeline, a video front-end unit, a thread spawner and thread dispatcher, and a unified return buffer manager, which manages unified return buffers.

In at least one embodiment, fixed function block 4730 also includes a graphics SoC interface 4737, a graphics microcontroller 4738, and a media pipeline 4739. Graphics SoC interface 4737 provides an interface between graphics core 4700 and other processor cores within an SoC integrated circuit. In at least one embodiment, graphics microcontroller 4738 is a programmable sub-processor that is configurable to manage various functions of graphics processor 4700, including thread dispatch, scheduling, and pre-emption. In at least one embodiment, media pipeline 4739 includes logic to facilitate decoding, encoding, preprocessing, and/or post-processing of multimedia data, including image and video data. In at least one embodiment, media pipeline 4739 implements media operations via requests to compute or sampling logic within sub-cores 4701-4701F.

In at least one embodiment, SoC interface 4737 enables graphics core 4700 to communicate with general-purpose application processor cores (e.g., CPUs) and/or other components within an SoC, including memory hierarchy elements such as a shared LLC memory, system RAM, and/or embedded on-chip or on-package DRAM. In at least one embodiment, SoC interface 4737 can also enable communication with fixed function devices within an SoC, such as camera imaging pipelines, and enables use of and/or implements global memory atomics that may be shared between graphics core 4700 and CPUs within an SoC. In at least one embodiment, SoC interface 4737 can also implement power management controls for graphics core 4700 and enable an interface between a clock domain of graphic core 4700 and other clock domains within an SoC. In at least one embodiment, SoC interface 4737 enables receipt of command buffers from a command streamer and global thread dispatcher that are configured to provide commands and instructions to each of one or more graphics cores within a graphics processor. In at least one embodiment, commands and instructions can be dispatched to media pipeline 4739, when media operations are to be performed, or a geometry and fixed function pipeline (e.g., geometry and fixed function pipeline 4736, geometry and fixed function pipeline 4714) when graphics processing operations are to be performed.

In at least one embodiment, graphics microcontroller 4738 can be configured to perform various scheduling and management tasks for graphics core 4700. In at least one embodiment, graphics microcontroller 4738 can perform graphics and/or compute workload scheduling on various graphics parallel engines within execution unit (EU) arrays 4702A-4702F, 4704A-4704F within sub-cores 4701A-4701F. In at least one embodiment, host software executing on a CPU core of an SoC including graphics core 4700 can submit workloads one of multiple graphic processor doorbells, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 4738 can also facilitate low-power or idle states for graphics core 4700, providing graphics core 4700 with an ability to save and restore registers within graphics core 4700 across low-power state transitions independently from an operating system and/or graphics driver software on a system.

In at least one embodiment, graphics core 4700 may have greater than or fewer than illustrated sub-cores 4701A-4701F, up to N modular sub-cores. For each set of N sub-cores, in at least one embodiment, graphics core 4700 can also include shared function logic 4710, shared and/or cache memory 4712, a geometry/fixed function pipeline 4714, as well as additional fixed function logic 4716 to accelerate various graphics and compute processing operations. In at least one embodiment, shared function logic 4710 can include logic units (e.g., sampler, math, and/or inter-thread communication logic) that can be shared by each N sub-cores within graphics core 4700. Shared and/or cache memory 4712 can be an LLC for N sub-cores 4701A-4701F within graphics core 4700 and can also serve as shared memory that is accessible by multiple sub-cores. In at least one embodiment, geometry/fixed function pipeline 4714 can be included instead of geometry/fixed function pipeline 4736 within fixed function block 4730 and can include same or similar logic units.

In at least one embodiment, graphics core 4700 includes additional fixed function logic 4716 that can include various fixed function acceleration logic for use by graphics core 4700. In at least one embodiment, additional fixed function logic 4716 includes an additional geometry pipeline for use in position only shading. In position-only shading, at least two geometry pipelines exist, whereas in a full geometry pipeline within geometry/fixed function pipeline 4716, 4736, and a cull pipeline, which is an additional geometry pipeline which may be included within additional fixed function logic 4716. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 4716 can execute position shaders in parallel with a main application and generally generates critical results faster than a full pipeline, as a cull pipeline fetches and shades position attribute of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 4716 can also include general purpose processing acceleration logic, such as fixed function matrix multiplication logic, for accelerating CUDA programs.

In at least one embodiment, each graphics sub-core 4701A-4701F includes a set of execution resources that may be used to perform graphics, media, and compute operations in response to requests by graphics pipeline, media pipeline, or shader programs. In at least one embodiment, graphics sub-cores 4701A-4701F include multiple EU arrays 4702A-4702F, 4704A-4704F, thread dispatch and inter-thread communication ("TD/IC") logic 4703A-4703F, a 3D (e.g., texture) sampler 4705A-4705F, a media sampler 4706A-4706F, a shader processor 4707A-4707F, and shared local memory ("SLM") 4708A-4708F. EU arrays 4702A-4702F, 4704A-4704F each include multiple execution units, which are GPGPUs capable of performing floating-point and integer/fixed-point logic operations in service of a graphics, media, or compute operation, including graphics, media, or compute shader programs. In at least one embodiment, TD/IC logic 4703A-4703F performs local thread dispatch and thread control operations for execution units within a sub-core and facilitate communication between threads executing on execution units of a sub-core. In at least one embodiment, 3D sampler 4705A-4705F can read texture or other 3D graphics related data into memory. In at least one embodiment, 3D sampler can read texture data differently based on a configured sample state and texture format associated with a given texture. In at least one embodiment, media sampler 4706A-4706F can perform similar read operations based on a type and format associated with media data. In at least one embodiment, each graphics sub-core 4701A-4701F can alternately include a unified 3D and media sampler. In at least one embodiment, threads executing on execution units within each of sub-cores 4701A-4701F can make use of shared local memory 4708A-4708F within each sub-core, to enable threads executing within a thread group to execute using a common pool of on-chip memory.

Figure 48:
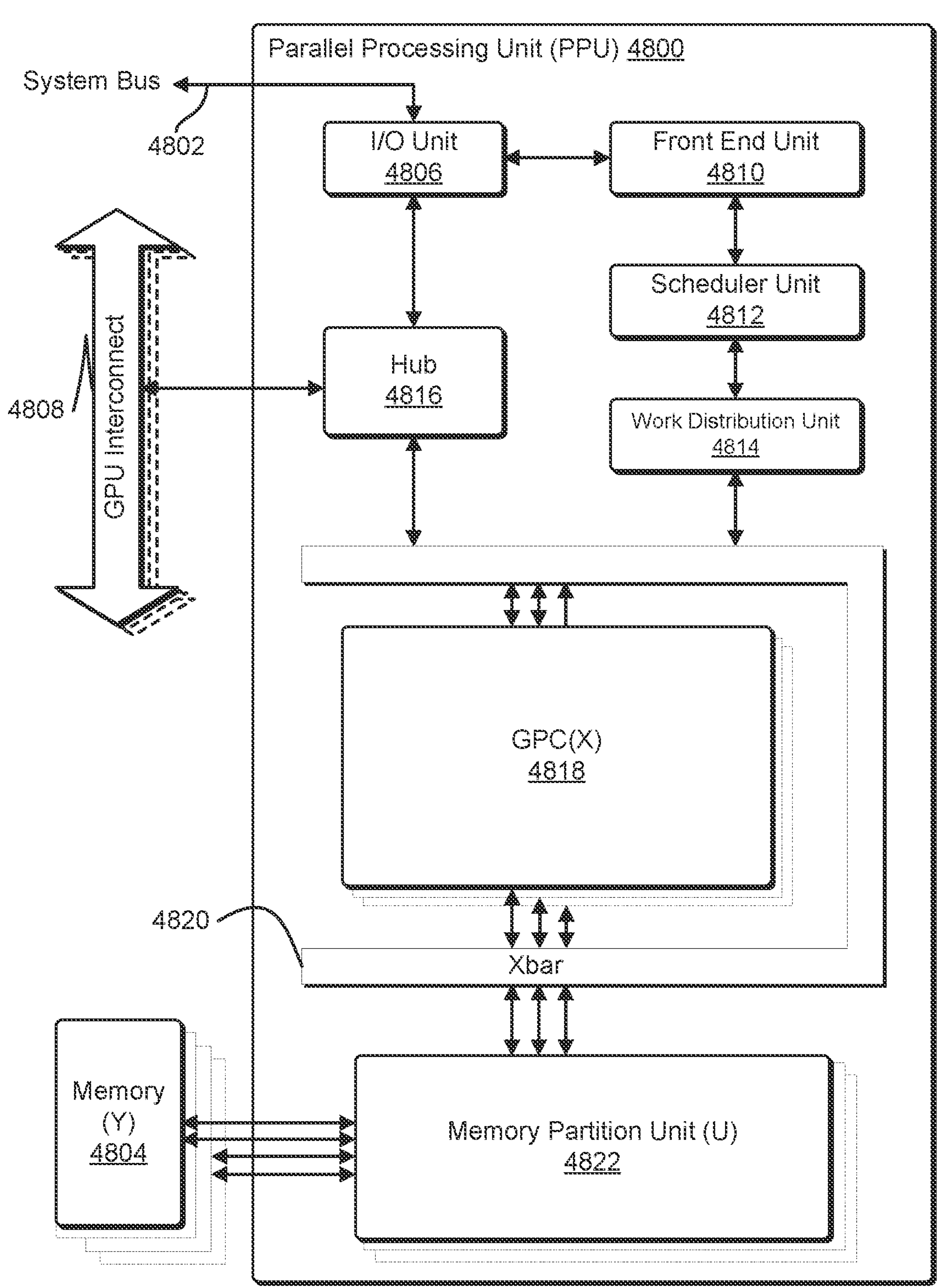
FIG. 48 illustrates a PPU, in accordance with at least one embodiment.

FIG. 48 illustrates a parallel processing unit ("PPU") 4800, in accordance with at least one embodiment. In at least one embodiment, PPU 4800 is configured with machine-readable code that, if executed by PPU 4800, causes PPU 4800 to perform some or all of processes and techniques described herein. In at least one embodiment, PPU 4800 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 4800. In at least one embodiment, PPU 4800 is a GPU configured to implement a graphics rendering pipeline for processing three-dimensional ("3D") graphics data in order to generate two-dimensional ("2D") image data for display on a display device such as an LCD device. In at least one embodiment, PPU 4800 is utilized to perform computations such as linear algebra operations and machine-learning operations. FIG. 48 illustrates an example parallel processor for illustrative purposes only and should be construed as a non-limiting example of a processor architecture that may be implemented in at least one embodiment.

In at least one embodiment, PPU 4800 can be configured to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, PPU 4800 can be configured to execute a schedule job API to receive inputs to cause an indication of computing resources to be used to by software instructions. In at least one embodiment, PPU 4800 can be configured to execute a schedule job API to receive inputs to indicate a priority with which to perform instructions.

In at least one embodiment, PPU 4800 can be configured to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, PPU 4800 can be configured to execute a get all available profiles API to receive frequency inputs, computing resource inputs, priority inputs, processor identifiers, or some combination thereof, to identify a processor settings profile, or as otherwise described herein.

In at least one embodiment, PPU 4800 can be configured to execute a schedule set specific profile on processor API to receive an indication of a processor settings profile to cause instructions to be performed by processors configured according to that processor settings profile, or as otherwise described herein.

In at least one embodiment, at least one component shown or described with respect to FIG. 48 is used to implement techniques and/or functions described in connection with FIGS. 1-33. In at least one embodiment, PPU 4800 performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, one or more PPUs 4800 are configured to accelerate High Performance Computing ("HPC"), data center, and machine learning applications. In at least one embodiment, one or more PPUs 4800 are configured to accelerate CUDA programs. In at least one embodiment, PPU 4800 includes, without limitation, an I/O unit 4806, a front-end unit 4810, a scheduler unit 4812, a work distribution unit 4814, a hub 4816, a crossbar ("Xbar") 4820, one or more general processing clusters ("GPCs") 4818, and one or more partition units ("memory partition units") 4822. In at least one embodiment, PPU 4800 is connected to a host processor or other PPUs 4800 via one or more high-speed GPU interconnects ("GPU interconnects") 4808. In at least one embodiment, PPU 4800 is connected to a host processor or other peripheral devices via a system bus or interconnect 4802. In at least one embodiment, PPU 4800 is connected to a local memory comprising one or more memory devices ("memory") 4804. In at least one embodiment, memory devices 4804 include, without limitation, one or more dynamic random access memory (DRAM) devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 4808 may refer to a wire-based multi-lane communications link that is used by systems to scale and include one or more PPUs 4800 combined with one or more CPUs, supports cache coherence between PPUs 4800 and CPUs, and CPU mastering. In at least one embodiment, data and/or commands are transmitted by high-speed GPU interconnect 4808 through hub 4816 to/from other units of PPU 4800 such as one or more copy engines, video encoders, video decoders, power management units, and other components which may not be explicitly illustrated in FIG. 48.

In at least one embodiment, I/O unit 4806 is configured to transmit and receive communications (e.g., commands, data) from a host processor (not illustrated in FIG. 48) over system bus 4802. In at least one embodiment, I/O unit 4806 communicates with host processor directly via system bus 4802 or through one or more intermediate devices such as a memory bridge. In at least one embodiment, I/O unit 4806 may communicate with one or more other processors, such as one or more of PPUs 4800 via system bus 4802. In at least one embodiment, I/O unit 4806 implements a PCIe interface for communications over a PCIe bus. In at least one embodiment, I/O unit 4806 implements interfaces for communicating with external devices.

In at least one embodiment, I/O unit 4806 decodes packets received via system bus 4802. In at least one embodiment, at least some packets represent commands configured to cause PPU 4800 to perform various operations. In at least one embodiment, I/O unit 4806 transmits decoded commands to various other units of PPU 4800 as specified by commands. In at least one embodiment, commands are transmitted to front-end unit 4810 and/or transmitted to hub 4816 or other units of PPU 4800 such as one or more copy engines, a video encoder, a video decoder, a power management unit, etc. (not explicitly illustrated in FIG. 48). In at least one embodiment, I/O unit 4806 is configured to route communications between and among various logical units of PPU 4800.

In at least one embodiment, a program executed by host processor encodes a command stream in a buffer that provides workloads to PPU 4800 for processing. In at least one embodiment, a workload comprises instructions and data to be processed by those instructions. In at least one embodiment, buffer is a region in a memory that is accessible (e.g., read/write) by both a host processor and PPU 4800—a host interface unit may be configured to access buffer in a system memory connected to system bus 4802 via memory requests transmitted over system bus 4802 by I/O unit 4806. In at least one embodiment, a host processor writes a command stream to a buffer and then transmits a pointer to the start of the command stream to PPU 4800 such that front-end unit 4810 receives pointers to one or more command streams and manages one or more command streams, reading commands from command streams and forwarding commands to various units of PPU 4800.

In at least one embodiment, front-end unit 4810 is coupled to scheduler unit 4812 that configures various GPCs 4818 to process tasks defined by one or more command streams. In at least one embodiment, scheduler unit 4812 is configured to track state information related to various tasks managed by scheduler unit 4812 where state information may indicate which of GPCs 4818 a task is assigned to, whether task is active or inactive, a priority level associated with task, and so forth. In at least one embodiment, scheduler unit 4812 manages execution of a plurality of tasks on one or more of GPCs 4818.

In at least one embodiment, scheduler unit 4812 is coupled to work distribution unit 4814 that is configured to dispatch tasks for execution on GPCs 4818. In at least one embodiment, work distribution unit 4814 tracks a number of scheduled tasks received from scheduler unit 4812 and work distribution unit 4814 manages a pending task pool and an active task pool for each of GPCs 4818. In at least one embodiment, pending task pool comprises a number of slots (e.g., 32 slots) that contain tasks assigned to be processed by a particular GPC 4818; active task pool may comprise a number of slots (e.g., 4 slots) for tasks that are actively being processed by GPCs 4818 such that as one of GPCs 4818 completes execution of a task, that task is evicted from active task pool for GPC 4818 and one of other tasks from pending task pool is selected and scheduled for execution on GPC 4818. In at least one embodiment, if an active task is idle on GPC 4818, such as while waiting for a data dependency to be resolved, then the active task is evicted from GPC 4818 and returned to a pending task pool while another task in the pending task pool is selected and scheduled for execution on GPC 4818.

In at least one embodiment, work distribution unit 4814 communicates with one or more GPCs 4818 via XBar 4820. In at least one embodiment, XBar 4820 is an interconnect network that couples many units of PPU 4800 to other units of PPU 4800 and can be configured to couple work distribution unit 4814 to a particular GPC 4818. In at least one embodiment, one or more other units of PPU 4800 may also be connected to XBar 4820 via hub 4816.

In at least one embodiment, tasks are managed by scheduler unit 4812 and dispatched to one of GPCs 4818 by work distribution unit 4814. GPC 4818 is configured to process task and generate results. In at least one embodiment, results may be consumed by other tasks within GPC 4818, routed to a different GPC 4818 via XBar 4820, or stored in memory 4804. In at least one embodiment, results can be written to memory 4804 via partition units 4822, which implement a memory interface for reading and writing data to/from memory 4804. In at least one embodiment, results can be transmitted to another PPU 4804 or CPU via high-speed GPU interconnect 4808. In at least one embodiment, PPU 4800 includes, without limitation, a number U of partition units 4822 that is equal to number of separate and distinct memory devices 4804 coupled to PPU 4800.

In at least one embodiment, a host processor executes a driver kernel that implements an application programming interface ("API") that enables one or more applications executing on host processor to schedule operations for execution on PPU 4800. In at least one embodiment, multiple compute applications are simultaneously executed by PPU 4800 and PPU 4800 provides isolation, quality of service ("QoS"), and independent address spaces for multiple compute applications. In at least one embodiment, an application generates instructions (e.g., in the form of API calls) that cause a driver kernel to generate one or more tasks for execution by PPU 4800 and the driver kernel outputs tasks to one or more streams being processed by PPU 4800. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform a task and that exchange data through shared memory.

Figure 49:
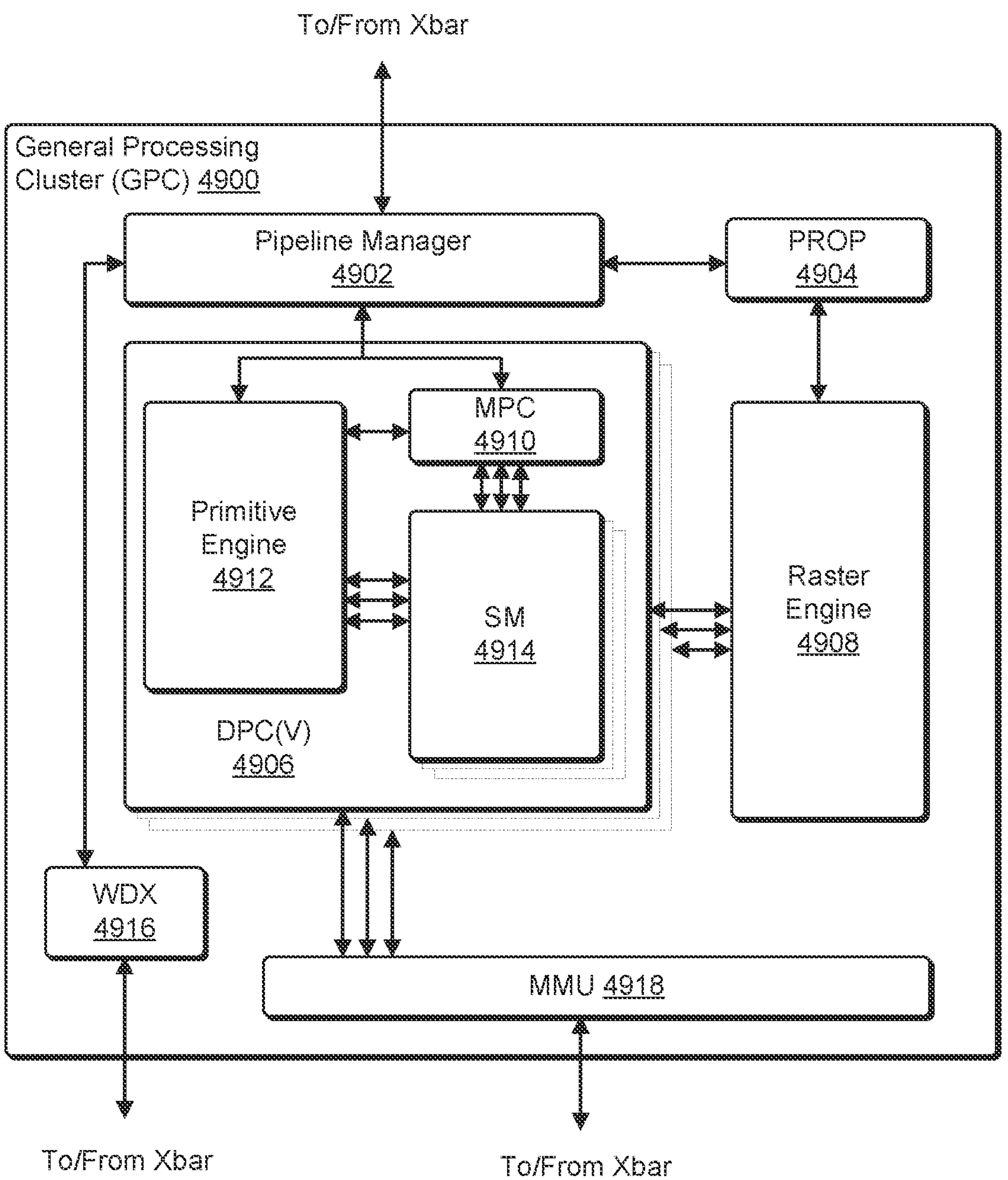
FIG. 49 illustrates a GPC, in accordance with at least one embodiment.

FIG. 49 illustrates a GPC 4900, in accordance with at least one embodiment. In at least one embodiment, GPC 4900 is GPC 4818 of FIG. 48. In at least one embodiment, each GPC 4900 includes, without limitation, a number of hardware units for processing tasks and each GPC 4900 includes, without limitation, a pipeline manager 4902, a pre-raster operations unit ("PROP") 4904, a raster engine 4908, a work distribution crossbar ("WDX") 4916, an MMU 4918, one or more Data Processing Clusters ("DPCs") 4906, and any suitable combination of parts.

In at least one embodiment, GPC 4900 can be configured to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, GPC 4900 can be configured to execute a schedule job API to receive inputs to cause an indication of computing resources to be used to by software instructions. In at least one embodiment, GPC 4900 can be configured to execute a schedule job API to receive inputs to indicate a priority with which to perform instructions.

In at least one embodiment, GPC 4900 can be configured to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, GPC 4900 can be configured to execute a get all available profiles API to receive frequency inputs, computing resource inputs, priority inputs, processor identifiers, or some combination thereof, to identify a processor settings profile, or as otherwise described herein.

In at least one embodiment, GPC 4900 can be configured to execute a schedule set specific profile on processor API to receive an indication of a processor settings profile to cause instructions to be performed by processors configured according to that processor settings profile, or as otherwise described herein.

In at least one embodiment, at least one component shown or described with respect to FIG. 49 is used to implement techniques and/or functions described in connection with FIGS. 1-33. In at least one embodiment, GPC 4900 performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, at least one component shown or described with respect to FIG. 49 is used to implement techniques and/or functions described in connection with FIGS. 1-33. In at least one embodiment, GPC 4900 performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, operation of GPC 4900 is controlled by pipeline manager 4902. In at least one embodiment, pipeline manager 4902 manages configuration of one or more DPCs 4906 for processing tasks allocated to GPC 4900. In at least one embodiment, pipeline manager 4902 configures at least one of one or more DPCs 4906 to implement at least a portion of a graphics rendering pipeline. In at least one embodiment, DPC 4906 is configured to execute a vertex shader program on a programmable streaming multiprocessor ("SM") 4914. In at least one embodiment, pipeline manager 4902 is configured to route packets received from a work distribution unit to appropriate logical units within GPC 4900 and, in at least one embodiment, some packets may be routed to fixed function hardware units in PROP 4904 and/or raster engine 4908 while other packets may be routed to DPCs 4906 for processing by a primitive engine 4912 or SM 4914. In at least one embodiment, pipeline manager 4902 configures at least one of DPCs 4906 to implement a computing pipeline. In at least one embodiment, pipeline manager 4902 configures at least one of DPCs 4906 to execute at least a portion of a CUDA program.

In at least one embodiment, PROP unit 4904 is configured to route data generated by raster engine 4908 and DPCs 4906 to a Raster Operations ("ROP") unit in a partition unit, such as memory partition unit 4822 described in more detail above in conjunction with FIG. 48. In at least one embodiment, PROP unit 4904 is configured to perform optimizations for color blending, organize pixel data, perform address translations, and more. In at least one embodiment, raster engine 4908 includes, without limitation, a number of fixed function hardware units configured to perform various raster operations and, in at least one embodiment, raster engine 4908 includes, without limitation, a setup engine, a coarse raster engine, a culling engine, a clipping engine, a fine raster engine, a tile coalescing engine, and any suitable combination thereof. In at least one embodiment, a setup engine receives transformed vertices and generates plane equations associated with geometric primitive defined by vertices; plane equations are transmitted to a coarse raster engine to generate coverage information (e.g., an x, y coverage mask for a tile) for a primitive; the output of the coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, the output of raster engine 4908 comprises fragments to be processed by any suitable entity such as by a fragment shader implemented within DPC 4906.

In at least one embodiment, each DPC 4906 included in GPC 4900 comprise, without limitation, an M-Pipe Controller ("MPC") 4910; primitive engine 4912; one or more SMs 4914; and any suitable combination thereof. In at least one embodiment, MPC 4910 controls operation of DPC 4906, routing packets received from pipeline manager 4902 to appropriate units in DPC 4906. In at least one embodiment, packets associated with a vertex are routed to primitive engine 4912, which is configured to fetch vertex attributes associated with vertex from memory; in contrast, packets associated with a shader program may be transmitted to SM 4914.

In at least one embodiment, SM 4914 comprises, without limitation, a programmable streaming processor that is configured to process tasks represented by a number of threads. In at least one embodiment, SM 4914 is multi-threaded and configured to execute a plurality of threads (e.g., 32 threads) from a particular group of threads concurrently and implements a SIMD architecture where each thread in a group of threads (e.g., a warp) is configured to process a different set of data based on same set of instructions. In at least one embodiment, all threads in group of threads execute same instructions. In at least one embodiment, SM 4914 implements a SIMT architecture wherein each thread in a group of threads is configured to process a different set of data based on same set of instructions, but where individual threads in group of threads are allowed to diverge during execution. In at least one embodiment, a program counter, a call stack, and an execution state is maintained for each warp, enabling concurrency between warps and serial execution within warps when threads within a warp diverge. In another embodiment, a program counter, a call stack, and an execution state is maintained for each individual thread, enabling equal concurrency between all threads, within and between warps. In at least one embodiment, an execution state is maintained for each individual thread and threads executing the same instructions may be converged and executed in parallel for better efficiency. At least one embodiment of SM 4914 is described in more detail in conjunction with FIG. 50.

In at least one embodiment, MMU 4918 provides an interface between GPC 4900 and a memory partition unit (e.g., partition unit 4822 of FIG. 48) and MMU 4918 provides translation of virtual addresses into physical addresses, memory protection, and arbitration of memory requests. In at least one embodiment, MMU 4918 provides one or more translation lookaside buffers (TLBs) for performing translation of virtual addresses into physical addresses in memory.

FIG. 50 illustrates a streaming multiprocessor ("SM") 5000, in accordance with at least one embodiment. In at least one embodiment, SM 5000 is SM 4914 of FIG. 49. In at least one embodiment, SM 5000 includes, without limitation, an instruction cache 5002; one or more scheduler units 5004; a register file 5008; one or more processing cores ("cores") 5010; one or more special function units ("SFUs") 5012; one or more LSUs 5014; an interconnect network 5016; a shared memory/L1 cache 5018; and any suitable combination thereof. In at least one embodiment, a work distribution unit dispatches tasks for execution on GPCs of parallel processing units (PPUs) and each task is allocated to a particular Data Processing Cluster (DPC) within a GPC and, if a task is associated with a shader program, then the task is allocated to one of SMs 5000. In at least one embodiment, scheduler unit 5004 receives tasks from a work distribution unit and manages instruction scheduling for one or more thread blocks assigned to SM 5000. In at least one embodiment, scheduler unit 5004 schedules thread blocks for execution as warps of parallel threads, wherein each thread block is allocated at least one warp. In at least one embodiment, each warp executes threads. In at least one embodiment, scheduler unit 5004 manages a plurality of different thread blocks, allocating warps to different thread blocks and then dispatching instructions from a plurality of different cooperative groups to various functional units (e.g., processing cores 5010, SFUs 5012, and LSUs 5014) during each clock cycle. In at least one embodiment, SM 5000 includes one or more thread block clusters, where a thread block cluster can enable programmatic control of locality at a granularity larger than a single thread block of a single streaming multiprocessor (SM). In at least one embodiment, thread block clusters (also referred to as "clusters") enables multiple thread blocks running concurrently across streaming multiprocessors to synchronize and collaboratively fetch, exchange, or otherwise use data.

In at least one embodiment, SM 5000 can be configured to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, SM 5000 can be configured to execute a schedule job API to receive inputs to cause an indication of computing resources to be used to by software instructions. In at least one embodiment, SM 5000 can be configured to execute a schedule job API to receive inputs to indicate a priority with which to perform instructions.

In at least one embodiment, SM 5000 can be configured to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, SM 5000 can be configured to execute a get all available profiles API to receive frequency inputs, computing resource inputs, priority inputs, processor identifiers, or some combination thereof, to identify a processor settings profile, or as otherwise described herein.

In at least one embodiment, SM 5000 can be configured to execute a schedule set specific profile on processor API to receive an indication of a processor settings profile to cause instructions to be performed by processors configured according to that processor settings profile, or as otherwise described herein.

In at least one embodiment, at least one component shown or described with respect to FIG. 50 is used to implement techniques and/or functions described in connection with FIGS. 1-33. In at least one embodiment, SM 5000 performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, "cooperative groups" may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, APIs of conventional programming models provide a single, simple construct for synchronizing cooperating threads: a barrier across all threads of a thread block (e.g., syncthreads ( ) function). However, in at least one embodiment, programmers may define groups of threads at smaller than thread block granularities and synchronize within defined groups to enable greater performance, design flexibility, and software reuse in the form of collective group-wide function interfaces. In at least one embodiment, cooperative groups enable programmers to define groups of threads explicitly at sub-block and multi-block granularities, and to perform collective operations such as synchronization on threads in a cooperative group. In at least one embodiment, a sub-block granularity is as small as a single thread. In at least one embodiment, a programming model supports clean composition across software boundaries, so that libraries and utility functions can synchronize safely within their local context without having to make assumptions about convergence. In at least one embodiment, cooperative group primitives enable new patterns of cooperative parallelism, including, without limitation, producer-consumer parallelism, opportunistic parallelism, and global synchronization across an entire grid of thread blocks.

In at least one embodiment, a dispatch unit 5006 is configured to transmit instructions to one or more of functional units and scheduler unit 5004 includes, without limitation, two dispatch units 5006 that enable two different instructions from same warp to be dispatched during each clock cycle. In at least one embodiment, each scheduler unit 5004 includes a single dispatch unit 5006 or additional dispatch units 5006.

In at least one embodiment, each SM 5000, in at least one embodiment, includes, without limitation, register file 5008 that provides a set of registers for functional units of SM 5000. In at least one embodiment, register file 5008 is divided between each of the functional units such that each functional unit is allocated a dedicated portion of register file 5008. In at least one embodiment, register file 5008 is divided between different warps being executed by SM 5000 and register file 5008 provides temporary storage for operands connected to data paths of functional units. In at least one embodiment, each SM 5000 comprises, without limitation, a plurality of L processing cores 5010. In at least one embodiment, SM 5000 includes, without limitation, a large number (e.g., 128 or more) of distinct processing cores 5010. In at least one embodiment, each processing core 5010 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 5010 include, without limitation, 64 single-precision (32-bit) floating point cores, 64 integer cores, 32 double-precision (64-bit) floating point cores, and 8 tensor cores.

In at least one embodiment, tensor cores are configured to perform matrix operations. In at least one embodiment, one or more tensor cores are included in processing cores 5010. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA-C++ API, exposes specialized matrix load, matrix multiply and accumulate, and matrix store operations to efficiently use tensor cores from a CUDA-C++ program. In at least one embodiment, at the CUDA level, a warp-level interface assumes 16×16 size matrices spanning all 32 threads of a warp.

In at least one embodiment, each SM 5000 comprises, without limitation, M SFUs 5012 that perform special functions (e.g., attribute evaluation, reciprocal square root, and like). In at least one embodiment, SFUs 5012 include, without limitation, a tree traversal unit configured to traverse a hierarchical tree data structure. In at least one embodiment, SFUs 5012 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 5000. In at least one embodiment, texture maps are stored in shared memory/L1 cache 5018. In at least one embodiment, texture units implement texture operations such as filtering operations using mip-maps (e.g., texture maps of varying levels of detail). In at least one embodiment, each SM 5000 includes, without limitation, two texture units.

In at least one embodiment, each SM 5000 comprises, without limitation, N LSUs 5014 that implement load and store operations between shared memory/L1 cache 5018 and register file 5008. In at least one embodiment, each SM 5000 includes, without limitation, interconnect network 5016 that connects each of the functional units to register file 5008 and LSU 5014 to register file 5008 and shared memory/L1 cache 5018. In at least one embodiment, interconnect network 5016 is a crossbar that can be configured to connect any of the functional units to any of the registers in register file 5008 and connect LSUs 5014 to register file 5008 and memory locations in shared memory/L1 cache 5018.

In at least one embodiment, shared memory/L1 cache 5018 is an array of on-chip memory that allows for data storage and communication between SM 5000 and a primitive engine and between threads in SM 5000. In at least one embodiment, shared memory/L1 cache 5018 comprises, without limitation, 128 KB of storage capacity and is in a path from SM 5000 to a partition unit. In at least one embodiment, shared memory/L1 cache 5018 is used to cache reads and writes. In at least one embodiment, one or more of shared memory/L1 cache 5018, L2 cache, and memory are backing stores.

In at least one embodiment, combining data cache and shared memory functionality into a single memory block provides improved performance for both types of memory accesses. In at least one embodiment, capacity is used or is usable as a cache by programs that do not use shared memory, such as if shared memory is configured to use half of capacity, texture and load/store operations can use remaining capacity. In at least one embodiment, integration within shared memory/L1 cache 5018 enables shared memory/L1 cache 5018 to function as a high-throughput conduit for streaming data while simultaneously providing high-bandwidth and low-latency access to frequently reused data. In at least one embodiment, when configured for general purpose parallel computation, a simpler configuration can be used compared with graphics processing. In at least one embodiment, fixed function GPUs are bypassed, creating a much simpler programming model. In at least one embodiment and in a general purpose parallel computation configuration, a work distribution unit assigns and distributes blocks of threads directly to DPCs. In at least one embodiment, threads in a block execute the same program, using a unique thread ID in a calculation to ensure each thread generates unique results, using SM 5000 to execute a program and perform calculations, shared memory/L1 cache 5018 to communicate between threads, and LSU 5014 to read and write global memory through shared memory/L1 cache 5018 and a memory partition unit. In at least one embodiment, when configured for general purpose parallel computation, SM 5000 writes commands that scheduler unit 5004 can use to launch new work on DPCs. In at least one embodiment, SM 5000 includes one or more distributed shared memories (or distributed shared memory) that enable direct SM-to-SM operations such as loading, storing, and performing atomics across multiple SM shared memory blocks.

In at least one embodiment, SM 5000 includes one or more asynchronous execution functions that include a tensor memory accelerator (TMA) unit that can transfer blocks of data between global memory and shared memory. In at least one embodiment, one or more processors uses or access one or more TMAs to perform bi-directional copy operations, e.g., from global to shared memory and vice versa. In at least one embodiment, SM 5000 includes one or more TMAs to asynchronously copy between thread blocks in a cluster. In at least one embodiment, SM 5000 includes one or more asynchronous transaction barriers to perform atomic data movement and synchronization. In at least one embodiment, SM 5000 includes a tensor core transformer engine, which includes software and one or more cores to accelerate transformer model training and inferencing. In at least one embodiment, a transformer one or more processor cores performing one or more tensor core transformer engines manage and dynamically choose between FP8 and 16-bit calculations by re-casting and scaling between FP8 and 16-bit in each layer of one or more neural networks.

In at least one embodiment, PPU is included in or coupled to a desktop computer, a laptop computer, a tablet computer, servers, supercomputers, a smart-phone (e.g., a wireless, hand-held device), a PDA, a digital camera, a vehicle, a head mounted display, a hand-held electronic device, and more. In at least one embodiment, PPU is embodied on a single semiconductor substrate. In at least one embodiment, PPU is included in an SoC along with one or more other devices such as additional PPUs, memory, a RISC CPU, an MMU, a digital-to-analog converter ("DAC"), and like.

In at least one embodiment, PPU may be included on a graphics card that includes one or more memory devices. In at least one embodiment, a graphics card may be configured to interface with a PCIe slot on a motherboard of a desktop computer. In at least one embodiment, PPU may be an integrated GPU ("iGPU") included in chipset of motherboard.

Software Constructions for General-Purpose Computing

The following figures set forth, without limitation, exemplary software constructs for implementing at least one embodiment.

Figure 51:
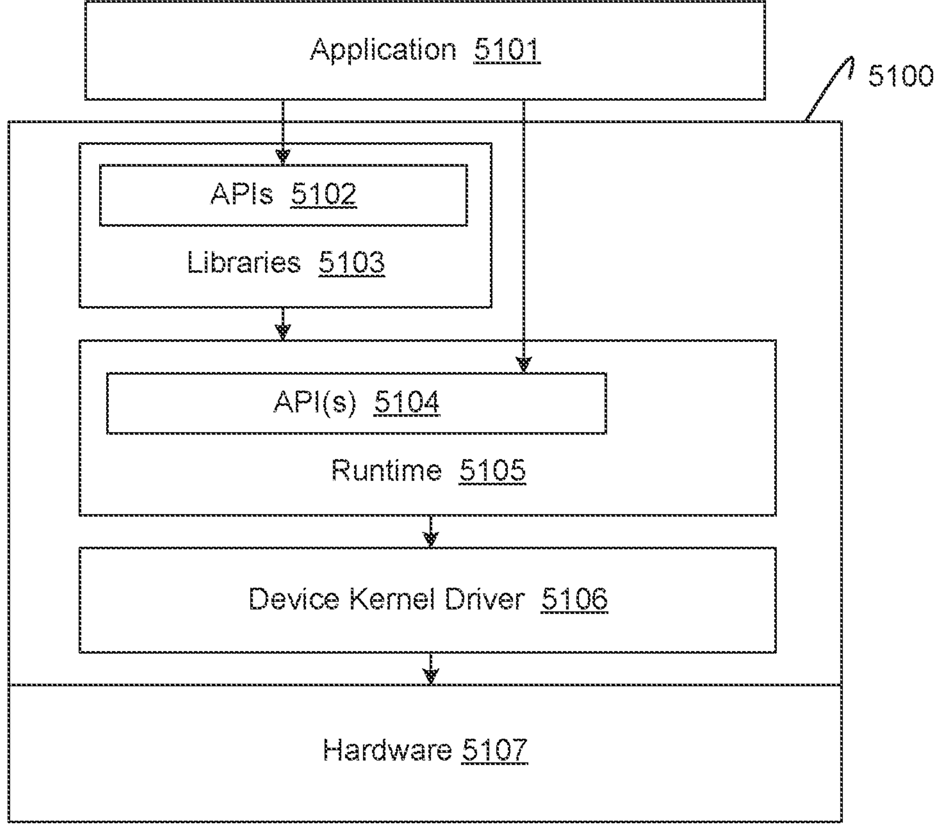
FIG. 51 illustrates a software stack of a programming platform, in accordance with at least one embodiment.

FIG. 51 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, at least one component shown or described with respect to FIG. 51 is used to implement techniques and/or functions described in connection with FIGS. 1-33. In at least one embodiment, software stack 5100 performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, a software stack 5100 of a programming platform provides an execution environment for an application 5101. In at least one embodiment, application 5101 may include any computer software capable of being launched on software stack 5100. In at least one embodiment, application 5101 may include, but is not limited to, an artificial intelligence ("AI")/machine learning ("ML") application, a high performance computing ("HPC") application, a virtual desktop infrastructure ("VDI"), or a data center workload.

In at least one embodiment, hardware 5107 can be configured to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, hardware 5107 can be configured to execute a schedule job API to receive inputs to cause an indication of computing resources to be used to by software instructions. In at least one embodiment, hardware 5107 can be configured to execute a schedule job API to receive inputs to indicate a priority with which to perform instructions.

In at least one embodiment, hardware 5107 can be configured to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, hardware 5107 can be configured to execute a get all available profiles API to receive frequency inputs, computing resource inputs, priority inputs, processor identifiers, or some combination thereof, to identify a processor settings profile, or as otherwise described herein.

In at least one embodiment, hardware 5107 can be configured to execute a schedule set specific profile on processor API to receive an indication of a processor settings profile to cause instructions to be performed by processors configured according to that processor settings profile, or as otherwise described herein.

In at least one embodiment, application 5101 and software stack 5100 run on hardware 5107. Hardware 5107 may include one or more GPUs, CPUs, FPGAs, AI engines, and/or other types of compute devices that support a programming platform, in at least one embodiment. In at least one embodiment, such as with CUDA, software stack 5100 may be vendor specific and compatible with only devices from particular vendor(s). In at least one embodiment, such as in with OpenCL, software stack 5100 may be used with devices from different vendors. In at least one embodiment, hardware 5107 includes a host connected to one more devices that can be accessed to perform computational tasks via application programming interface ("API") calls. A device within hardware 5107 may include, but is not limited to, a GPU, FPGA, AI engine, or other compute device (but may also include a CPU) and its memory, as opposed to a host within hardware 5107 that may include, but is not limited to, a CPU (but may also include a compute device) and its memory, in at least one embodiment.

In at least one embodiment, software stack 5100 of a programming platform includes, without limitation, a number of libraries 5103, a runtime 5105, and a device kernel driver 5106. Each of libraries 5103 may include data and programming code that can be used by computer programs and leveraged during software development, in at least one embodiment. In at least one embodiment, libraries 5103 may include, but are not limited to, pre-written code and subroutines, classes, values, type specifications, configuration data, documentation, help data, and/or message templates. In at least one embodiment, libraries 5103 include functions that are optimized for execution on one or more types of devices. In at least one embodiment, libraries 5103 may include, but are not limited to, functions for performing mathematical, deep learning, and/or other types of operations on devices. In at least one embodiment, libraries 5103 are associated with corresponding APIs 5102, which may include one or more APIs, that expose functions implemented in libraries 5103. In at least one embodiment, a processor (e.g. CPU, GPU) performs, calls, or otherwise uses one or more APIs to prioritize kernels. For example, a first kernel (e.g., parent) can launch a second kernel (e.g., child kernel), and said second kernel can be used by a processor to launch additional kernels (e.g., grandchildren kernels) independent of said first kernel. In at least one embodiment, a processor performs an API or calls an API from memory to be performed to support dynamic stream priority (e.g., updating priority while a stream is being used to perform operations). For example, when a processor performs said API, it allows a programmer to copy stream priority from one stream to one or more other streams.

In at least one embodiment, software stack 5100 includes an API to support dynamic stream priority (e.g., updating priority while a stream is being used to perform operations), which allows a programmer to set priority of a stream at any time after creation. In at least one embodiment, software stack 5100 includes an API to support dynamic stream priority (e.g., updating priority while the stream is being used to perform operations), which allows a programmer to obtain current priority of a stream, where the priority is one of a plurality of attributes of a stream. In at least one embodiment, software stack 5100 includes an API to support dynamic stream priority (e.g., updating priority while the stream is being used to perform operations), which allows a programmer to obtain current priority of a stream as a single attribute. In at least one embodiment, software stack 5100 includes an API to support dynamic stream priority (e.g., updating priority while the stream is being used to perform operations), which allows a programmer to launch a kernel to perform operations on a stream at a set priority, which may be different from the stream priority. In at least one embodiment, software stack 5100 includes an API to indicate whether an object (e.g., a thread synchronization object such as a barrier) tracks whether all data movement operations for a set of threads operating on a GPU are complete has a specified state after a specified period of time, where a specified state can be a state indicating that data has been moved and is ready for use, and is specified using an expected parity value as an input to the API.

In at least one embodiment, software stack 5100 includes one or more APIs to updated kernels. In at least one embodiment, a processor performs an API or calls an API from memory to be performed to update to an existing API is to support context-free kernels, which allows a programmer to add a kernel node to a graph without a graphics context, so that a graphics context can be dynamically associated with a kernel at runtime. In at least one embodiment, software stack 5100 includes one or more APIs to allow a programmer to obtain a kernel identifier and a graphics context as separate parameters from a kernel node, so that parameters to be obtained from kernels and from context-free kernels. In at least one embodiment, software stack 5100 includes one or more APIs to use parallel processor(s), such as one or more graphics processing units, to launch task graphs (e.g., task graphs) and to execute one or more task graphs (e.g., including one or more programs).

In at least one embodiment, software stack 5100 includes one or more APIs to associate one or more instructions with one or more memory ordering operations, such as a fence or membar operation. In at least one embodiment, instructions are associated with one or more domains such that a memory ordering operation is executed in association to one or more particular domains without interfering with instructions of other domains. an API to indicate a thread has arrived (e.g., at a thread synchronization barrier), or finished a stage of work in relation to asynchronous data movement operations on a GPU. In at least one embodiment, software stack 5100 includes one or more to allow programmers to manually indicate an expected transaction count when a thread has finished a stage of work, which is used to update an object that tracks whether all data movement operations for a set of threads are complete.

In at least one embodiment, application 5101 is written as source code that is compiled into executable code, as discussed in greater detail below in conjunction with FIGS. 56-58. Executable code of application 5101 may run, at least in part, on an execution environment provided by software stack 5100, in at least one embodiment. In at least one embodiment, during execution of application 5101, code may be reached that needs to run on a device, as opposed to a host. In such a case, runtime 5105 may be called to load and launch requisite code on the device, in at least one embodiment. In at least one embodiment, runtime 5105 may include any technically feasible runtime system that is able to support execution of application S01.

In at least one embodiment, runtime 5105 is implemented as one or more runtime libraries associated with corresponding APIs, which are shown as API(s) 5104. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 5104 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, one or more processors disclosed in "processing systems" can perform, access, or otherwise use software stack 5100. For example, APU 3800, CPU 3900, 41A-41B exemplary graphics processors, general-purpose graphics processing unit ("GPGPU") 4230, parallel processor 4300, processing cluster 4394, graphics multiprocessor 4334, graphics multiprocessor 4396, graphics processor 4400, processor 4500, processor 4600, parallel processing unit ("PPU") 4800, GPC 4900, and/or streaming multiprocessor ("SM") 5000 can perform, use, call, or otherwise implement (e.g., through accessing a memory) one or more APIs included in software stack 5100.

In at least one embodiment, device kernel driver 5106 is configured to facilitate communication with an underlying device. In at least one embodiment, device kernel driver 5106 may provide low-level functionalities upon which APIs, such as API(s) 5104, and/or other software relies. In at least one embodiment, device kernel driver 5106 may be configured to compile intermediate representation ("IR") code into binary code at runtime. For CUDA, device kernel driver 5106 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 5106 to compile IR code at runtime.

Figure 52:
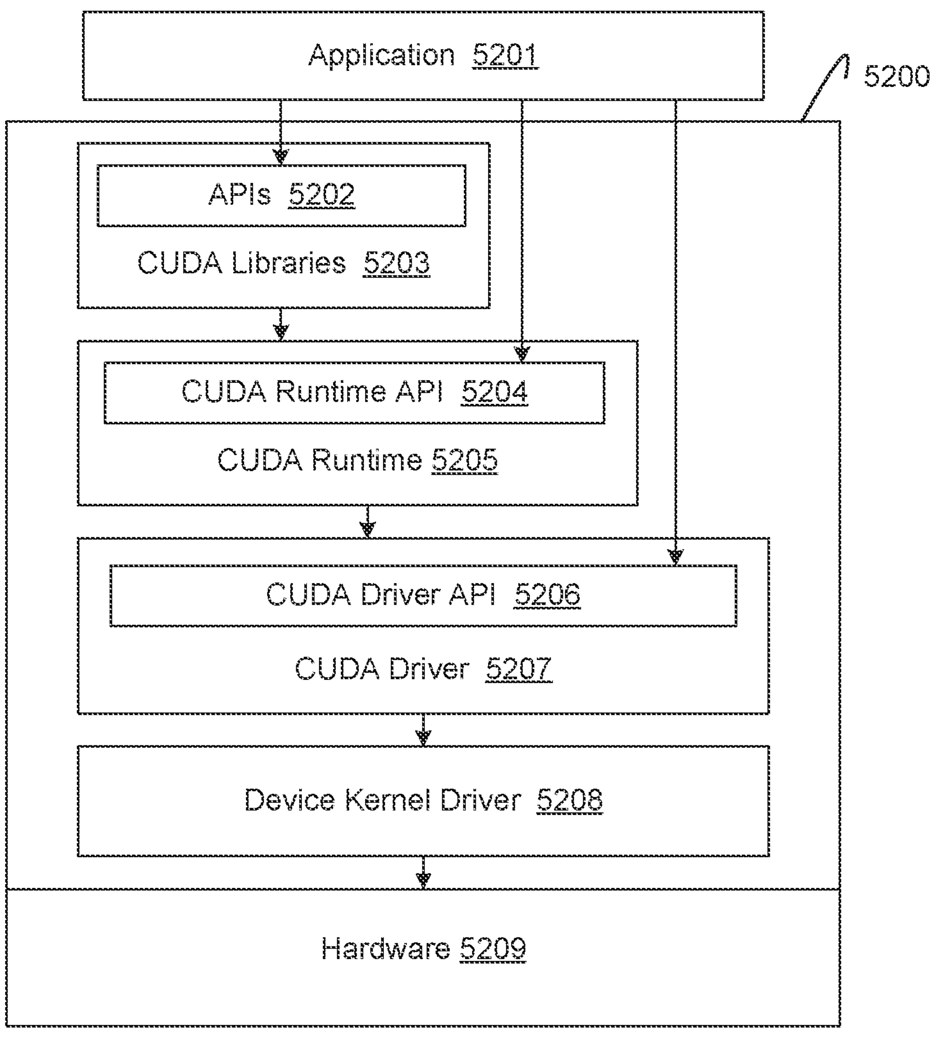
FIG. 52 illustrates a CUDA implementation of a software stack of FIG. 51, in accordance with at least one embodiment.

FIG. 52 illustrates a CUDA implementation of software stack 5100 of FIG. 51, in accordance with at least one embodiment. In at least one embodiment, a CUDA software stack 5200, on which an application 5201 may be launched, includes CUDA libraries 5203, a CUDA runtime 5205, a CUDA driver 5207, and a device kernel driver 5208. In at least one embodiment, CUDA software stack 5200 executes on hardware 5209, which may include a GPU that supports CUDA and is developed by NVIDIA Corporation of Santa Clara, CA.

In at least one embodiment, software stack 5100 can be configured to perform a processor to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, software stack 5100 can be configured to perform a processor to execute a schedule job API to receive inputs to cause an indication of computing resources to be used to by software instructions. In at least one embodiment, software stack 5100 can be configured to perform a processor to execute a schedule job API to receive inputs to indicate a priority with which to perform instructions.

In at least one embodiment, software stack 5100 can be configured to perform a processor to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, software stack 5100 can be configured to perform a processor to execute a get all available profiles API to receive frequency inputs, computing resource inputs, priority inputs, processor identifiers, or some combination thereof, to identify a processor settings profile, or as otherwise described herein.

In at least one embodiment, software stack 5100 can be configured to perform a processor to execute a schedule set specific profile on processor API to receive an indication of a processor settings profile to cause instructions to be performed by processors configured according to that processor settings profile, or as otherwise described herein.

In at least one embodiment, at least one component shown or described with respect to FIG. 52 is used to implement techniques and/or functions described in connection with FIGS. 1-33. In at least one embodiment, application 5201 performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, application 5201, CUDA runtime 5205, and device kernel driver 5208 may perform similar functionalities as application 5101, runtime 5105, and device kernel driver 5106, respectively, which are described above in conjunction with FIG. 51. In at least one embodiment, CUDA driver 5207 includes a library (libcuda.so) that implements a CUDA driver API 5206. Similar to a CUDA runtime API 5204 implemented by a CUDA runtime library (cudart), CUDA driver API 5206 may, without limitation, expose functions for memory management, execution control, device management, error handling, synchronization, and/or graphics interoperability, among other things, in at least one embodiment. In at least one embodiment, CUDA driver API 5206 differs from CUDA runtime API 5204 in that CUDA runtime API 5204 simplifies device code management by providing implicit initialization, context (analogous to a process) management, and module (analogous to dynamically loaded libraries) management. In contrast to high-level CUDA runtime API 5204, CUDA driver API 5206 is a low-level API providing more fine-grained control of the device, particularly with respect to contexts and module loading, in at least one embodiment. In at least one embodiment, CUDA driver API 5206 may expose functions for context management that are not exposed by CUDA runtime API 5204. In at least one embodiment, CUDA driver API 5206 is also language-independent and supports, e.g., OpenCL in addition to CUDA runtime API 5204. Further, in at least one embodiment, development libraries, including CUDA runtime 5205, may be considered as separate from driver components, including user-mode CUDA driver 5207 and kernel-mode device driver 5208 (also sometimes referred to as a “display” driver).

In at least one embodiment, application 5201 can be configured to perform a processor to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, application 5201 can be configured to perform a processor to execute a schedule job API to receive inputs to cause an indication of computing resources to be used to by software instructions. In at least one embodiment, application 5201 can be configured to perform a processor to execute a schedule job API to receive inputs to indicate a priority with which to perform instructions.

In at least one embodiment, application 5201 can be configured to perform a processor to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, application 5201 can be configured to perform a processor to execute a get all available profiles API to receive frequency inputs, computing resource inputs, priority inputs, processor identifiers, or some combination thereof, to identify a processor settings profile, or as otherwise described herein.

In at least one embodiment, application 5201 can be configured to perform a processor to execute a schedule set specific profile on processor API to receive an indication of a processor settings profile to cause instructions to be performed by processors configured according to that processor settings profile, or as otherwise described herein.

In at least one embodiment, CUDA libraries 5203 may include, but are not limited to, mathematical libraries, deep learning libraries, parallel algorithm libraries, and/or signal/image/video processing libraries, which parallel computing applications such as application 5201 may utilize. In at least one embodiment, CUDA libraries 5203 may include mathematical libraries such as a cuBLAS library that is an implementation of Basic Linear Algebra Subprograms (“BLAS”) for performing linear algebra operations, a cuFFT library for computing fast Fourier transforms (“FFTs”), and a cuRAND library for generating random numbers, among others. In at least one embodiment, CUDA libraries 5203 may include deep learning libraries such as a cuDNN library of primitives for deep neural networks and a TensorRT platform for high-performance deep learning inference, among others.

Figure 53:
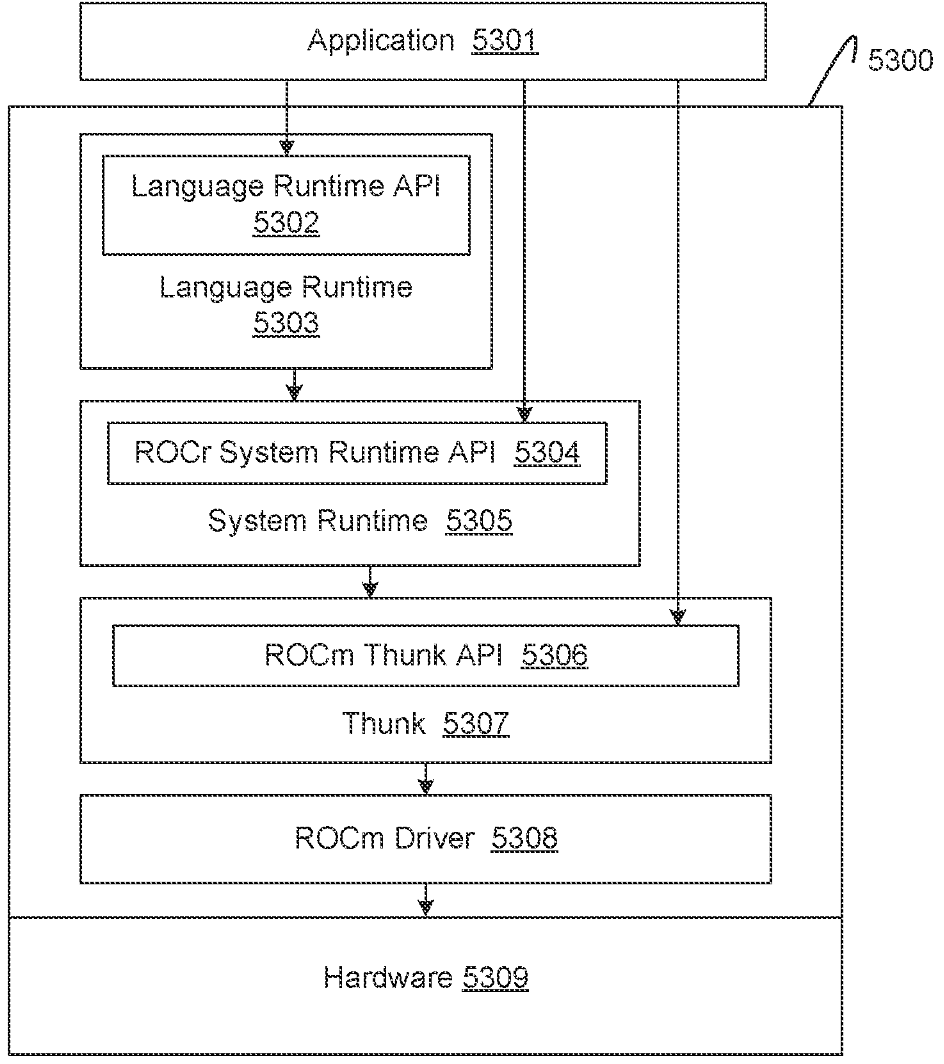
FIG. 53 illustrates a ROCm implementation of a software stack of FIG. 51, in accordance with at least one embodiment.

FIG. 53 illustrates a ROCm implementation of software stack 5100 of FIG. 51, in accordance with at least one embodiment. In at least one embodiment, a ROCm software stack 5300, on which an application 5301 may be launched, includes a language runtime 5303, a system runtime 5305, a thunk 5307, and a ROCm kernel driver 5308. In at least one embodiment, ROCm software stack 5300 executes on hardware 5309, which may include a GPU that supports ROCm and is developed by AMD Corporation of Santa Clara, CA.

In at least one embodiment, ROCm software stack 5300 can be configured to perform a processor to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, ROCm software stack 5300 can be configured to perform a processor to execute a schedule job API to receive inputs to cause an indication of computing resources to be used to by software instructions. In at least one embodiment, ROCm software stack 5300 can be configured to perform a processor to execute a schedule job API to receive inputs to indicate a priority with which to perform instructions.

In at least one embodiment, ROCm software stack 5300 can be configured to perform a processor to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, ROCm software stack 5300 can be configured to perform a processor to execute a get all available profiles API to receive frequency inputs, computing resource inputs, priority inputs, processor identifiers, or some combination thereof, to identify a processor settings profile, or as otherwise described herein.

In at least one embodiment, ROCm software stack 5300 can be configured to perform a processor to execute a schedule set specific profile on processor API to receive an indication of a processor settings profile to cause instructions to be performed by processors configured according to that processor settings profile, or as otherwise described herein.

In at least one embodiment, at least one component shown or described with respect to FIG. 53 is used to implement techniques and/or functions described in connection with FIGS. 1-33. In at least one embodiment, ROCm software stack 5300 performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, application 5301 may perform similar functionalities as application 5101 discussed above in conjunction with FIG. 51. In addition, language runtime 5303 and system runtime 5305 may perform similar functionalities as runtime 5105 discussed above in conjunction with FIG. 51, in at least one embodiment. In at least one embodiment, language runtime 5303 and system runtime 5305 differ in that system runtime 5305 is a language-independent runtime that implements a ROCr system runtime API 5304 and makes use of a Heterogeneous System Architecture ("HSA") Runtime API. HSA runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 5305, language runtime 5303 is an implementation of a language-specific runtime API 5302 layered on top of ROCr system runtime API 5304, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 5204 discussed above in conjunction with FIG. 52, such as functions for memory management, execution control, device management, error handling, and synchronization, among other things.

In at least one embodiment, thunk (ROCt) 5307 is an interface 5306 that can be used to interact with underlying ROCm driver 5308. In at least one embodiment, ROCm driver 5308 is a ROCK driver, which is a combination of an AMDGPU driver and a HSA kernel driver (amdkfd). In at least one embodiment, AMDGPU driver is a device kernel driver for GPUs developed by AMD that performs similar functionalities as device kernel driver 5106 discussed above in conjunction with FIG. 51. In at least one embodiment, HSA kernel driver is a driver permitting different types of processors to share system resources more effectively via hardware features.

In at least one embodiment, various libraries (not shown) may be included in ROCm software stack 5300 above language runtime 5303 and provide functionality similarity to CUDA libraries 5203, discussed above in conjunction with FIG. 52. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

Figure 54:
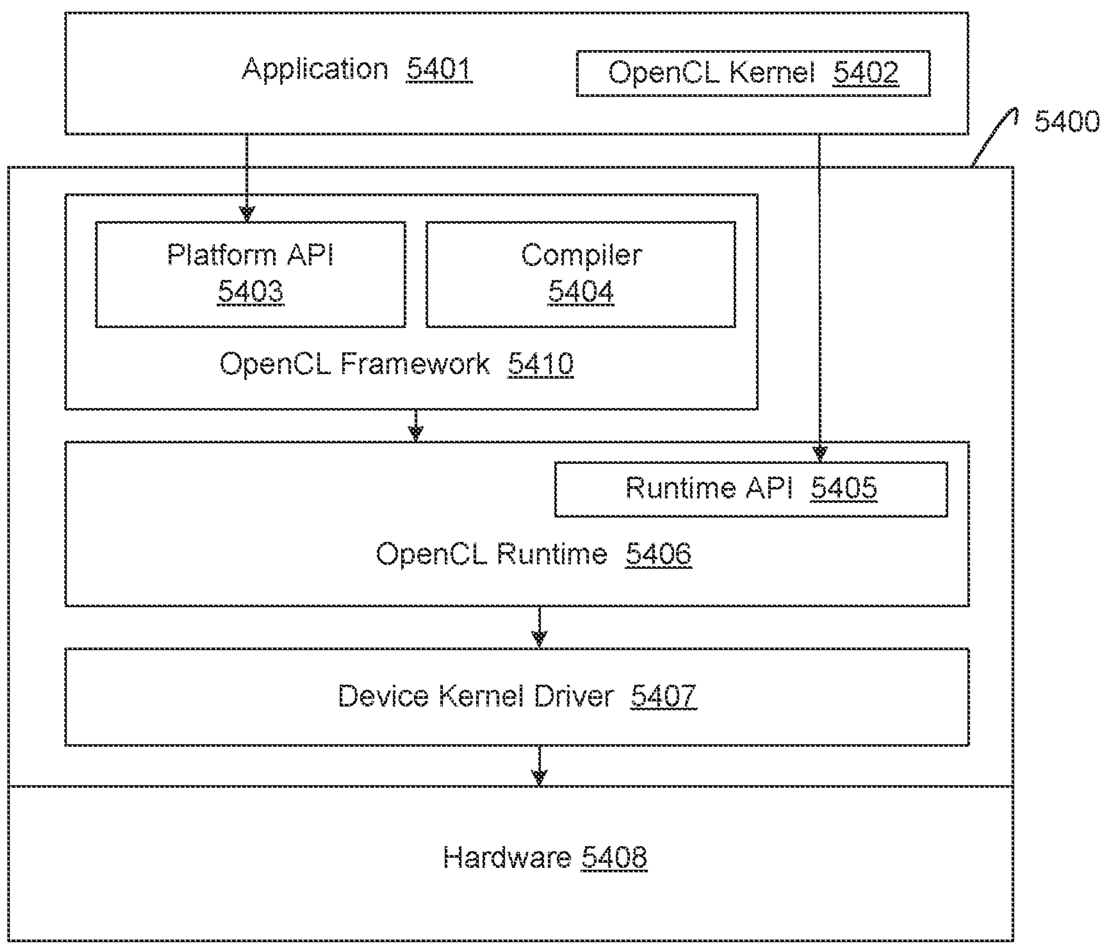
FIG. 54 illustrates an OpenCL implementation of a software stack of FIG. 51, in accordance with at least one embodiment.

FIG. 54 illustrates an OpenCL implementation of software stack 5100 of FIG. 51, in accordance with at least one embodiment. In at least one embodiment, an OpenCL software stack 5400, on which an application 5401 may be launched, includes an OpenCL framework 5410, an OpenCL runtime 5406, and a driver 5407. In at least one embodiment, OpenCL software stack 5400 executes on hardware 5209 that is not vendor-specific. As OpenCL is supported by devices developed by different vendors, specific OpenCL drivers may be required to interoperate with hardware from such vendors, in at least one embodiment.

In at least one embodiment, OpenCL software stack 5400 can be configured to perform a processor to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, OpenCL software stack 5400 can be configured to perform a processor to execute a schedule job API to receive inputs to cause an indication of computing resources to be used to by software instructions. In at least one embodiment, OpenCL software stack 5400 can be configured to perform a processor to execute a schedule job API to receive inputs to indicate a priority with which to perform instructions.

In at least one embodiment, OpenCL software stack 5400 can be configured to perform a processor to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, OpenCL software stack 5400 can be configured to perform a processor to execute a get all available profiles API to receive frequency inputs, computing resource inputs, priority inputs, processor identifiers, or some combination thereof, to identify a processor settings profile, or as otherwise described herein.

In at least one embodiment, OpenCL software stack 5400 can be configured to perform a processor to execute a schedule set specific profile on processor API to receive an indication of a processor settings profile to cause instructions to be performed by processors configured according to that processor settings profile, or as otherwise described herein.

In at least one embodiment, at least one component shown or described with respect to FIG. 54 is used to implement techniques and/or functions described in connection with FIGS. 1-33. In at least one embodiment, application 5401 performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, application 5401, OpenCL runtime 5406, device kernel driver 5407, and hardware 5408 may perform similar functionalities as application 5101, runtime 5105, device kernel driver 5106, and hardware 5107, respectively, that are discussed above in conjunction with FIG. 51. In at least one embodiment, application 5401 further includes an OpenCL kernel 5402 with code that is to be executed on a device.

In at least one embodiment, OpenCL defines a "platform" that allows a host to control devices connected to the host. In at least one embodiment, an OpenCL framework provides a platform layer API and a runtime API, shown as platform API 5403 and runtime API 5405. In at least one embodiment, runtime API 5405 uses contexts to manage execution of kernels on devices. In at least one embodiment, each identified device may be associated with a respective context, which runtime API 5405 may use to manage command queues, program objects, and kernel objects, share memory objects, among other things, for that device. In at least one embodiment, platform API 5403 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 5404 is also included in OpenCL frame-work 5410. Source code may be compiled offline prior to executing an application or online during execution of an application, in at least one embodiment. In contrast to CUDA and ROCm, OpenCL applications in at least one embodiment may be compiled online by compiler 5404, which is included to be representative of any number of compilers that may be used to compile source code and/or IR code, such as Standard Portable Intermediate Representation ("SPIR-V") code, into binary code. Alternatively, in at least one embodiment, OpenCL ap-plications may be compiled offline, prior to execution of such applications.

Figure 55:
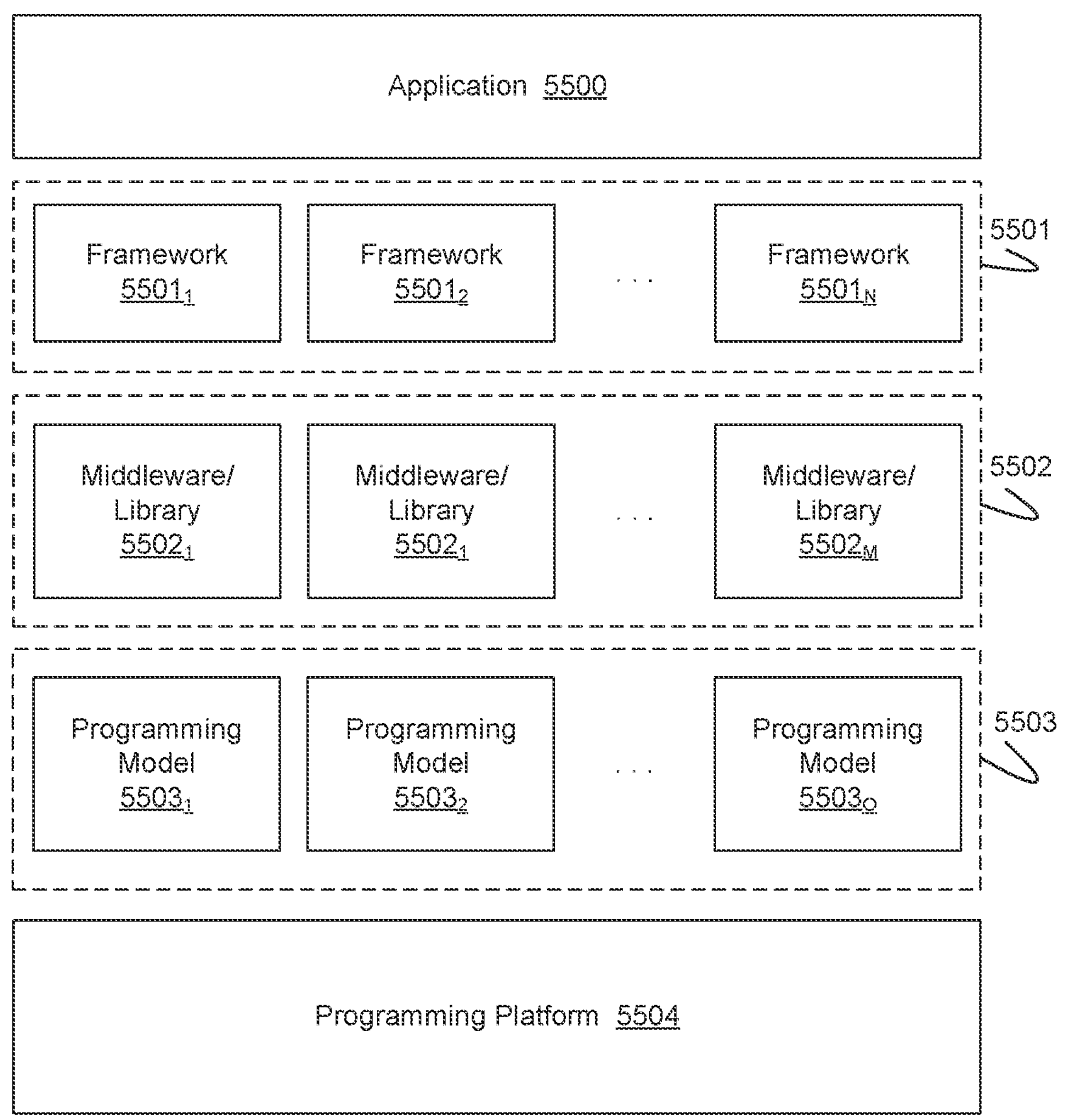
FIG. 55 illustrates software that is supported by a programming platform, in accordance with at least one embodiment.

FIG. 55 illustrates software that is supported by a programming platform, in accordance with at least one embodiment. In at least one embodiment, a programming platform 5504 is configured to support various programming models 5503, middlewares and/or libraries 5502, and frameworks 5501 that an application 5500 may rely upon. In at least one embodiment, application 5500 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDA Developer Data Loading Library ("DALI") CUDA libraries to provide accelerated computing on underlying hardware.

In at least one embodiment, application 5500 can be configured to perform a processor to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, application 5500 can be configured to perform a processor to execute a schedule job API to receive inputs to cause an indication of computing resources to be used to by software instructions. In at least one embodiment, application 5500 can be configured to perform a processor to execute a schedule job API to receive inputs to indicate a priority with which to perform instructions.

In at least one embodiment, application 5500 can be configured to perform a processor to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, application 5500 can be configured to perform a processor to execute a get all available profiles API to receive frequency inputs, computing resource inputs, priority inputs, processor identifiers, or some combination thereof, to identify a processor settings profile, or as otherwise described herein.

In at least one embodiment, application 5500 can be configured to perform a processor to execute a schedule set specific profile on processor API to receive an indication of a processor settings profile to cause instructions to be performed by processors configured according to that processor settings profile, or as otherwise described herein.

In at least one embodiment, at least one component shown or described with respect to FIG. 55 is used to implement techniques and/or functions described in connection with FIGS. 1-33. In at least one embodiment, application 5502 performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, programming platform 5504 may be one of a CUDA, ROCm, or OpenCL platform described above in conjunction with FIG. 52, FIG. 53, and FIG. 54, respectively. In at least one embodiment, programming platform 5504 supports multiple programming models 5503, which are abstractions of an underlying computing system permitting expressions of algorithms and data structures. Programming models 5503 may expose features of underlying hardware in order to improve performance, in at least one embodiment. In at least one embodiment, programming models 5503 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulcan Compute.

In at least one embodiment, libraries and/or middlewares 5502 provide implementations of abstractions of programming models 5504. In at least one embodiment, such libraries include data and programming code that may be used by computer programs and leveraged during software development. In at least one embodiment, such middlewares include software that provides services to applications beyond those available from programming platform 5504. In at least one embodiment, libraries and/or middlewares 5502 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 5502 may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

In at least one embodiment, application frameworks 5501 depend on libraries and/or middlewares 5502. In at least one embodiment, each of application frameworks 5501 is a software framework used to implement a standard structure of application software. Returning to the AI/ML example discussed above, an AI/ML application may be implemented using a framework such as Caffe, Caffe2, TensorFlow, Keras, PyTorch, or MxNet deep learning frameworks, in at least one embodiment.

Figure 56:
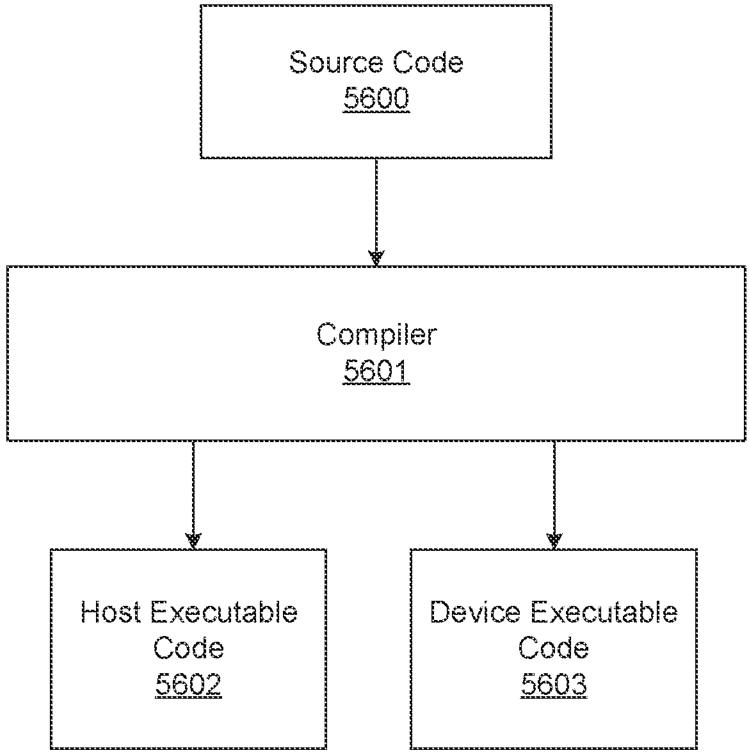
FIG. 56 illustrates compiling code to execute on programming platforms of FIGS. 51-54, in accordance with at least one embodiment.

FIG. 56 illustrates compiling code to execute on one of programming platforms of FIGS. 51-54, in accordance with at least one embodiment. In at least one embodiment, a compiler 5601 receives source code 5600 that includes both host code as well as device code. In at least one embodiment, complier 5601 is configured to convert source code 5600 into host executable code 5602 for execution on a host and device executable code 5603 for execution on a device. In at least one embodiment, source code 5600 may either be compiled offline prior to execution of an application, or online during execution of an application. In at least one embodiment, compiler 5601 includes or has access to one or more libraries to recognize a sequence of API calls to perform a single fused API, where a single fused API is a combined API for two or more APIs.

In at least one embodiment, source code 5600 can be compiled and executed to cause performance of a processor to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, source code 5600 can be compiled and executed to cause performance of a processor to execute a schedule job API to receive inputs to cause an indication of computing resources to be used to by software instructions. In at least one embodiment, source code 5600 can be compiled and executed to cause performance of a processor to execute a schedule job API to receive inputs to indicate a priority with which to perform instructions.

In at least one embodiment, source code 5600 can be compiled and executed to cause performance of a processor to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, source code 5600 can be compiled and executed to cause performance of a processor to execute a get all available profiles API to receive frequency inputs, computing resource inputs, priority inputs, processor identifiers, or some combination thereof, to identify a processor settings profile, or as otherwise described herein.

In at least one embodiment, source code 5600 can be compiled and executed to cause performance of a processor to execute a schedule set specific profile on processor API to receive an indication of a processor settings profile to cause instructions to be performed by processors configured according to that processor settings profile, or as otherwise described herein.

In at least one embodiment, at least one component shown or described with respect to FIG. 56 is used to implement techniques and/or functions described in connection with FIGS. 1-33. In at least one embodiment, compiler 5601 compiles code of a job to be performed by one or more processors that have been configured according to one or more processor settings based, at least in part, on one or more job characteristics as described in conjunction with FIG. 1, or as otherwise described herein.

In at least one embodiment, source code 5600 may include code in any programming language supported by compiler 5601, such as C++, C, Fortran, etc. In at least one embodiment, source code 5600 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 5600 may include multiple source code files, rather than a single-source file, into which host code and device code are separated.

In at least one embodiment, compiler 5601 is configured to compile source code 5600 into host executable code 5602 for execution on a host and device executable code 5603 for execution on a device. In at least one embodiment, compiler 5601 performs operations including parsing source code 5600 into an abstract system tree (AST), performing optimizations, and generating executable code. In at least one embodiment in which source code 5600 includes a single-source file, compiler 5601 may separate device code from host code in such a single-source file, compile device code and host code into device executable code 5603 and host executable code 5602, respectively, and link device executable code 5603 and host executable code 5602 together in a single file, as discussed in greater detail below with respect to FIG. 57.

In at least one embodiment, host executable code 5602 and device executable code 5603 may be in any suitable format, such as binary code and/or IR code. In the case of CUDA, host executable code 5602 may include native object code and device executable code 5603 may include code in PTX intermediate representation, in at least one embodiment. In the case of ROCm, both host executable code 5602 and device executable code 5603 may include target binary code, in at least one embodiment.

Figure 57:
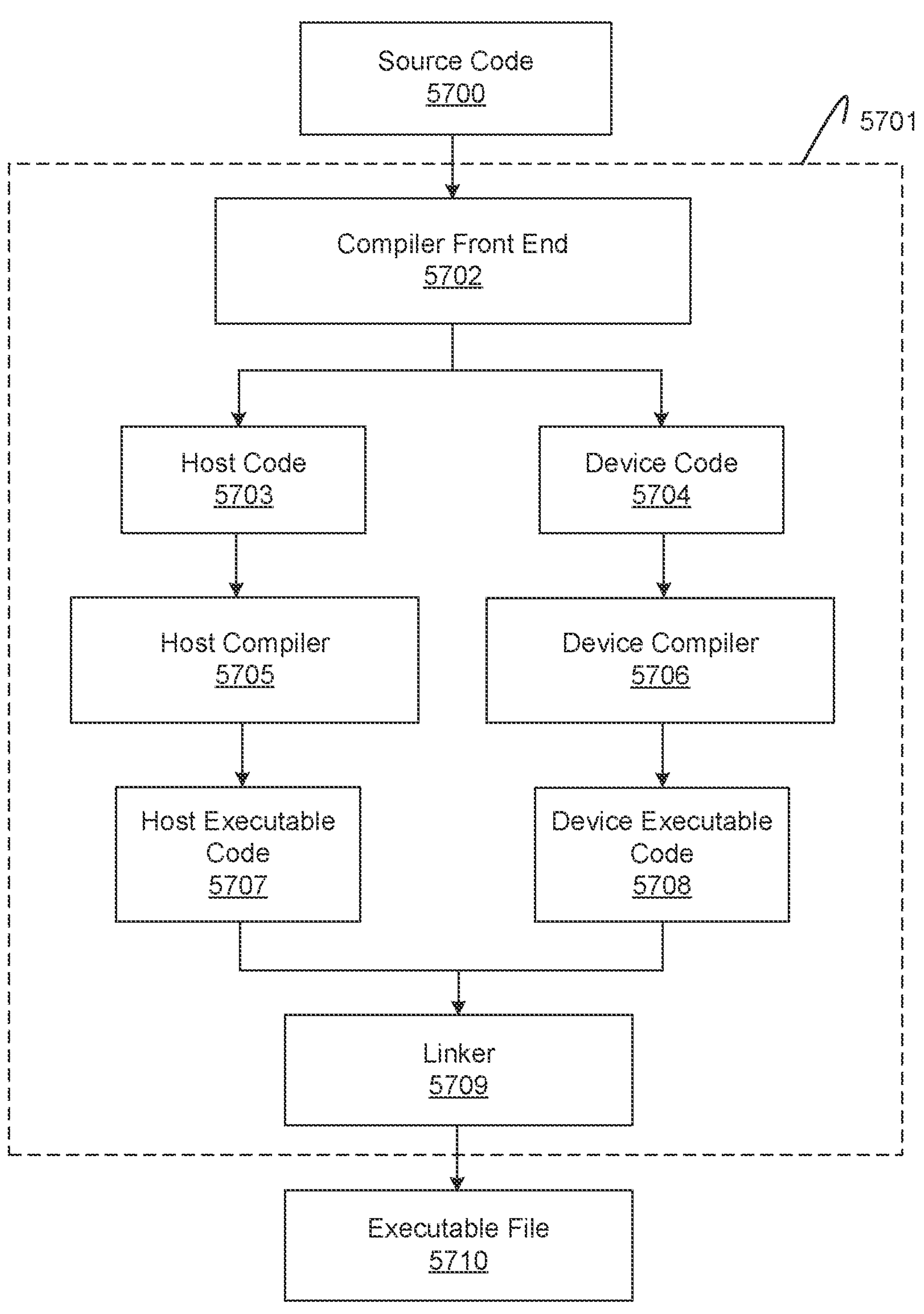
FIG. 57 illustrates in greater detail compiling code to execute on programming platforms of FIGS. 51-54, in accordance with at least one embodiment.

FIG. 57 is a more detailed illustration of compiling code to execute on one of programming platforms of FIGS. 51-54, in accordance with at least one embodiment. In at least one embodiment, a compiler 5701 is configured to receive source code 5700, compile source code 5700, and output an executable file 5710. In at least one embodiment, source code 5700 is a single-source file, such as a .cu file, a .hip.cpp file, or a file in another format, that includes both host and device code. In at least one embodiment, compiler 5701 may be, but is not limited to, an NVIDIA CUDA compiler ("NVCC") for compiling CUDA code in .cu files, or a HCC compiler for compiling HIP code in .hip.cpp files.

In at least one embodiment, source code 5700 can be compiled and executed to cause performance of a processor to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, source code 5700 can be compiled and executed to cause performance of a processor to execute a schedule job API to receive inputs to cause an indication of computing resources to be used to by software instructions. In at least one embodiment, source code 5700 can be compiled and executed to cause performance of a processor to execute a schedule job API to receive inputs to indicate a priority with which to perform instructions.

In at least one embodiment, source code 5700 can be compiled and executed to cause performance of a processor to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, source code 5700 can be compiled and executed to cause performance of a processor to execute a get all available profiles API to receive frequency inputs, computing resource inputs, priority inputs, processor identifiers, or some combination thereof, to identify a processor settings profile, or as otherwise described herein.

In at least one embodiment, source code 5700 can be compiled and executed to cause performance of a processor to execute a schedule set specific profile on processor API to receive an indication of a processor settings profile to cause instructions to be performed by processors configured according to that processor settings profile, or as otherwise described herein.

In at least one embodiment, at least one component shown or described with respect to FIG. 57 is used to implement techniques and/or functions described in connection with FIGS. 1-33. In at least one embodiment, compiler 5701 compiles code of a job to be performed by one or more processors that have been configured according to one or more processor settings based, at least in part, on one or more job characteristics as described in conjunction with FIG. 1, or as otherwise described herein.

In at least one embodiment, compiler 5701 includes a compiler front end 5702, a host compiler 5705, a device compiler 5706, and a linker 5709. In at least one embodiment, compiler front end 5702 is configured to separate device code 5704 from host code 5703 in source code 5700. Device code 5704 is compiled by device compiler 5706 into device executable code 5708, which as described may include binary code or IR code, in at least one embodiment. Separately, host code 5703 is compiled by host compiler 5705 into host executable code 5707, in at least one embodiment. For NVCC, host compiler 5705 may be, but is not limited to, a general purpose C/C++ compiler that outputs native object code, while device compiler 5706 may be, but is not limited to, a Low Level Virtual Machine ("LLVM")-based compiler that forks a LLVM compiler infrastructure and outputs PTX code or binary code, in at least one embodiment. For HCC, both host compiler 5705 and device compiler 5706 may be, but are not limited to, LLVM-based compilers that output target binary code, in at least one embodiment.

Subsequent to compiling source code 5700 into host executable code 5707 and device executable code 5708, linker 5709 links host and device executable code 5707 and 5708 together in executable file 5710, in at least one embodiment. In at least one embodiment, native object code for a host and PTX or binary code for a device may be linked together in an Executable and Linkable Format ("ELF") file, which is a container format used to store object code.

Figure 58:
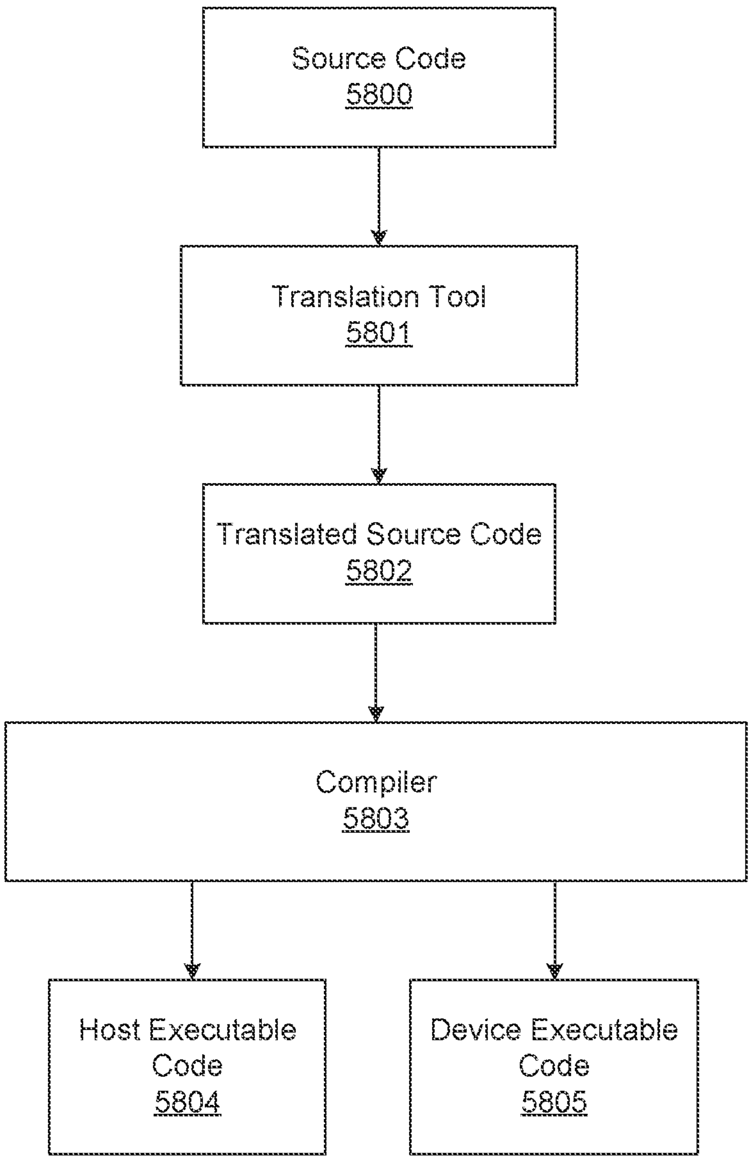
FIG. 58 illustrates translating source code prior to compiling source code, in accordance with at least one embodiment.

FIG. 58 illustrates translating source code prior to compiling source code, in accordance with at least one embodiment. In at least one embodiment, source code 5800 is passed through a translation tool 5801, which translates source code 5800 into translated source code 5802. In at least one embodiment, a compiler 5803 is used to compile translated source code 5802 into host executable code 5804 and device executable code 5805 in a process that is similar to compilation of source code 5600 by compiler 5601 into host executable code 5602 and device executable 5603, as discussed above in conjunction with FIG. 56.

In at least one embodiment, source code 5800 can be compiled and executed to cause performance of a processor to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, source code 5800 can be compiled and executed to cause performance of a processor to execute a schedule job API to receive inputs to cause an indication of computing resources to be used to by software instructions. In at least one embodiment, source code 5800 can be compiled and executed to cause performance of a processor to execute a schedule job API to receive inputs to indicate a priority with which to perform instructions.

In at least one embodiment, source code 5800 can be compiled and executed to cause performance of a processor to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, source code 5800 can be compiled and executed to cause performance of a processor to execute a get all available profiles API to receive frequency inputs, computing resource inputs, priority inputs, processor identifiers, or some combination thereof, to identify a processor settings profile, or as otherwise described herein.

In at least one embodiment, source code 5800 can be compiled and executed to cause performance of a processor to execute a schedule set specific profile on processor API to receive an indication of a processor settings profile to cause instructions to be performed by processors configured according to that processor settings profile, or as otherwise described herein.

In at least one embodiment, at least one component shown or described with respect to FIG. 58 is used to implement techniques and/or functions described in connection with FIGS. 1-33. In at least one embodiment, translation tool 5801 translates code of a job to be performed by one or more processors that have been configured according to one or more processor settings based, at least in part, on one or more job characteristics as described in conjunction with FIG. 1, or as otherwise described herein.

In at least one embodiment, a translation performed by translation tool 5801 is used to port source 5800 for execution in a different environment than that in which it was originally intended to run. In at least one embodiment, translation tool 5801 may include, but is not limited to, a HIP translator that is used to "hipify" CUDA code intended for a CUDA platform into HIP code that can be compiled and executed on a ROCm platform. In at least one embodiment, translation of source code 5800 may include parsing source code 5800 and converting calls to API(s) provided by one programming model (e.g., CUDA) into corresponding calls to API(s) provided by another programming model (e.g., HIP), as discussed in greater detail below in conjunction with FIGS. 59A-60. Returning to the example of hipifying CUDA code, calls to CUDA runtime API, CUDA driver API, and/or CUDA libraries may be converted to corresponding HIP API calls, in at least one embodiment. In at least one embodiment, automated translations performed by translation tool 5801 may sometimes be incomplete, requiring additional, manual effort to fully port source code 5800.

Configuring Gpus for General-Purpose Computing

The following figures set forth, without limitation, exemplary architectures for compiling and executing compute source code, in accordance with at least one embodiment.

Figure 59A:
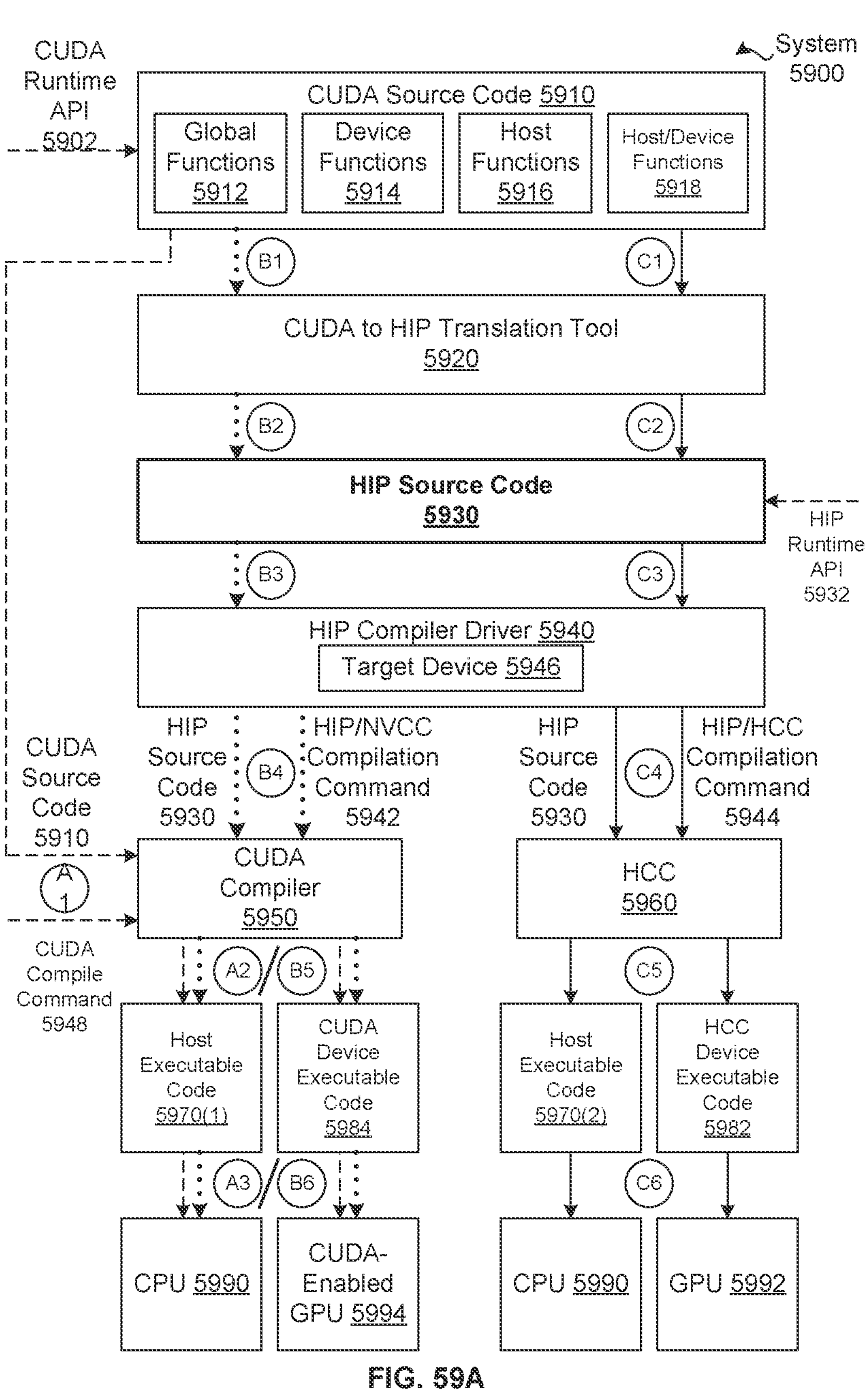
FIG. 59A illustrates a system configured to compile and execute CUDA source code using different types of processing units, in accordance with at least one embodiment.

FIG. 59A illustrates a system 5900 configured to compile and execute CUDA source code 5910 using different types of processing units, in accordance with at least one embodiment. In at least one embodiment, system 5900 includes, without limitation, CUDA source code 5910, a CUDA compiler 5950, host executable code 5970(1), host executable code 5970(2), CUDA device executable code 5984, a CPU 5990, a CUDA-enabled GPU 5994, a GPU 5992, a CUDA to HIP translation tool 5920, HIP source code 5930, a HIP compiler driver 5940, an HCC 5960, and HCC device executable code 5982.

In at least one embodiment, CUDA source code 5910 is a collection of human-readable code in a CUDA programming language. In at least one embodiment, CUDA code is human-readable code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable in parallel on a device. In at least one embodiment, a device may be a processor that is optimized for parallel instruction processing, such as CUDA-enabled GPU 5990, GPU 59192, or another GPGPU, etc. In at least one embodiment, host code is source code that, after compilation, is executable on a host. In at least one embodiment, a host is a processor that is optimized for sequential instruction processing, such as CPU 5990.

In at least one embodiment, CUDA source code 5910 includes, without limitation, any number (including zero) of global functions 5912, any number (including zero) of device functions 5914, any number (including zero) of host functions 5916, and any number (including zero) of host/device functions 5918. In at least one embodiment, global functions 5912, device functions 5914, host functions 5916, and host/device functions 5918 may be mixed in CUDA source code 5910. In at least one embodiment, each of global functions 5912 is executable on a device and callable from a host. In at least one embodiment, one or more of global functions 5912 may therefore act as entry points to a device. In at least one embodiment, each of global functions 5912 is a kernel. In at least one embodiment and in a technique known as dynamic parallelism, one or more of global functions 5912 defines a kernel that is executable on a device and callable from such a device. In at least one embodiment, a kernel is executed N (where N is any positive integer) times in parallel by N different threads on a device during execution.

In at least one embodiment, each of device functions 5914 is executed on a device and callable from such a device only. In at least one embodiment, each of host functions 5916 is executed on a host and callable from such a host only. In at least one embodiment, each of host/device functions 5916 defines both a host version of a function that is executable on a host and callable from such a host only and a device version of the function that is executable on a device and callable from such a device only.

In at least one embodiment, CUDA source code 5910 may also include, without limitation, any number of calls to any number of functions that are defined via a CUDA runtime API 5902. In at least one embodiment, CUDA runtime API 5902 may include, without limitation, any number of functions that execute on a host to allocate and deallocate device memory, transfer data between host memory and device memory, manage systems with multiple devices, etc. In at least one embodiment, CUDA source code 5910 may also include any number of calls to any number of functions that are specified in any number of other CUDA APIs. In at least one embodiment, a CUDA API may be any API that is designed for use by CUDA code. In at least one embodiment, CUDA APIs include, without limitation, CUDA runtime API 5902, a CUDA driver API, APIs for any number of CUDA libraries, etc. In at least one embodiment and relative to CUDA runtime API 5902, a CUDA driver API is a lower-level API but provides finer-grained control of a device. In at least one embodiment, examples of CUDA libraries include, without limitation, cuBLAS, cuFFT, cuRAND, cuDNN, etc.

In at least one embodiment, CUDA compiler 5950 compiles input CUDA code (e.g., CUDA source code 5910) to generate host executable code 5970(1) and CUDA device executable code 5984. In at least one embodiment, CUDA compiler 5950 is NVCC. In at least one embodiment, host executable code 5970(1) is a compiled version of host code included in input source code that is executable on CPU 5990. In at least one embodiment, CPU 5990 may be any processor that is optimized for sequential instruction processing.

In at least one embodiment, CUDA device executable code 5984 is a compiled version of device code included in input source code that is executable on CUDA-enabled GPU 5994. In at least one embodiment, CUDA device executable code 5984 includes, without limitation, binary code. In at least one embodiment, CUDA device executable code 5984 includes, without limitation, IR code, such as PTX code, that is further compiled at runtime into binary code for a specific target device (e.g., CUDA-enabled GPU 5994) by a device driver. In at least one embodiment, CUDA-enabled GPU 5994 may be any processor that is optimized for parallel instruction processing and that supports CUDA. In at least one embodiment, CUDA-enabled GPU 5994 is developed by NVIDIA Corporation of Santa Clara, CA.

In at least one embodiment, CUDA to HIP translation tool 5920 is configured to translate CUDA source code 5910 to functionally similar HIP source code 5930. In a least one embodiment, HIP source code 5930 is a collection of human-readable code in a HIP programming language. In at least one embodiment, HIP code is human-readable code in a HIP programming language. In at least one embodiment, a HIP programming language is an extension of the C++ programming language that includes, without limitation, functionally similar versions of CUDA mechanisms to define device code and distinguish between device code and host code. In at least one embodiment, a HIP programming language may include a subset of functionality of a CUDA programming language. In at least one embodiment, for example, a HIP programming language includes, without limitation, mechanism(s) to define global functions 5912, but such a HIP programming language may lack support for dynamic parallelism and therefore global functions 5912 defined in HIP code may be callable from a host only.

In at least one embodiment, HIP source code 5930 includes, without limitation, any number (including zero) of global functions 5912, any number (including zero) of device functions 5914, any number (including zero) of host functions 5916, and any number (including zero) of host/device functions 5918. In at least one embodiment, HIP source code 5930 may also include any number of calls to any number of functions that are specified in a HIP runtime API 5932. In at least one embodiment, HIP runtime API 5932 includes, without limitation, functionally similar versions of a subset of functions included in CUDA runtime API 5902. In at least one embodiment, HIP source code 5930 may also include any number of calls to any number of functions that are specified in any number of other HIP APIs. In at least one embodiment, a HIP API may be any API that is designed for use by HIP code and/or ROCm. In at least one embodiment, HIP APIs include, without limitation, HIP runtime API 5932, a HIP driver API, APIs for any number of HIP libraries, APIs for any number of ROCm libraries, etc.

In at least one embodiment, CUDA to HIP translation tool 5920 converts each kernel call in CUDA code from a CUDA syntax to a HIP syntax and converts any number of other CUDA calls in CUDA code to any number of other functionally similar HIP calls. In at least one embodiment, a CUDA call is a call to a function specified in a CUDA API, and a HIP call is a call to a function specified in a HIP API. In at least one embodiment, CUDA to HIP translation tool 5920 converts any number of calls to functions specified in CUDA runtime API 5902 to any number of calls to functions specified in HIP runtime API 5932.

In at least one embodiment, CUDA to HIP translation tool 5920 is a tool known as hipify-perl that executes a text-based translation process. In at least one embodiment, CUDA to HIP translation tool 5920 is a tool known as hipify-clang that, relative to hipify-perl, executes a more complex and more robust translation process that involves parsing CUDA code using clang (a compiler front-end) and then translating resulting symbols. In at least one embodiment, properly converting CUDA code to HIP code may require modifications (e.g., manual edits) in addition to those performed by CUDA to HIP translation tool 5920.

In at least one embodiment, HIP compiler driver 5940 is a front end that determines a target device 5946 and then configures a compiler that is compatible with target device 5946 to compile HIP source code 5930. In at least one embodiment, target device 5946 is a processor that is optimized for parallel instruction processing. In at least one embodiment, HIP compiler driver 5940 may determine target device 5946 in any technically feasible fashion.

In at least one embodiment, if target device 5946 is compatible with CUDA (e.g., CUDA-enabled GPU 5994), then HIP compiler driver 5940 generates a HIP/NVCC compilation command 5942. In at least one embodiment and as described in greater detail in conjunction with FIG. 59B, HIP/NVCC compilation command 5942 configures CUDA compiler 5950 to compile HIP source code 5930 using, without limitation, a HIP to CUDA translation header and a CUDA runtime library. In at least one embodiment and in response to HIP/NVCC compilation command 5942, CUDA compiler 5950 generates host executable code 5970(1) and CUDA device executable code 5984.

In at least one embodiment, if target device 5946 is not compatible with CUDA, then HIP compiler driver 5940 generates a HIP/HCC compilation command 5944. In at least one embodiment and as described in greater detail in conjunction with FIG. 59C, HIP/HCC compilation command 5944 configures HCC 5960 to compile HIP source code 5930 using, without limitation, an HCC header and a HIP/HCC runtime library. In at least one embodiment and in response to HIP/HCC compilation command 5944, HCC 5960 generates host executable code 5970(2) and HCC device executable code 5982. In at least one embodiment, HCC device executable code 5982 is a compiled version of device code included in HIP source code 5930 that is executable on GPU 5992. In at least one embodiment, GPU 5992 may be any processor that is optimized for parallel instruction processing, is not compatible with CUDA, and is compatible with HCC. In at least one embodiment, GPU 5992 is developed by AMD Corporation of Santa Clara, CA. In at least one embodiment GPU, 5992 is a non-CUDA-enabled GPU 5992.

For explanatory purposes only, three different flows that may be implemented in at least one embodiment to compile CUDA source code 5910 for execution on CPU 5990 and different devices are depicted in FIG. 59A. In at least one embodiment, a direct CUDA flow compiles CUDA source code 5910 for execution on CPU 5990 and CUDA-enabled GPU 5994 without translating CUDA source code 5910 to HIP source code 5930. In at least one embodiment, an indirect CUDA flow translates CUDA source code 5910 to HIP source code 5930 and then compiles HIP source code 5930 for execution on CPU 5990 and CUDA-enabled GPU 5994. In at least one embodiment, a CUDA/HCC flow translates CUDA source code 5910 to HIP source code 5930 and then compiles HIP source code 5930 for execution on CPU 5990 and GPU 5992.

A direct CUDA flow that may be implemented in at least one embodiment is depicted via dashed lines and a series of bubbles annotated A1-A3. In at least one embodiment and as depicted with bubble annotated A1, CUDA compiler 5950 receives CUDA source code 5910 and a CUDA compile command 5948 that configures CUDA compiler 5950 to compile CUDA source code 5910. In at least one embodiment, CUDA source code 5910 used in a direct CUDA flow is written in a CUDA programming language that is based on a programming language other than C++ (e.g., C, Fortran, Python, Java, etc.). In at least one embodiment and in response to CUDA compile command 5948, CUDA compiler 5950 generates host executable code 5970(1) and CUDA device executable code 5984 (depicted with bubble annotated A2). In at least one embodiment and as depicted with bubble annotated A3, host executable code 5970(1) and CUDA device executable code 5984 may be executed on, respectively, CPU 5990 and CUDA-enabled GPU 5994. In at least one embodiment, CUDA device executable code 5984 includes, without limitation, binary code. In at least one embodiment, CUDA device executable code 5984 includes, without limitation, PTX code and is further compiled into binary code for a specific target device at runtime.

An indirect CUDA flow that may be implemented in at least one embodiment is depicted via dotted lines and a series of bubbles annotated B1-B6. In at least one embodiment and as depicted with bubble annotated B1, CUDA to HIP translation tool 5920 receives CUDA source code 5910. In at least one embodiment and as depicted with bubble annotated B2, CUDA to HIP translation tool 5920 translates CUDA source code 5910 to HIP source code 5930. In at least one embodiment and as depicted with bubble annotated B3, HIP compiler driver 5940 receives HIP source code 5930 and determines that target device 5946 is CUDA-enabled.

In at least one embodiment and as depicted with bubble annotated B4, HIP compiler driver 5940 generates HIP/NVCC compilation command 5942 and transmits both HIP/NVCC compilation command 5942 and HIP source code 5930 to CUDA compiler 5950. In at least one embodiment and as described in greater detail in conjunction with FIG. 59B, HIP/NVCC compilation command 5942 configures CUDA compiler 5950 to compile HIP source code 5930 using, without limitation, a HIP to CUDA translation header and a CUDA runtime library. In at least one embodiment and in response to HIP/NVCC compilation command 5942, CUDA compiler 5950 generates host executable code 5970(1) and CUDA device executable code 5984 (depicted with bubble annotated B5). In at least one embodiment and as depicted with bubble annotated B6, host executable code 5970(1) and CUDA device executable code 5984 may be executed on, respectively, CPU 5990 and CUDA-enabled GPU 5994. In at least one embodiment, CUDA device executable code 5984 includes, without limitation, binary code. In at least one embodiment, CUDA device executable code 5984 includes, without limitation, PTX code and is further compiled into binary code for a specific target device at runtime.

A CUDA/HCC flow that may be implemented in at least one embodiment is depicted via solid lines and a series of bubbles annotated C1-C6. In at least one embodiment and as depicted with bubble annotated C1, CUDA to HIP translation tool 5920 receives CUDA source code 5910. In at least one embodiment and as depicted with bubble annotated C2, CUDA to HIP translation tool 5920 translates CUDA source code 5910 to HIP source code 5930. In at least one embodiment and as depicted with bubble annotated C3, HIP compiler driver 5940 receives HIP source code 5930 and determines that target device 5946 is not CUDA-enabled.

In at least one embodiment, HIP compiler driver 5940 generates HIP/HCC compilation command 5944 and transmits both HIP/HCC compilation command 5944 and HIP source code 5930 to HCC 5960 (depicted with bubble annotated C4). In at least one embodiment and as described in greater detail in conjunction with FIG. 59C, HIP/HCC compilation command 5944 configures HCC 5960 to compile HIP source code 5930 using, without limitation, an HCC header and a HIP/HCC runtime library. In at least one embodiment and in response to HIP/HCC compilation command 5944, HCC 5960 generates host executable code 5970(2) and HCC device executable code 5982 (depicted with bubble annotated C5). In at least one embodiment and as depicted with bubble annotated C6, host executable code 5970(2) and HCC device executable code 5982 may be executed on, respectively, CPU 5990 and GPU 5992.

In at least one embodiment, after CUDA source code 5910 is translated to HIP source code 5930, HIP compiler driver 5940 may subsequently be used to generate executable code for either CUDA-enabled GPU 5994 or GPU 5992 without re-executing CUDA to HIP translation tool 5920. In at least one embodiment, CUDA to HIP translation tool 5920 translates CUDA source code 5910 to HIP source code 5930 that is then stored in memory. In at least one embodiment, HIP compiler driver 5940 then configures HCC 5960 to generate host executable code 5970(2) and HCC device executable code 5982 based on HIP source code 5930. In at least one embodiment, HIP compiler driver 5940 subsequently configures CUDA compiler 5950 to generate host executable code 5970(1) and CUDA device executable code 5984 based on stored HIP source code 5930.

Figure 59B:
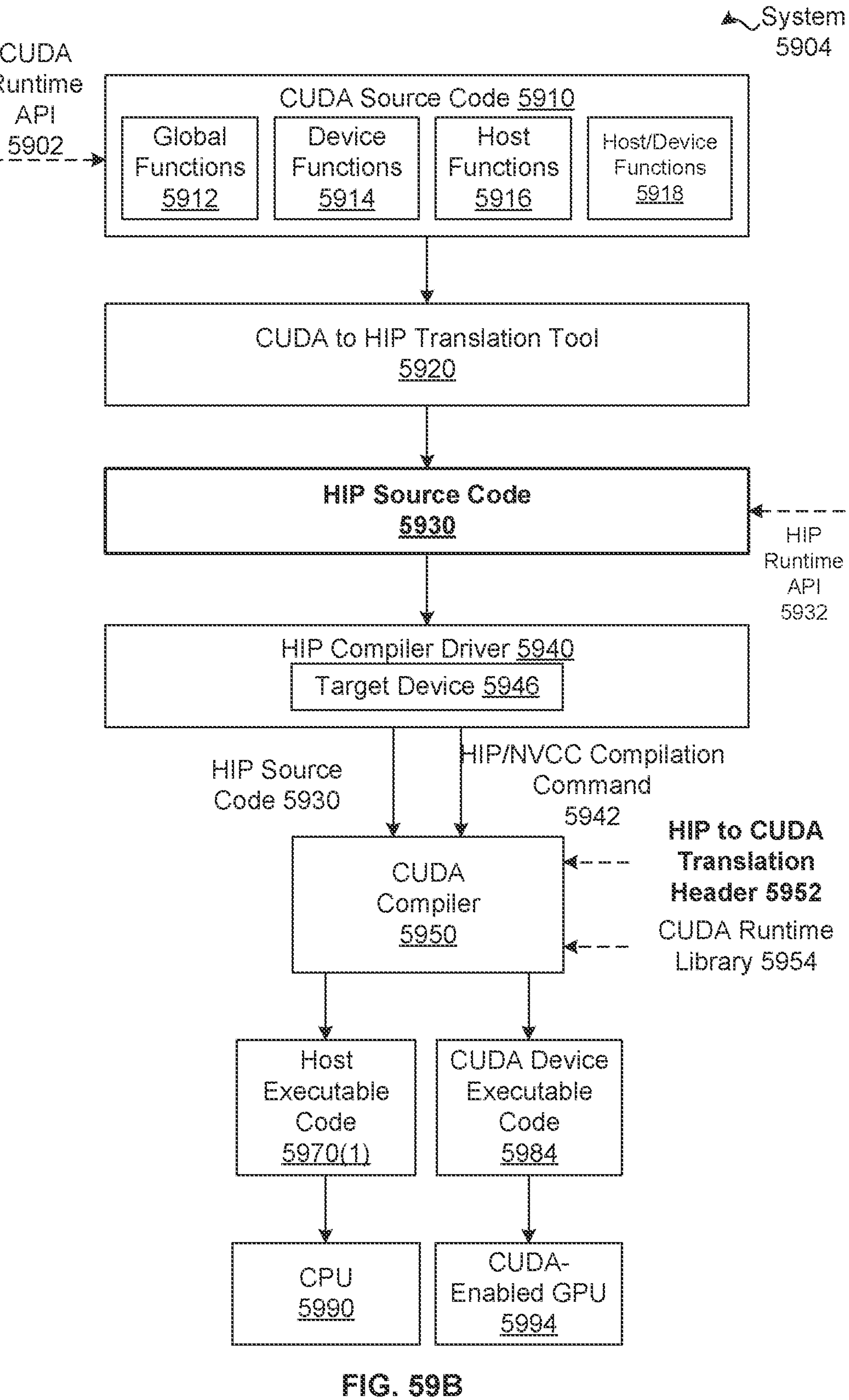
FIG. 59B illustrates a system configured to compile and execute CUDA source code of FIG. 59A using a CPU and a CUDA-enabled GPU, in accordance with at least one embodiment.

FIG. 59B illustrates a system 5904 configured to compile and execute CUDA source code 5910 of FIG. 59A using CPU 5990 and CUDA-enabled GPU 5994, in accordance with at least one embodiment. In at least one embodiment, system 5904 includes, without limitation, CUDA source code 5910, CUDA to HIP translation tool 5920, HIP source code 5930, HIP compiler driver 5940, CUDA compiler 5950, host executable code 5970(1), CUDA device executable code 5984, CPU 5990, and CUDA-enabled GPU 5994.

In at least one embodiment and as described previously herein in conjunction with FIG. 59A, CUDA source code 5910 includes, without limitation, any number (including zero) of global functions 5912, any number (including zero) of device functions 5914, any number (including zero) of host functions 5916, and any number (including zero) of host/device functions 5918. In at least one embodiment, CUDA source code 5910 also includes, without limitation, any number of calls to any number of functions that are specified in any number of CUDA APIs.

In at least one embodiment, CUDA to HIP translation tool 5920 translates CUDA source code 5910 to HIP source code 5930. In at least one embodiment, CUDA to HIP translation tool 5920 converts each kernel call in CUDA source code 5910 from a CUDA syntax to a HIP syntax and converts any number of other CUDA calls in CUDA source code 5910 to any number of other functionally similar HIP calls.

In at least one embodiment, HIP compiler driver 5940 determines that target device 5946 is CUDA-enabled and generates HIP/NVCC compilation command 5942. In at least one embodiment, HIP compiler driver 5940 then configures CUDA compiler 5950 via HIP/NVCC compilation command 5942 to compile HIP source code 5930. In at least one embodiment, HIP compiler driver 5940 provides access to a HIP to CUDA translation header 5952 as part of configuring CUDA compiler 5950. In at least one embodiment, HIP to CUDA translation header 5952 translates any number of mechanisms (e.g., functions) specified in any number of HIP APIs to any number of mechanisms specified in any number of CUDA APIs. In at least one embodiment, CUDA compiler 5950 uses HIP to CUDA translation header 5952 in conjunction with a CUDA runtime library 5954 corresponding to CUDA runtime API 5902 to generate host executable code 5970(1) and CUDA device executable code 5984. In at least one embodiment, host executable code 5970(1) and CUDA device executable code 5984 may then be executed on, respectively, CPU 5990 and CUDA-enabled GPU 5994. In at least one embodiment, CUDA device executable code 5984 includes, without limitation, binary code. In at least one embodiment, CUDA device executable code 5984 includes, without limitation, PTX code and is further compiled into binary code for a specific target device at runtime.

Figure 59C:
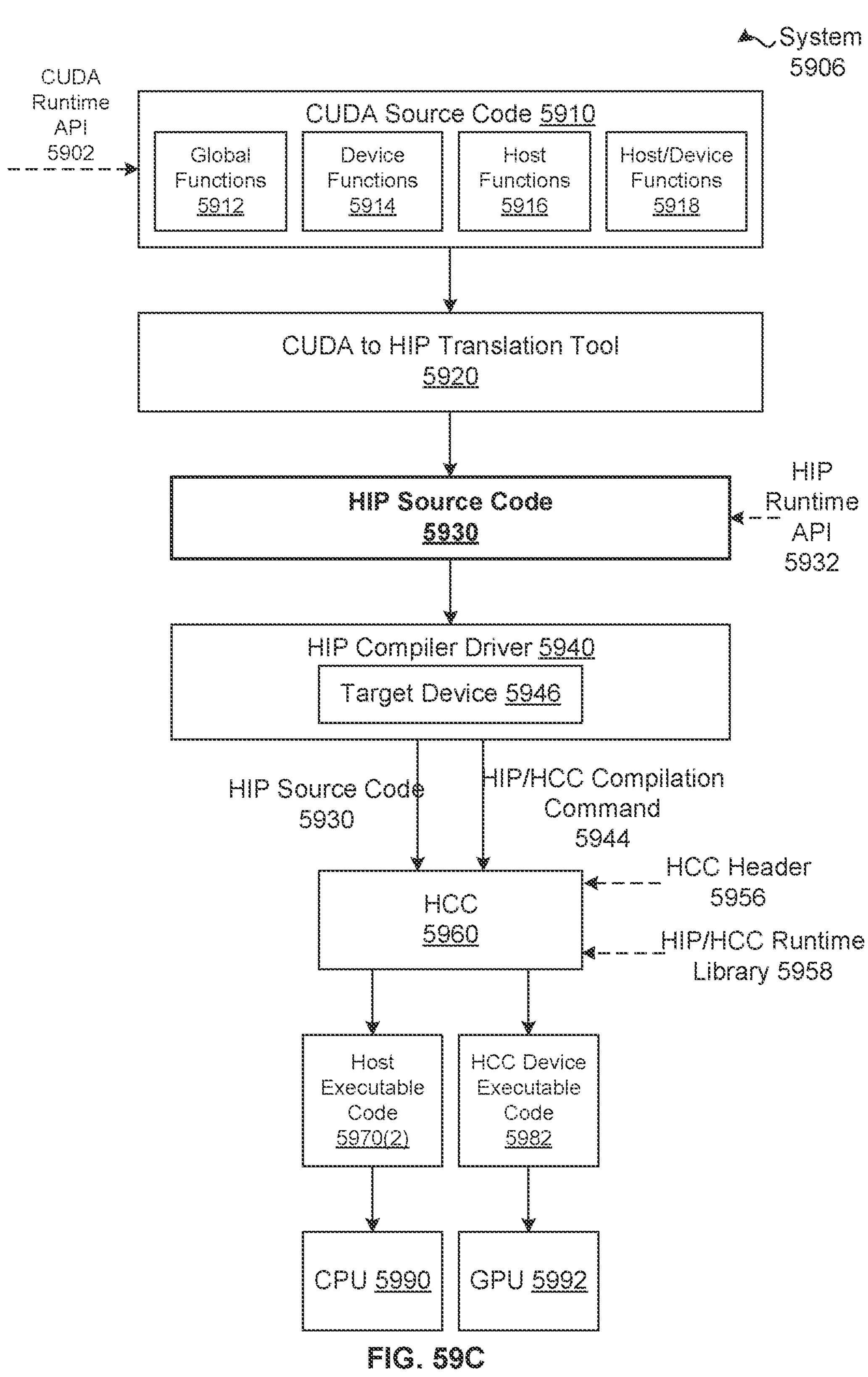
FIG. 59C illustrates a system configured to compile and execute CUDA source code of FIG. 59A using a CPU and a non-CUDA-enabled GPU, in accordance with at least one embodiment.

FIG. 59C illustrates a system 5906 configured to compile and execute CUDA source code 5910 of FIG. 59A using CPU 5990 and non-CUDA-enabled GPU 5992, in accordance with at least one embodiment. In at least one embodiment, system 5906 includes, without limitation, CUDA source code 5910, CUDA to HIP translation tool 5920, HIP source code 5930, HIP compiler driver 5940, HCC 5960, host executable code 5970(2), HCC device executable code 5982, CPU 5990, and GPU 5992.

In at least one embodiment, system 5900, system 5904, system 5906, or some combination thereof can be configured to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, system 5900, system 5904, system 5906, or some combination thereof can be configured to execute a schedule job API to receive inputs to cause an indication of computing resources to be used to by software instructions. In at least one embodiment, system 5900, system 5904, system 5906, or some combination thereof can be configured to execute a schedule job API to receive inputs to indicate a priority with which to perform instructions.

In at least one embodiment, system 5900, system 5904, system 5906, or some combination thereof can be configured to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, system 5900, system 5904, system 5906, or some combination thereof can be configured to execute a get all available profiles API to receive frequency inputs, computing resource inputs, priority inputs, processor identifiers, or some combination thereof, to identify a processor settings profile, or as otherwise described herein.

In at least one embodiment, system 5900, system 5904, system 5906, or some combination thereof can be configured to execute a schedule set specific profile on processor API to receive an indication of a processor settings profile to cause instructions to be performed by processors configured according to that processor settings profile, or as otherwise described herein.

In at least one embodiment, at least one component shown or described with respect to FIGS. 59A-59C is used to implement techniques and/or functions described in connection with FIGS. 1-33. In at least one embodiment, system 5906 performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, APU 3800 can be configured to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, APU 3800 can be configured to execute a schedule job API to receive inputs to cause an indication of computing resources to be used to by software instructions. In at least one embodiment, APU 3800 can be configured to execute a schedule job API to receive inputs to indicate a priority with which to perform instructions.

In at least one embodiment, APU 3800 can be configured to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, APU 3800 can be configured to execute a get all available profiles API to receive frequency inputs, computing resource inputs, priority inputs, processor identifiers, or some combination thereof, to identify a processor settings profile, or as otherwise described herein.

In at least one embodiment, APU 3800 can be configured to execute a schedule set specific profile on processor API to receive an indication of a processor settings profile to cause instructions to be performed by processors configured according to that processor settings profile, or as otherwise described herein.

In at least one embodiment and as described previously herein in conjunction with FIG. 59A, CUDA source code 5910 includes, without limitation, any number (including zero) of global functions 5912, any number (including zero) of device functions 5914, any number (including zero) of host functions 5916, and any number (including zero) of host/device functions 5918. In at least one embodiment, CUDA source code 5910 also includes, without limitation, any number of calls to any number of functions that are specified in any number of CUDA APIs.

In at least one embodiment, CUDA to HIP translation tool 5920 translates CUDA source code 5910 to HIP source code 5930. In at least one embodiment, CUDA to HIP translation tool 5920 converts each kernel call in CUDA source code 5910 from a CUDA syntax to a HIP syntax and converts any number of other CUDA calls in source code 5910 to any number of other functionally similar HIP calls.

In at least one embodiment, HIP compiler driver 5940 subsequently determines that target device 5946 is not CUDA-enabled and generates HIP/HCC compilation command 5944. In at least one embodiment, HIP compiler driver 5940 then configures HCC 5960 to execute HIP/HCC compilation command 5944 to compile HIP source code 5930. In at least one embodiment, HIP/HCC compilation command 5944 configures HCC 5960 to use, without limitation, a HIP/HCC runtime library 5958 and an HCC header 5956 to generate host executable code 5970(2) and HCC device executable code 5982. In at least one embodiment, HIP/HCC runtime library 5958 corresponds to HIP runtime API 5932. In at least one embodiment, HCC header 5956 includes, without limitation, any number and type of interoperability mechanisms for HIP and HCC. In at least one embodiment, host executable code 5970(2) and HCC device executable code 5982 may be executed on, respectively, CPU 5990 and GPU 5992.

FIG. 60 illustrates an exemplary kernel translated by CUDA-to-HIP translation tool 5920 of FIG. 59C, in accordance with at least one embodiment. In at least one embodiment, CUDA source code 5910 partitions an overall problem that a given kernel is designed to solve into relatively coarse sub-problems that can independently be solved using thread blocks. In at least one embodiment, each thread block includes, without limitation, any number of threads. In at least one embodiment, each sub-problem is partitioned into relatively fine pieces that can be solved cooperatively in parallel by threads within a thread block. In at least one embodiment, threads within a thread block can cooperate by sharing data through shared memory and by synchronizing execution to coordinate memory accesses.

In at least one embodiment, source code 5910 can be compiled and be performed by a processor to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, source code 5910 can be compiled and be performed by a processor to execute a schedule job API to receive inputs to cause an indication of computing resources to be used to by software instructions. In at least one embodiment, source code 5910 can be compiled and be performed by a processor to execute a schedule job API to receive inputs to indicate a priority with which to perform instructions.

In at least one embodiment, source code 5910 can be compiled and be performed by a processor to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, source code 5910 can be compiled and be performed by a processor to execute a get all available profiles API to receive frequency inputs, computing resource inputs, priority inputs, processor identifiers, or some combination thereof, to identify a processor settings profile, or as otherwise described herein.

In at least one embodiment, source code 5910 can be compiled and be performed by a processor to execute a schedule set specific profile on processor API to receive an indication of a processor settings profile to cause instructions to be performed by processors configured according to that processor settings profile, or as otherwise described herein.

In at least one embodiment, at least one component shown or described with respect to FIG. 60 is used to implement techniques and/or functions described in connection with FIGS. 1-33. In at least one embodiment, a kernel of FIG. 60 comprises instructions that, when launched, performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, CUDA source code 5910 organizes thread blocks associated with a given kernel into a one-dimensional, a two-dimensional, or a three-dimensional grid of thread blocks. In at least one embodiment, each thread block includes, without limitation, any number of threads, and a grid includes, without limitation, any number of thread blocks.

In at least one embodiment, a kernel is a function in device code that is defined using a "_global_" declaration specifier. In at least one embodiment, the dimension of a grid that executes a kernel for a given kernel call and associated streams are specified using a CUDA kernel launch syntax 6010. In at least one embodiment, CUDA kernel launch syntax 6010 is specified as "KernelName<<<GridSize, BlockSize, SharedMemorySize, Stream>>>(KernelArguments);". In at least one embodiment, an execution configuration syntax is a "<<< . . . >>>" construct that is inserted between a kernel name ("KernelName") and a parenthesized list of kernel arguments ("KernelArguments"). In at least one embodiment, CUDA kernel launch syntax 6010 includes, without limitation, a CUDA launch function syntax instead of an execution configuration syntax.

In at least one embodiment, "GridSize" is of a type dim3 and specifies the dimension and size of a grid. In at least one embodiment, type dim3 is a CUDA-defined structure that includes, without limitation, unsigned integers x, y, and z. In at least one embodiment, if z is not specified, then z defaults to one. In at least one embodiment, if y is not specified, then y defaults to one. In at least one embodiment, the number of thread blocks in a grid is equal to the product of GridSize.x, GridSize.y, and GridSize.z. In at least one embodiment, "BlockSize" is of type dim3 and specifies the dimension and size of each thread block. In at least one embodiment, the number of threads per thread block is equal to the product of BlockSize.x, BlockSize.y, and BlockSize.z. In at least one embodiment, each thread that executes a kernel is given a unique thread ID that is accessible within the kernel through a built-in variable (e.g., "threadIdx").

In at least one embodiment and with respect to CUDA kernel launch syntax 6010, "SharedMemorySize" is an optional argument that specifies a number of bytes in a shared memory that is dynamically allocated per thread block for a given kernel call in addition to statically allocated memory. In at least one embodiment and with respect to CUDA kernel launch syntax 6010, SharedMemorySize defaults to zero. In at least one embodiment and with respect to CUDA kernel launch syntax 6010, "Stream" is an optional argument that specifies an associated stream and defaults to zero to specify a default stream. In at least one embodiment, a stream is a sequence of commands (possibly issued by different host threads) that execute in order. In at least one embodiment, different streams may execute commands out of order with respect to one another or concurrently.

In at least one embodiment, CUDA source code 5910 includes, without limitation, a kernel definition for an exemplary kernel "MatAdd" and a main function. In at least one embodiment, main function is host code that executes on a host and includes, without limitation, a kernel call that causes kernel MatAdd to execute on a device. In at least one embodiment and as shown, kernel MatAdd adds two matrices A and B of size N×N, where N is a positive integer, and stores the result in a matrix C. In at least one embodiment, main function defines a threadsPerBlock variable as 16 by 16 and a numBlocks variable as N/16 by N/16. In at least one embodiment, main function then specifies kernel call "MatAdd<<<numBlocks, threadsPerBlock>>>(A, B, C);". In at least one embodiment and as per CUDA kernel launch syntax 6010, kernel MatAdd is executed using a grid of thread blocks having a dimension N/16 by N/16, where each thread block has a dimension of 16 by 16. In at least one embodiment, each thread block includes 256 threads, a grid is created with enough blocks to have one thread per matrix element, and each thread in such a grid executes kernel MatAdd to perform one pair-wise addition.

In at least one embodiment, while translating CUDA source code 5910 to HIP source code 5930, CUDA to HIP translation tool 5920 translates each kernel call in CUDA source code 5910 from CUDA kernel launch syntax 6010 to a HIP kernel launch syntax 6020 and converts any number of other CUDA calls in source code 5910 to any number of other functionally similar HIP calls. In at least one embodiment, HIP kernel launch syntax 6020 is specified as "hipLaunchKernelGGL (KernelName, GridSize, BlockSize, SharedMemorySize, Stream, KernelArguments);". In at least one embodiment, each of KernelName, GridSize, BlockSize, ShareMemorySize, Stream, and KernelArguments has the same meaning in HIP kernel launch syntax 6020 as in CUDA kernel launch syntax 6010 (described previously herein). In at least one embodiment, arguments SharedMemorySize and Stream are required in HIP kernel launch syntax 6020 and are optional in CUDA kernel launch syntax 6010.

In at least one embodiment, a portion of HIP source code 5930 depicted in FIG. 60 is identical to a portion of CUDA source code 5910 depicted in FIG. 60 except for a kernel call that causes kernel MatAdd to execute on a device. In at least one embodiment, kernel MatAdd is defined in HIP source code 5930 with the same "_global_" declaration specifier with which kernel MatAdd is defined in CUDA source code 5910. In at least one embodiment, a kernel call in HIP source code 5930 is "hipLaunchKernelGGL (MatAdd, numBlocks, threadsPerBlock, 0, 0, A, B, C);", while a corresponding kernel call in CUDA source code 5910 is "MatAdd<<<numBlocks, threadsPerBlock>>>(A, B, C);".

Figure 61:
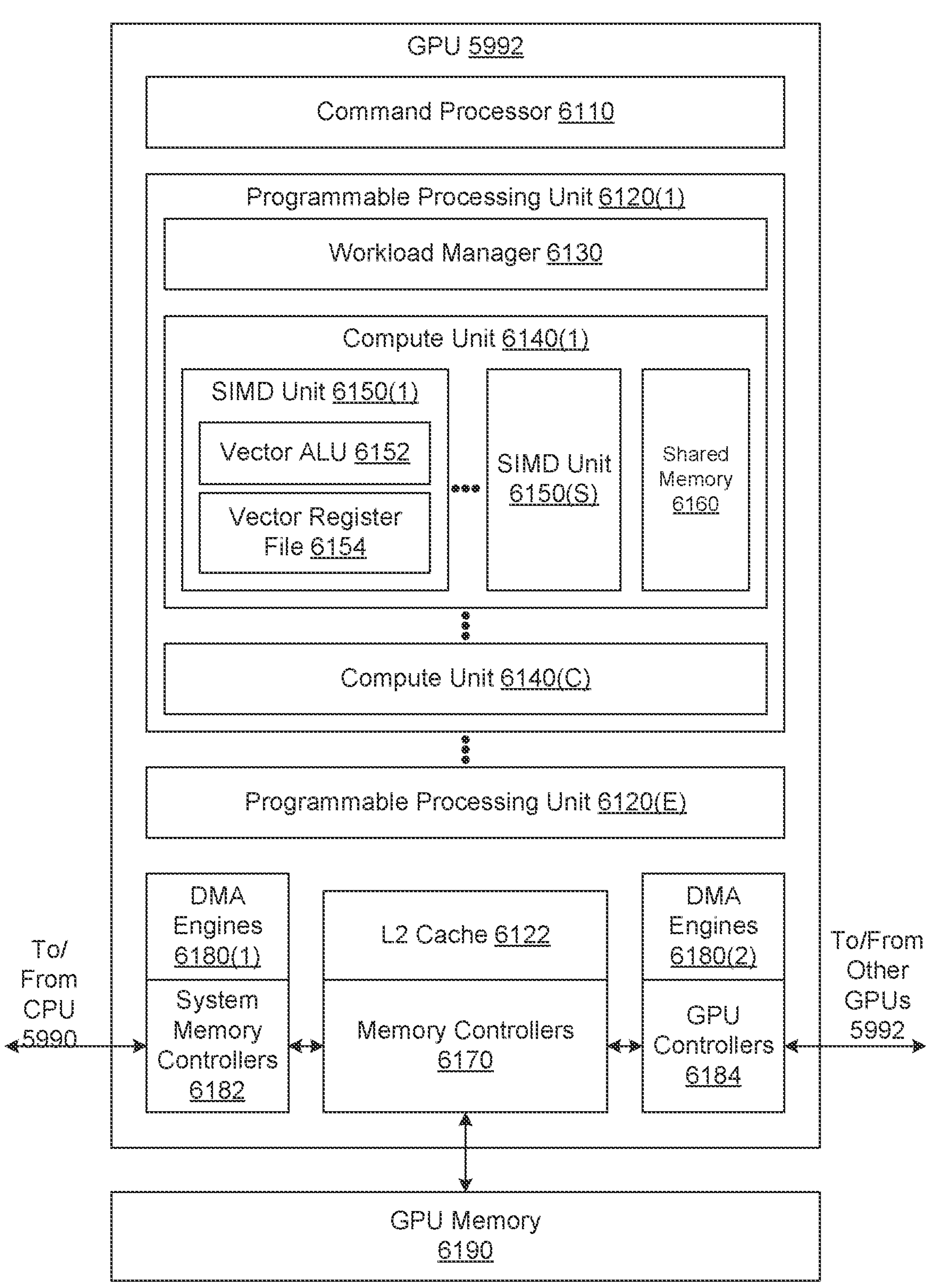
FIG. 61 illustrates non-CUDA-enabled GPU of FIG. 59C in greater detail, in accordance with at least one embodiment.

FIG. 61 illustrates non-CUDA-enabled GPU 5992 of FIG. 59C in greater detail, in accordance with at least one embodiment. In at least one embodiment, GPU 5992 is developed by AMD corporation of Santa Clara. In at least one embodiment, GPU 5992 can be configured to perform compute operations in a highly-parallel fashion. In at least one embodiment, GPU 5992 is configured to execute graphics pipeline operations such as draw commands, pixel operations, geometric computations, and other operations associated with rendering an image to a display. In at least one embodiment, GPU 5992 is configured to execute operations unrelated to graphics. In at least one embodiment, GPU 5992 is configured to execute both operations related to graphics and operations unrelated to graphics. In at least one embodiment, GPU 5992 can be configured to execute device code included in HIP source code 5930.

In at least one embodiment, non-CUDA-enabled GPU 5992 can be configured to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, non-CUDA-enabled GPU 5992 can be configured to execute a schedule job API to receive inputs to cause an indication of computing resources to be used to by software instructions. In at least one embodiment, non-CUDA-enabled GPU 5992 can be configured to execute a schedule job API to receive inputs to indicate a priority with which to perform instructions.

In at least one embodiment, non-CUDA-enabled GPU 5992 can be configured to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, non-CUDA-enabled GPU 5992 can be configured to execute a get all available profiles API to receive frequency inputs, computing resource inputs, priority inputs, processor identifiers, or some combination thereof, to identify a processor settings profile, or as otherwise described herein.

In at least one embodiment, non-CUDA-enabled GPU 5992 can be configured to execute a schedule set specific profile on processor API to receive an indication of a processor settings profile to cause instructions to be performed by processors configured according to that processor settings profile, or as otherwise described herein.

In at least one embodiment, at least one component shown or described with respect to FIG. 61 is used to implement techniques and/or functions described in connection with FIGS. 1-33. In at least one embodiment, non-CUDA-enabled GPU 5992 performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, GPU 5992 includes, without limitation, any number of programmable processing units 6120, a command processor 6110, an L2 cache 6122, memory controllers 6170, DMA engines 6180(1), system memory controllers 6182, DMA engines 6180(2), and GPU controllers 6184. In at least one embodiment, each programmable processing unit 6120 includes, without limitation, a workload manager 6130 and any number of compute units 6140. In at least one embodiment, command processor 6110 reads commands from one or more command queues (not shown) and distributes commands to workload managers 6130. In at least one embodiment, for each programmable processing unit 6120, associated workload manager 6130 distributes work to compute units 6140 included in programmable processing unit 6120. In at least one embodiment, each compute unit 6140 may execute any number of thread blocks, but each thread block executes on a single compute unit 6140. In at least one embodiment, a workgroup is a thread block.

In at least one embodiment, each compute unit 6140 includes, without limitation, any number of SIMD units 6150 and a shared memory 6160. In at least one embodiment, each SIMD unit 6150 implements a SIMD architecture and is configured to perform operations in parallel. In at least one embodiment, each SIMD unit 6150 includes, without limitation, a vector ALU 6152 and a vector register file 6154. In at least one embodiment, each SIMD unit 6150 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 6160. In at least one embodiment, compute unit 6140 includes one or more distributed shared memories (or distributed shared memory) that enable direct streaming multiprocessor (SM) to streaming multiple processor (SM) for operations related to loading, storing, and performing atomics across multiple SM shared memory blocks. compute unit 6140 includes one or more cluster distributed shared memories (DSMEM), which are blocks of memory within a cluster that enabled to access each other's shared memory directly.

In at least one embodiment, programmable processing units 6120 are referred to as "shader engines." In at least one embodiment, each programmable processing unit 6120 includes, without limitation, any amount of dedicated graphics hardware in addition to compute units 6140. In at least one embodiment, each programmable processing unit 6120 includes, without limitation, any number (including zero) of geometry processors, any number (including zero) of rasterizers, any number (including zero) of render back ends, workload manager 6130, and any number of compute units 6140.

In at least one embodiment, compute units 6140 share L2 cache 6122. In at least one embodiment, L2 cache 6122 is partitioned. In at least one embodiment, a GPU memory 6190 is accessible by all compute units 6140 in GPU 5992. In at least one embodiment, memory controllers 6170 and system memory controllers 6182 facilitate data transfers between GPU 5992 and a host, and DMA engines 6180(1) enable asynchronous memory transfers between GPU 5992 and such a host. In at least one embodiment, memory controllers 6170 and GPU controllers 6184 facilitate data transfers between GPU 5992 and other GPUs 5992, and DMA engines 6180(2) enable asynchronous memory transfers between GPU 5992 and other GPUs 5992.

In at least one embodiment, GPU 5992 includes, without limitation, any amount and type of system interconnect that facilitates data and control transmissions across any number and type of directly or indirectly linked components that may be internal or external to GPU 5992. In at least one embodiment, GPU 5992 includes, without limitation, any number and type of I/O interfaces (e.g., PCIe) that are coupled to any number and type of peripheral devices. In at least one embodiment, GPU 5992 may include, without limitation, any number (including zero) of display engines and any number (including zero) of multimedia engines. In at least one embodiment, GPU 5992 implements a memory subsystem that includes, without limitation, any amount and type of memory controllers (e.g., memory controllers 6170 and system memory controllers 6182) and memory devices (e.g., shared memories 6160) that may be dedicated to one component or shared among multiple components. In at least one embodiment, GPU 5992 implements a cache subsystem that includes, without limitation, one or more cache memories (e.g., L2 cache 6122) that may each be private to or shared between any number of components (e.g., SIMD units 6150, compute units 6140, and programmable processing units 6120).

Figure 62:
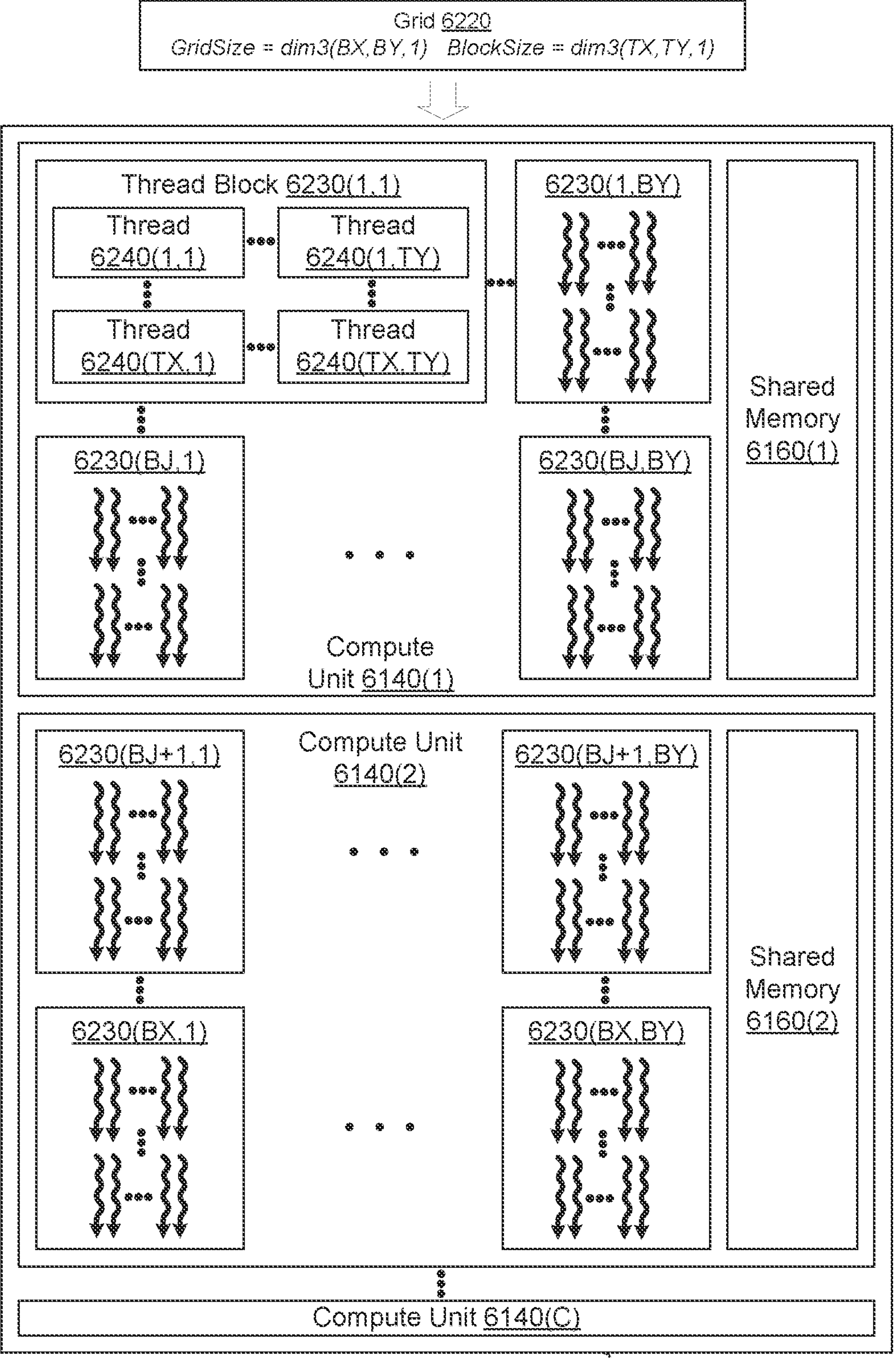
FIG. 62 illustrates how threads of an exemplary CUDA grid are mapped to different compute units of FIG. 61, in accordance with at least one embodiment.

FIG. 62 illustrates how threads of an exemplary CUDA grid 6220 are mapped to different compute units 6140 of FIG. 61, in accordance with at least one embodiment. In at least one embodiment and for explanatory purposes only, grid 6220 has a GridSize of BX by BY by 1 and a BlockSize of TX by TY by 1. In at least one embodiment, grid 6220 therefore includes, without limitation, (BX*BY) thread blocks 6230 and each thread block 6230 includes, without limitation, (TX*TY) threads 6240. Threads 6240 are depicted in FIG. 62 as squiggly arrows.

In at least one embodiment, CUDA grid 6220 can be configured to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, CUDA grid 6220 can be configured to execute a schedule job API to receive inputs to cause an indication of computing resources to be used to by software instructions. In at least one embodiment, CUDA grid 6220 can be configured to execute a schedule job API to receive inputs to indicate a priority with which to perform instructions.

In at least one embodiment, CUDA grid 6220 can be configured to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, CUDA grid 6220 can be configured to execute a get all available profiles API to receive frequency inputs, computing resource inputs, priority inputs, processor identifiers, or some combination thereof, to identify a processor settings profile, or as otherwise described herein.

In at least one embodiment, CUDA grid 6220 can be configured to execute a schedule set specific profile on processor API to receive an indication of a processor settings profile to cause instructions to be performed by processors configured according to that processor settings profile, or as otherwise described herein.

In at least one embodiment, at least one component shown or described with respect to FIG. 62 is used to implement techniques and/or functions described in connection with FIGS. 1-33. In at least one embodiment, CUDA grid 6220 performs one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, grid 6220 is mapped to programmable processing unit 6120(1) that includes, without limitation, compute units 6140(1)-6140(C). In at least one embodiment and as shown, (BJ*BY) thread blocks 6230 are mapped to compute unit 6140(1), and the remaining thread blocks 6230 are mapped to compute unit 6140(2). In at least one embodiment, each thread block 6230 may include, without limitation, any number of warps, and each warp is mapped to a different SIMD unit 6150 of FIG. 61.

In at least one embodiment, warps in a given thread block 6230 may synchronize together and communicate through shared memory 6160 included in associated compute unit 6140. For example and in at least one embodiment, warps in thread block 6230(BJ, 1) can synchronize together and communicate through shared memory 6160(1). For example and in at least one embodiment, warps in thread block 6230(BJ+1,1) can synchronize together and communicate through shared memory 6160(2).

Figure 63:
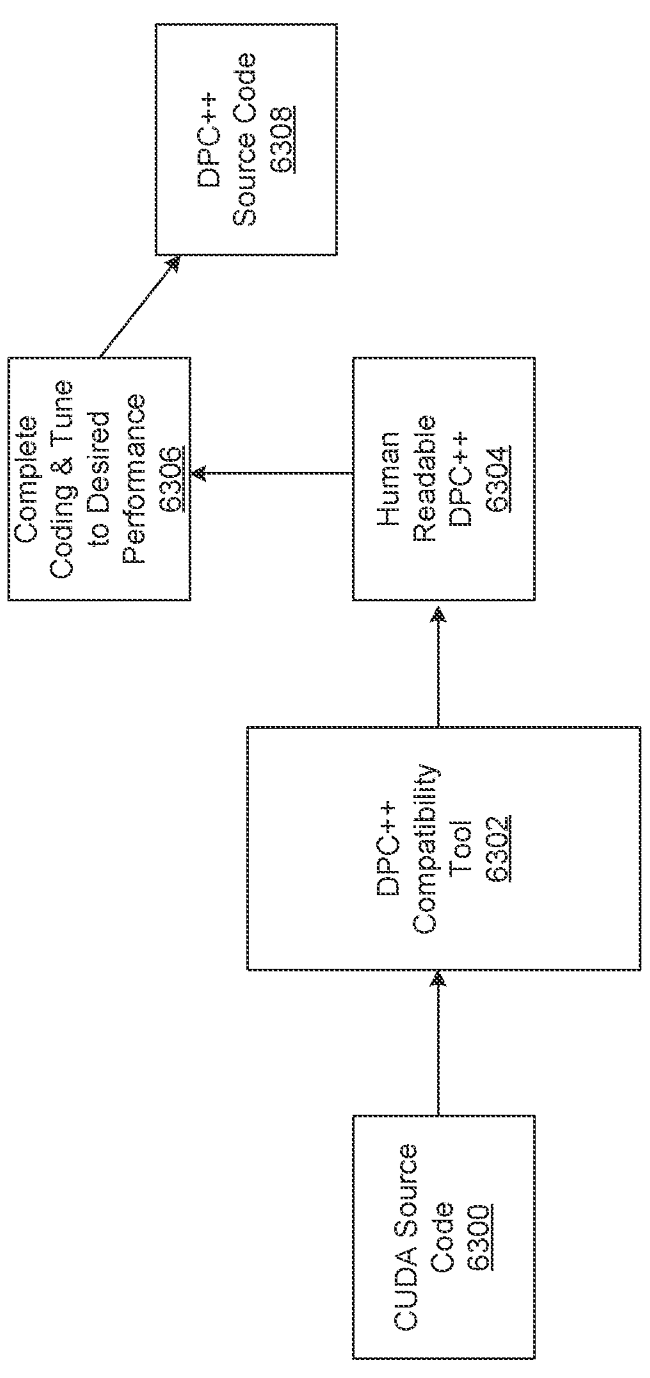
FIG. 63 illustrates how to migrate existing CUDA code to Data Parallel C++ code, in accordance with at least one embodiment.

FIG. 63 illustrates how to migrate existing CUDA code to Data Parallel C++ code, in accordance with at least one embodiment. Data Parallel C++ (DPC++) may refer to an open, standards-based alternative to single-architecture proprietary languages that allows developers to reuse code across hardware targets (CPUs and accelerators such as GPUs and FPGAs) and also perform custom tuning for a specific accelerator. DPC++ use similar and/or identical C and C++ constructs in accordance with ISO C++ which developers may be familiar with. DPC++ incorporates standard SYCL from The Khronos Group to support data parallelism and heterogeneous programming. SYCL refers to a cross-platform abstraction layer that builds on underlying concepts, portability and efficiency of OpenCL that enables code for heterogeneous processors to be written in a "single-source" style using standard C++. SYCL may enable single source development where C++ template functions can contain both host and device code to construct complex algorithms that use OpenCL acceleration, and then re-use them throughout their source code on different types of data.

In at least one embodiment, CUDA source code migrated to DPC++ can be performed to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, CUDA source code migrated to DPC++ can be performed to execute a schedule job API to receive inputs to cause an indication of computing resources to be used to by software instructions. In at least one embodiment, CUDA source code migrated to DPC++ can be performed to execute a schedule job API to receive inputs to indicate a priority with which to perform instructions.

In at least one embodiment, CUDA source code migrated to DPC++ can be performed to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, CUDA source code migrated to DPC++ can be performed to execute a get all available profiles API to receive frequency inputs, computing resource inputs, priority inputs, processor identifiers, or some combination thereof, to identify a processor settings profile, or as otherwise described herein.

In at least one embodiment, CUDA source code migrated to DPC++ can be performed to execute a schedule set specific profile on processor API to receive an indication of a processor settings profile to cause instructions to be performed by processors configured according to that processor settings profile, or as otherwise described herein.

In at least one embodiment, at least one component shown or described with respect to FIG. 63 is used to implement techniques and/or functions described in connection with FIGS. 1-3. In at least one embodiment, CUDA code migrated to Data Parallel C++ code, when performed, causes one or more processors to perform one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, a DPC++ compiler is used to compile DPC++ source code which can be deployed across diverse hardware targets. In at least one embodiment, a DPC++ compiler is used to generate DPC++ applications that can be deployed across diverse hardware targets and a DPC++ compatibility tool can be used to migrate CUDA applications to a multiplatform program in DPC++. In at least one embodiment, a DPC++ base tool kit includes a DPC++ compiler to deploy applications across diverse hardware targets; a DPC++ library to increase productivity and performance across CPUs, GPUs, and FPGAs; a DPC++ compatibility tool to migrate CUDA applications to multiplatform applications; and any suitable combination thereof.

In at least one embodiment, a DPC++ programming model is utilized to simply one or more aspects relating to programming CPUs and accelerators by using modern C++ features to express parallelism with a programming language called Data Parallel C++. DPC++ programming language may be utilized to code reuse for hosts (e.g., a CPU) and accelerators (e.g., a GPU or FPGA) using a single source language, with execution and memory dependencies being clearly communicated. Mappings within DPC++ code can be used to transition an application to run on a hardware or set of hardware devices that best accelerates a workload. A host may be available to simplify development and debugging of device code, even on platforms that do not have an accelerator available.

In at least one embodiment, CUDA source code 6300 is provided as an input to a DPC++ compatibility tool 6302 to generate human readable DPC++ 6304. In at least one embodiment, human readable DPC++ 6304 includes inline comments generated by DPC++ compatibility tool 6302 that guides a developer on how and/or where to modify DPC++ code to complete coding and tuning to desired performance 6306, thereby generating DPC++ source code 6308.

In at least one embodiment, CUDA source code 6300 is or includes a collection of human-readable source code in a CUDA programming language. In at least one embodiment, CUDA source code 6300 is human-readable source code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable on a device (e.g., GPU or FPGA) and may include or more parallelizable workflows that can be executed on one or more processor cores of a device. In at least one embodiment, a device may be a processor that is optimized for parallel instruction processing, such as CUDA-enabled GPU, GPU, or another GPGPU, etc. In at least one embodiment, host code is source code that, after compilation, is executable on a host. In least one embodiment, some or all of host code and device code can be executed in parallel across a CPU and GPU/FPGA. In at least one embodiment, a host is a processor that is optimized for sequential instruction processing, such as CPU. CUDA source code 6300 described in connection with FIG. 63 may be in accordance with those discussed elsewhere in this document.

In at least one embodiment, DPC++ compatibility tool 6302 refers to an executable tool, program, application, or any other suitable type of tool that is used to facilitate migration of CUDA source code 6300 to DPC++ source code 6308. In at least one embodiment, DPC++ compatibility tool 6302 is a command-line-based code migration tool available as part of a DPC++ tool kit that is used to port existing CUDA sources to DPC++. In at least one embodiment, DPC++ compatibility tool 6302 converts some or all source code of a CUDA application from CUDA to DPC++ and generates a resulting file that is written at least partially in DPC++, referred to as human readable DPC++ 6304. In at least one embodiment, human readable DPC++ 6304 includes comments that are generated by DPC++ compatibility tool 6302 to indicate where user intervention may be necessary. In at least one embodiment, user intervention is necessary when CUDA source code 6300 calls a CUDA API that has no analogous DPC++ API; other examples where user intervention is required are discussed later in greater detail.

In at least one embodiment, a workflow for migrating CUDA source code 6300 (e.g., application or portion thereof) includes creating one or more compilation database files; migrating CUDA to DPC++ using a DPC++ compatibility tool 6302; completing migration and verifying correctness, thereby generating DPC++ source code 6308; and compiling DPC++ source code 6308 with a DPC++ compiler to generate a DPC++ application. In at least one embodiment, a compatibility tool provides a utility that intercepts commands used when Makefile executes and stores them in a compilation database file. In at least one embodiment, a file is stored in JSON format. In at least one embodiment, an intercept-built command converts Makefile command to a DPC compatibility command.

In at least one embodiment, intercept-build is a utility script that intercepts a build process to capture compilation options, macro defs, and include paths, and writes this data to a compilation database file. In at least one embodiment, a compilation database file is a JSON file. In at least one embodiment, DPC++ compatibility tool 6302 parses a compilation database and applies options when migrating input sources. In at least one embodiment, use of intercept-build is optional, but highly recommended for Make or CMake based environments. In at least one embodiment, a migration database includes commands, directories, and files: command may include necessary compilation flags; directory may include paths to header files; file may include paths to CUDA files.

In at least one embodiment, DPC++ compatibility tool 6302 migrates CUDA code (e.g., applications) written in CUDA to DPC++ by generating DPC++ wherever possible. In at least one embodiment, DPC++ compatibility tool 6302 is available as part of a tool kit. In at least one embodiment, a DPC++ tool kit includes an intercept-build tool. In at least one embodiment, an intercept-built tool creates a compilation database that captures compilation commands to migrate CUDA files. In at least one embodiment, a compilation database generated by an intercept-built tool is used by DPC++ compatibility tool 6302 to migrate CUDA code to DPC++. In at least one embodiment, non-CUDA C++ code and files are migrated as is. In at least one embodiment, DPC++ compatibility tool 6302 generates human readable DPC++ 6304 which may be DPC++ code that, as generated by DPC++ compatibility tool 6302, cannot be compiled by DPC++ compiler and requires additional plumbing for verifying portions of code that were not migrated correctly, and may involve manual intervention, such as by a developer. In at least one embodiment, DPC++ compatibility tool 6302 provides hints or tools embedded in code to help developers manually migrate additional code that could not be migrated automatically. In at least one embodiment, migration is a one-time activity for a source file, project, or application.

In at least one embodiment, DPC++ compatibility tool 63002 is able to successfully migrate all portions of CUDA code to DPC++ and there may simply be an optional step for manually verifying and tuning performance of DPC++ source code that was generated. In at least one embodiment, DPC++ compatibility tool 6302 directly generates DPC++ source code 6308 which is compiled by a DPC++ compiler without requiring or utilizing human intervention to modify DPC++ code generated by DPC++ compatibility tool 6302. In at least one embodiment, DPC++ compatibility tool generates compile-able DPC++ code which can be optionally tuned by a developer for performance, readability, maintainability, other various considerations; or any combination thereof.

In at least one embodiment, one or more CUDA source files are migrated to DPC++ source files at least partially using DPC++ compatibility tool 6302. In at least one embodiment, CUDA source code includes one or more header files which may include CUDA header files. In at least one embodiment, a CUDA source file includes a <cuda.h> header file and a <stdio.h> header file which can be used to print text. In at least one embodiment, a portion of a vector addition kernel CUDA source file may be written as or related to:

```
#include <cuda.h>
#include <stdio.h>
#define VECTOR_SIZE 256
[ ] global___ void VectorAddKernel(float* A, float* B, float* C)
{
  A[threadIdx.x] = threadIdx.x + 1.0f;
  B[threadIdx.x] = threadIdx.x + 1.0f;
  C[threadIdx.x] = A[threadIdx.x] + B[threadIdx.x];
}
int main( )
{
  float *d_A, *d_B, *d_C;
  cudaMalloc(&d_A, VECTOR_SIZE*sizeof(float));
  cudaMalloc(&d_B, VECTOR_SIZE*sizeof(float));
  cudaMalloc(&d_C, VECTOR_SIZE*sizeof(float));
  VectorAddKernel<<<1, VECTOR_SIZE>>>(d_A, d_B, d_C);
  float Result[VECTOR_SIZE] = { };
  cudaMemcpy(Result, d_C, VECTOR_SIZE*sizeof(float),
cudaMemcpyDeviceToHost);
  cudaFree(d_A);
  cudaFree(d_B);
  cudaFree(d_C);
  for (int i=0; i<VECTOR_SIZE; i++ {
    if (i % 16 == 0) {
      printf("\n");
    }
    printf("%f ", Result[i]);
  }
  return 0;
}
```

In at least one embodiment and in connection with CUDA source file presented above, DPC++ compatibility tool 6302 parses a CUDA source code and replaces header files with appropriate DPC++ and SYCL header files. In at least one embodiment, DPC++ header files includes helper declarations. In CUDA, there is a concept of a thread ID and correspondingly, in DPC++ or SYCL, for each element there is a local identifier.

In at least one embodiment and in connection with CUDA source file presented above, there are two vectors A and B which are initialized and a vector addition result is put into vector C as part of VectorAddKernel ( ) In at least one embodiment, DPC++ compatibility tool 6302 converts CUDA thread IDs used to index work elements to SYCL standard addressing for work elements via a local ID as part of migrating CUDA code to DPC++ code. In at least one embodiment, DPC++ code generated by DPC++ compatibility tool 6302 can be optimized—for example, by reducing dimensionality of an nd_item, thereby increasing memory and/or processor utilization.

In at least one embodiment and in connection with CUDA source file presented above, memory allocation is migrated. In at least one embodiment, cudaMalloc ( ) is migrated to a unified shared memory SYCL call malloc_device ( ) to which a device and context is passed, relying on SYCL concepts such as platform, device, context, and queue. In at least one embodiment, a SYCL platform can have multiple devices (e.g., host and GPU devices); a device may have multiple queues to which jobs can be submitted; each device may have a context; and a context may have multiple devices and manage shared memory objects.

In at least one embodiment and in connection with CUDA source file presented above, a main ( ) function invokes or calls VectorAddKernel ( ) to add two vectors A and B together and store result in vector C. In at least one embodiment, CUDA code to invoke VectorAddKernel ( ) is replaced by DPC++ code to submit a kernel to a command queue for execution. In at least one embodiment, a command group handler cgh passes data, synchronization, and computation that is submitted to the queue, parallel_for is called for a number of global elements and a number of work items in that work group where VectorAddKernel ( ) is called.

In at least one embodiment and in connection with CUDA source file presented above, CUDA calls to copy device memory and then free memory for vectors A, B, and C are migrated to corresponding DPC++ calls. In at least one embodiment, C++ code (e.g., standard ISO C++ code for printing a vector of floating point variables) is migrated as is, without being modified by DPC++ compatibility tool 6302. In at least one embodiment, DPC++ compatibility tool 6302 modify CUDA APIs for memory setup and/or host calls to execute kernel on the acceleration device. In at least one embodiment and in connection with CUDA source file presented above, a corresponding human readable DPC++ 6304 (e.g., which can be compiled) is written as or related to:

```
#include <CL/sycl.hpp>
#include <dpct/dpct.hpp>
#define VECTOR_SIZE 256
void VectorAddKernel(float* A, float* B, float* C,
          sycl::nd_item<3> item_ct1)
{
  A[item_ct1.get_local_id(2)] = item_ct1.get_local_id(2) + 1.0f;
  B[item_ct1.get_local_id(2)] = item_ct1.get_local_id(2) + 1.0f;
  C[item_ct1.get_local_id(2)] =
       A[item_ct1.get_local_id(2)] + B[item_ct1.get_local_id(2)];
}
int main( )
{
  float *d_A, *d_B, *d_C;
  d_A = (float *)sycl::malloc_device(VECTOR_SIZE * sizeof(float),
    dpct::get_current_device( ),
    dpct::get_default_context( ));
  d_B = (float *)sycl::malloc_device(VECTOR_SIZE * sizeof(float),
    dpct::get_current_device( ),
    dpct::get_default_context( ));
  d_C = (float *)sycl::malloc_device(VECTOR_SIZE * sizeof(float),
    dpct::get_current_device( ),
    dpct::get_default_context( ));
  dpct::get_default_queue_wait( ).submit([&](sycl::handler &cgh) {
    cgh.parallel_for(
      sycl::nd_range<3>(sycl::range<3>(1, 1, 1) *
            sycl::range<3>(1, 1, VECTOR_SIZE) *
            sycl::range<3>(1, 1, VECTOR_SIZE)),
      [=](sycl::nd_items<3> item_ct1) {
        VectorAddKernel(d_A, d_B, d_C, item_ct1);
      });
  });
```

-continued

```
  float Result[VECTOR_SIZE] = { };
  dpct::get_default_queue_wait( )
    .memcpy(Result, d_C, VECTOR_SIZE * sizeof(float))
    .wait( );
  sycl::free(d_A, dpct::get_default_context( ));
  sycl::free(d_B, dpct::get_default_context( ));
  sycl::free(d_C, dpct::get_default_context( ));
  for (int i=0; i<VECTOR_SIZE; i++ {
    if (i % 16 == 0) {
        printf("\n");
    }
    printf("%f ", Result[i]);
  }
  return 0;
}
```

In at least one embodiment, human readable DPC++ 6304 refers to output generated by DPC++ compatibility tool 6302 and may be optimized in one manner or another. In at least one embodiment, human readable DPC++ 6304 generated by DPC++ compatibility tool 6302 can be manually edited by a developer after migration to make it more maintainable, performance, or other considerations. In at least one embodiment, DPC++ code generated by DPC++ compatibility tool 63002 such as DPC++ disclosed can be optimized by removing repeat calls to get_current_device ( ) and/or get_default_context ( ) for each malloc_device ( ) call. In at least one embodiment, DPC++ code generated above uses a 3 dimensional nd_range which can be refactored to use only a single dimension, thereby reducing memory usage. In at least one embodiment, a developer can manually edit DPC++ code generated by DPC++ compatibility tool 6302 replace uses of unified shared memory with accessors. In at least one embodiment, DPC++ compatibility tool 6302 has an option to change how it migrates CUDA code to DPC++ code. In at least one embodiment, DPC++ compatibility tool 6302 is verbose because it is using a general template to migrate CUDA code to DPC++ code that works for a large number of cases.

In at least one embodiment, a CUDA to DPC++ migration workflow includes steps to: prepare for migration using intercept-build script; perform migration of CUDA projects to DPC++ using DPC++ compatibility tool 6302; review and edit migrated source files manually for completion and correctness; and compile final DPC++ code to generate a DPC++ application. In at least one embodiment, manual review of DPC++ source code may be required in one or more scenarios including but not limited to: migrated API does not return error code (CUDA code can return an error code which can then be consumed by the application but SYCL uses exceptions to report errors, and therefore does not use error codes to surface errors); CUDA compute capability dependent logic is not supported by DPC++; statement could not be removed. In at least one embodiment, scenarios in which DPC++ code requires manual intervention may include, without limitation: error code logic replaced with (*,0) code or commented out; equivalent DPC++ API not available; CUDA compute capability-dependent logic; hardware-dependent API (clock ( ); missing features unsupported API; execution time measurement logic; handling built-in vector type conflicts; migration of cuBLAS API; and more.

In at least one embodiment, one or more techniques described herein utilize a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model utilizes a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is utilized to interact with various accelerator, GPU, processor, and/or variations thereof, architectures. In at least one embodiment, oneAPI includes a set of libraries that implement various functionalities. In at least one embodiment, oneAPI includes at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oneAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oneAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is utilized for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as oneVPL, is a library that is utilized for accelerating video processing in one or more applications. In at least one embodiment, oneVPL implements various video decoding, encoding, and processing functions. In at least one embodiment, one VPL implements various functions for media pipelines on CPUs, GPUs, and other accelerators. In at least one embodiment, one VPL implements device discovery and selection in media centric and video analytics workloads. In at least one embodiment, oneVPL implements API primitives for zero-copy buffer sharing.

In at least one embodiment, a oneAPI programming model utilizes a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a subset of functionality of a CUDA programming language. In at least one embodiment, one or more CUDA programming model operations are performed using a oneAPI programming model using a DPC++ programming language.

Figure 64:
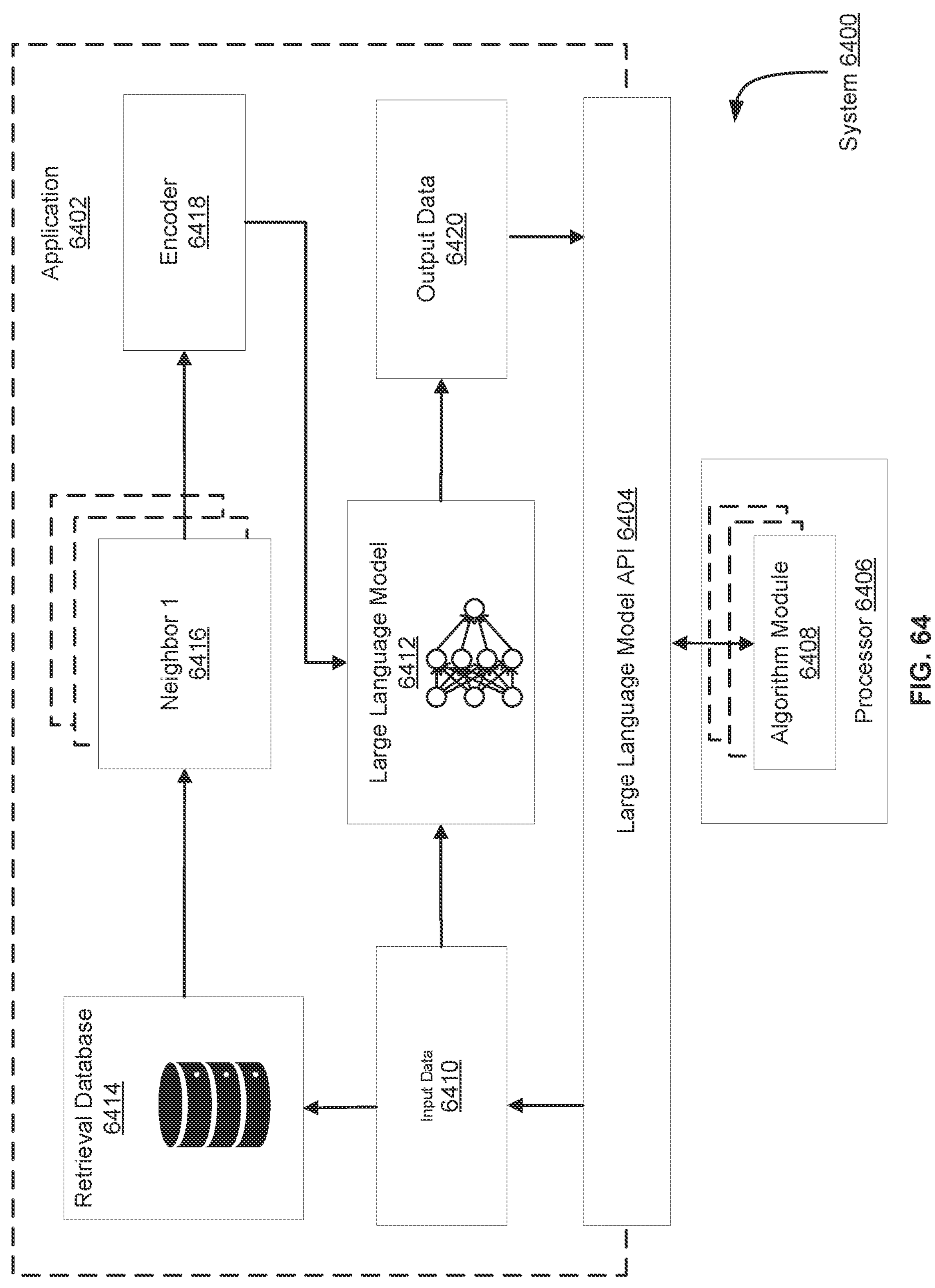
FIG. 64 illustrates components of a system to access a large language model, in accordance with at least one embodiment.

FIG. 64 is a system diagram illustrating system 6400 for interfacing with an application 6402 to process data, according to at least one embodiment. In at least one embodiment, application 6402 uses large language model (LLM) 6412 to generate output data 6420 based, at least in part, on input data 6410. In at least one embodiment, input data 6410 is a text prompt. In at least one embodiment, input data 6410 includes unstructured text. In at least one embodiment, input data 6410 includes a sequence of tokens. In at least one embodiment, a token is a portion of input data. In at least one embodiment, a token is a word. In at least one embodiment, a token is a character. In at least one embodiment, a token is a subword. In at least one embodiment, input data 6410 is formatted in Chat Markup Language (ChatML). In at least one embodiment, input data 6410 is an image. In at least one embodiment, input data 6410 is one or more video frames. In at least one embodiment, input data 6410 is any other expressive medium.

In at least one embodiment, system 6400 can be configured to execute a schedule job API to receive indications, as inputs, of a processor performance preference, job type, job priority, or some combination thereof, to cause processors to be configured to operate at a clock frequency, as described in conjunction with FIGS. 8A-C or as otherwise described herein. In at least one embodiment, system 6400 can be configured to execute a schedule job API to receive inputs to cause an indication of computing resources to be used to by software instructions. In at least one embodiment, system 6400 can be configured to execute a schedule job API to receive inputs to indicate a priority with which to perform instructions.

In at least one embodiment, system 6400 can be configured to execute a get all available profiles API to receive, as inputs, indications of a processor performance preference, frequency inputs, job type, computing resource inputs, priority inputs, processor identifier, or some combination thereof, to cause an identification of a processor settings profile, or as otherwise described herein. In at least one embodiment, system 6400 can be configured to execute a get all available profiles API to receive frequency inputs, computing resource inputs, priority inputs, processor identifiers, or some combination thereof, to identify a processor settings profile, or as otherwise described herein.

In at least one embodiment, system 6400 can be configured to execute a schedule set specific profile on processor API to receive an indication of a processor settings profile to cause instructions to be performed by processors configured according to that processor settings profile, or as otherwise described herein.

In at least one embodiment, at least one component shown or described with respect to FIG. 64 is used to implement techniques and/or functions described in connection with FIGS. 1-33. In at least one embodiment, LLM 6412 generates code customized for a user to cause one or more processors to perform one or more operations of an API to identify one or more settings to be used to configure one or more processors based, at least in part, one or more characteristics of a job to be performed by the one or more processors as described in conjunction with FIG. 1, or as otherwise described herein.

In at least one embodiment, large language model 6412 comprises a deep neural network. In at least one embodiment, a deep neural network is a neural network with two or more layers. In at least one embodiment, large language model 6412 comprises a transformer model. In at least one embodiment, large language model 6412 comprises a neural network configured to perform natural language processing. In at least one embodiment, large language model 6412 is configured to process one or more sequences of data. In at least one embodiment, large language model 6412 is configured to process text. In at least one embodiment, weights and biases of a large language model 6412 are configured to process text. In at least one embodiment, large language model 6412 is configured to determine patterns in data to perform one or more natural language processing tasks. In at least one embodiment, a natural language processing task comprises text generation. In at least one embodiment, a natural language processing task comprises question answering. In at least one embodiment, performing a natural language processing task results in output data 6420.

In at least one embodiment, a processor uses input data 6410 to query retrieval database 6414. In at least one embodiment, retrieval database 6414 is a key-value store. In at least one embodiment, retrieval database 6414 is a corpus used to train large language model 6412. In at least one embodiment, a processor uses retrieval database 6414 to provide large language model 6412 with updated information. In at least one embodiment, retrieval database 6414 comprises data from an internet source. In at least one embodiment, large language model 6412 does not use retrieval database 6414 to perform inferencing.

In at least one embodiment, an encoder encodes input data 6410 into one or more feature vectors. In at least one embodiment, an encoder encodes input data 6410 into a sentence embedding vector. In at least one embodiment, a processor uses said sentencing embedding vector to perform a nearest neighbor search to generate one or more neighbors 6416. In at least one embodiment, one or more neighbors 6416 is value in retrieval database 6414 corresponding to a key comprising input data 6410. In at least one embodiment, one or more neighbors 6416 comprise text data. In at least one embodiment, encoder 6418 encodes one or more neighbors 6416. In at least one embodiment, encoder 6418 encodes one or more neighbors 6416 into a text embedding vector. In at least one embodiment, encoder 6418 encodes one or more neighbors 6416 into a sentence embedding vector. In at least one embodiment, large language model 6416 uses input data 6410 and data generated by encoder 6418 to generate output data 6420. In at least one embodiment, processor 6406 interfaces with application 6402 using large language model (LLM) application programming interface(s) (API(s)) 6404. In at least one embodiment, processor 6406 accesses large language model 6416 using large language model (LLM) application programming interface(s) (API(s)) 6404.

In at least one embodiment, output data 6420 comprise computer instructions. In at least one embodiment, output data 6420 comprise instructions written in CUDA programming language. In at least one embodiment, output data 6420 comprise instructions to be performed by processor 6406. In at least one embodiment, output data 6420 comprise instructions to control execution of one or more algorithm modules 6408. In at least one embodiment, one or more algorithm modules 6408 comprise, for example, one or more neural networks to perform pattern recognition. In at least one embodiment, one or more algorithm modules 6408 comprise, for example, one or more neural networks to perform frame generation. In at least one embodiment, one or more algorithm modules 6408 comprise, for example, one or more neural networks to generate a drive path. In at least one embodiment, one or more algorithm modules 6408 comprise, for example, one or more neural networks to generate a 5G signal. In at least one embodiment, processor 6406 interfaces with application 6402 using large language model (LLM) application programming interface(s) (API(s)) 6404. In at least one embodiment, processor 6406 may use one or more parallel computing platforms and/or programming models (e.g., NVIDIA's CUDA model).

In at least one embodiment, aspects of systems and techniques described herein in relation to FIG. 64 are incorporated into aspects of preceding figure(s). For example, in at least one embodiment, an apparatus depicted in preceding figure(s) includes processor 6406.

For example, in at least one embodiment, system 6400 uses ChatGPT to write CUDA code. For example, in at least one embodiment, system 6400 uses ChatGPT to train an object classification neural network. For example, in at least one embodiment, system 6400 uses ChatGPT and a neural network to identify a driving path. For example, in at least one embodiment, system 6400 uses ChatGPT and a neural network to generate a 5G signal.

It should be noted that, while example embodiments described herein may relate to a CUDA programming model, techniques described herein can be utilized with any suitable programming model, such HIP, oneAPI (e.g., using oneAPI-based programming to perform or implement a method disclosed herein), and/or variations thereof.

In at least one embodiment, one or more components of systems and/or processors disclosed above can communicate with one or more CPUs, ASICs, GPUs, FPGAs, or other hardware, circuitry, or integrated circuit components that include, e.g., an upscaler or upsampler to upscale an image, an image blender or image blender component to blend, mix, or add images together, a sampler to sample an image (e.g., as part of a DSP), a neural network circuit that is configured to perform an upscaler to upscale an image (e.g., from a low resolution image to a high resolution image), or other hardware to modify or generate an image, frame, or video to adjust its resolution, size, or pixels; one or more components of systems and/or processors disclosed above can use components described in this disclosure to perform methods, operations, or instructions that generate or modify an image.

At least one embodiment of the disclosure can be described in view of the following clauses:

1. A processor comprising:
   one or more circuits to perform an application programming interface (API) to identify one or more settings to be used to configure one or more processors to operate at one or more processor clock frequencies based, at least in part, on one or more priority inputs to the API.
2. The processor of clause 1, wherein the one or more priority inputs comprise one or more indications of one or more priorities of one or more instructions to be performed by the one or more processors.
3. The processor of any of clauses 1-2, wherein the one or more priority inputs are received from a scheduler of one or more instructions to be performed by the one or more processors.
4. The processor of any of clauses 1-3, wherein the API is to identify the one or more settings based, at least in part, on the one or more priority inputs that correspond to a set of instructions and one or more other priority inputs that correspond to another set of instructions.
5. The processor of any of clauses 1-4, wherein the API is to identify the one or more settings based, at least in part, on a percentage of one or more default values of the one or more settings.
6. The processor of any of clauses 1-5, wherein the API is to identify the one or more settings based, at least in part, on an integer used to bias one or more default values of the one or more settings.
7. The processor of any of clauses 1-6, wherein the one or more processors are part of one or more data centers.
8. A system, comprising:
   one or more processors to perform an application programming interface (API) to identify one or more settings to be used to configure one or more processors to operate at one or more processor clock frequencies based, at least in part, on one or more priority inputs to the API.

9. The system of clause 8, wherein the one or more priority inputs correspond to one or more software workloads to be performed by the one or more processors.
10. The system of any of clauses 8-9, wherein the one or more priority inputs are received from a scheduler of software workloads to be performed in a data center.
11. The system of any of clauses 8-10, wherein the one or more priority inputs correspond to a software workload and the one or more processors are to perform the software workload and another software workload concurrently.
12. The system of any of clauses 8-11, wherein the API identifies the one or more settings based, at least in part, on one or more indications of the one or more settings stored in one or more data structures that correlate the one or more indications with the one or more priority inputs.
13. The system of any of clauses 8-12, wherein the one or more settings comprise one or more processor setting values that are a percentage of one or more default processor setting values.
14. The system of any of clauses 8-13, wherein the one or more processors are one or more graphics processing units (GPUs) of a GPU cluster.
15. A method, comprising:
   performing an application programming interface (API) to identify one or more settings to be used to configure one or more processors to operate at one or more processor clock frequencies based, at least in part, on one or more priority inputs to the API.
16. The method of clause 15, wherein the one or more priority inputs correspond to one or more jobs to be performed by the one or more processors.
17. The method of any of clauses 15-16, wherein one or more priority inputs are received from a job scheduler of a data center.
18. The method of any of clauses 15-17, wherein the one or more priority inputs correspond to a job and the one or more processors are to perform the job and another job concurrently.
19. The method of any of clauses 15-18, wherein the API identifies the one or more settings based, at least in part, on a data structure that correlates one or more settings with the one or more priority inputs.
20. The method of any of clauses 15-19, wherein the one or more settings comprise one or more processor setting values that are based, at least in part, on one or more default processor setting values.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). A number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In present document, references may be made to obtaining, acquiring, receiving, or inputting analog or digital data into a subsystem, computer system, or computer-implemented machine. Process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. One or more processors, comprising:
circuitry to, in response to an application programming interface (API) call:
identify one or more settings to be used to configure one or more processors to operate at one or more processor clock frequencies based, at least in part, on:
one or more priority inputs to the API; and
one or more data structures correlating the one or more priority inputs with the one or more settings comprising the one or more processor clock frequencies.

2. The one or more processors of claim 1, wherein the one or more priority inputs comprise one or more indications of one or more priorities of one or more instructions to be performed by the one or more processors.

3. The one or more processors of claim 1, wherein the one or more priority inputs are received from a scheduler of one or more instructions to be performed by the one or more processors.

4. The one or more processors of claim 1, wherein the circuitry is further to, in response to the API call, identify the one or more settings based, at least in part, on the one or more priority inputs that correspond to a set of instructions and one or more other priority inputs that correspond to another set of instructions.

5. The one or more processors of claim 1, wherein the circuitry is further to, in response to the API call, identify the one or more settings based, at least in part, on a percentage of one or more default values of the one or more settings.

6. The processor of claim 1, wherein the circuitry is further to, in response to the API call, identify the one or more settings based, at least in part, on an integer used to bias one or more default values of the one or more settings.

7. The processor of claim 1, wherein the one or more processors are part of one or more data centers.

8. The one or more processors of claim 1, wherein the circuitry is further to, in response to the API call, to identify one or more settings to be used to configure one or more processors to operate at one or more processor clock frequencies based, at least in part, on performance metrics observed during performance of a software workload.

9. A system, comprising:
one or more processors to perform an application programming interface (API) to identify one or more settings to be used to configure one or more processors to operate at one or more processor clock frequencies based, at least in part, on:
one or more priority inputs to the API; and
one or more data structures correlating the one or more priority inputs with the one or more settings comprising the one or more processor clock frequencies.

10. The system of claim 9, wherein the one or more priority inputs correspond to one or more software workloads to be performed by the one or more processors.

11. The system of claim 9, wherein the one or more priority inputs are received from a scheduler of software workloads to be performed in a data center.

12. The system of claim 9, wherein the one or more priority inputs correspond to a software workload and the one or more processors are to perform the software workload and another software workload concurrently.

13. The system of claim 9, wherein the API identifies the one or more settings based, at least in part, on one or more indications of the one or more settings stored in one or more data structures that correlate the one or more indications with the one or more priority inputs.

14. The system of claim 9, wherein the one or more settings comprise one or more processor setting values that are a percentage of one or more default processor setting values.

15. The system of claim 9, wherein the one or more processors are one or more graphics processing units (GPUs) of a GPU cluster.

16. A method, comprising:
performing an application programming interface (API) to identify one or more settings to be used to configure one or more processors to operate at one or more processor clock frequencies based, at least in part, on:
one or more priority inputs to the API; and
one or more data structures correlating the one or more priority inputs with the one or more settings comprising the one or more processor clock frequencies.

17. The method of claim 16, wherein the one or more priority inputs correspond to one or more jobs to be performed by the one or more processors.

18. The method of claim 16, wherein one or more priority inputs are received from a job scheduler of a data center.

19. The method of claim 16, wherein the one or more priority inputs correspond to a job and the one or more processors are to perform the job and another job concurrently.

20. The method of claim 16, wherein the API identifies the one or more settings based, at least in part, on a data structure that correlates one or more settings with the one or more priority inputs.

21. The method of claim 16, wherein the one or more settings comprise one or more processor setting values that are based, at least in part, on one or more default processor setting values.

* * * * *